US006921497B2

(12) United States Patent
Nagel

(10) Patent No.: US 6,921,497 B2
(45) Date of Patent: Jul. 26, 2005

(54) COMPOSITION OF MATTER TAILORING: SYSTEM I

(75) Inventor: Christopher J. Nagel, Wayland, MA (US)

(73) Assignee: Electromagnetics Corporation, Fall River, MA (US)

(*) Notice: Subject to any disclaimer, the term of this patent is extended or adjusted under 35 U.S.C. 154(b) by 288 days.

(21) Appl. No.: 10/123,028

(22) Filed: Apr. 12, 2002

(65) Prior Publication Data

US 2004/0119053 A1 Jun. 24, 2004

Related U.S. Application Data

(63) Continuation-in-part of application No. 09/416,720, filed on Oct. 13, 1999, now Pat. No. 6,572,792, and a continuation-in-part of application No. PCT/US00/28549, filed on Oct. 13, 2000.

(51) Int. Cl.[7] .............................. H01B 1/02; H01B 1/04; C01B 33/02; C22C 9/00; C22C 13/00
(52) U.S. Cl. ....................... 252/512; 252/513; 148/221; 148/555; 75/392; 75/628; 75/638; 75/646; 423/348; 420/469; 420/497; 420/570; 420/557; 420/558; 420/127; 420/441
(58) Field of Search ................................ 252/512, 513, 252/514; 148/221, 555; 75/392, 628, 638, 646; 420/469, 497, 570, 558, 557, 127, 441; 423/348

(56) References Cited

U.S. PATENT DOCUMENTS 2,395,458 A * 2/1946 Cape ........................... 75/526

| | | | |
|---|---|---|---|
| 2,956,873 A | * 10/1960 | Gordon | 75/628 |
| 3,695,865 A | 10/1972 | Wolker | |
| 3,754,894 A | * 8/1973 | Saccomano et al. | 75/557 |
| 4,168,967 A | 9/1979 | Sridhar et al. | |
| 4,175,954 A | 11/1979 | Oden et al. | |
| 4,318,738 A | 3/1982 | Masumoto et al. | |
| 4,456,479 A | * 6/1984 | Harris et al. | 75/621 |
| 5,190,577 A | * 3/1993 | Bermel et al. | 75/552 |
| 5,288,342 A | 2/1994 | Job | 148/320 |
| 5,308,379 A | 5/1994 | Ishida et al. | 75/646 |
| 5,362,421 A | 11/1994 | Kropp et al. | 252/512 |
| 5,449,491 A | 9/1995 | Job | 420/590 |
| 5,632,826 A | 5/1997 | Hultin-Stigenberg et al. | 148/326 |
| 5,759,308 A | 6/1998 | Hultin-Stigenberg et al. | 148/607 |
| 6,008,069 A | 12/1999 | Yamada | 438/113 |
| 6,192,969 B1 | 2/2001 | Bunn et al. | 164/122.1 |
| 6,277,438 B1 | 8/2001 | Olivas | 427/154 |
| 6,303,760 B1 | 10/2001 | Dorn et al. | 534/11 |

FOREIGN PATENT DOCUMENTS

| | | |
|---|---|---|
| EP | 1 008 839 | 6/2000 |
| JP | 4-99236 | 3/1992 |
| WO | WO 03/089676 A3 | 10/2003 |

OTHER PUBLICATIONS

Job, Jennifer, "New Carbon Molecules Make Stronger Metals," *The World and I*, Apr. 1999, pp. 170–177.

(Continued)

*Primary Examiner*—Mark Kopec
(74) *Attorney, Agent, or Firm*—Elmore Craig, PC; Carolyn S. Elmore; Anne I. Craig

(57) ABSTRACT

The present invention relates to new compositions of matter, particularly metals and alloys, and methods of making such compositions. The new compositions of matter exhibit long-range ordering and unique electronic character.

42 Claims, 59 Drawing Sheets

OTHER PUBLICATIONS

Burstein, et al., "Electrochemically Induced Annealing of Stainless–Steel Surfaces," *Nature,* 407:885–887 (2000).

Gorman, J., "New Work Improves Stainless Steel Surface," *Science News,* 158:312 (2000).

Weiss, P., "Pores of Glass Skin Shrink from Light," *Science News,* 158:312 (2000).

Weiss, P., "Light Pulses Flout Sacrosanct Speed Limit," *Science News,* 157:375 (2000).

Weiss, P., "Vibrations Flit Along Water's Fast Lane," *Science News,* 156:358 (1999).

Weiss, P., "Electron Breakup? Physics Shake–up," *Science News,* 158:216 (2000).

Milius, S., "Wasps Drive Frog Eggs to (Escape) Hatch," *Science News,* 158:246 (2000).

Gorman, J., "Crystal Reveals Unexpected Beginnings," *Science News,* 158:84 (2000).

Weiss, P., "Voltage Flip Turns Magnetism on, off," *Science News,* 159:63 (2001).

Ohno et al., "Electric–field Control of Ferromagnetism," *Nature,* 408:944–946 (2000).

Weiss, P., "Light Stands Still in Atom Clouds," *Science News,* 159:52 (2001).

Gorman, J., "Strange Crystal Birth Found in Mine," *Science News ,* 158:207 (2000).

Gorman, J., "A Late Arrival for Platinum and Gold?," *Science News,* 158:207 (2000).

Holzheld et al., "Evidence for a Late Chondritic Veneer in the Earth's Mantle From High–Pressure Partitioning of Palladium and Platinum," *Nature,* 406:396–399 (2000).

Kishimoto et al., "Observation of Nuclear Excitation by Electron Transition in 197 Au with Synchrotron X Rays and an Avalanche Photodiode," *The American Physical Society,* 85:1831–1834 (2000).

Carreyre, et al., "First Direct Proof of Internal Conversion Between Bound States," *The American Physical Society,* 62:024311–1/024311–8 (2000).

Jacoby, Mitch, "Picture–Perfect Orbitals," *C&EN,* p. 8, Sep. 6, 1999.

Zuo, et al., "Direct Observation of d holes and Cu–Cu Bonding in Cu2O," *Nature,* 401:49 (1999).

Raloff, J., "Medicinal EMFs: Harnessing Electric and Magnetic Fields for Healing and Health," *Science News,* 156:316–318 (1999).

Weiss, P., "Magnetic Whispers: Chemistry and Medicine Finally Tune into Controversial Molecular Chatter," *Science News,* 159:42–44 (2001).

Weiss, P., "Breaking the Law: Can Quantum Mechanics+ Thermodynamic=Perpetual Motion?," *Science News,* 158:234–239 (2000).

"Pravda Releases More Info on Sensational Energy Source Discovery" [on–line], Jul. 12, 2001 [retrieved on Aug. 27, 2001]. Retrieved from the Internet http://www.100megsfree4.com/farshores/nrussen.htm (No Author Cited).

"Handbook of Chemistry and Physics, $73^{rd}$ Edition," edited by D.R. Lide, CRC Press, pp. 10–233 to 10–271, 1992.

Havrilla, George J., "X–Ray Fluorescence Spectrometry," *Handbook of Instrumental Techniques for Analytical Chemistry,* Frank A Settle, Ed., Prentice–Hall, Inc.: pp. 459–468 (1997).

U.S. Appl. No. 10/659,090, filed Sep. 10, 2003, Nagel, Christopher J.

U.S. Appl. No. 10/659,149, filed Sep. 10, 2003, Nagel, Christopher J.

U.S. Appl. No. 10/659,391, filed Oct. 21, 2003, Nagel, Christopher J.

Database WPI, Section Ch, Week 197728, Derwent Publications Ltd., London, GB; XP002254970, Class M24, An 1977–49267Y and JP 52 065133 (Nippon Steel Corp), May 30, 1977 Abstract.

Database WPI, Section PQ, Week 199438, Derwent Publications Ltd., London, GB; XP002254971, Class P53, An 1994–308766 and KR 9 310 044 B (Lee D), Oct. 14, 1993 Abstract.

Database WPI, Section Ch, Week 198204, Derwent Publications Ltd, London, GB; XP002254972, Class L03, An 1982–06910E and JP 56 162427 A (Meidensha Elec Mgf Co Ltd), Dec. 14, 1981 Abstract.

\* cited by examiner

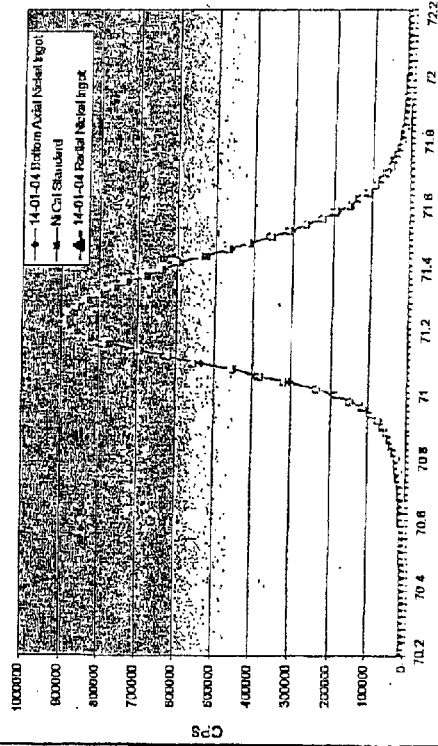
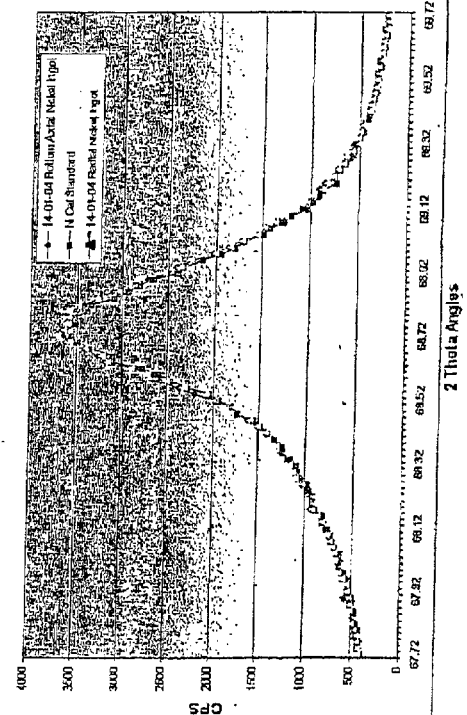
FIG. 27B
FIG. 27A

Schematic layout of ARL 8410 sequential XRF.

COMPOSITION OF MATTER TAILORING: SYSTEM I

RELATED APPLICATION

This application is a continuation-in-part of U.S. Ser. No. 09/416,720, filed Oct. 13, 1999 now U.S. Pat. No. 6,572,792, and a continuation-in-part of International Application No. PCT/US00/28549, which designated the United States and was filed on Oct. 13, 2000, published in English, which is a continuation of U.S. Ser. No. 09/416,720, filed Oct. 13, 1999 now U.S. Pat. No. 6,572,792. The entire teachings of the above applications are incorporated herein by reference.

BACKGROUND OF THE INVENTION

All matter has structure. The structure of matter emanates from the electronic structure of the elements of the periodic table. It is the electronic structure of the elements and the new electronic structures that arise as a consequence of their combination in molecules that define the electronic state and character of matter. It is also the electronic structure that creates the properties identified and associated with elements and the matter that results from their combination and arrangement (e.g., molecules and matter).

Certain combinations of elements give rise to states of matter with particularly desirable properties. For instance, certain states of matter have long-range order, which refers to matter that has repeating aligned chemical, electronic, or structural units. Example of such states of matter include surfactant membranes, crystals such as smectic liquid crystals and liquid crystalline polymers, and magnetic materials.

One means of imparting unique properties to a material involves adding carbon to the material. Depending on the parent material and on the amount of carbon added, carbon may remain dissolved in a material or may precipitate out to form discrete carbon structures.

SUMMARY OF THE INVENTION

The present invention relates to a new composition of matter comprised of 'p', 'd', and/or 'f' atomic orbitals, and a process for making the composition of matter. This new composition of matter can be distinguished by a change in energy, electronic properties, physical properties, and the like. X-ray fluorescence spectroscopy is a preferred method of detecting and distinguishing new compositions of matter. The change in properties can be controlled to be transient, fixed, or adjustable (temporarily permanent) and includes properties such as mechanical, electrical, chemical, thermal, engineering, and physical properties, as well structural character of the composition of matter (e.g., alignment, orientation, order, anisotropy, and the like).

The present invention includes manufactured metals and alloys characterized by the x-ray fluorescence spectrometry plots and elemental abundance tables (obtained from x-ray fluorescence analysis) contained herein.

The present invention is additionally a method of processing a metal or an alloy of metals, comprising the steps of:

(A.) adding the metal or alloy to a reactor in one or more steps and melting said metal or alloy;

(B.) adding a carbon source to the molten metal or alloy and dissolving carbon in said molten metal or alloy, followed by removing the undissolved carbon source;

(C.) increasing the temperature of the molten metal or alloy;

(D.) varying the temperature of the molten metal or alloy between two temperatures over one or more cycles;

(E.) adding a flow of an inert gas through the molten metal or alloy;

(F.) varying the temperature of the molten metal or alloy between two temperatures over one or more cycles;

(G.) adding a carbon source to the molten metal or alloy and further dissolving carbon in said molten metal or alloy, followed by removing the undissolved carbon source;

(H.) varying the temperature of the molten metal or alloy between two temperatures over one or more cycles, wherein the molten metal or alloy has a greater degree of saturation with carbon than in Step (F.);

(I.) stopping the flow of the inert gas;

(J.) varying the temperature of the molten metal or alloy between two temperatures over one or more cycles, wherein the molten metal or alloy has a greater degree of saturation with carbon than in Step (H.) and wherein an inert gas is added as the temperature is lowered and an inert gas, chosen independently, is added as the temperature is raised;

(K.) varying the temperature of the molten metal or alloy between two temperatures over one or more cycles, wherein the molten metal or alloy has a greater degree of saturation with carbon than in Step (J.) and wherein an inert gas is added as the temperature is lowered and an inert gas, chosen independently, is added as the temperature is raised;

(L.) stopping the flow of the inert gases;

(M.) varying the temperature of the molten metal or alloy between two temperatures over one or more cycles, wherein the molten metal or alloy has an equal or greater degree of saturation with carbon than in Step (K.); and (N.) cooling the molten metal or alloy to room temperature, thereby obtaining a solidified manufactured metal or alloy.

Steps (D.), (F.), (H.), (J.), (K.), and (L.) of the present method are commonly referred to as "cycling steps" below. For purposes of the present invention, carbon "dissolved" in a metal is defined as carbon that has been solubilized in a molten metal, adsorbed by a metal, reacted with a metal, or has otherwise interacted with a metal such that carbon is desorbed or transferred from a solid carbon source into a molten metal.

Preferably, the present invention is a method of processing copper, comprised of the steps described above.

The present invention also includes a method of processing a metal or an alloy of metals, comprising the steps of:

(A.) adding the metal or alloy to a reactor in one or more steps and melting said metal or alloy;

(B.) adding a carbon source to the molten metal or alloy and dissolving carbon in said molten metal or alloy, followed by removing the undissolved carbon source;

(C.) varying the temperature of the molten metal or alloy between two temperatures over two or more cycles;

(D.) adding a carbon source to the molten metal or alloy and further dissolving carbon in said molten metal or alloy, followed by removing the undissolved carbon source;

(E.) varying the temperature of the molten metal or alloy between two temperatures over two or more cycles, wherein the molten metal or alloy has a greater degree of saturation with carbon than in Step (D.); and (F.) cooling the molten metal or alloy to room temperature, thereby obtaining a solidified manufactured metal or alloy;

further characterized by adding a flow of inert gas, before, during, or after one or more of Steps (B.) through (E.).

In another embodiment, the present invention is a method of processing copper, or other metal or alloy comprising:

(1.) contacting molten copper or other metal or alloy with a carbon source;

(2.) an iterative cycling process, wherein relative saturation of copper or other metal or alloy with carbon remains the same or increases independently with each cycle; and (3.) cooling the molten copper or other metal or alloy to room temperature, thereby obtaining a solidified manufactured copper or other metal or alloy.

Advantages of the present invention include a method of processing metals into new compositions of matter and producing and characterizing compositions of matter with altered physical and/or electrical properties.

BRIEF DESCRIPTION OF THE DRAWINGS

FIGS. 27A and 27B show plots of x-ray fluorescence spectrometry for manufactured nickel, on both the axial and radial faces of a block cut from the ingot prepared in Example 2, as compared to plots of x-ray fluorescence spectrometry for natural nickel.

DETAILED DESCRIPTION OF THE INVENTION

Figure 1A:
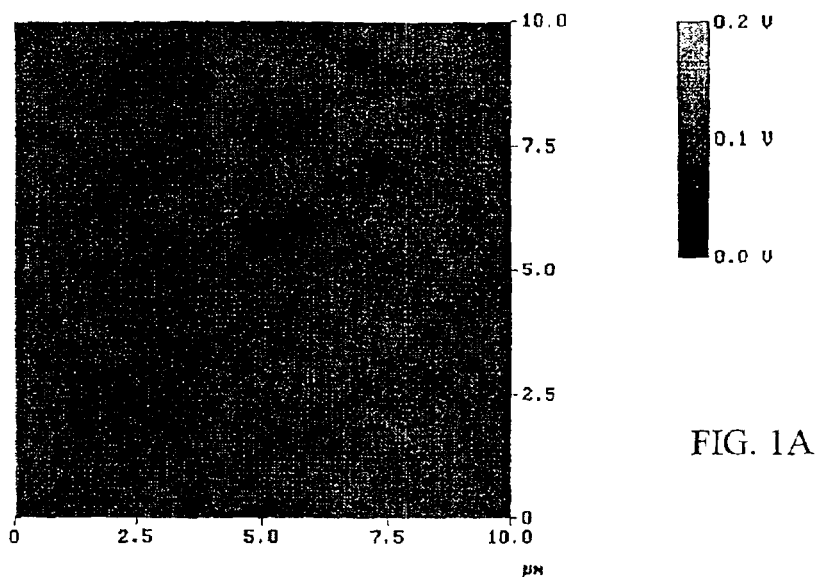
FIGS. 1A and 1B show non-contact magnetic force microscopy images of natural copper and manufactured copper, respectively.

Electromagnetic chemistry is the science that affects the transfer and circulation of energy in many forms when induced by changes in electromagnetic energy. The theory of Electrodynamics of Moving Bodies (Einstein, 1905) mandates that when the electrodynamic components of the material are manipulated, changes in the energy levels within the atomic orbitals must be induced. These changes in the atomic orbitals are the vehicles by which changes in the (material) properties, such as the magnitude and/or the orientation, can occur. Alignment of the electrodynamic component induces effects that may result in significant changes in the underlying material species: (1) alignment of atoms with the resulting directionality of physical properties; (2) alignment of energy levels and the capability to produce harmonics, may establish physical properties conducive for energy transfer; (3) alignment of the electrodynamic component include the opening of pathways for free electron flow, and; (4) alignment of electrodynamic field phase orientation.

The present invention relates to new compositions of matter, referred to herein as "manufactured" metals or alloys of metals. A "manufactured" metal or alloy is a metal or alloy which exhibits a change in electronic structure, such as that seen in a fluid XRF spectrum. The American Heritage College Dictionary, Third Edition defines "fluid" as changing or tending to change.

Metals of the present invention are generally p, d, or f block metals. Metals include transition metals such as Group 3 metals (e.g., scandium, yttrium, lanthanum), Group 4 metals (e.g, titanium, zirconium, hafnium), Group 5 metals (vanadium, niobium, tantalum), Group 6 metals (e.g., chromium, molybdenum, tungsten), Group 7 metals (e.g., manganese, technetium, rhenium), Group 8 metals (e.g., iron, ruthenium, osmium), Group 9 metals (e.g., cobalt, rhodium, iridium), Group 10 metals (nickel, palladium, platinum), Group 11 metals (e.g., copper, silver, gold), and Group 12 metals (e.g., zinc, cadmium, mercury). Metals of the present invention also include alkali metals (e.g., lithium, sodium, potassium, rubidium, cesium) and alkaline earth metals (e.g., beryllium magnesium, calcium, strontium, barium). Additional metals include aluminum, gallium, indium, tin, lead, boron, germanium, arsenic, antimony, tellurium, bismuth, and silicon.

The present invention also includes alloys of metals. Alloys are typically mixtures of metals. Alloys of the present invention can be formed, for example, by melting together two or more of the metals listed above. Preferred alloys include those comprised of copper, gold, and silver; tin, zinc, and lead; tin, sodium, magnesium, and potassium; iron, vanadium, chromium, and manganese; and nickel, tantalum, hafnium, and tungsten.

Carbon sources of the present invention include materials that are partially, primarily, or totally comprised of carbon. Those carbon sources that are non-organic and comprised partially of carbon are primarily comprised of one or more metals. Suitable carbon sources include graphite rods, graphite powder, graphite flakes, fullerenes, diamonds, natural gas, methane, ethane, propane, butane, pentane, cast iron, iron comprising carbon, steel comprising carbon, and combinations thereof. A preferred carbon source is a high purity (<5 ppm impurities) carbon source. Another preferred carbon source is a high purity (<5 ppm impurities) graphite rod. The carbon source is selected, in part, based on the system to which it is added. In one example, graphite rods and graphite flakes are added to copper, typically in a sequential manner. In another example, graphite rods and graphite powder are added to iron, typically in a sequential manner.

Carbon sources can be contacted with molten metals for variable periods of time. The period of time the carbon source is in contact with molten metals is the time between adding the carbon source and removing the undissolved carbon source. The period of time can be from about 0.5 hours to about 12 hours, about 1 hour to about 10 hours, about 2 hours to about 8 hours, about 3 hours to about 6 hours, about 3.5 hours to about 4.5 hours, or about 3.9 hours to about 4.1 hours. Alternatively, the period of time can be from about 5 minutes to about 300 minutes, about 10 minutes to about 200 minutes, about 20 minutes to about 120 minutes, about 30 minutes to about 90 minutes, about 40 minutes to about 80 minutes, about 50 minutes to about 70 minutes, or about 59 minutes to about 61 minutes.

A cycle of the present invention includes a period of time where the temperature and/or the degree to which a metal is saturated with carbon is varied. Over a period of time, varying the temperature involves a period of raising (or increasing) the temperature of a metal or alloy and a period when the temperature of a metal or alloy decreases (either passively, such as by heat transfer to the surrounding environment, or actively, such as by mechanical means), in any order. Inert gas can be added during a cycle, except where it is specified that inert gas addition is ceased prior to that cycle. Increasing the temperature of the metal or alloy increases the amount of carbon that can be dissolved into that metal or alloy, which therefore decreases the degree to which the metal or alloy is saturated with carbon (relative to the temperature and degree of carbon saturation when graphite saturation assemblies are removed the first time). Similarly, decreasing the temperature of the metal or alloy increases the (relative) degree to which the metal or alloy is saturated with carbon.

The degree to which a metal is saturated with carbon varies over the course of a method, as well as within each step. In Examples 1–14, the degree of carbon saturation varies between 70% and 95% in the first cycling step, between 70% and 95% in the second cycling step, between 101% and 103% in the third cycling step, between 104% and 107% in the fourth cycling step, between 108% and 118% in the fifth cycling step, and between 114% and 118% in the sixth cycling step. The cycling steps correspond to Steps (D.), (F.), (H.), (J.), (K.), and (L.), respectively, of the method described in the third paragraph of the summary.

One example of a method of the present invention can be described in terms of carbon saturation values. After a metal or alloy is added to a suitable reactor, establish the dissolved carbon level at 70% to 95% of the equilibrium saturation of carbon for the thermodynamic state specified (e.g., T, P, composition) when the composition is in its natural state (hereinafter the equilibrium saturation of carbon is referred to as "$[C]_{eqsat}$"). Identify temperature set points for 80% and 95% $[C]_{eqsat}$ Vary the temperature between the predetermined set points, such that the temperature is decreased for 7 minutes and increased over 7 minutes per cycle, for 15 cycles. Next, establish a flow of argon. Vary the temperature between the predetermined set points, such that the temperature is decreased for 7 minutes and increased over 7 minutes per cycle, for 5 cycles; the temperature should be maintained above 70% $[C]_{eqsat}$ at all times and maintained below 95% $[C]_{eqsat}$ at all times. The carbon level is raised to saturation (i.e., $[C]_{eqsat}$) with continued argon addition. Hold for 60 minutes at saturation (i.e., $[C]_{eqsat}$) with continued argon addition. Raise the carbon level to $^{-}1\%_{wt}$ (i.e., $^{-}1\%_{wt}$ represents $1\%_{wt}$ above the saturation value as defined in its natural state) of $[C]_{eqsat}$ with continued argon addition and hold for 5 minutes. Vary the temperature for 20 cycles to remain between $^{+}1\%_{wt}$ and $^{+}3\%_{wt}$ of $[C]_{eqsat}$, such that the temperature is decreased over 9 minutes and increased over 9 minutes per cycle. Cease argon addition. Cool the metal to $^{+}4\%_{wt}$ of $[C]_{eqsat}$. Vary the temperature for 4.5 cycles to remain between $^{+}4\%_{wt}$ and $^{+}7\%_{wt}$ of $[C]_{eqsat}$, such that the temperature is decreased over 3 minutes and increased over 5 minutes. Argon is added as the carbon saturation increases and nitrogen is added as carbon saturation decreases. Cool the metal to obtain $^{+}8\%_{wt}$ with continued argon addition. Vary the temperature over 15.5 cycles to remain between $^{+}8\%_{wt}$ and $^{+}18\%_{wt}$ of $[C]_{eqsat}$, such that the temperature is decreased over 15 minutes and increased over 15 minutes. Argon is added as the carbon saturation increases and nitrogen is added as carbon saturation decreases. After the 15.5 cycles are complete, gas addition is halted. Perform one complete cycle by varying the temperature to remain between $^{+}18\%_{wt}$ to $^{+}14\%_{wt}$ of $[C]_{eqsat}$ (ending at $^{+}18\%_{wt}$), such that the temperature is increased over 15 minutes and decreased over 15 minutes. Proceed immediately to a cool down that leads to solidification.

An iterative cycle process is a process comprising two or more cycles, whereby one or more of the cycles are carried out at a temperature below the carbon saturation point and one or more cycles are carried out at a temperature above the carbon saturation point. For example, in Example 1, the first cycle is carried out between 2480° F. and 2530° F., the second cycle is carried out between 2480° F. and 2530° F., the third cycle is carried out at 2453° F. and 2459° F., the fourth cycle is carried out between 2441° F. and 2450° F., the fifth cycle is carried out between 2406° F. and 2438° F., and the sixth cycle is carried out between 2406° F. and 2419° F. A cycle following an earlier cycle can have the identical temperature range as the earlier cycle, a partially overlapping temperature range with the earlier cycle, a temperature range above that of the earlier cycle, or a temperature cycle below that of the earlier cycle. Partially overlapping temperature ranges includes ranges where one temperature range falls within the limits of a second temperature range (e.g., 2406° F. to 2438° F. and 2406° F. to 2419° F.). Preferably, during an iterative cycling process, the degree to which the metal or alloy is saturated with carbon increases over the process.

Cycles of the present invention can vary in duration. The duration of a cycle can vary among cycles in a step. A cycle duration is, for example, about 2 minutes to about 90 minutes, about 3 minutes to about 67 minutes, about 5 minutes to about 45 minutes, about 8 minutes to about 30 minutes, about 10 minutes to about 20 minutes, about 14 minutes to about 18 minutes, about 7 minutes to about 9 minutes, about 13 minutes to about 15 minutes, about 17 minutes to about 19 minutes, about 28 minutes to about 32 minutes, or about 29 minutes to about 31 minutes.

A cycle can be symmetry or asymmetric. In a symmetric cycle, the period of increasing the metal or alloy temperature is equal to the period of decreasing the metal or alloy temperature. In an asymmetric cycle, the period of increasing the metal or alloy temperature is different than the period of decreasing the metal or alloy temperature. For an asymmetric cycle, the period of increasing the metal or alloy temperature can be longer than or shorter than the period of decreasing the metal or alloy temperature.

For example, in a cycle lasting about 7 minutes to about 9 minutes, the temperature can be increased for about 3 minutes and the temperature can be decreased for about 5 minutes. If the cycle lasts about 13 minutes to about 15 minutes, the temperature can be increased for about 7 minutes and the temperature can be decreased for about 7 minutes. If the cycle lasts about 17 minutes to about 19 minutes, the temperature can be increased for about 9 minutes and the temperature can be decreased for about 9 minutes. If the cycle lasts about 29 minutes to about 31 minutes, the temperature can be increased for about 15 minutes and the temperature can decreased for about 15 minutes.

The number of cycles in a step is generally an integer or half-integer value. For example, the number of cycles in a step can be one or more, one to forty, or one to twenty. The number of cycles can be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40. Alternatively, the number of cycles in a step can be 0.5, 1.5, 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, 20.5, 21.5, 22.5, 23.5, 24.5, 25.5, 26.5, 27.5, 28.5, 29.5, or 30.5. In a step comprising a half-integer or a non-integer quantity of cycles, either heating or cooling can occur first.

After the initial heating step, the temperature of a metal or an alloy is sufficiently high, such that the temperature is equal to or greater than the solidus temperature. The solidus temperature varies depending on the metal or the alloy, and the amount of carbon dissolved therein. The temperature at the end of Step (F.) of the third paragraph of the summary is typically about 900° F. to about 3000° F., but varies from metal to metal. For example, the temperature at the end of Step (F.) can be about 1932° F. to about 2032° F., about 1957° F. to about 2007° F., or about 1932° F. to about 2467° F. for copper; about 2368° F. to about 2468° F., about 2393° F. to about 2443° F., or about 2368° F. to about 2855° F. for nickel; about 2358° F. to about 2458° F. or about 2373° F. to about 2423° F., or about 2358° F. to about 2805° F. for cobalt; about 1932° F. to about 2032° F., about 1957° F. to about 2007° F., or about 1932° F. to about 2467° F. for a copper/gold/silver alloy; about 399° F. to about 499° F., about 424° F. to about 474° F., or about 399° F. to about 932° F. for a tin/lead/zinc alloy; about 399° F. to about 499° F., about 424° F. to about 474° F., or about 399° F. to 932° F. for a tin/sodium/potassium/magnesium alloy; about 2550° F. to about 2650° F., about 2575° F. to about 2625° F., or about 2550° F to about 2905° F. for silicon; about 2058° F. to about 2158° F., about 2073° F. to about 2123° F., or about 2058° F. to about 2855° F. for iron; about 2058° F. to about 2158° F., about 2073° F. to about 2123° F., or about 2058° F. to about 2855° F. for an iron/vanadium/chromium/manganese alloy; or 2368° F. to about 2468° F., about 2393° F. to about 2443° F., or about 2368° F. to about 2855° F. for a nickel/tantalum/hafnium/tungsten alloy.

Inert gas or gases can be added during a step. Inert gases are chosen, independently, from the group consisting of argon, nitrogen, helium, neon, xenon, krypton, hydrogen, and mixtures thereof. When an inert gas is added during a step, the inert gas (or mixture thereof) can change from cycle-to-cycle or within a cycle For purposes of the present invention, inert gases used for purging, particularly in the backspace of a reactor are generally considered separately from the other inert gases. Nitrogen is typically added continuously through a method of the present invention, irrespective of whether "inert gas" flow into the metal is started or stopped. In one example, a nitrogen flow is maintained throughout an entire method, such that a nitrogen pressure of about 0.4–0.6 psi, or about 0.5 psi is maintained.

At the end of the instant methods, the molten metal or alloy is cooled. The metal or alloy is cooled, at minimum, to a temperature below the solidus temperature. Preferably, the metal or alloy is cooled to room or ambient temperature. Such cooling can include gradual and/or rapid cooling steps. Gradual cooling typically includes cooling due to heat exchange with air or an inert gas over 1 to 72 hours, 2 to 50 hours, 3 to 30 hours, or 8 to 72 hours. Rapid cooling, also known as quenching, typically includes an initial cooling with air or an inert gas to below the solidus temperature, thereby forming a solid mass, and placing the solid mass into a bath comprising a suitable fluid such as tap water, distilled water, deionized water, other forms of water, inert gases (as defined above), liquid nitrogen or other suitable liquified gases, a thermally-stable oil (e.g., silicone oil) or organic coolant, and combinations thereof. The bath should contain a suitable quantity of liquid at a suitable temperature, such that the desired amount of cooling occurs.

Methods of the present invention are carried out in a suitable reactor. Suitable reactors are selected depending on the amount of metal or alloy to be processed, mode of heating, extent of heating (temperature) required, and the like. A preferred reactor in the present method is an induction furnace reactor, which is capable of operating in a frequency range of 0 kHz to about 10,000 kHz, 0 kHz to about 3,000 kHz, or 0 kHz to about 1,000 kHz. Reactors operating at lower frequencies are desirable for larger metal charges, such that a reactor operating at 0–3,000kHz is generally suitable for 20 pound metal charges and a reactor operating at 0–1,000 kHz is generally suitable for 5000 pound metal charges.

Typically, reactors of the present method are lined with a suitable crucible. Crucibles are selected, in part, based on the amount of metal or alloy to be heated and the temperature of the method. Crucibles selected for the present method typically have a capacity from about five pounds to about five tons. One preferred crucible is comprised of 89.07% $Al_2O_3$, 10.37% $SiO_2$, 0.16% $TiO_2$, 0.15% $Fe_2O_3$, 0.03% $CaO$, 0.01% $MgO$, 0.02% $Na_2O_3$, and 0.02% $K_2O$, and has a 9" outside diameter, a 7.75" inside diameter, and a 14" depth. A second preferred crucible is comprised of 99.68% $Al_2O_3$, 0.07% $SiO_2$, 0.08% $Fe_2O_3$, 0.04% $CaO$, and 0.12% $Na_2O_3$, and has a 4.5" outside diameter, a 3.75" inside diameter and a 10" depth.

After being subjected to a process of the present invention, metals and alloys can be analyzed by a variety of techniques, including chemical and physical methods. A preferred analytical method is x-ray fluorescence spectrometry. X-ray fluorescence spectrometry is described in "X-Ray Fluorescence Spectrometry", by George J. Havrilla in "Handbook of Instrumental Techniques for Analytical Chemistry," Frank A. Settle, Ed., Prentice-Hall, Inc: 1997, which is incorporated herein by reference.

XRF spectrometry is a well-known and long-practiced method, which has been used to detect and quantify or semi-quantify the elemental composition (for elements with $Z \geq 11$) of solid and liquid samples. This technique benefits from minimal sample preparation, wide dynamic range, and being nondestructive. Typically, XRF data are not dependent on which dimension (e.g., axial or radial) of a sample was analyzed. Accuracy of less than 1% error can generally be achieved with XRF spectrometry, and the technique can have detection limits of parts per million.

XRF spectrometry first involves exciting an atom, such that an inner shell electron is ejected (e.g., the photoelectric effect). Upon ejection of an electron, an outer shell electron will "drop" down into the lower-energy position of the ejected inner shell electron. When the outer shell electron "drops" into the lower-energy inner shell, x-ray energy is released. Typically, an electron is ejected from the K, L, or M shell and is replaced by an electron from the L, M, or N shell. Because there are numerous combinations of ejections and replacements possible for any given element, x-rays of several energies are emitted during a typical XRF experiment. Therefore, each element in the Periodic Table has a standard pattern of x-ray emissions after being excited by a sufficiently energetic source, since each such element has its own characteristic electronic state. By matching a pattern of emitted x-ray energies to values found in tables, such as those on pages 10–233 to 10–271 of "Handbook of Chemistry and Physics, $73^{rd}$ Edition," edited by D. R. Lide, CRC Press, 1992, which is incorporated herein by reference, one can identify which elements are present in a sample. In addition, the intensity of the emitted x-rays allows one to quantify the amount of an element in a sample.

There are two standard variations of the XRF technique. First, as an energy-dispersive method (EDXRF), the XRF technique uses a detector such as a Si(Li) detector, which is capable of simultaneously measuring the energy and intensity of x-ray photons from an array of elements. EDXRF is well-suited for rapid acquisition of data to determine gross elemental composition. Typically, the detection limits for EDXRF are in the range of tens to hundreds of parts-per-million. A wavelength-dispersive technique (WDXRF) is generally better-suited for analyses requiring high accuracy and precision. WDXRF uses a crystal to disperse emitted x-rays, based on Bragg's Law. Natural crystals, such as lithium fluoride and germanium, are commonly used for high-energy (short wavelength) x-rays, while synthetic crystals are commonly used for low-energy (longer wavelength) x-rays. Crystals are chosen, in part, to achieve desired resolution, so that x-rays of different energies are disperse to distinguishable 2θ angles. WDXRF can either measure x-rays sequentially, such that a WDXRF instrument will step through a range of 2θ angles in recording a spectrum, or there will be detectors positioned at multiple 2θ angles, allowing for more rapid analysis of a sample. Detectors for WDXRF commonly include gas ionization and scintillation detectors. A further description of the use WDXRF technique in the present invention can be found in Example 1. Results from EDXRF and results from WDXRF can be compared by determining the relationship between a 2θ angle and the wavelength of the corresponding x-ray (e.g., using Bragg's Law) and converting the wavelength into an energy (e.g., energy equals wavelength multiplied by Planck's constant).

Analysis of emitted x-rays can be carried out automatically or semi-automatically, such as by using a software package (e.g., UniQuant, which is sold by Omega Data Systems BV, Veldhoven, The Netherlands) for either EDXRF or WDXRF. UniQuant is used for standardless semi-quantitative to quantitative XRF analysis using the intensities measured by a sequential x-ray spectrometer. The software package unifies all types of samples into one analytical program. The UniQuant software program is highly effective for analyzing samples for which no standards are available. Sample preparation is usually minimal or not required at all. Samples can be of very different natures, sizes and shapes. Elements from fluorine or sodium up to uranium, or their oxide compounds, can be analyzed in samples such as a piece of glass, a screw, metal drillings, lubricating oil, loose fly ash powder, polymers, phosphoric acid, thin layers on a substrate, soil, paint, the year rings of trees, and, in general, those samples for which no standards are available. The reporting is in weight % along with an estimated error for each element.

In software packages such as UniQuant, an XRF spectrum is composed of data channels. Each data channel corresponds to an energy range and contains information about the number of x-rays emitted at that energy. The data channels can be combined into one coherent plot to show the number or intensity of emitted x-rays versus energy or 2θ angle (the 2θ angle is related to the wavelength of an x-ray), such that the plot will show a series of peaks. An analysis of the peaks by one skilled in the art or the software package can identify the correspondence between the experimentally-determined peaks and the previously-determined peaks of individual elements. For an element, peak location (i.e., the centroid of the peak with respect to energy or 2θ angle), peak profile/shape, peak creation, and peak fluidity would be expected to be essentially the same, within experimental error, for any sample containing the element. If the same quantity of an element is present in two samples, intensity will also be essentially the same, excepting experimental error and matrix effects.

A typical software package is programmed to correlate certain data channels with the emitted x-rays of elements. Quantification of the intensity of emitted x-rays is accomplished by integrating the XRF spectrum over a number of data channels. Based on the measured intensities and the previously-compiled data on elements, the software package will integrate over all data channels, correlate the emitted x-ray intensities, and will then calculate the relative abundance or quantity of elements which appear to be present in a sample, based upon comparison to the standards. Ideally, the relative abundances will total 100% prior to normalization. However, for a variety of reasons, such as improper or insufficient calibration, the relative abundances will not total 100% prior to normalization. Another reason that the relative abundances of elements do not total 100% prior to normalization is that a portion of the XRF spectrum falls outside of the data channels that the software package correlates with an element (i.e., a portion of the XRF spectrum is not recognized as belonging to an element and is not included in the relative abundance calculation). In this case, the relative abundances will likely total less than 100% prior to normalization. Representative examples of relative abundance data are presented in Table 4, which includes the results of XRF analyses of the products of Examples 1–10, as processed by a Uniquant software package.

X-ray emission spectrometry (XES), a technique analogous to XRF, also provides electronic information about elements. In XES, a lower-energy source is used to eject electrons from a sample, such that only the surface (to several micrometers) of the sample is analyzed. Similar to XRF, a series of peaks is generated, which corresponds to outer shell electrons replacing ejected inner shell electrons. The peak shape, peak fluidity, peak creation, peak intensity, peak centroid, and peak profile are expected to be essentially the same, within experimental error and matrix effects, for two samples having the same composition.

A new composition of matter of the present invention can manifest itself as a transient, adjustable, or permanent change in energy and/or associated properties, as broadly defined. Property change can be exhibited as or comprise a change in: (1) structural atomic character (e.g., XES/XRF peak creation, peak fluidity, peak intensity, peak centroid, peak profile or shape as a function of material/sample orientation, atomic energy level(s), and TEM, STM, MFM scans); (2) electronic character (e.g., electron electromagnetic interactions, electromagnetic field position/orientation, energy gradients, Hall effect, voltage, capacitance, voltage decay rate, voltage gradient, voltage signature including slope of decay and/or change of slope decay, voltage magnitude, voltage orientation); (3) structural molecular or atomic character (e.g, SEM, TEM, STM, AFM, LFM, and MFM scans, optical microscopy images, and structural orientation, ordering, long range alignment/ordering, anisotropy); (4) physical constants (e.g., color, crystalline form, specific rotation, emissivity, melting point, boiling point, density, refractive index, solubility, hardness, surface tension, dielectric, magnetic susceptibility, coefficient of friction, x-ray wavelengths); (5) physical properties (e.g., mechanical, chemical, electrical, thermal, engineering, and the like); and, (6) other changes that differentiate naturally occurring materials from manufactured materials created by inducing a change in matter.

1. Structural Atomic Character

In the sections below, certain analyses have been conducted where a block of a manufactured product (e.g., a metal or an alloy) has been cut from a larger piece. In these analyses, the axial direction or an axial trace refers to a side of the block that was originally parallel to the side walls of a reactor. The radial direction or a radial trace refers to a side of the block that was originally parallel with the top or bottom of a reactor. A metal block can also contain micro- or macro-voids that can be analyzed.

Figure 1B:
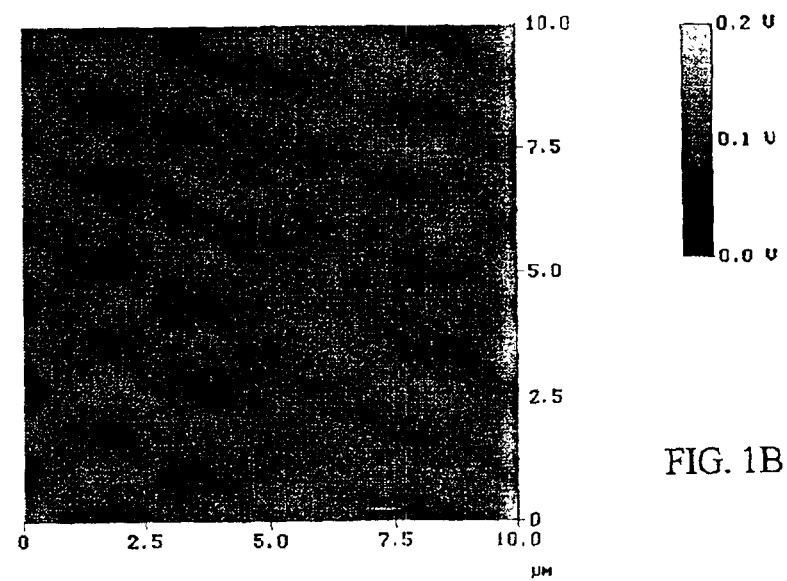
Figure 2A:
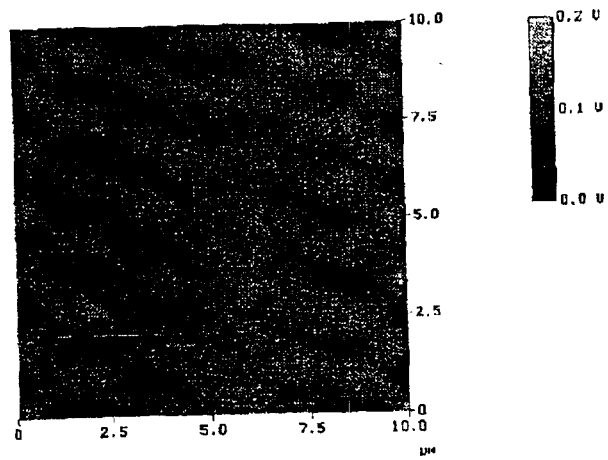
FIG. 2A shows non-contact magnetic force microscopy of manufactured copper.
Figure 2B:
FIG. 2B shows scanning tunneling microscopy images of manufactured copper.
Figure 3A:
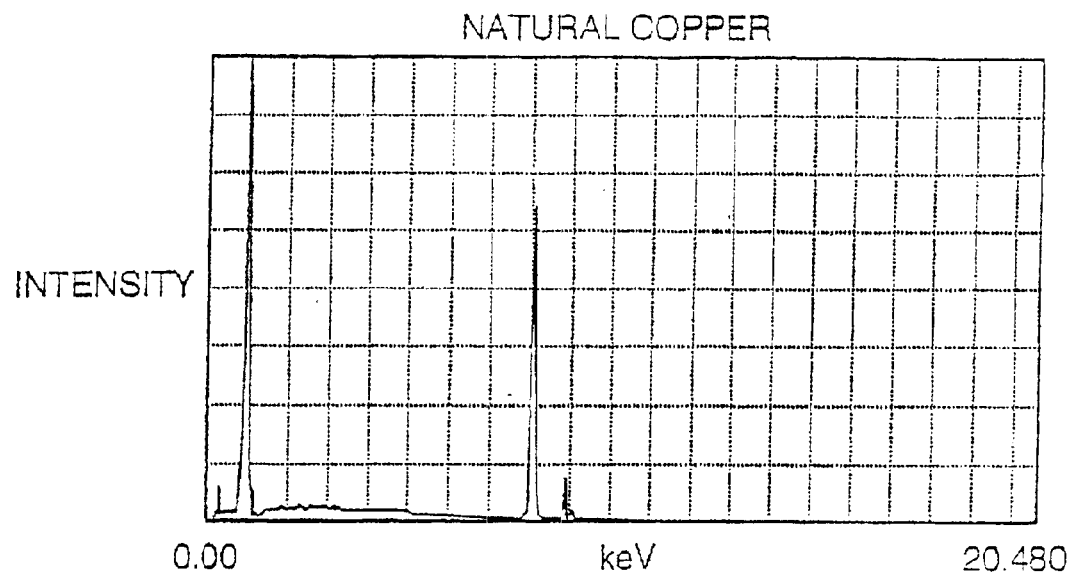
FIGS. 3A, 3B, and 4A and 4B show x-ray emission spectrometry images of natural copper and manufactured copper.
Figure 3B:
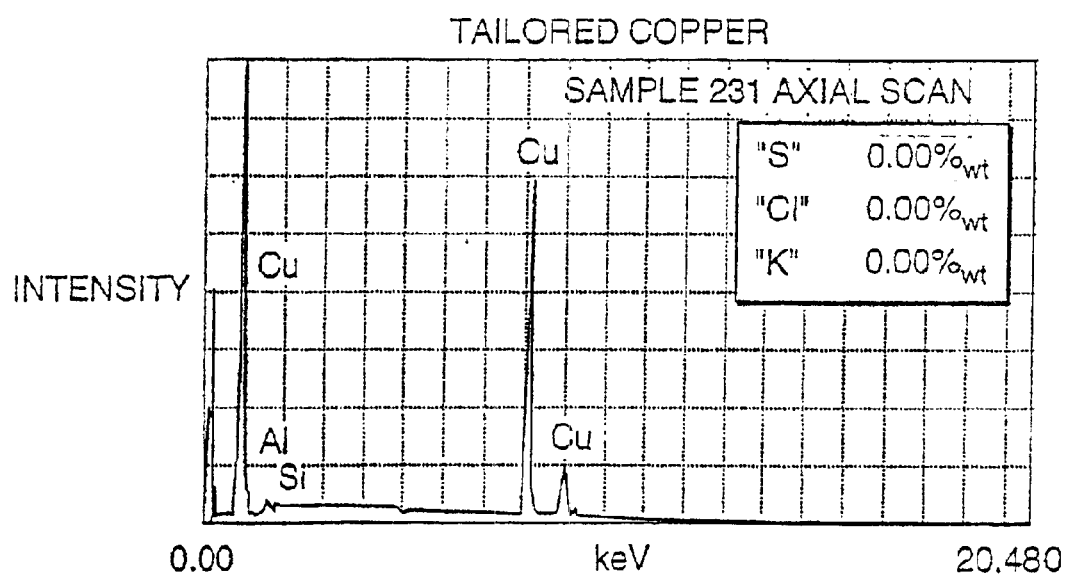
Figure 4A:
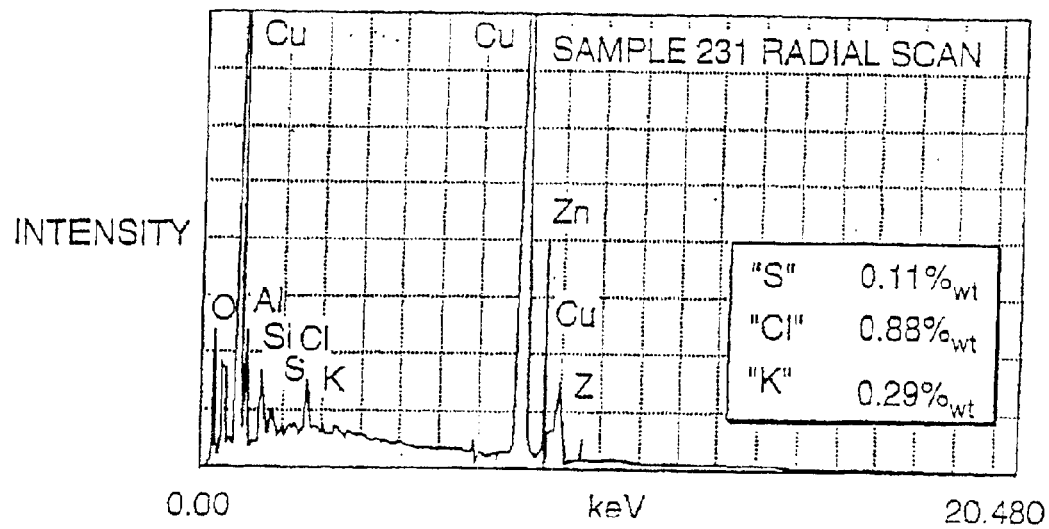
Figure 4B:
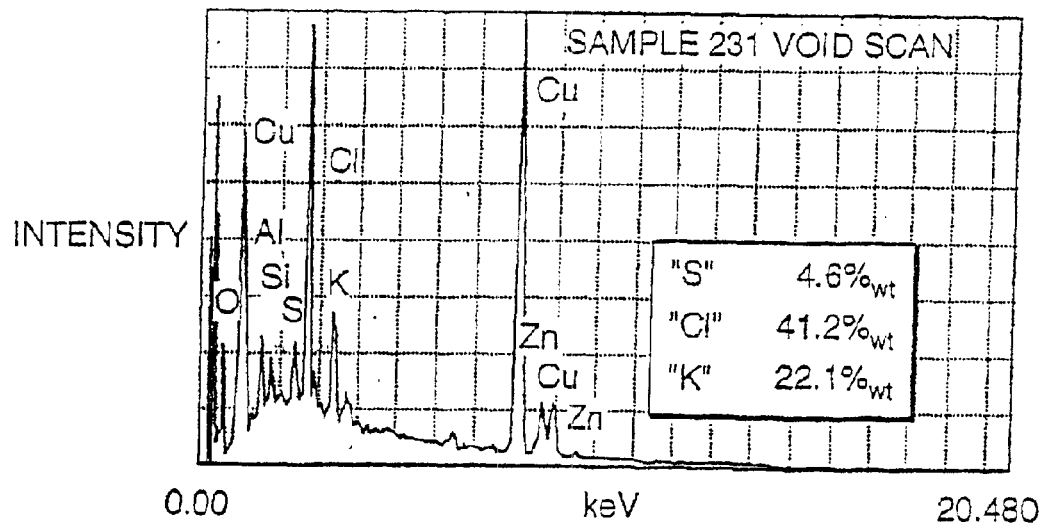

FIG. 1A shows a non-contact, magnetic force microscopy image of natural copper, the control standard, and FIG. 1B shows a new composition of matter: manufactured copper, which is identified by an altered and aligned electromagnetic network. FIG. 2A shows a non-contact, magnetic force microscopy (MFM) scan and FIG. 2B shows a scanning tunneling microscopy (STM) scan. Individually, and from differing vantage points, these scans show the outline of the changed electromagnetic energy network. The MFM scan shows the radial trace while the STM scan shows the axial trace.

XES analysis of the control standard compared to the atomically altered (i.e., manufactured) state are shown in FIGS. 3A, 3B, 4A, and 4B. Manufactured copper in the axial direction exhibits similar composition to natural copper (i.e., 99.98%$_{wt}$), but radial scans exhibit new peaks in the region close to naturally occurring S, Cl, and K. The shifting centroid of the observed peaks from the natural species (i.e., S, Cl, K) confirm electronic change in the atomic state of the base element; as does the non-contact MFM void scan (compare FIG. 1B with FIG. 5A). Conventional chemical analysis performed using a LECO (IR) analyzer confirmed the absence of sulfur at XES lower detection limits. LECO analysis confirmed sulfur concentration at 7.8 ppm; this analysis was consistent with the manufacture's batch product analysis of 7.0 ppm S.

Figure 5A:
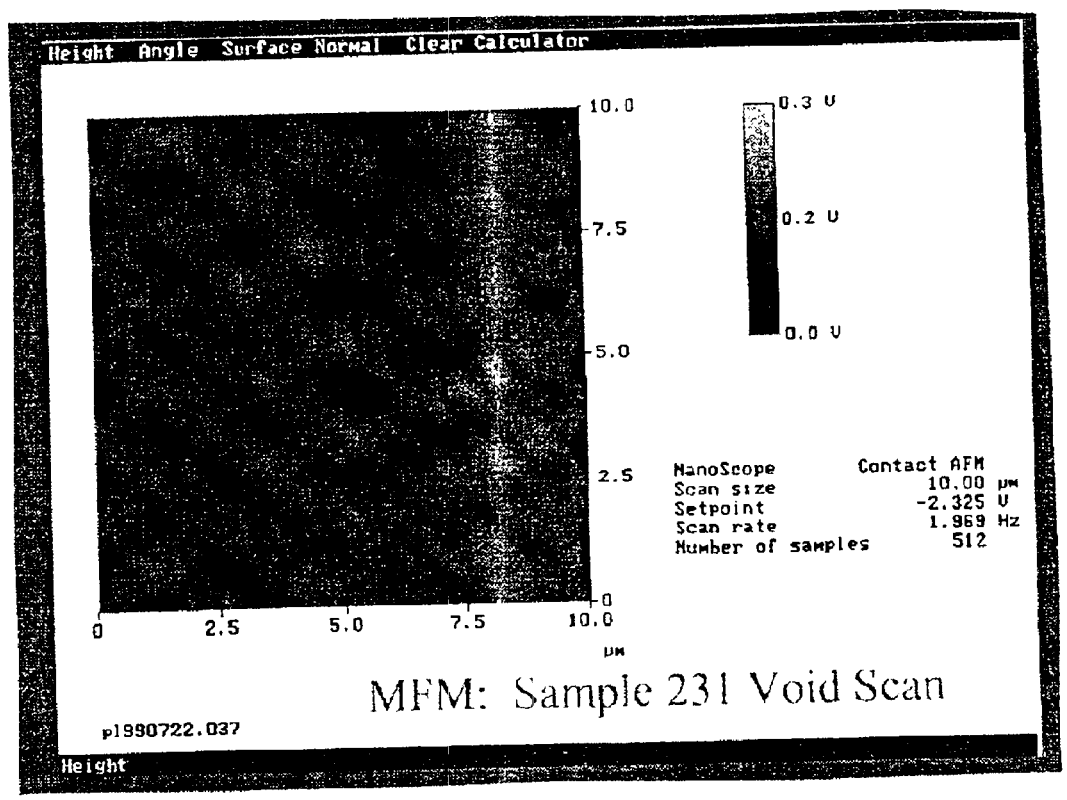
FIG. 5A shows a non-contact magnetic force microscopy image of manufactured copper.
Figure 5B:
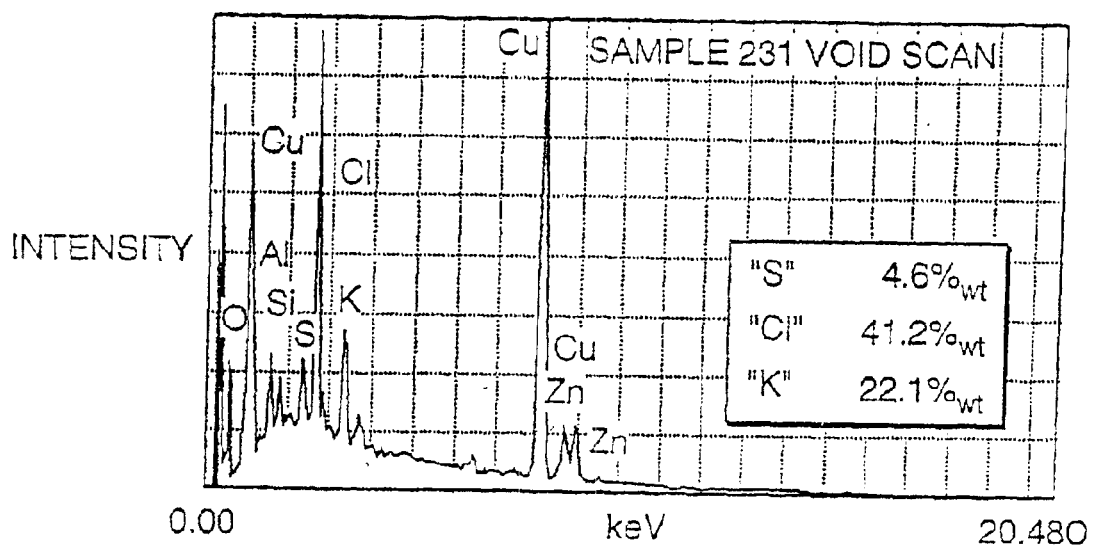
FIG. 5B shows a x-ray emission spectroscopy image of manufactured copper.

FIG. 5B compares the XES radial scan of manufactured copper to that of a void space within the same material. An underlying change in atomic character can be inferred from a dramatic change in signal count/intensity and a non-contact MFM of the void space (FIG. 5A). MFM evidence highlights the structure and its changed orientation and alignment compared to the control MFM (FIG. 1A).

Figure 6A:
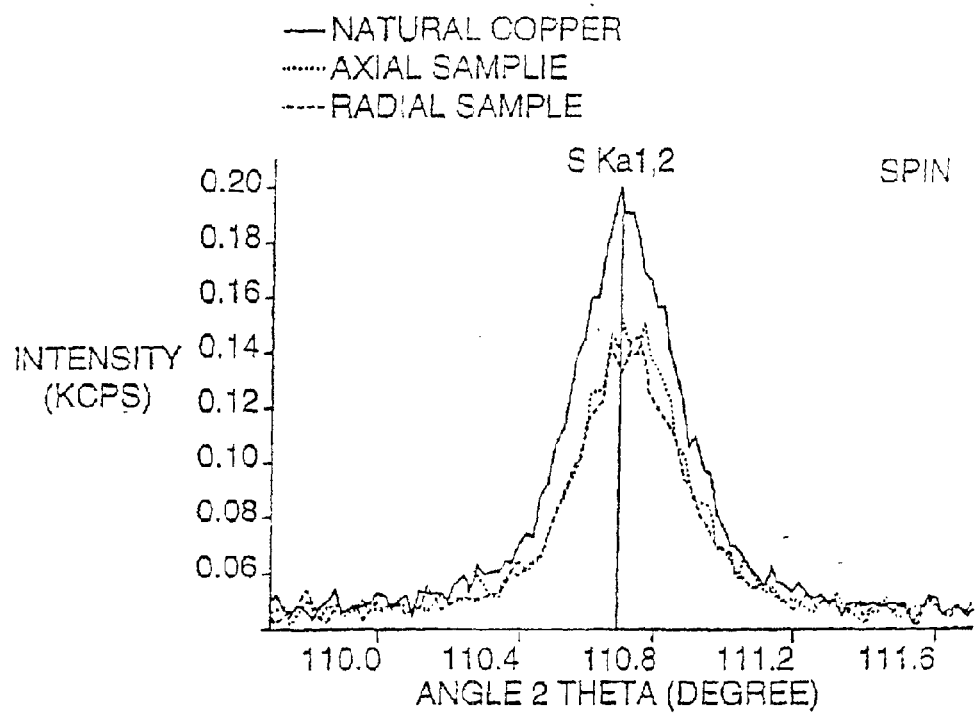
FIGS. 6A and 6B show a plot of an x-ray fluorescence spectrometry comparison of manufactured copper and natural copper.
Figure 6B:
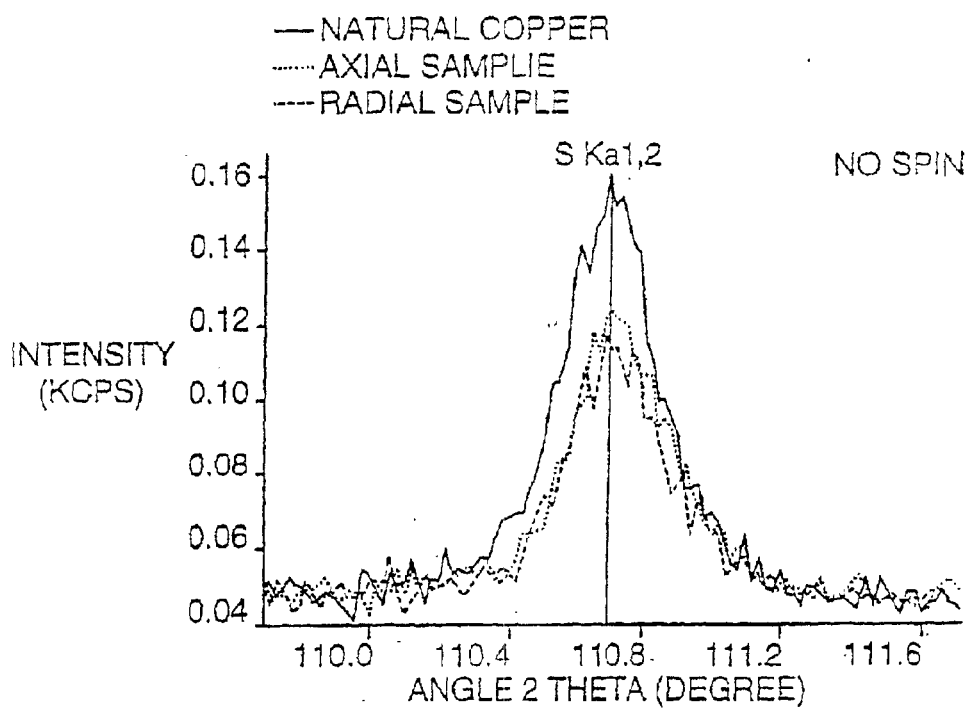
Figure 7:
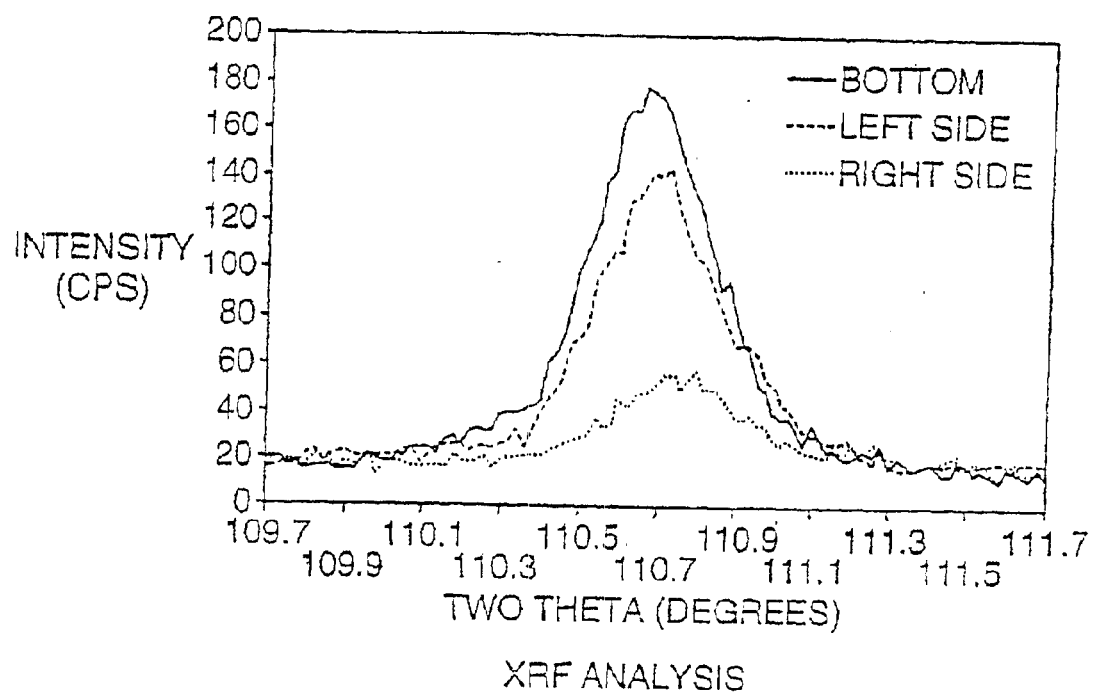
FIG. 7 shows a plot of an X-ray fluorescence spectrometry in relation to the direction of the scan.

High precision XRF imaging shows that manufactured copper has a $K_\alpha$ line in the vicinity of 110.7 degrees (the 2θ angle). Since 110.7 degrees is the location of natural sulfur's $K_\alpha$ line, this $K_\alpha$ line is referred to herein as a "sulfur-like" $K_\alpha$ line. This is the $K_\alpha$ line that would be expected if detectable quantities of sulfur were present; however, an IR LECO analysis of this sample showed that there was no sulfur was present (<10 ppm) in the sample. The presence of this line indicates an electronic structure change, which has shifted the two theta degree position of the $K_\alpha$ line compared to natural copper (FIGS. 6A and 6B). Several other figures indicate the presence of unexpected $K_\alpha$ lines for elements not present in the sample (e.g., FIG. 27 shows the presence of a significant aluminum-like $K_\alpha$ line for a sample containing 99.98% copper). FIG. 7 shows an increase in signal intensity dependent upon which side of a homogeneous block of sample was analyzed, as well as a shifting $K_\alpha$ centroid. These data demonstrate microscopically the bulk anisotropy later identified in the manufactured sample as does the MFM scans (FIGS. 1B and 5A).

2. Electronic Character

Figure 8:
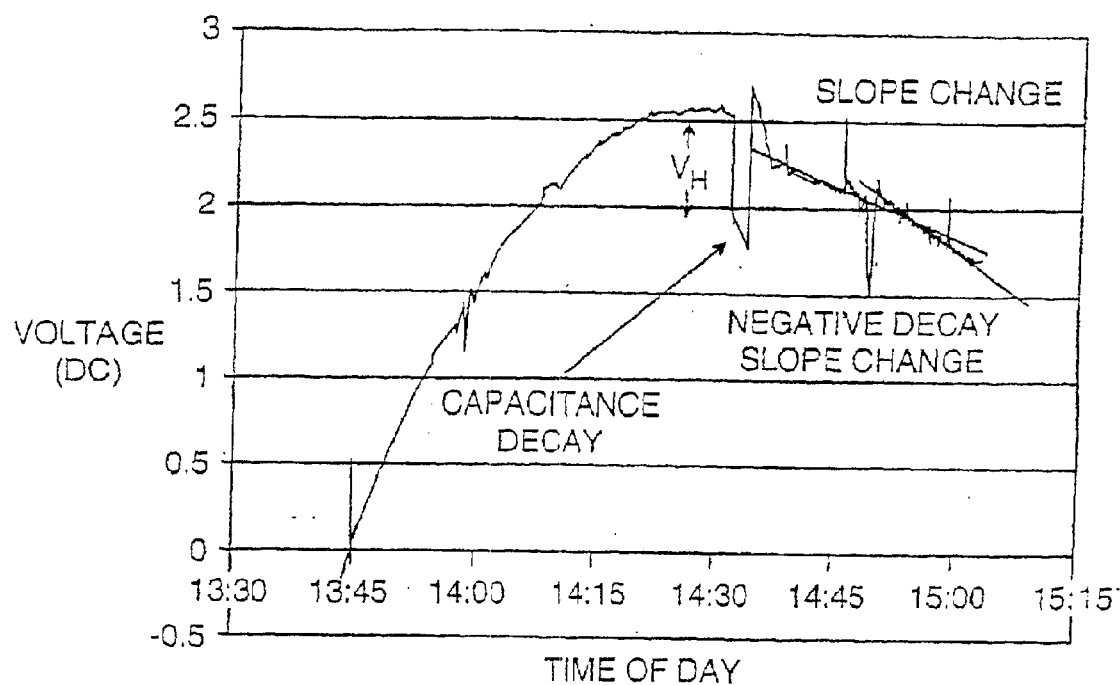
FIG. 8 shows a plot of a change in capacitance and voltage decay for a manufactured metal.
Figure 9:
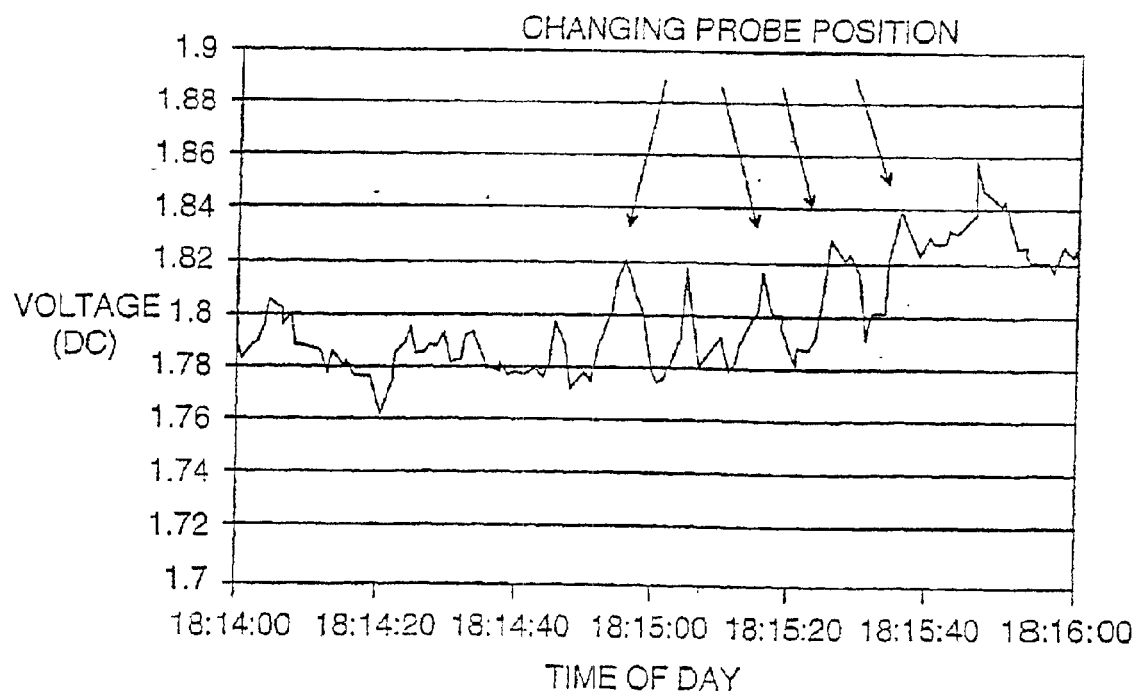
FIG. 9 shows a plot of a change in voltage gradients for a molten manufactured metal as the position of an electrode within the melt is changed.

Manipulation of the electrodynamic components affecting the orientation of a manufactured metal's or alloy's electromagnetic field can enable the observance of a Hall voltage ($V_H$). Manipulation of the electrodynamic components enables intensification of electromagnetic field affording charge concentration on the surface of the atoms within the bulk as opposed to the bulk surface of the bath. Properties that reflect field repositioning can include changing capacitance and voltage decay rate (FIG. 8) and voltage gradients (FIG. 9) within a conducting bulk media.

Figure 10:
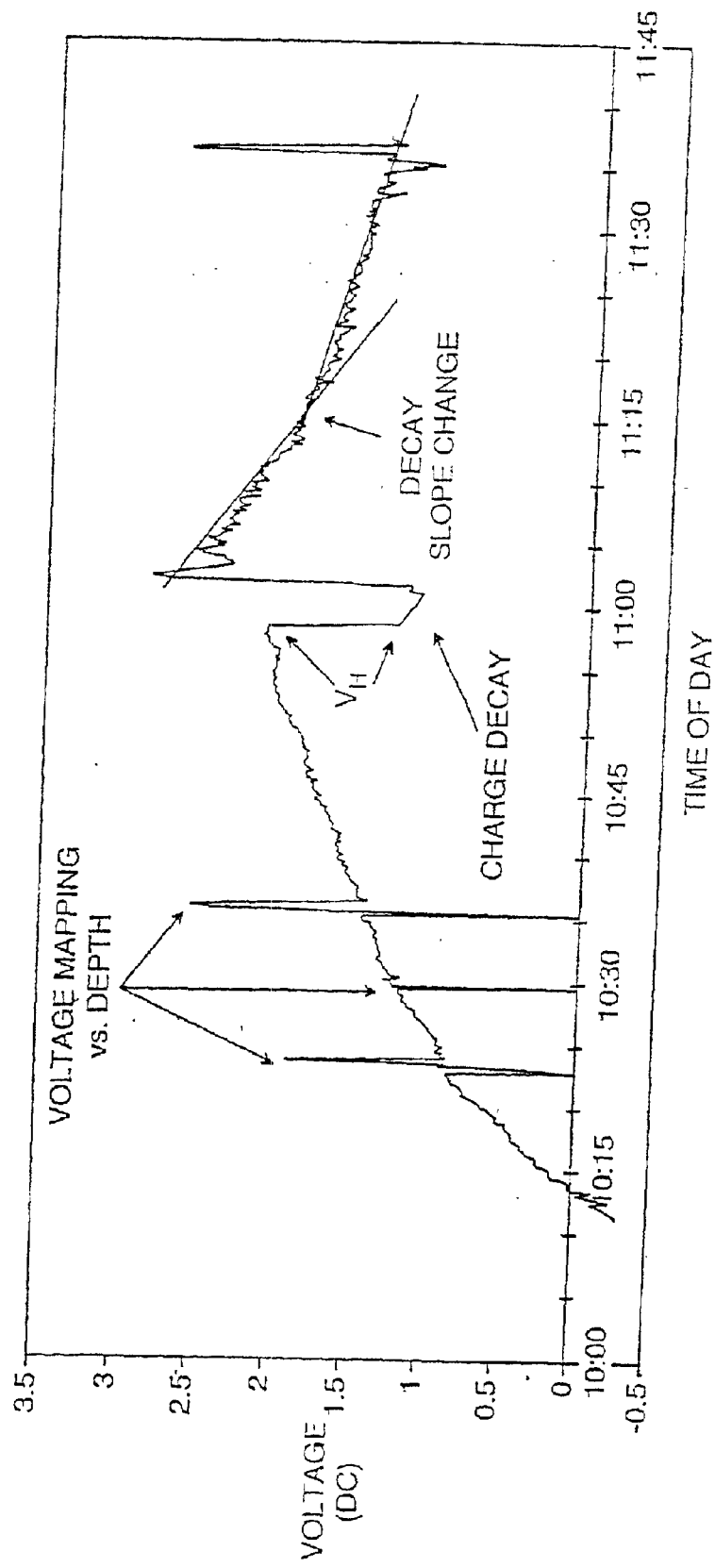
FIG. 10 shows a plot of the observed voltage of a manufactured copper-nickel alloy, as measured in a molten state.
Figure 11:
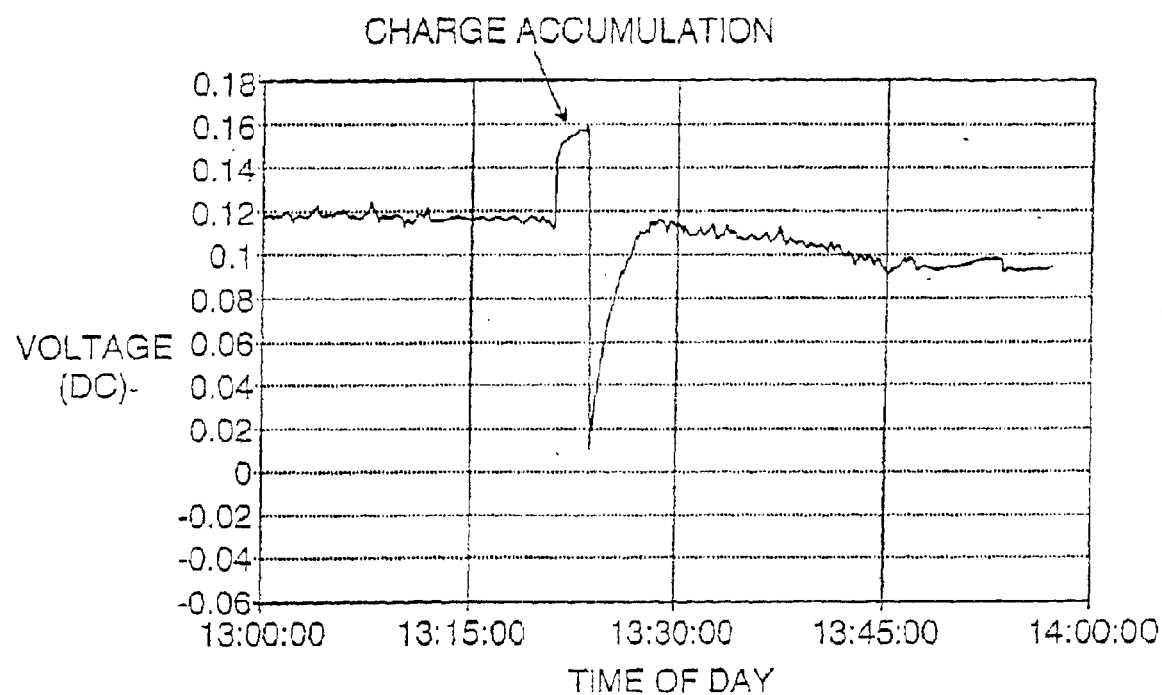
FIG. 11 shows a plot of the observed voltage of a manufactured metal, as measured in a molten state.

FIG. 10 shows the $V_H$ observed in a copper-nickel alloy. Voltage decay exhibited two distinct decay rates, indicative of two controlling mechanisms. A positive voltage signature with a positive capacitance decay (i.e., capacitance accumulation) is shown in FIG. 11.

Figure 12:
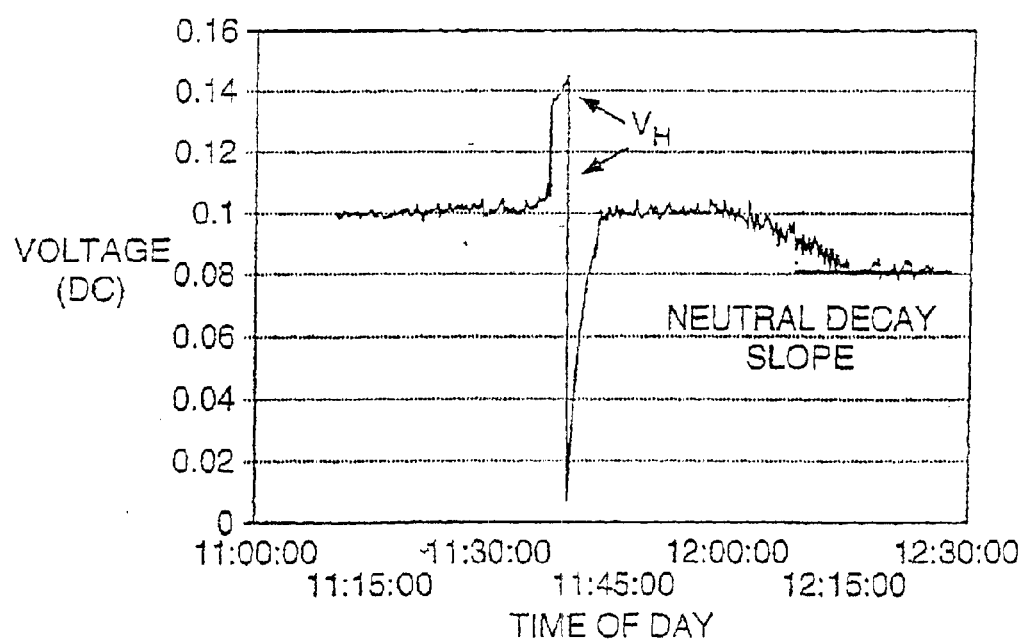
FIG. 12 shows a plot of a positive voltage signature and positive capacitance decay of a manufactured metal, as measured in a molten state.
Figure 13:
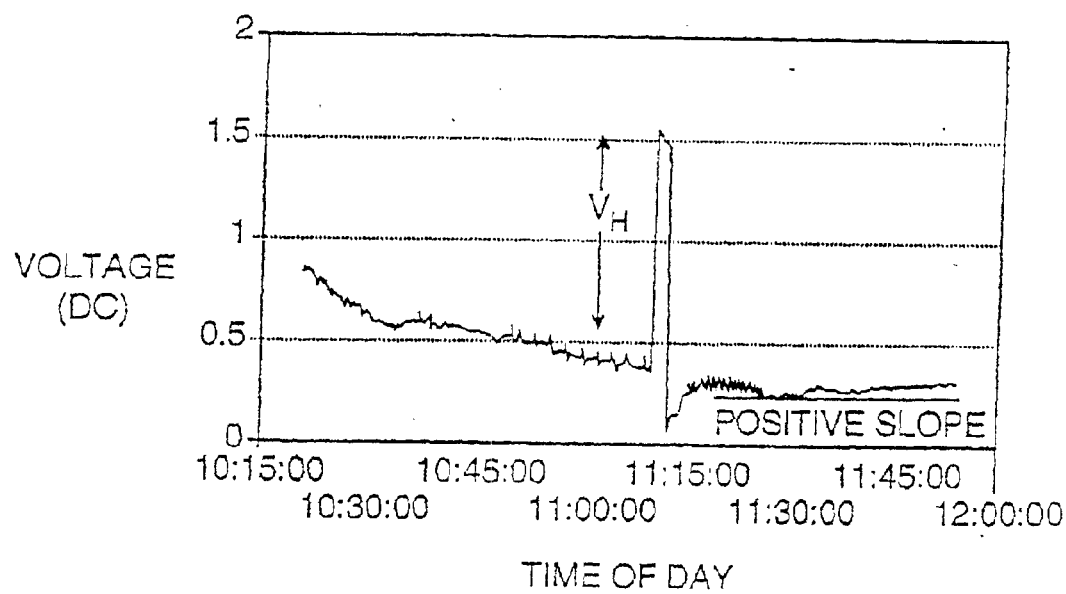
FIG. 13 shows a plot of a voltage decay profile of a manufactured metal, as measured in a molten state.
Figure 14:
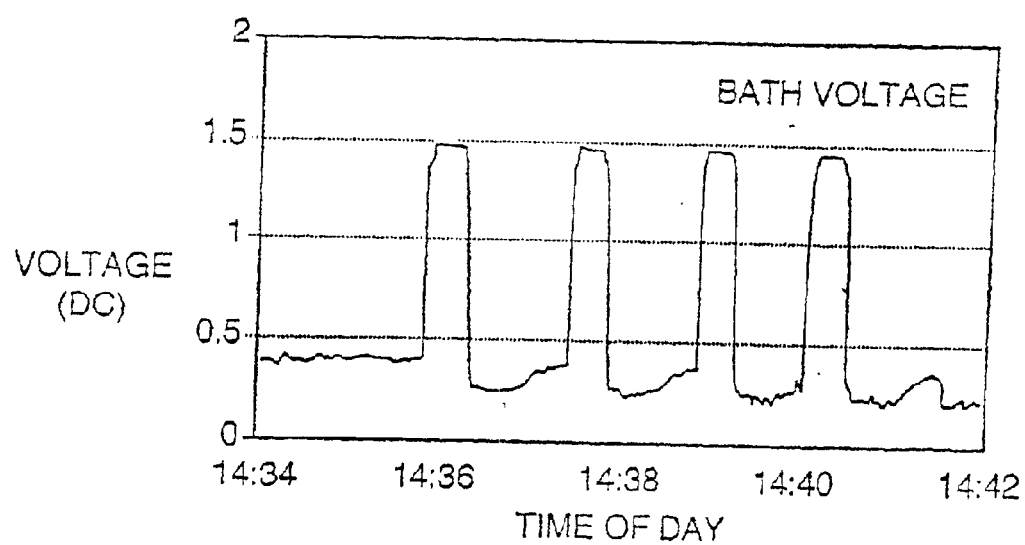
FIG. 14 shows a plot of a neutral decay in voltage and capacitance, as measured in a molten state.
Figure 15:
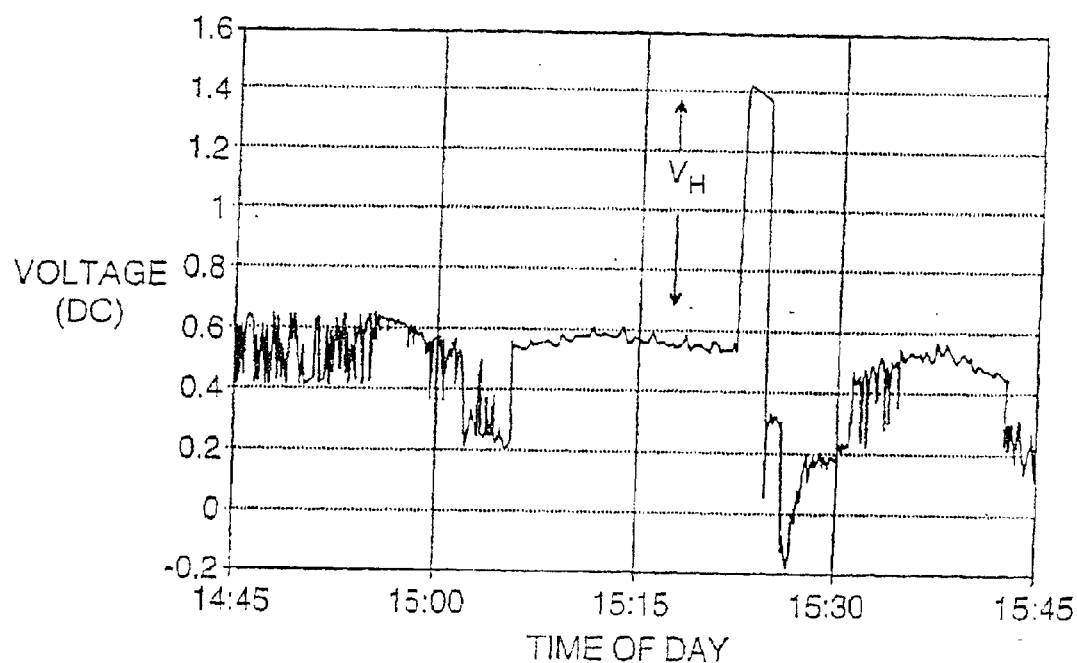
FIG. 15 shows a plot of a positive voltage signature and a negative capacitance decay of a manufactured metal, as measured in a molten state.
Figure 16:
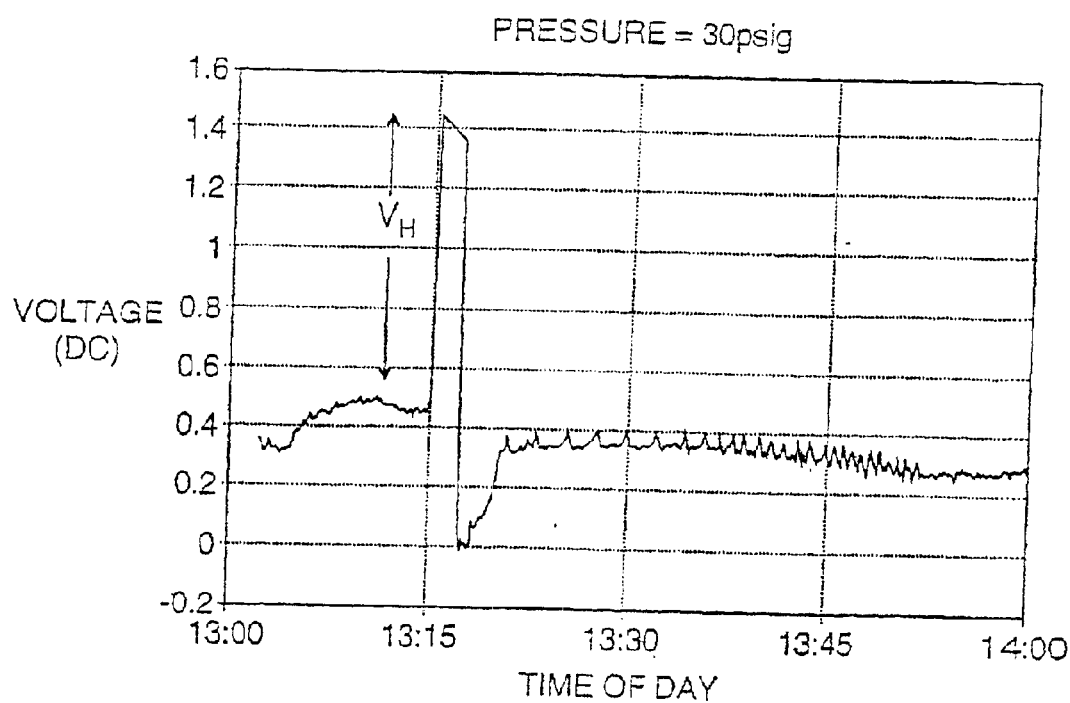
FIG. 16 shows a plot of the voltage over time of a manufactured metal under pressure.
Figure 17A:
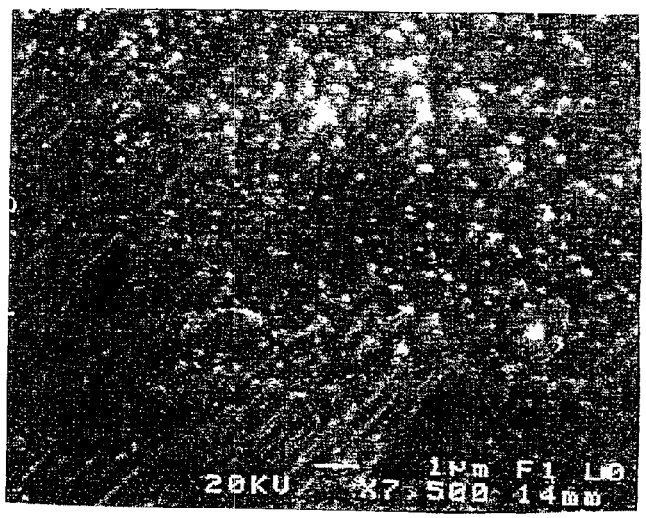
FIGS. 17A, 17B, 17C, 18A, 18B and 18C show optical and scanning electron microscopy images of manufactured copper.
Figure 17B:
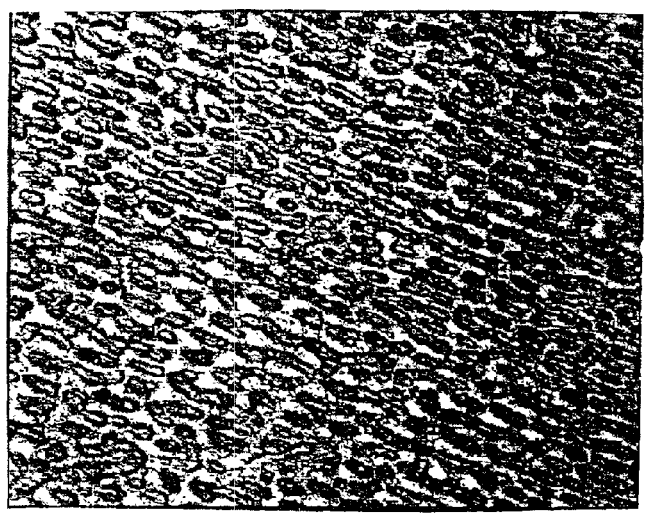
Figure 17C:
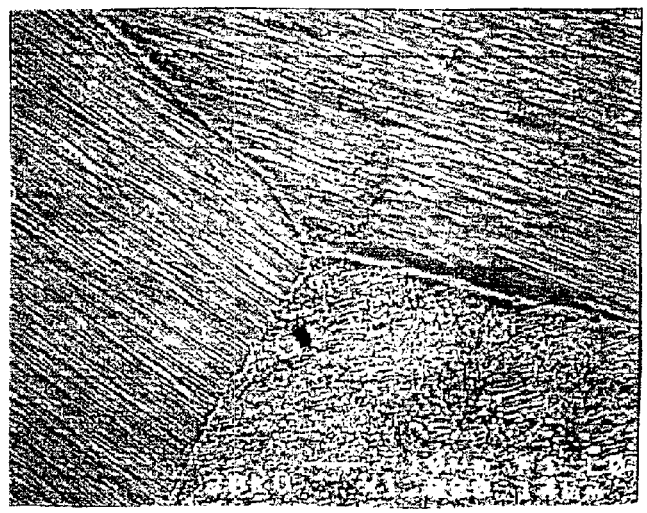
Figure 18A:
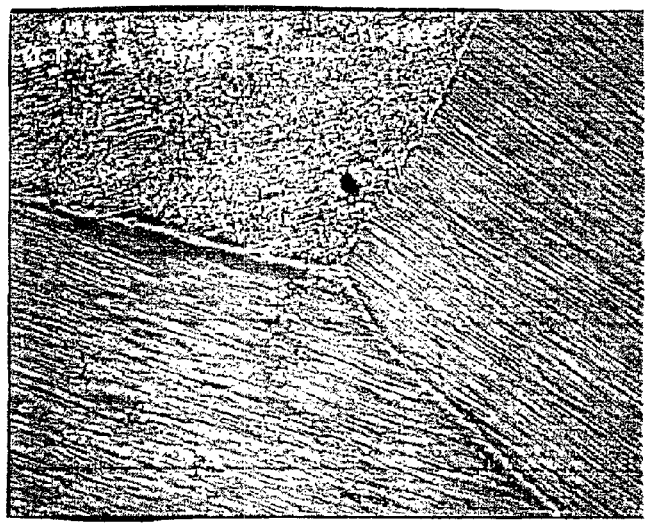
Figure 18B:
Figure 18C:
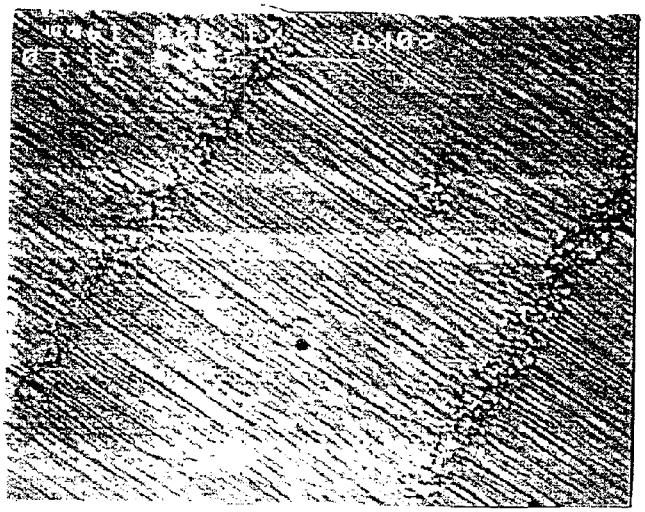
Figure 19A:
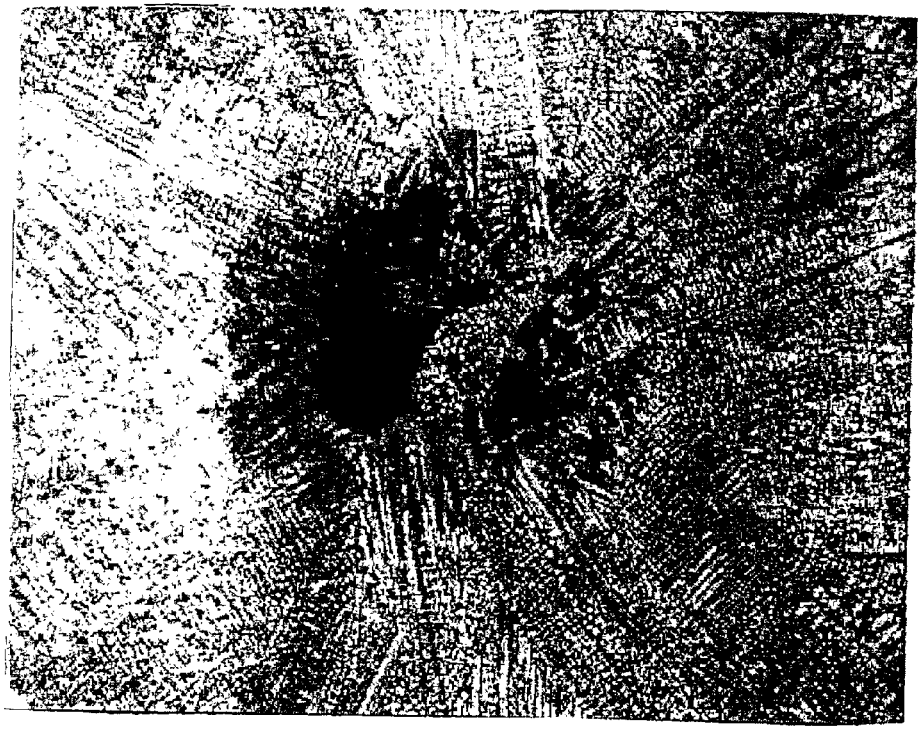
FIGS. 19A, 19B, 20A and 20B show optical microscopy images of manufactured nickel.
Figure 19B:
Figure 20A:
Figure 20B:
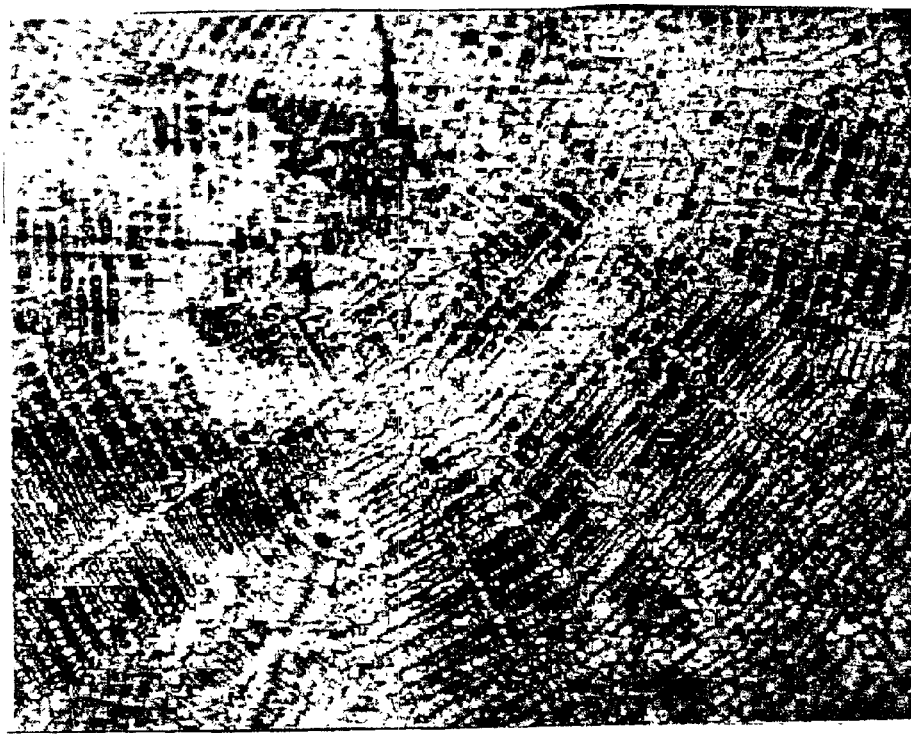
Figure 21A:
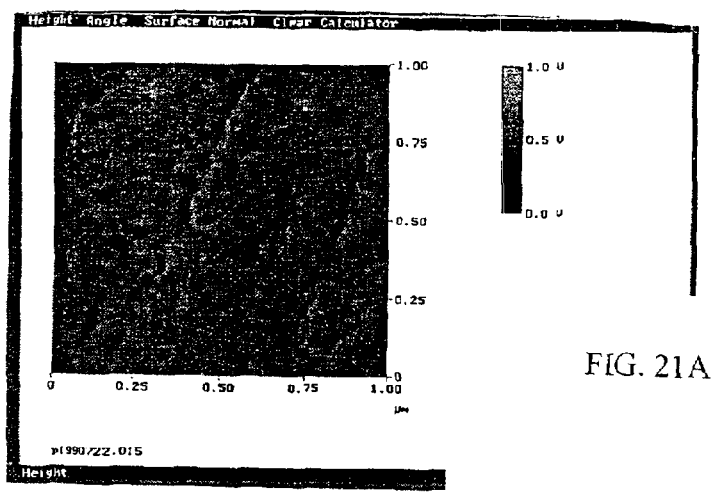
FIGS. 21A, 21B and 21C show images of atomic force microscopy and scanning tunneling microscopy of manufactured copper from an axial analysis.
Figure 21B:
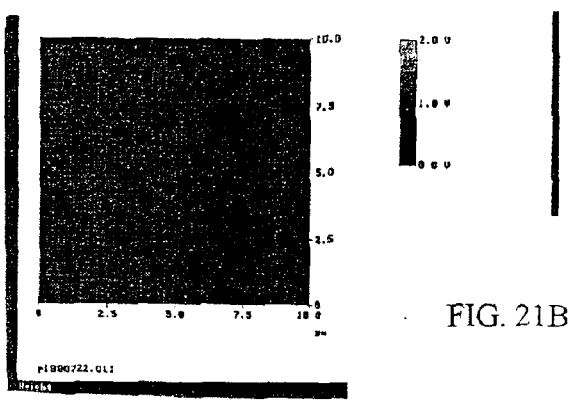
Figure 21C:
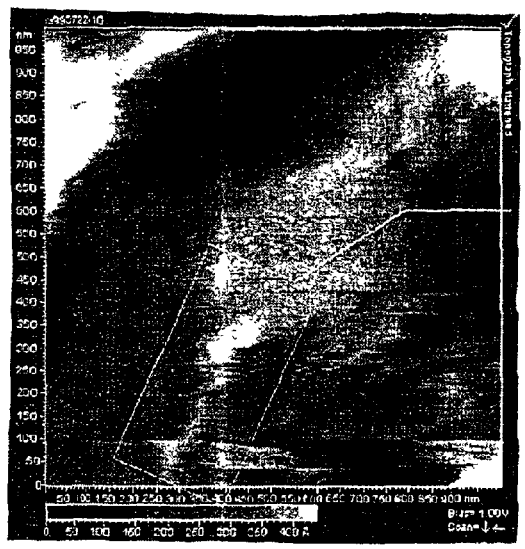
Figure 22A:
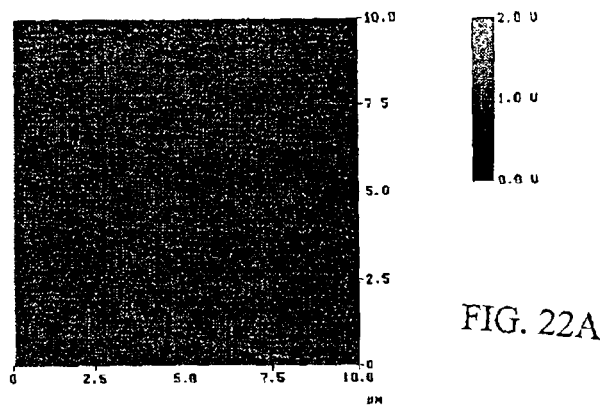
FIGS. 22A, 22B and 22C show images of atomic force microscopy and non-contact magnetic force microscopy of manufactured copper from a radial analysis.
Figure 22B:
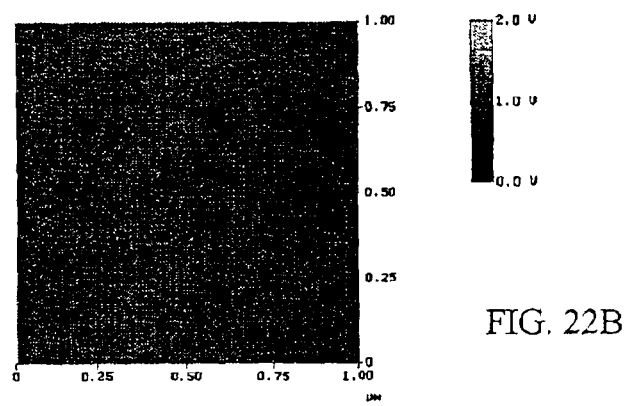
Figure 22C:
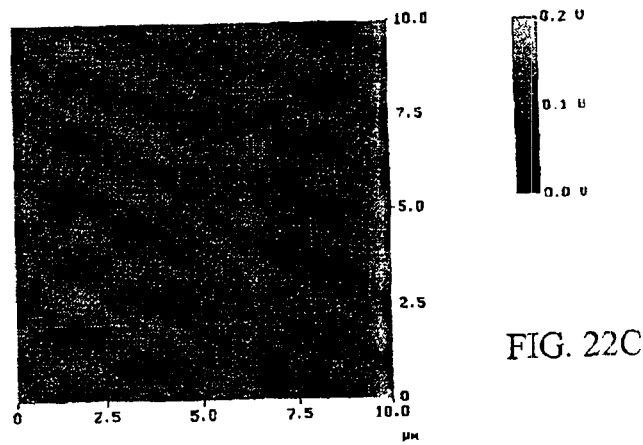

Control and manipulation of the charge signature (e.g., $V_H$ profile, capacitance slope, voltage slope) provides evidence of the alteration, and manipulation of the underlying electronic state. FIG. 12 shows a positive voltage signature and a positive capacitance decay. Additionally, the voltage decay profile has changed: one profile has a negative slope while the other has a neutral slope. Further change in the electronic structure enables the slope of the second voltage decay profile to become positive (FIG. 13); note also the change in slope of capacitance decay. The metal system shown in FIG. 14 has an electronic structure change that result in a nearly neutral decay in voltage and capacitance. Measurements were repeated four times. FIG. 15 shows that the voltage can actually become negative, indicating that the orientation can also be manipulated. FIG. 16 shows the phenomena can be observed under pressure. Table 1 is an XRF analysis using a Uniquant software package that shows a multiplicity of energetically contiguous X-ray atomic energy levels. One energetically contiguous series is represented by Sm, Eu, Gd, Tb; the other is represented by P, S, So (i.e., sulfur as an oxide), Cl, and Ar. Table 2 is an XRF analysis using a Uniquant software package that shows an energetically contiguous series as Al, Si, P, S, So (i.e., sulfur as an oxide), Cl, Ar, K, and Ca. Table 3 represents an experiment that utilized the same starting material as Tables 1 and 2, however, the reported amount or abundance of copper after processing differs from the other tables. The differing relative abundances of elements observed in Tables 1–3 are believed to correspond to the unexpected peaks seen in many of the XRF plots.

3. Structural Molecular/Atomic Character

New compositions of matter can be electronically modified to induce long range ordering/alignment. In one new composition of matter, long range ordering was induced in oxygen-free high conductivity (OFHC) copper. Optical microscopy and SEM imaging of the material verifies the degree and extent of long range ordering achieved (FIGS. 17A, 17B, 17C, 18A, 18B, and 18C). Under similar electronic conditions, long range ordering was induced in high purity (99.99%$_{wt}$) nickel. FIGS. 19A, 19B, 20A, and 20B show the optical microscopy imaging of the manufactured nickel material. A comparison of alignment is shown in-run, at two different points during processing, which highlights the adjustability of the altered electronic state of the manufactured nickel.

Extensive atomic force microscopy and non-contact MFM imaging of electronically altered OFHC copper shows views of structural configurations from a different perspective (FIGS. 21A, 21B, 21C, 22A, 22B, and 22C). Non-contact MFM imaging shows clear pattern repetition and intensity of the manufactured copper when compared to the natural copper. The manufactured copper represents a new composition of matter derived from natural copper, and the manufactured copper exhibits anisotropic behavior.

4. Physical Constants

In one sequence of new compositions of matter, color changes in OFHC copper were induced. The variation in color over four (4) new matter compositions ranged from black (two intensities) to copper (2 intensities) to gold (one intensity) to silver (one intensity). While not being bound by theory, the alteration of copper's electronic state along the continuum enables the new composition of matter's color to be adjusted along the continuum.

In another sequence of new compositions of matter, changes in the hardness of OFHC copper were induced. The variation in diamond pyramid hardness between different manufactured copper samples ranged from about 25 to 90 (or 3 to 9 times higher than natural copper). Hardness change was anisotropic.

Figures 23A, 23B, 23C:
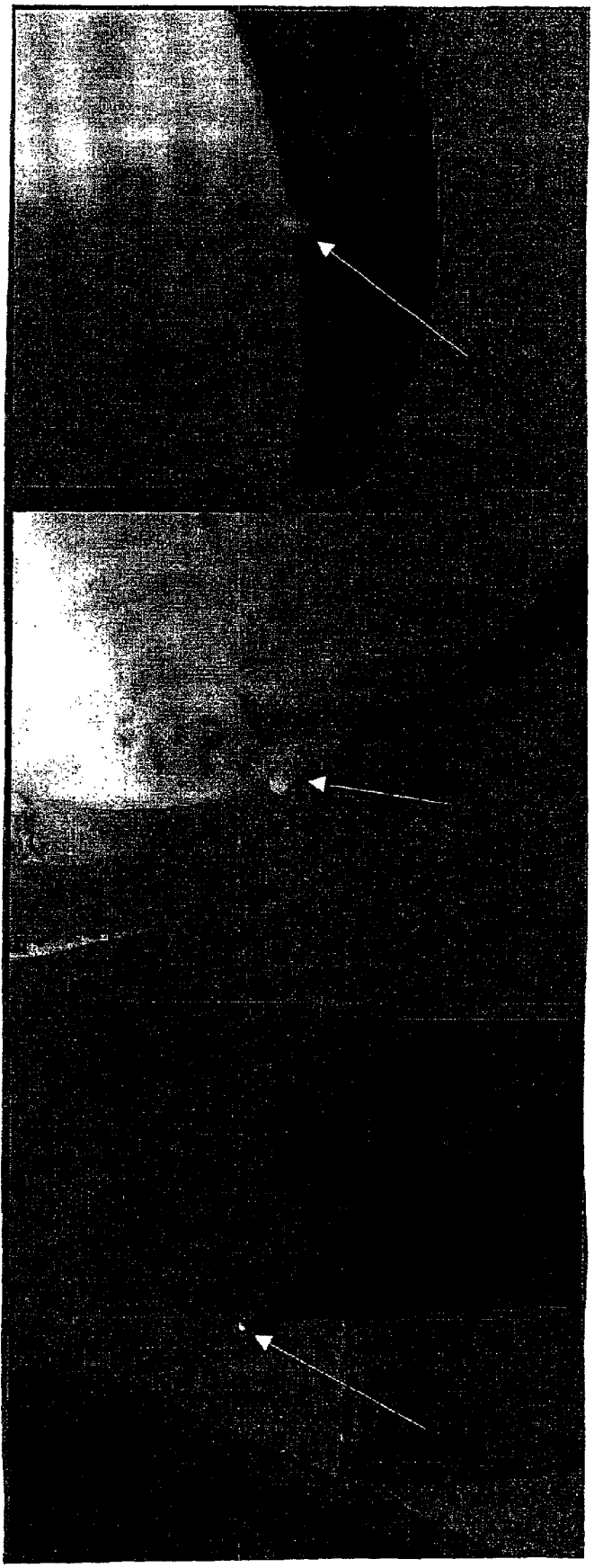
FIGS. 23A, 23B and 23C show images of discrete induced magnetism of non-magnetic copper.

In another new composition of matter, magnetism was induced in a high purity, non-magnetic metal copper (e.g., 99.98%$_{wt}$) in its elemental form (FIGS. 23A and 23B).

5. Physical Properties

In one sequence of new compositions of matter, ductility changes were induced in a high purity, ductile copper (99.98%$_{wt}$) in its elemental form. The variation in the engineering physical property of ductility ranged from brittle to semi-ductile to ductile to extremely ductile over four (4) new matter compositions.

Figure 24:
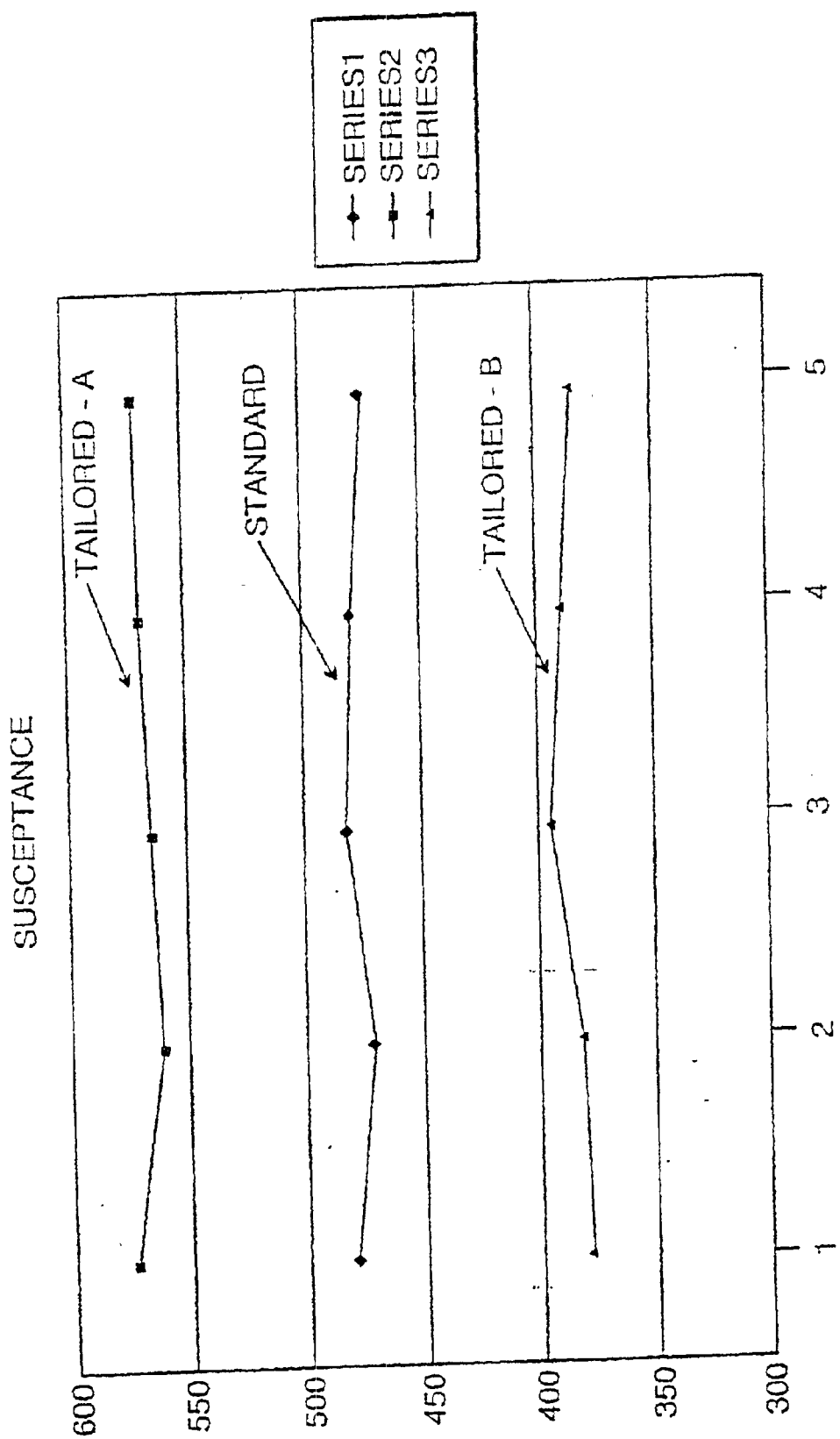
FIG. 24 shows a plot of electrical susceptance for manufactured compositions in comparison to the compositions in its natural state.

In one new composition of matter, the electrical reactance was increased approximately 3% above that of natural copper over the frequency range of 0 Hz to 100 kHz. In another new composition of matter, electrical susceptance was increased approximately 20% above 99.98%$_{wt}$ copper of the same chemical composition (i.e., the copper in its natural state). In another new composition of matter, electrical susceptance was decreased approximately 25% below 99.98%$_{wt}$ copper of the same chemical composition (i.e., the copper in its natural state). Electrical susceptance for these new matter compositions compared to the control standard (the material in its natural state) is shown in FIG. 24.

6. Additional Differentiations

In one sequence of new compositions of matter, which all used the same raw materials, consumables, utilities, and materials of construction, the sum of element concentrations identified by XRF analysis varied considerably. Variations in elemental abundance determined by XRF Uniquant prior to normalization over three (3) new matter compositions were 99.5%$_{wt}$ (Table 3), 96.0%$_{wt}$ (Table 2), and 90.6 %$_{wt}$ (Table 1). The apparent loss of matter between the recognized elemental structures and the manufactured elemental structures differentiates naturally occurring materials from materials with modified electronic structures (i.e., a new composition of matter).

While not being bound by theory, Applicant believes the conservation of energy requires that all mass, independent of magnitude and/or configuration, character, and/or dimension can be characterized by the allowed set of mathematical poles (defined as the operation zurn) and further characterized by the set of mathematical poles coalesced (defined as the isozurn value). An adjustment or manipulation of the zurn invokes a change in the isozurn value to a value different than its naturally occurring value, and accounts for the contribution of its rest state value, thereby modifying the electronic structure that defines the natural state. A change in the isozurn value to a value different than that which specifies the natural state denotes a change in the underlying electronic state of the specified species.

A change in the isozurn value is typically noted at the subatomic, atomic, or molecular level. While not being bound by theory, the complexity of energy interactions is believed to often impede single variable isolation. In these cases, a change in the electronic state of the specified species typically manifests itself as a change in a property value(s) from the naturally occurring state (e.g., the unaltered entropic driven ground state). Typical changes denoting a change in property value, which depart from the property value specifying its naturally occurring state, dictate a change in the isozurn value of that state.

Definitions of Acronyms
AO—Atomic Orbital
SEM—Scanning electron microscopy
TEM—Tunneling Electron Microscopy
STM—Scanning Tunneling Microscopy
AFM—Atomic Force Microscopy
LFM—Lateral Force Microscopy
MFM—Magnetic Force Microscopy
XES—X-ray Emission Spectrometry
XRF—X-ray Fluorescence Spectrometry
Exemplification

EXAMPLE 1

Experimental Procedure for Copper Run 14-01-01

A cylindrical alumina-based crucible (99.68% $Al_2O_3$, 0.07% $SiO_2$, 0.08% $Fe_2O_3$, 0.04% CaO, 0.12% $Na_2O_3$; 4.5" O.D.×3.75" I.D.×10" depth) of a 100 pound induction furnace reactor (Inductotherm) fitted with a 75-30R Powertrak power supply was charged with 2500 g copper (99.98% purity) through its charging port. The reactor was fitted with a graphite cap and a ceramic liner (i.e., the crucible, from Engineering Ceramics). During the entire procedure, a slight positive pressure of nitrogen (~0.5 psi) was maintained in the reactor using a continuous backspace purge. The reactor was heated to the metal charge liquidus point plus 300° F., at a rate no greater than 300° F./hour, as limited by the integrity of the crucible. The induction furnace operated in the frequency range of 0 kHz to 3000 kHz, with frequency determined by a temperature-controlled feedback loop implementing an Omega Model CN300 temperature controller. Upon reaching 2300° F., the reactor was charged with an additional 2143 g copper over an hour.

The temperature was again increased to 2462° F. again using a rate no greater than 300° F./hour. When this temperature was reached, graphite saturation assemblies (⅜" OD, 36" long high purity (<5 ppm impurities) graphite rods) were inserted to the bottom of the copper charge through ports located in the top plate. The copper was held at 2462° F. for 4 hours. Every 30 minutes during the hold period, an attempt was made to lower the graphite saturation assemblies as dissolution occurred. As the copper became saturated with carbon, the graphite saturation assemblies were consumed. After the 4 hour hold period was complete, the graphite saturation assemblies were removed.

The reactor temperature was increased to 2480° F. over 7 minutes. The temperature was then varied between 2480° F. and 2530° F. for 15 cycles. Each cycle consisted of raising the temperature continuously over 7 minutes and lowering the temperature continuously over 7 minutes. After the 15 cycles were completed, a gas addition lance was lowered into the molten metal to a position approximately 2" from the bottom of the reactor and a 0.15 L/min flow of argon was begun. The temperature of the copper was varied over another 5 cycles between 2480° F. and 2530° F.

After the fifth cycle, the reactor temperature was lowered to 2462° F. over a 10 minute period with continued argon addition. The graphite saturation assemblies were reinstalled in the copper and remained there for 1 hour. The graphite saturation assemblies were removed.

The reactor temperature was lowered to 2459° F. over 5 minutes. The reactor was held at this temperature for 5 minutes with continued argon addition. The temperature was then varied between 2459° F. and 2453° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2450° F. over 5 minutes. The temperature was varied between 2450° F. and 2441° F. over 4½ cycles. Each cycle consisted of lowering the temperature continuously over 5 minutes and raising the temperature continuously over 3 minutes. In addition, while raising the temperature, a 0.15 L/min flow of argon was added, and while lowering the temperature, a 0.15 L/min flow of nitrogen was added.

The reactor temperature was lowered to 2438° F. over 5 minutes. The temperature was varied between 2438° F. and 2406° F. for 15.5 cycles. Each cycle consisted of lowering the temperature continuously over 15 minutes and raising the temperature continuously over 15 minutes. In addition, while raising the temperature, a 0.15 L/min flow of argon was added, and while lowering the temperature, a 0.15 L/min flow of nitrogen was added. All gas addition, except for the purge of nitrogen ceased after the 15.5 cycles were completed.

The temperature was varied between 2406° F. and 2419° F. for one cycle. The cycle consisted of raising the temperature continuously over 15 minutes and lowering the temperature continuously over 15 minutes. The gas addition lance was removed.

The reactor temperature was cooled by lowering the induction furnace power to 1 kW or less as the ingot cooled. The copper was then cooled to approximately ambient temperature in water.

Analytical Protocols

X-ray Fluorescence

An ARL 8410 XRF was used to analyze each of the sample ingots. An ARL 8410 is a sequential wavelength dispersive spectrometer (WDS). Specific emission lines are used to determine the presence or absence, and the concentrations of various elements. Each characteristic x-ray line is measured in sequence by the instrument by controlling the instrument geometry.

Figure 62:
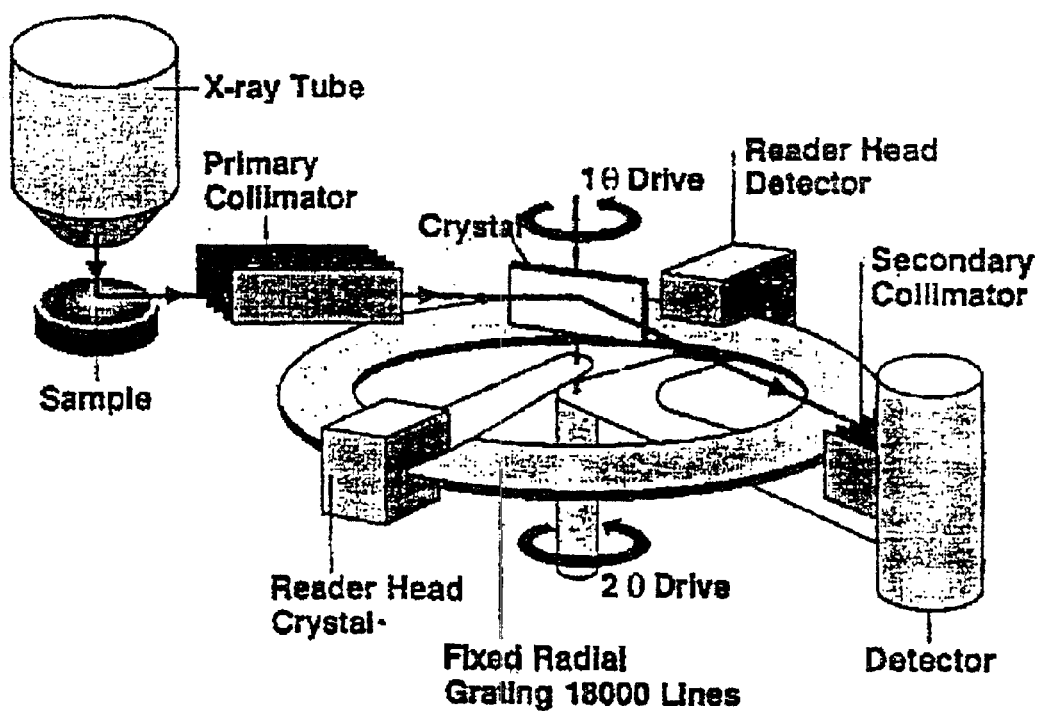
FIG. 62 shows the general configuration of the ARL 8410 spectrometer.

FIG. 62 shows the general configuration of the ARL 8410 spectrometer. The WDS spectrometer relies on the fundamentals of x-ray diffraction, when x-ray fluorescence occurs when matter is bombarded by a stream of high-energy incident x-ray photons. When the incident X-radiation strikes the sample, the incident x-rays may be absorbed, scattered, or transmitted for the measurement of the fluorescent yield.

The ARL 8410 utilizes an end-window rhodium (Rh) x-ray tube. The end-window is composed of Be, and holds the tube at high vacuum. The filaments are heated giving off electrons by thermoionic emission. This beam of electrons then bombards the target Rh anode across a 10-70 keV voltage potential. Thus, primary x-rays are produced during the collision. The emitted x-ray spectrum consists of (1) "Continuum" or "Bremstrahlung" radiation, (2) Characteristic x-ray lines of the target material (e.g., K and L series), and (3) Characteristic lines from any contaminants. Thus, the primary spectrum appears as a series of sharp intense peaks arrayed over a broad hump of continuum radiation. The ARL is equipped with and uses two types of photon detectors, the Flow Proportional Counter (FPC) and the Scintillation Counter (SC).

The manufactured metal samples are prepared by cutting a cube shape (approximately 1.1875") from the center of the cooled ingot. An axial edge and a radial edge are then denoted. To provide a smooth surface for analysis, the axial and radial faces are sequentially polished. The sample faces are sanded to 400 grit, then a polishing wheel is employed with 600 grit paper. Finally, a $\leq 1$ $\mu$m polishing compound completes the smoothing process. The sample is then cleaned with isopropyl alcohol and placed in a sample cassette/holder. The sample holder is then loaded into the XRF.

The orientation of the detector crystal with respect to the sample and the photon detector is controlled synchronously such that characteristic x-ray lines can be accurately measured. A sequential measurement consists of positioning the diffraction crystal at a given theta (diffraction angle) and the detector at two-theta and counting for a given period of time. The crystal and detector are then rotated to a different angle for the next characteristic x-ray line.

Uniquant Version 2 software, developed by Omega Data Systems is used to control the crystal and detector placement and provides the data reduction algorithms for each analytical protocol. The sample results include an elemental composition list along with the associated concentrations for each sample.

Measurement of Grain Sizes

When the grain sizes exceeded the size discernible with the human eye, the grain size (average span distance) was measured using a micrometer. When the grain sizes were not discernible via the naked eye, standard acid etching was performed and then optical microscopy was utilized to measure and characterize the grain.

Measurement of Magnetism

The magnetic properties of the manufactured ingots were tested via three methods.

Magnetic Attraction: An ⅛" diameter neodymium iron boron magnet was scanned consistently and uniformly across the surface of the ingot to detect areas of attraction. Areas of attraction were then noted at specific sites on the surface.

Attraction to Iron: The attraction of iron filings to specific points on the ingot were quantified by enumerating the number of filings retained on the ingot surface in a vertical or upside-down orientation.

Gauss Measurement: The magnetic behavior of various points on the ingot were quantified via the use of a F. W. Bell 4048 Gauss meter.

Measurement of Chemical Reactivity

The manufactured ingots were subjected to various chlorine ligands, including NaCl, NaOCl, HCl, and chlorinated organics to semi-quantitatively access their reactivity to ligated chlorine. The formation of reaction products was recorded, then reaction products were removed from the reaction site, weighed and elemental composition verified via XRF.

Analytical Results

Figure 25:
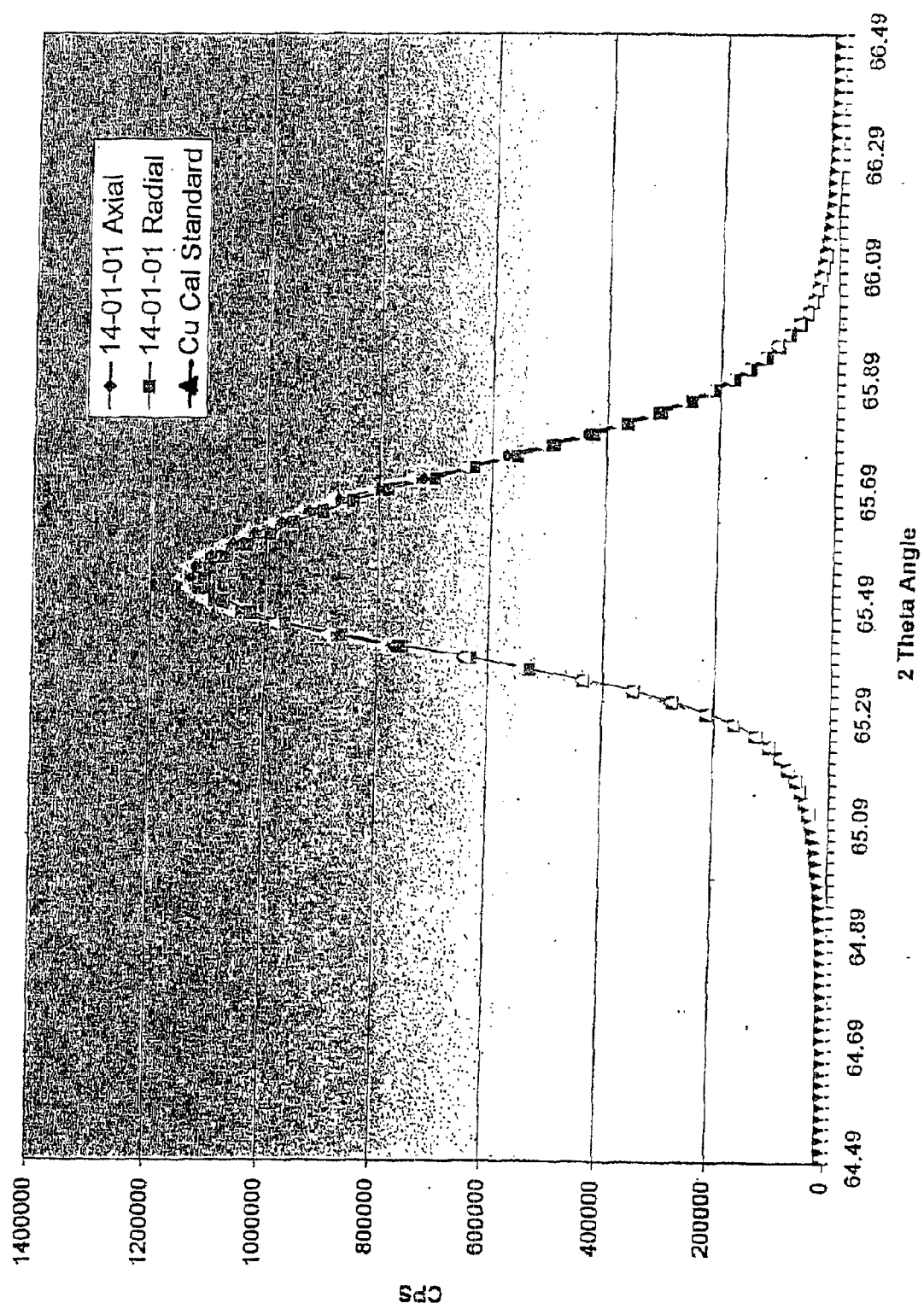
FIG. 25 shows a plot of x-ray fluorescence spectrometry for manufactured copper, on both the axial and radial faces of a block cut from the ingot prepared in Example 1, as compared to a plot of x-ray fluorescence spectrometry for natural copper.

An x-ray fluorescence analysis of the copper sample is provided in FIG. 25, with the $K_\alpha$ peak of a copper control standard shown for reference.

Figure 26:
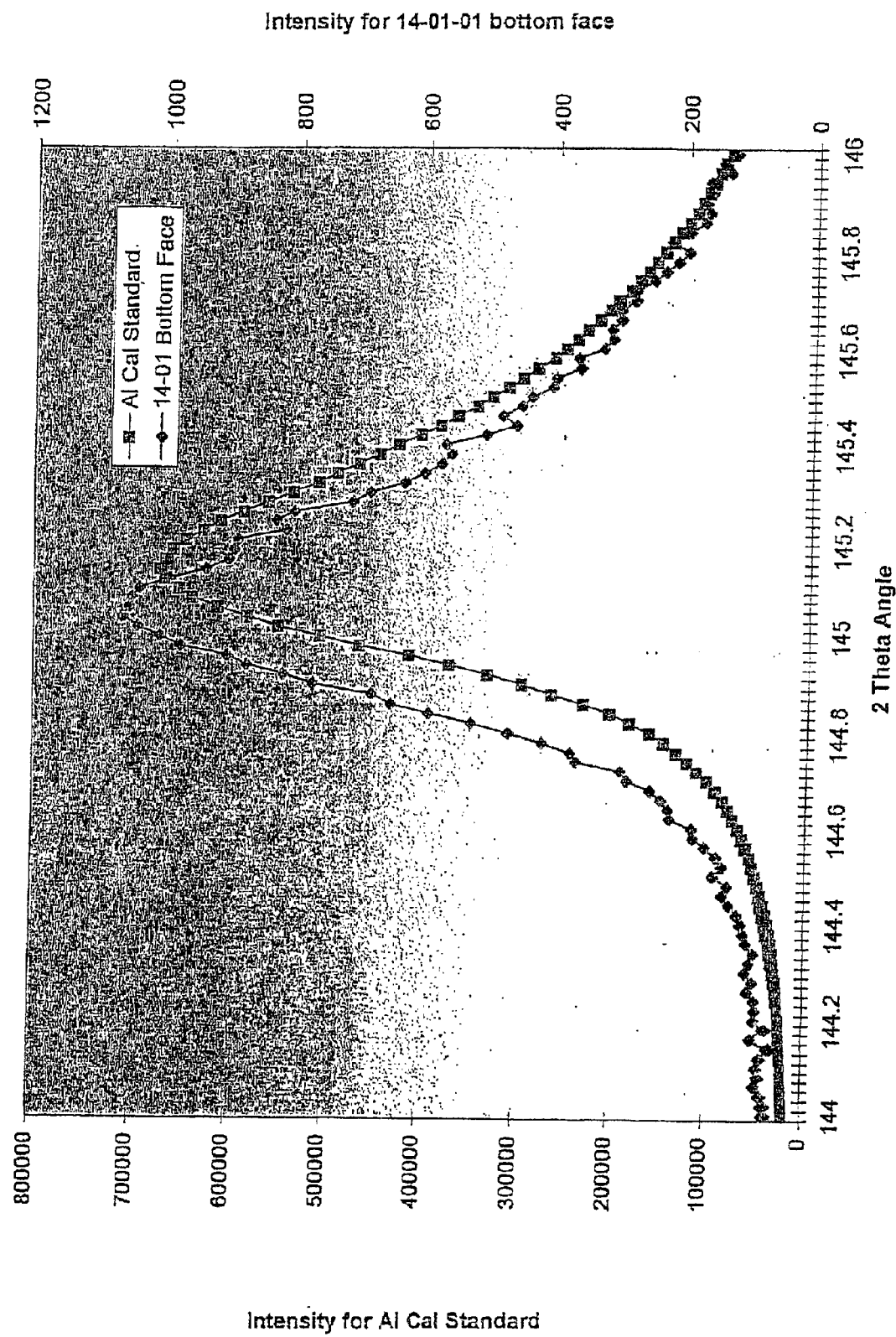
FIG. 26 shows a plot of x-ray fluorescence spectrometry for manufactured copper in the region of the $K_\alpha$ band of aluminum, on the bottom face of a block cut from the ingot prepared in Example 1, as compared to a plot of x-ray fluorescence spectrometry for natural aluminum.

An x-ray fluorescence analysis of the copper sample is provided in FIG. 26, with the $K_\alpha$ peak of an aluminum control standard shown for reference.

Summary data showing the apparent elemental composition of the product of Example 1 is shown in Tables 5–13, as was measured by an XRF analysis using a Uniquant software package. The apparent elemental composition of the product varies by position, which is indicated in each table.

The manufactured copper exhibited large grain sizes and different coloration on each grain, which caused the surface to appear iridescent. The axial (top) face of the ingot appeared glassy, while the sides were metallic in appearance (due to anisotropic behavior). The color on both the axial and radial surfaces mimicked that of natural copper (i.e., not the intense reds or dark browns observed in other manufactured coppers, for example, Examples 11–14). On the axial surface, unique demarcations were observed. The ingot had some internal void areas, which were open to the top surface. No unexpected magnetic activity or chemical reactivity were recorded.

EXAMPLE 2

Experimental Procedure for Nickel Run 14-01-04

A cylindrical alumina-based crucible (99.68% $Al_2O_3$, 0.07% $SiO_2$, 0.08% $Fe_2O_3$, 0.04% CaO, 0.12% $Na_2O_3$; 4.5" O.D.×3.75" I.D.×10" depth) of a 100 pound induction furnace reactor supplied by Inductotherm, was fitted with a 75-30R Powertrak power supply and charged with 2500 g nickel (99.97% purity) and 100 g of graphite carbon through its charging port. The reactor was fitted with a graphite cap with a ceramic liner (i.e. the crucible, from Engineering Ceramics). During the entire procedure, a slight positive pressure of nitrogen (~0.5 psi) was maintained in the reactor using a continuous backspace purge. The reactor was heated to the metal charge liquidus point, over a rate no greater than 300° F./hour, as limited by the integrity of the crucible. The induction furnace operated in a frequency range of 0 kHz to 3000 kHz, with frequency determined by a temperature-controlled feedback loop implementing an Omega Model CA 300 temperature controller. Upon reaching 2800° F., the reactor was charged with an additional 2700 g nickel over an hour.

The temperature was again increased to 2850° F. again using a rate no greater than 300° F./hour. When this temperature was reached, graphite saturation assemblies (⅜" OD, 36" long high purity [<5 ppm impurities] graphite rods) were inserted to the bottom of the nickel charge through ports located in the top plate. The nickel was held at 2850° F. for 4 hours. Every 30 minutes during the hold period, an attempt was made to lower the graphite saturation assemblies as dissolution occurred. As the nickel became saturated with carbon, the graphite saturation assemblies were consumed. After the 4 hour hold period was complete, the graphite saturation assemblies were removed.

The reactor temperature was increased to 3256° F. over 7 minutes. The temperature was then varied between 2950° F. and 3256° F. for 15 cycles. Each cycle consisted of lowering the temperature continuously over 7 minutes and raising the temperature continuously over 7 minutes. After the 15 cycles were completed, a gas addition lance was lowered and a 0.15 L/min flow of argon was begun. The temperature of the nickel was varied over another 5 cycles between 2950° F. and 3256° F.

After the fifth cycle, the reactor temperature was lowered to 2850° F. over a 10 minute period with continued argon addition. The graphite saturation assemblies were reinstalled in the nickel and remained there for 1 hour. The graphite saturation assemblies were removed.

The reactor temperature was lowered to 2829° F. over 5 minutes. The reactor was held at this temperature for 5 minutes with continued argon addition. The temperature was then varied between 2790° F. and 2829° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2770° F. over 5 minutes. The temperature was varied between 2710° F. and 2770° F. over 4½ cycles. Each cycle consisted of lowering the temperature continuously over 5 minutes and raising the temperature continuously over 3 minutes. In addition, while raising the temperature, a 0.15 L/min flow of argon was added, and while lowering the temperature, a 0.15 L/min flow of nitrogen was added.

The reactor temperature was lowered to 2691° F. over 5 minutes. The temperature was varied between 2492° F. and 2691° F. for 15.5 cycles. Each cycle consisted of lowering the temperature continuously over 15 minutes and raising the temperature continuously over 15 minutes. In addition, while raising the temperature, a 0.15 L/min flow of argon was added, and while lowering the temperature; a 0.15 L/min flow of nitrogen was added. All gas addition, except for the purge of nitrogen ceased after the 15.5 cycles were completed.

The temperature was varied between 2571° F. and 2492° F. for one cycle. The cycle consisted of raising the temperature continuously over 15 minutes and lowering the temperature over 15 minutes. The gas addition lance was removed.

The reactor temperature was slowly cooled by lowering the induction furnace power to 1 KW or less as the ingot cooled. The nickel was then cooled to approximately ambient temperature in water.

Analytical Protocols

XRF, grain size, magnetism, and chemical reactivity measurements were carried out by the procedures described in Example 1.

Analytical Results

An x-ray fluorescence analysis of the nickel sample is provided in FIGS. 27A and 27B, with the $K_\alpha$ and $L_\alpha$ peaks of a nickel control standard shown for reference.

Figures 28A, 28B:
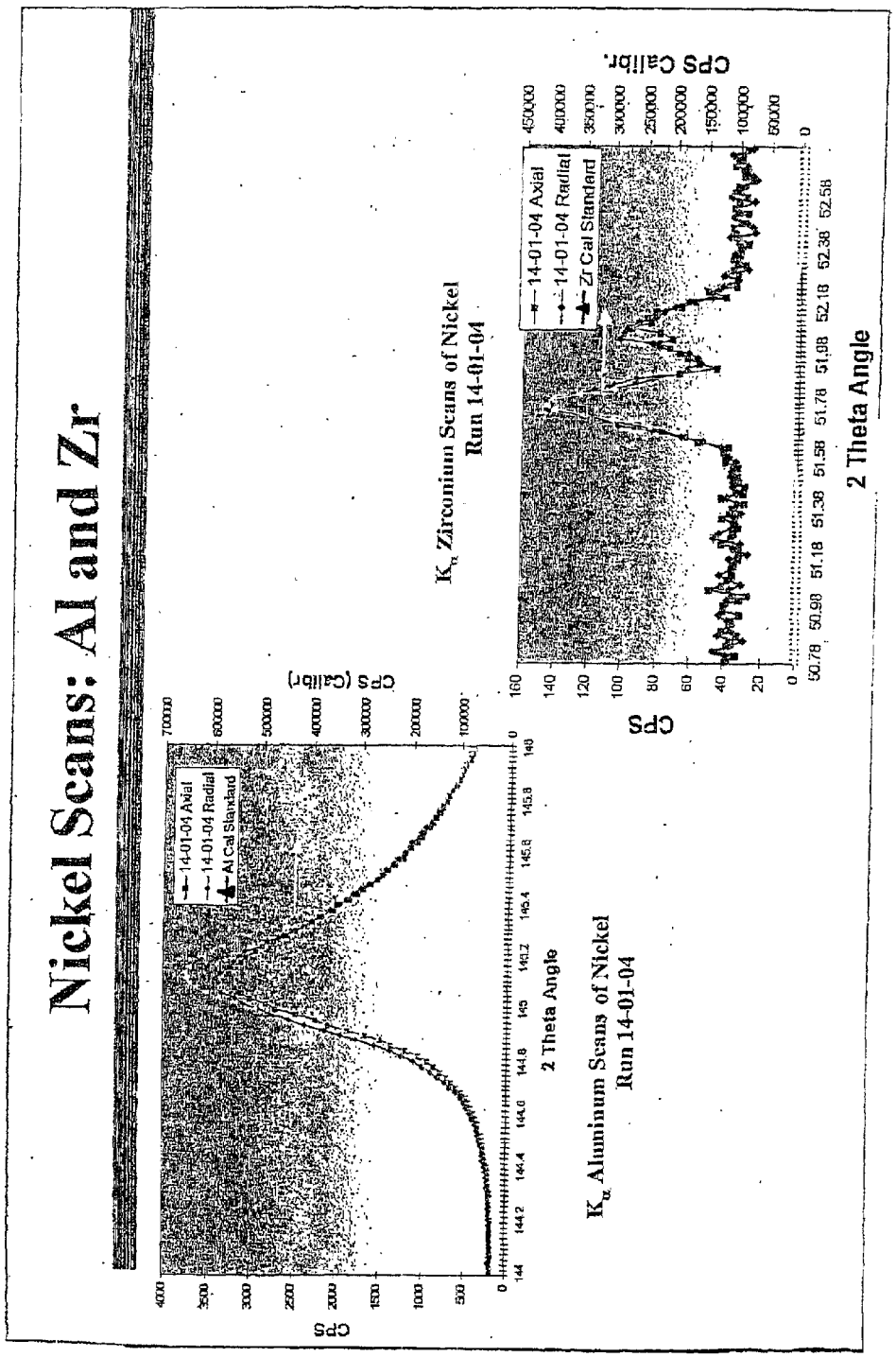
FIG. 28A shows a plot of x-ray fluorescence spectrometry for manufactured nickel in the region of the $K_\alpha$ band of aluminum, on the axial and radial faces of a block cut from the ingot prepared in Example 2, as compared to a plot of x-ray fluorescence spectrometry for natural aluminum.
FIG. 28B shows a plot of x-ray fluorescence spectrometry for manufactured nickel in the region of the $K_\alpha$ band of zirconium, on the axial and radial faces of a block cut from the ingot prepared in Example 2, as compared to a plot of x-ray fluorescence spectrometry for natural zirconium.

An x-ray fluorescence analysis of the nickel sample is provided in FIG. 28A, with the $K_\alpha$ peak of an aluminum control standard shown for reference.

An x-ray fluorescence analysis of the nickel sample is provided in FIG. 28B, with the $K_\alpha$ peak of a zirconium control standard shown for reference.

Figure 29:
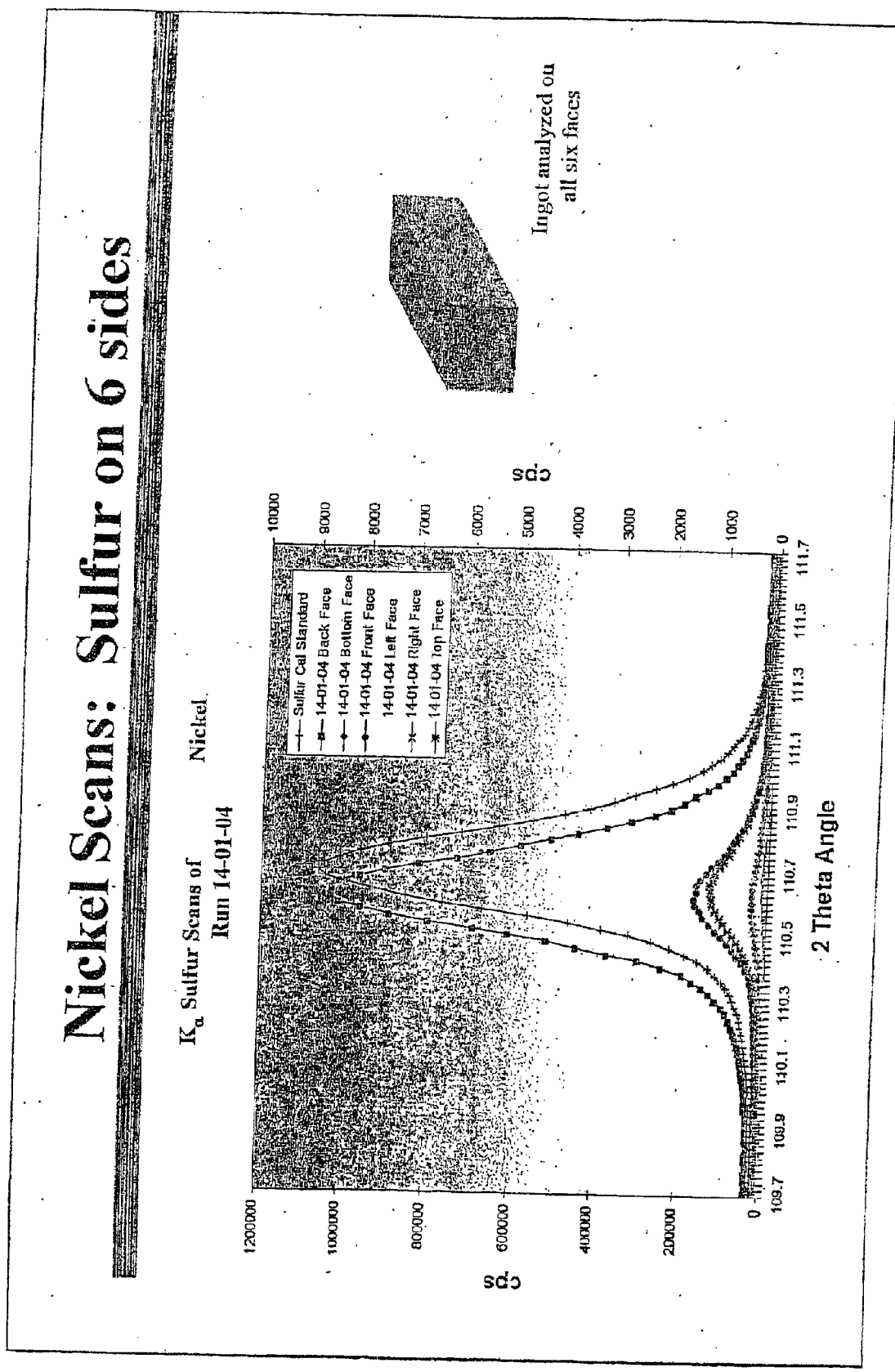
FIG. 29 shows a plot of x-ray fluorescence spectrometry for manufactured nickel in the region of the $K_\alpha$ band of sulfur, on all six faces of a block cut from the ingot prepared in Example 2, as compared to a plot of x-ray fluorescence spectrometry for natural sulfur.

An x-ray fluorescence analysis of the nickel sample is provided in FIG. 29, with the $K_\alpha$ peak of a sulfur control standard shown for reference.

Figure 30:
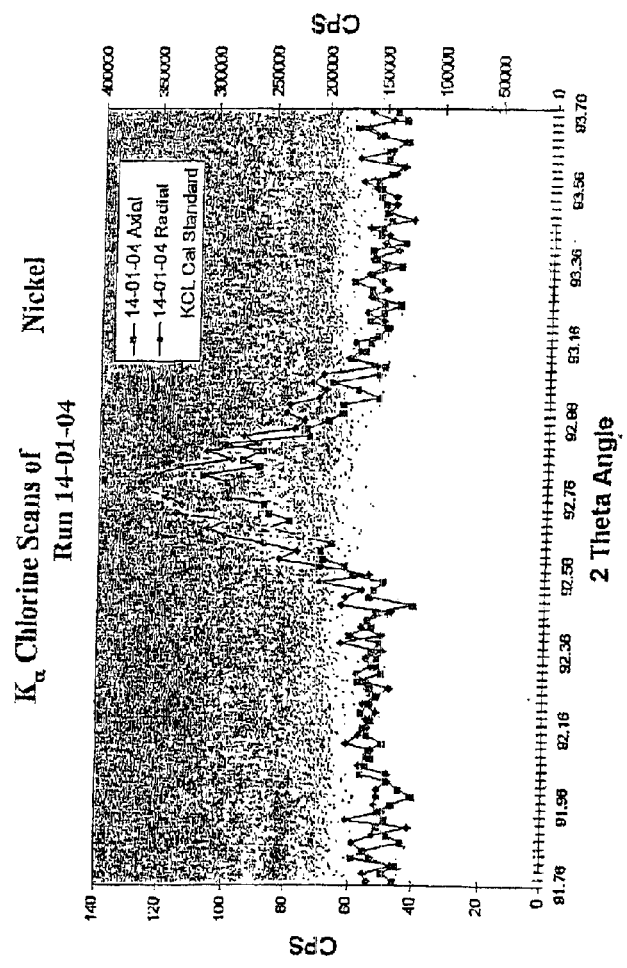
FIG. 30 shows a plot of x-ray fluorescence spectrometry for manufactured nickel in the region of the $K_\alpha$ band of chlorine (from potassium chloride), on the axial and radial faces of a block cut from the ingot prepared in Example 2, as compared to a plot of x-ray fluorescence spectrometry for natural chlorine (from potassium chloride).

An x-ray fluorescence analysis of the copper sample is provided in FIG. 30, with the $K_\alpha$ peak of an chlorine (from potassium chloride) shown for reference.

Summary data showing the apparent elemental composition of the product of Example 2 is shown in Tables 14–16, as was measured by an XRF analysis using a Uniquant software package. The apparent elemental composition of the product varies by position, which is indicated in each table.

The manufactured nickel retained a large amount of refractory on its exterior surface after retrieval from the reactor. The retained refractory was attributed to either surface attraction or reaction with the high content of $Al_2O_3$ in the refractory. The ingot did not crack with handling, but did have an internal void. The visible radial surface appeared duller in than the axial (top) face, again demonstrating anisotropic physical properties. The ingot demonstrated no unexpected chemical reactivity after removal from the reaction system.

EXAMPLE 3

Experimental Procedure for Cobalt Run 14-01-05

A cylindrical alumina-based crucible (99.68% $Al_2O_3$, 0.07% $SiO_2$, 0.08% $Fe_2O_3$, 0.04% CaO, 0.12% $Na_2O_3$; 4.5" O.D.×3.75" I.D.×10" depth) of a 100 pound induction furnace reactor supplied by Inductotherm and fitted with a 75-30R Powertrak power supply, was charged with 2176 g cobalt (99.8% purity) through its charging port. The reactor was fitted with a graphite cap with a ceramic liner from Engineering Ceramics. During the entire procedure, a slight positive pressure of nitrogen (~0.5 psi) was maintained in the reactor using a continuous backspace purge. The reactor was heated to 2800° F. over a minimum of 14 hours while the induction furnace operated in a frequency range of 0 kHz to 3000 kHz. Upon reaching 2700° F., the reactor was charged with an additional 3000 g cobalt over an hour.

When 2800° F. was reached, graphite saturation assemblies were inserted to the bottom of the cobalt charge through ports located in the top plate. The cobalt was held at 2800° F. for 4 hours. Every 30 minutes during the hold period, an attempt was made to lower the graphite saturation assemblies as dissolution progressed. As the cobalt became saturated with carbon, the graphite saturation assemblies were consumed. After the 4 hour hold period was complete, the graphite saturation assemblies were removed.

The reactor temperature was increased to 3086° F. over 7 minutes. The temperature was then varied between 2875° F. and 3086° F. for 15 cycles. Each cycle consisted of lowering the temperature continuously over 7 minutes and raising the temperature continuously over 7 minutes. After the 15 cycles were completed, a gas addition lance was lowered and a 0.15 L/min flow of argon was begun. The temperature of the cobalt was varied over another 5 cycles between 2875° F. and 3086° F.

After the fifth cycle, the reactor temperature was lowered to 2800° F. over a 10 minute period with continued argon addition. The graphite saturation assemblies were reinstalled in the cobalt and remained there for 1 hour. The graphite saturation assemblies were removed.

The reactor temperature was lowered to 2785° F. over 5 minutes. The reactor was held at this temperature for 5 minutes with continued argon addition. The temperature was then varied between 2689° F. and 2785° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2737° F. over 5 minutes. The temperature was varied between 2689° F. and 2737° F. over 4½ cycles. Each cycle consisted of lowering the temperature continuously over 5 minutes and raising the temperature continuously over 3 minutes. In addition, while raising the temperature, a 0.15 L/min flow of argon was added, and while lowering the temperature, a 0.15 L/min flow of nitrogen was added.

The reactor temperature was lowered to 2672° F. over 5 minutes. The temperature was varied between 2498° F. and 2672° F. for 15.5 cycles. Each cycle consisted of lowering the temperature continuously over 15 minutes and raising the temperature continuously over 15 minutes. In addition, while raising the temperature, a 0.15 L/min flow of argon was added, and while lowering the temperature, a 0.15 L/min flow of nitrogen was added. All gas addition, except for the purge of nitrogen ceased after the 15.5 cycles were completed.

The temperature was varied between 2570° F. and 2498° F. for one cycle. The cycle consisted of raising the temperature continuously over 15 minutes and lowering the temperature continuously over 15 minutes. The gas addition lance was removed.

The reactor temperature was cooled by lowering the induction furnace power to 1 kW or less as the ingot cooled. The cobalt was then cooled to approximately ambient temperature in water.

Analytical Protocols

XRF, grain size, magnetism, and chemical reactivity measurements were carried out by the procedures described in Example 1.

Analytical Results

Figures 31A, 31B:
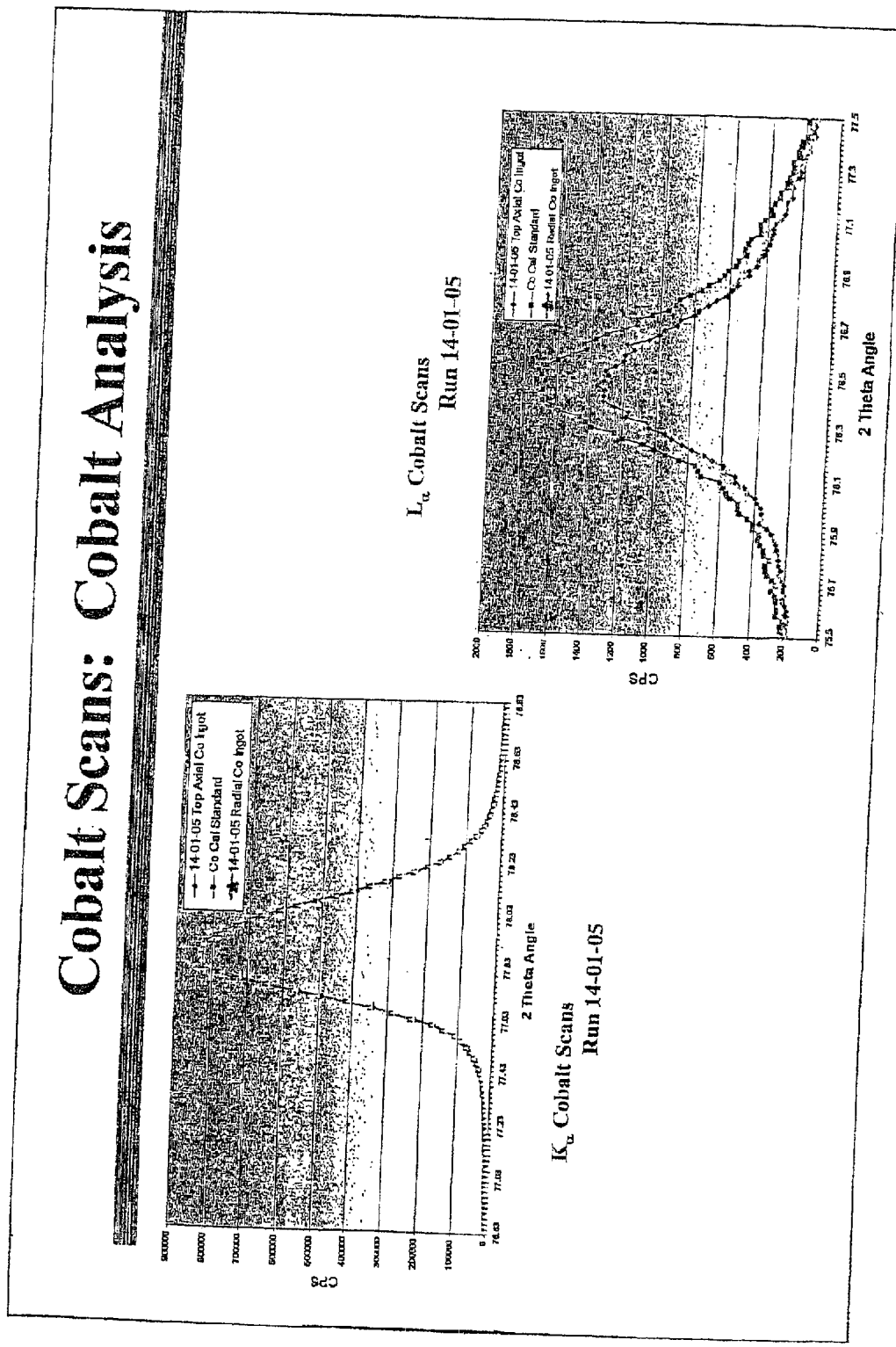
FIGS. 31A and 31B show plots of x-ray fluorescence spectrometry for manufactured cobalt, on both the axial and radial faces of a block cut from the ingot prepared in Example 3, as compared to plots of x-ray fluorescence spectrometry for natural cobalt.

An x-ray fluorescence analysis of the cobalt sample is provided in FIGS. 31A and 31B, with the $K_\alpha$ and $L_\alpha$ peaks of a cobalt control standard shown for reference.

Figures 32A, 32B:
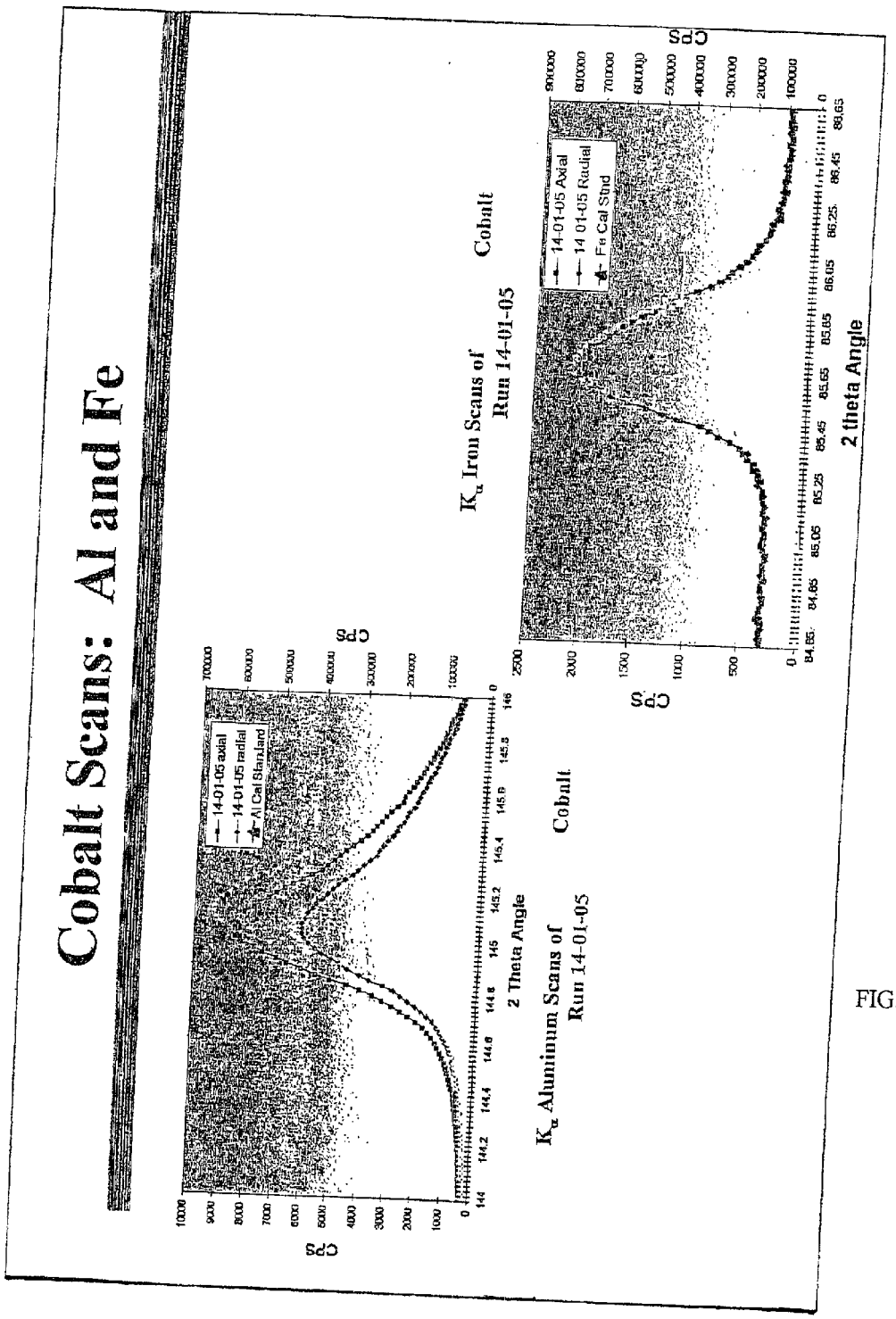
FIG. 32A shows a plot of x-ray fluorescence spectrometry for manufactured cobalt in the region of the $K_\alpha$ band of aluminum, on the axial and radial faces of a block cut from the ingot prepared in Example 3, as compared to a plot of x-ray fluorescence spectrometry for natural aluminum.
FIG. 32B shows a plot of x-ray fluorescence spectrometry for manufactured cobalt in the region of the $K_\alpha$ band of iron, on the axial and radial faces of a block cut from the ingot prepared in Example 3, as compared to a plot of x-ray fluorescence spectrometry for natural iron.

An x-ray fluorescence analysis of the cobalt sample is provided in FIG. 32A, with the $K_\alpha$ peak of an aluminum control standard shown for reference.

An x-ray fluorescence analysis of the cobalt sample is provided in FIG. 32B, with the $K_\alpha$ peak of an iron control standard shown for reference.

Figures 33A, 33B:
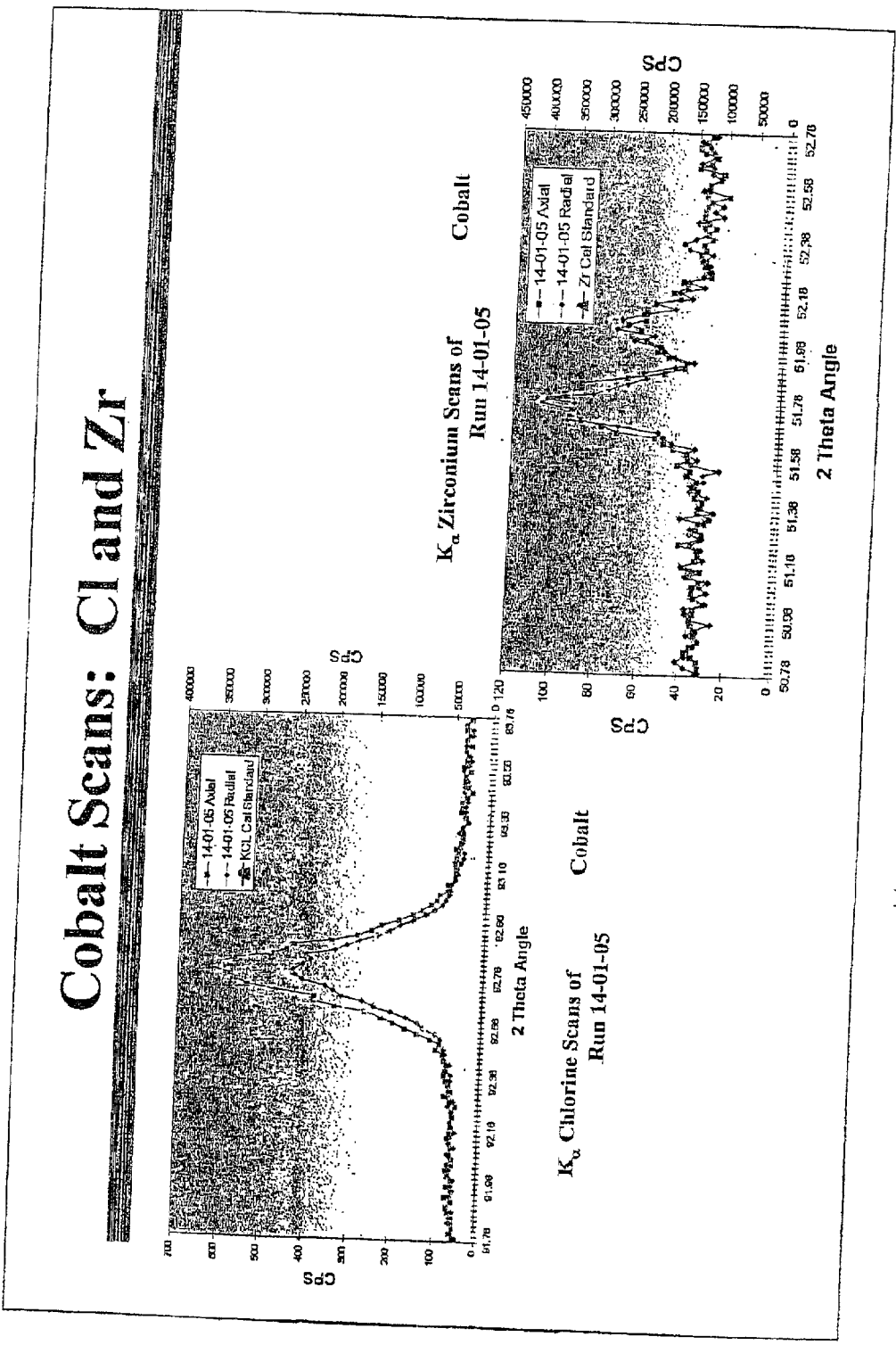
FIG. 33A shows a plot of x-ray fluorescence spectrometry for manufactured cobalt in the region of the $K_\alpha$ band of chlorine (from potassium chloride), on the axial and radial faces of a block cut from the ingot prepared in Example 3, as compared to a plot of x-ray fluorescence spectrometry for natural chlorine (from potassium chloride).
FIG. 33B shows a plot of x-ray fluorescence spectrometry for manufactured cobalt in the region of the $K_\alpha$ band of zirconium, on the axial and radial faces of a block cut from the ingot prepared in Example 3, as compared to a plot of x-ray fluorescence spectrometry for natural zirconium.

An x-ray fluorescence analysis of the cobalt sample is provided in FIG. 33A, with the $K_\alpha$ peak of a chlorine (from potassium chloride) control standard shown for reference.

An x-ray fluorescence analysis of the cobalt sample is provided in FIG. 33B, with the $K_\alpha$ peak of a zirconium control standard shown for reference.

Figure 34:
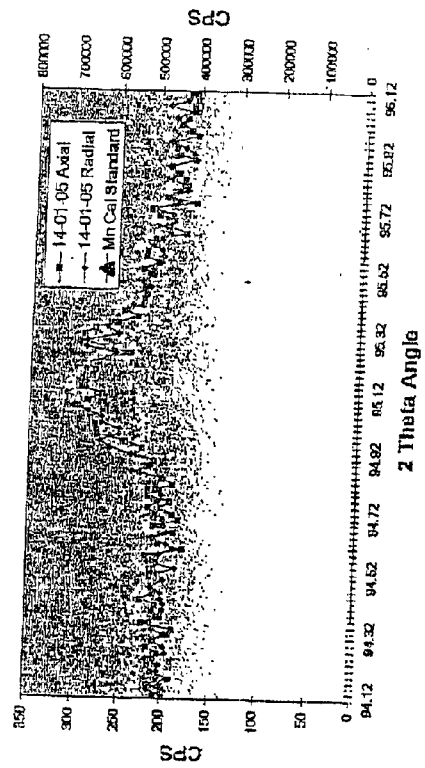
FIG. 34 shows a plot of x-ray fluorescence spectrometry for manufactured cobalt in the region of the $K_\alpha$ band of manganese, on the axial and radial faces of a block cut from the ingot prepared in Example 3, as compared to a plot of x-ray fluorescence spectrometry for natural manganese.

An x-ray fluorescence analysis of the cobalt sample is provided in FIG. 34, with the $K_\alpha$ peak of a manganese control standard shown for reference.

Summary data showing the apparent elemental composition of the product of Example 3 is shown in Table 17, as was measured by an XRF analysis using a Uniquant software package.

The top (axial) face of the manufactured cobalt ingot exhibited many of the recursive patterns observed in other manufactured ingots. The surface peaks are inconsistent with what would be expected given the forces of gravity during cooling. In addition, the shiny top face of the ingot exhibited an unexpected coloration, such that some of the faces had a distinct pink tint. While the top of the ingot was shiny, silver metallic, the sides of the ingot were matte silver in appearance.

The manufactured cobalt ingot retained a small amount of refractory around its base. The ingot did not crack upon retrieval from the reaction system. No unexpected magnetic behavior or chemical reactivity were observed.

EXAMPLE 4

Experimental Procedure for Copper/Gold/Silver Run 14-01-06

A cylindrical alumina-based crucible (99.68% $Al_2O_3$, 0.07% $SiO_2$, 0.08% $Fe_2O_3$, 0.04% CaO, 0.12% $Na_2O_3$; 4.5"

O.D.×3.75" I.D.×10" depth) of a 100 pound induction furnace reactor supplied by Inductotherm and fitted with a 75-30R Powertrak power supply was charged with 2518 g copper (99.98% purity), plus 62.28 g each of gold (99.9999% pure) and silver (99.9999% pure) through its charging port. The reactor was fitted with a graphite cap with a ceramic liner by Engineering Ceramics. During the entire procedure, a slight positive pressure of nitrogen (~0.5 psi) was maintained in the reactor using a continuous backspace purge. The reactor was heated to 2300° F. over a minimum of 12 hours while the induction furnace operated in a frequency range of 0 kHz to 3000 kHz. Upon reaching 2300° F., the reactor was charged with an additional 2000 g copper over an hour.

The temperature was again increased to 2462° F. again using a rate no greater than 300° F./hour. When this temperature was reached, graphite saturation assemblies were inserted to the bottom of the metal charge through ports located in the top plate. The alloy was held at 2462° F. for 4 hours. Every 30 minutes during the hold period, an attempt was made to lower the graphite saturation assemblies. As the alloy became saturated with carbon, the graphite saturation assemblies were consumed. After the 4 hour hold period was complete, the graphite saturation assemblies were removed.

The reactor temperature was increased to 2480° F. over 7 minutes. The temperature was then varied between 2480° F. and 2530° F. for 15 cycles. Each cycle consisted of raising the temperature continuously over 7 minutes and lowering the temperature continuously over 7 minutes. After the 15 cycles were completed, a gas addition lance was lowered and a 0.15 L/min flow of argon was begun. The temperature of the alloy was varied over another 5 cycles between 2480° F. and 2530° F.

After the fifth cycle, the reactor temperature was lowered to 2462° F. over a 10 minute period with continued argon addition. The graphite saturation assemblies were reinstalled in the alloy and remained there for 1 hour. The graphite saturation assemblies were removed.

The reactor temperature was lowered to 2459° F. over 5 minutes. The reactor was held at this temperature for 5 minutes with continued argon addition. The temperature was then varied between 2453° F. and 2459° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2450° F. over 5 minutes. The temperature was varied between 2441° F. and 2450° F. over 4½ cycles. Each cycle consisted of lowering the temperature continuously over 5 minutes and raising the temperature continuously over 3 minutes. In addition, while raising the temperature, a 0.15 L/min flow of argon was added, and while lowering the temperature, a 0.15 L/min flow of nitrogen was added.

The reactor temperature was lowered to 2438° F. over 5 minutes. The temperature was varied between 2406° F. and 2438° F. for 15.5 cycles. Each cycle consisted of lowering the temperature continuously over 15 minutes and raising the temperature continuously over 15 minutes. In addition, while raising the temperature, a 0.15 L/min flow of argon was added, and while lowering the temperature, a 0.15 L/min flow of nitrogen was added. All gas addition, except for the purge of nitrogen ceased after the 15.5 cycles were completed.

The temperature was varied between 2406° F. and 2419° F. for one cycle. The cycle consisted of raising the temperature continuously over 15 minutes and lowering the temperature continuously over 15 minutes. The gas addition lance was removed.

The reactor temperature was cooled by lowering the induction furnace power to 1 kW or less as the ingot cooled. The copper/silver/gold was then cooled to approximately ambient temperature in water.

Analytical Protocols

XRF, grain size, magnetism, and chemical reactivity measurements were carried out by the procedures described in Example 1.

Analytical Results

Figure 35:
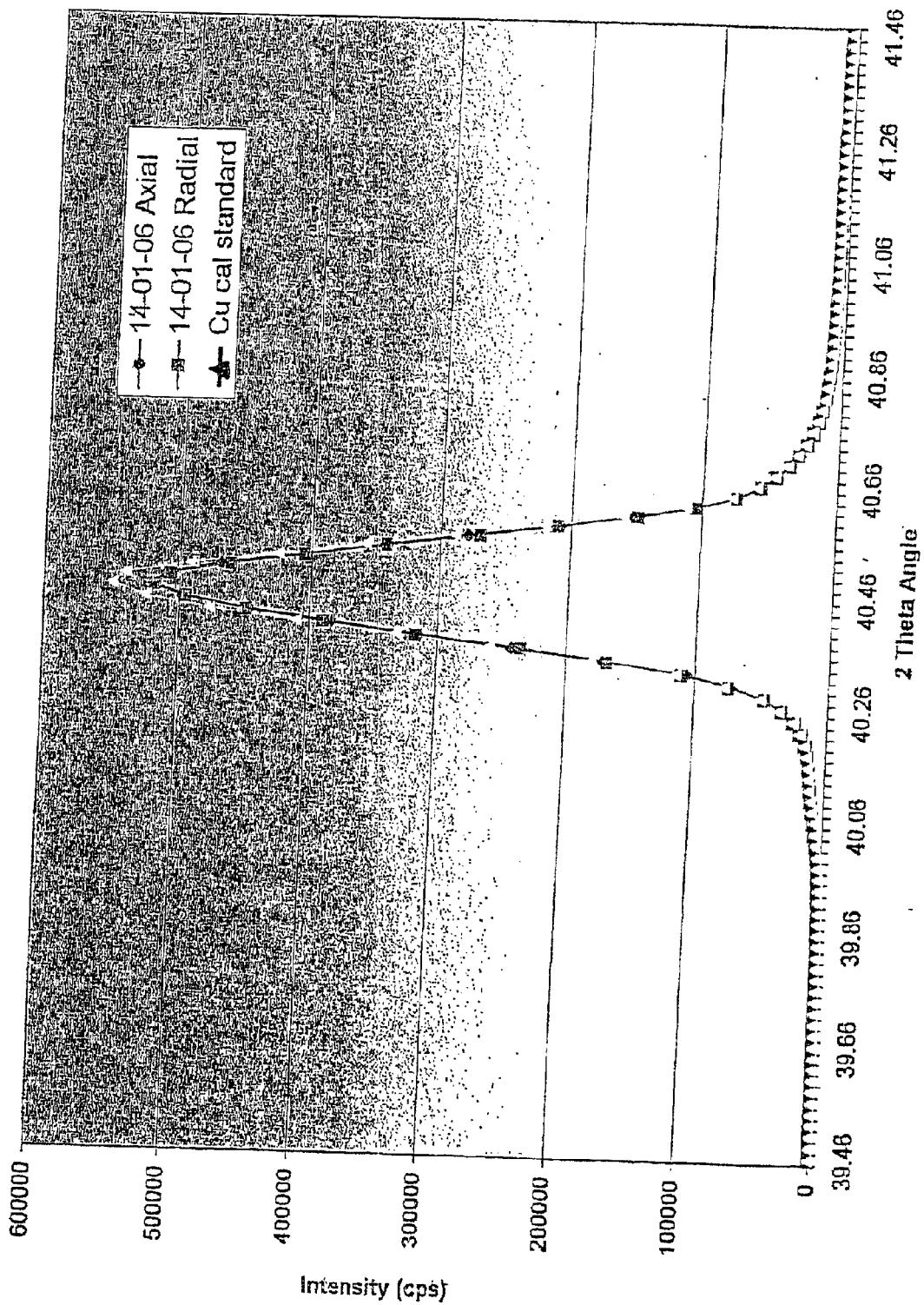
FIG. 35 shows a plot of x-ray fluorescence spectrometry for a manufactured copper/silver/gold alloy in the region of the $K_\alpha$ band of copper, on the axial and radial faces of a block cut from the ingot prepared in Example 4, as compared to a plot of x-ray fluorescence spectrometry for natural copper.

An x-ray fluorescence analysis of the copper/gold/silver alloy sample is provided in FIG. 35, with the $K_\alpha$ peak of a copper control standard shown for reference.

Figure 36:
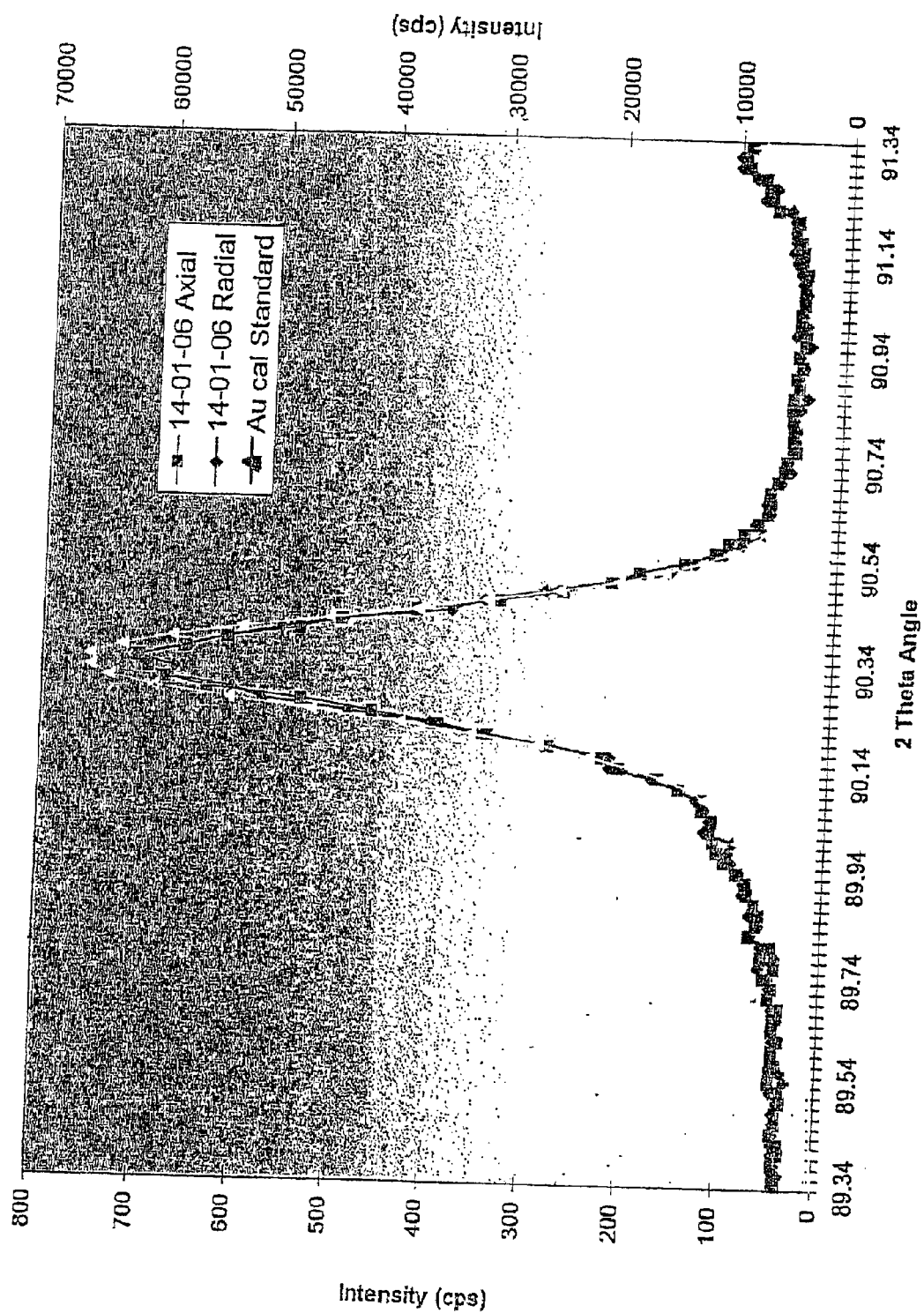
FIG. 36 shows a plot of x-ray fluorescence spectrometry for a manufactured copper/silver/gold alloy in the region of the $K_\alpha$ band of gold, on the axial and radial faces of a block cut from the ingot prepared in Example 4, as compared to a plot of x-ray fluorescence spectrometry for natural silver.

An x-ray fluorescence analysis of the copper/gold/silver alloy sample is provided in FIG. 36, with the $K_\alpha$ peak of a gold control standard shown for reference.

Figure 37:
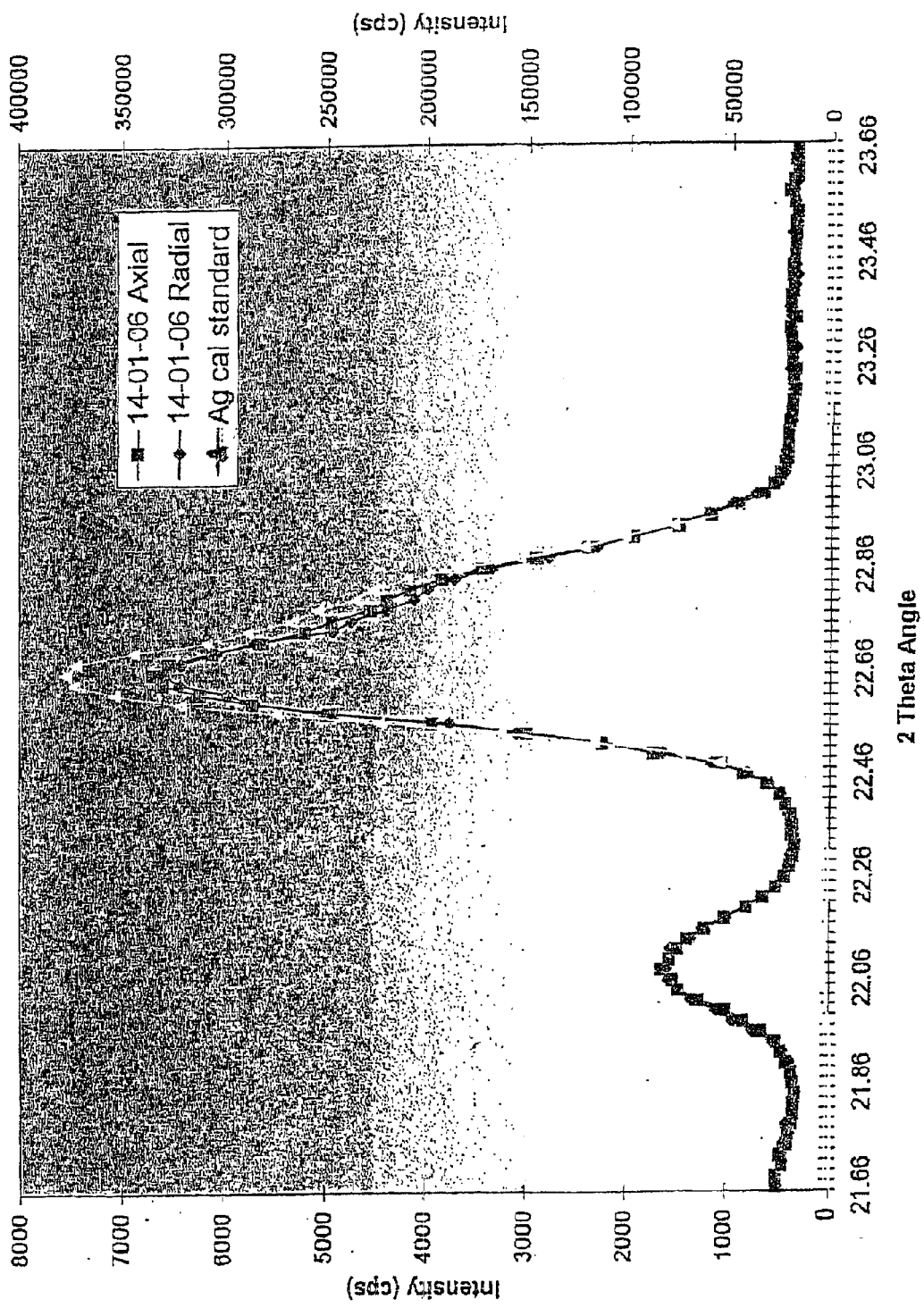
FIG. 37 shows a plot of x-ray fluorescence spectrometry for a manufactured copper/silver/gold alloy in the region of the $K_\alpha$ band of silver, on the axial and radial faces of a block cut from the ingot prepared in Example 4, as compared to a plot of x-ray fluorescence spectrometry for natural gold.

An x-ray fluorescence analysis of the copper/gold/silver alloy sample is provided in FIG. 37, with the $K_\alpha$ peak of a silver control standard shown for reference.

Summary data showing the apparent elemental composition of the product of Example 4 is shown in Tables 18–19, as was measured by an XRF analysis using a Uniquant software package. The apparent elemental composition of the product varies by position, which is indicated in each table.

The manufactured copper-based alloy exhibited uniform coloration in both the axial and radial directions. Prior to being quenched in water, the ingot exhibited significant iridescence on all surfaces. After being quenched, the intensity of iridescence diminished.

An unexpected feature of the ingot was the axial face crystal orientation. No magnetic behavior was observed. The ingot did not crack or retain any refractory after retrieval from the reactor.

EXAMPLE 5

Experimental Procedure for Tin/Lead/Zinc 14-01-07

A cylindrical alumina-based crucible (99.68% $Al_2O_3$, 0.07% $SiO_2$, 0.08% $Fe_2O_3$, 0.04% CaO, 0.12% $Na_2O_3$; 4.5" O.D.×3.75" I.D.×10" depth) of a 100 pound induction furnace reactor supplied by Inductotherm and fitted with a 75-30R Powertrak power supply was charged with 2562 g copper (99.9% purity), plus 854 g each of Lead (99+% pure) and Zinc (99.8% pure) through its charging port. The reactor was fitted with a graphite cap with a ceramic liner by Engineering Ceramics. During the entire procedure, a slight positive pressure of nitrogen (~0.5 psi) was maintained in the reactor using a continuous backspace purge. The reactor was heated to 932° F. over a minimum of 4 hours at a rate no greater than 300° F./hour. The induction furnace operated in the frequency range of 0 kHz to 3000 kHz with frequency determined by a temperature-controlled feedback loop implementing an Omega Model CN300 temperature controller.

When 932° F. was reached, graphite saturation assemblies were inserted to the bottom of the metal charge through ports located in the top plate. The tin/lead/zinc alloy was held at 932° F. for 4 hours. Every 30 minutes during the hold period, an attempt was made to lower the graphite saturation assemblies. As the tin/lead/zinc alloy became saturated with carbon, the graphite saturation assemblies were consumed. After the 4 hour hold period was complete, the graphite saturation assemblies were removed.

The reactor temperature was increased to 968° F. over 7 minutes. The temperature was then varied between 942° F. and 968° F. for 15 cycles. Each cycle consisted of lowering the temperature continuously over 7 minutes and raising the temperature continuously over 7 minutes. After the 15 cycles were completed, a gas addition lance was lowered into the molten metal to a position approximately 2" from the bottom of the reactor and a 0.15 L/min flow of argon was begun. The temperature of the tin/lead/zinc alloy was varied over another 5 cycles between 942° F. and 968° F.

After the fifth cycle, the reactor temperature was lowered to 932° F. over a 10 minute period with continued argon addition. The graphite saturation assemblies were reinstalled in the tin/lead/zinc alloy and remained there for 1 hour. The graphite saturation assemblies were removed.

The reactor temperature was lowered to 930° F. over 5 minutes. The reactor was held at this temperature for 5 minutes with continued argon addition. The temperature was then varied between 918° F. and 930° F. over 20 cycles. Each cycle consisted of lowering the temperature continuously over 9 minutes and raising the temperature continuously over 9 minutes. The argon addition ceased after completion of the 20 cycles.

The reactor temperature was lowered to 924° F. over 5 minutes. The temperature was varied between 918° F. and 924° F. over 4½ cycles. Each cycle consisted of lowering the temperature continuously over 5 minutes and raising the temperature continuously over 3 minutes. In addition, while raising the temperature, a 0.15 L/min flow of argon was added, and while lowering the temperature, a 0.15 L/min flow of nitrogen was added.

The reactor temperature was lowered to 916° F. over 5 minutes. The temperature was varied between 894° F. and 916° F. for 15.5 cycles. Each cycle consisted of lowering the temperature continuously over 15 minutes and raising the temperature over 15 minutes. In addition, while raising the temperature, a 0.15 L/min flow of argon was added, and while lowering the temperature, a 0.15 L/min flow of nitrogen was added. All gas addition, except for the purge of nitrogen ceased after the 15.5 cycles were completed.

The temperature was varied between 894° F. and 903° F. for one cycle. The cycle consisted of raising the temperature continuously over 15 minutes and lowering the temperature continuously over 15 minutes. The gas addition lance was removed.

The reactor temperature was cooled by lowering the induction furnace power to 1 kW or less as the ingot cooled. The tin/lead/zinc alloy was then cooled to approximately ambient temperature in water.

Analytical Protocols

XRF, grain size, magnetism, and chemical reactivity measurements were carried out by the procedures described in Example 1.

Analytical Results

Figure 38:
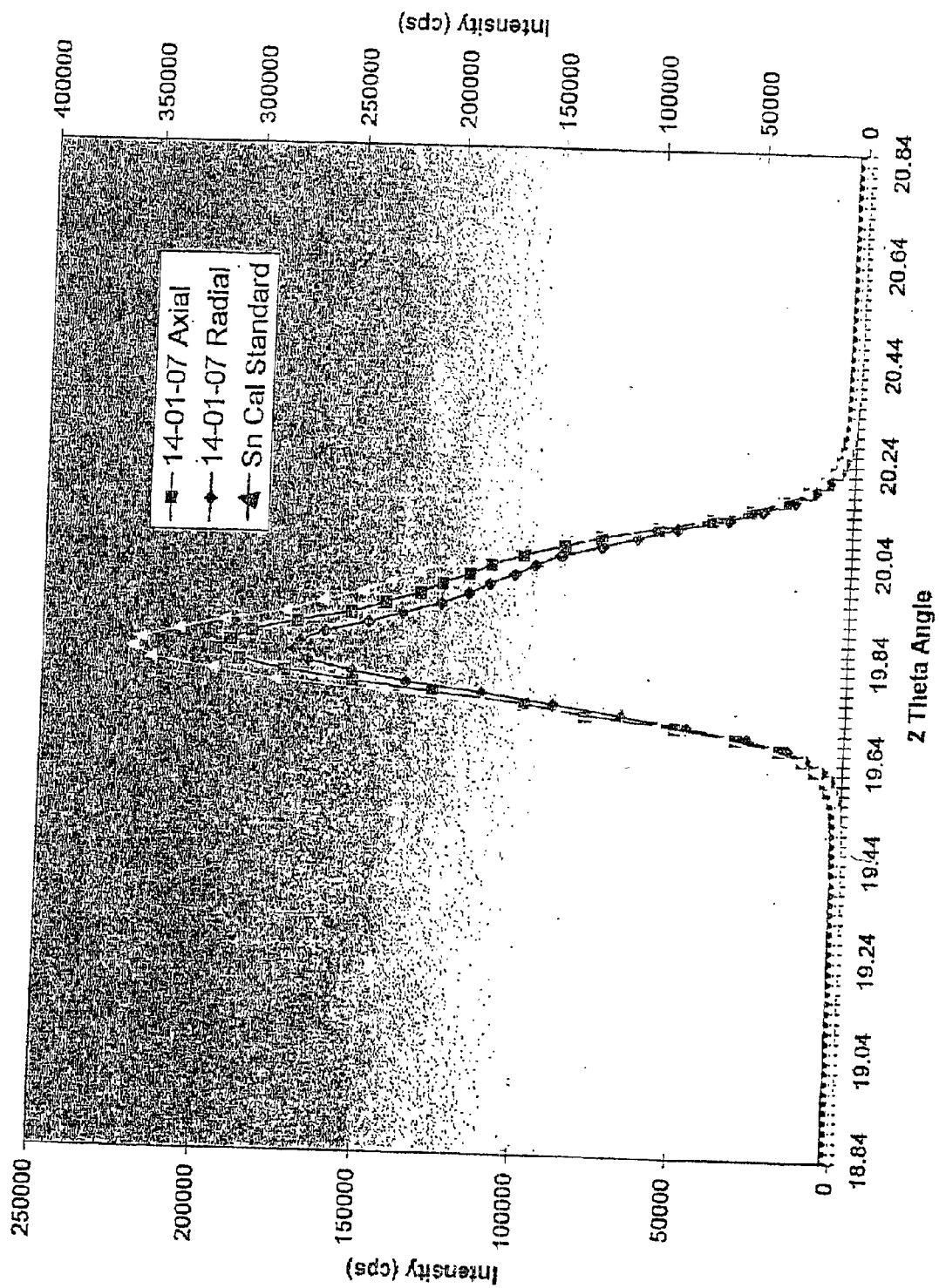
FIG. 38 shows a plot of x-ray fluorescence spectrometry for a manufactured tin/lead/zinc alloy in the region of the $K_\alpha$ band of tin, on the axial and radial faces of a block cut from the ingot prepared in Example 5, as compared to a plot of x-ray fluorescence spectrometry for natural tin.

An x-ray fluorescence analysis of the tin/lead/zinc alloy sample is provided in FIG. 38, with the $K_\alpha$ peak of a tin control standard shown for reference.

Figure 39:
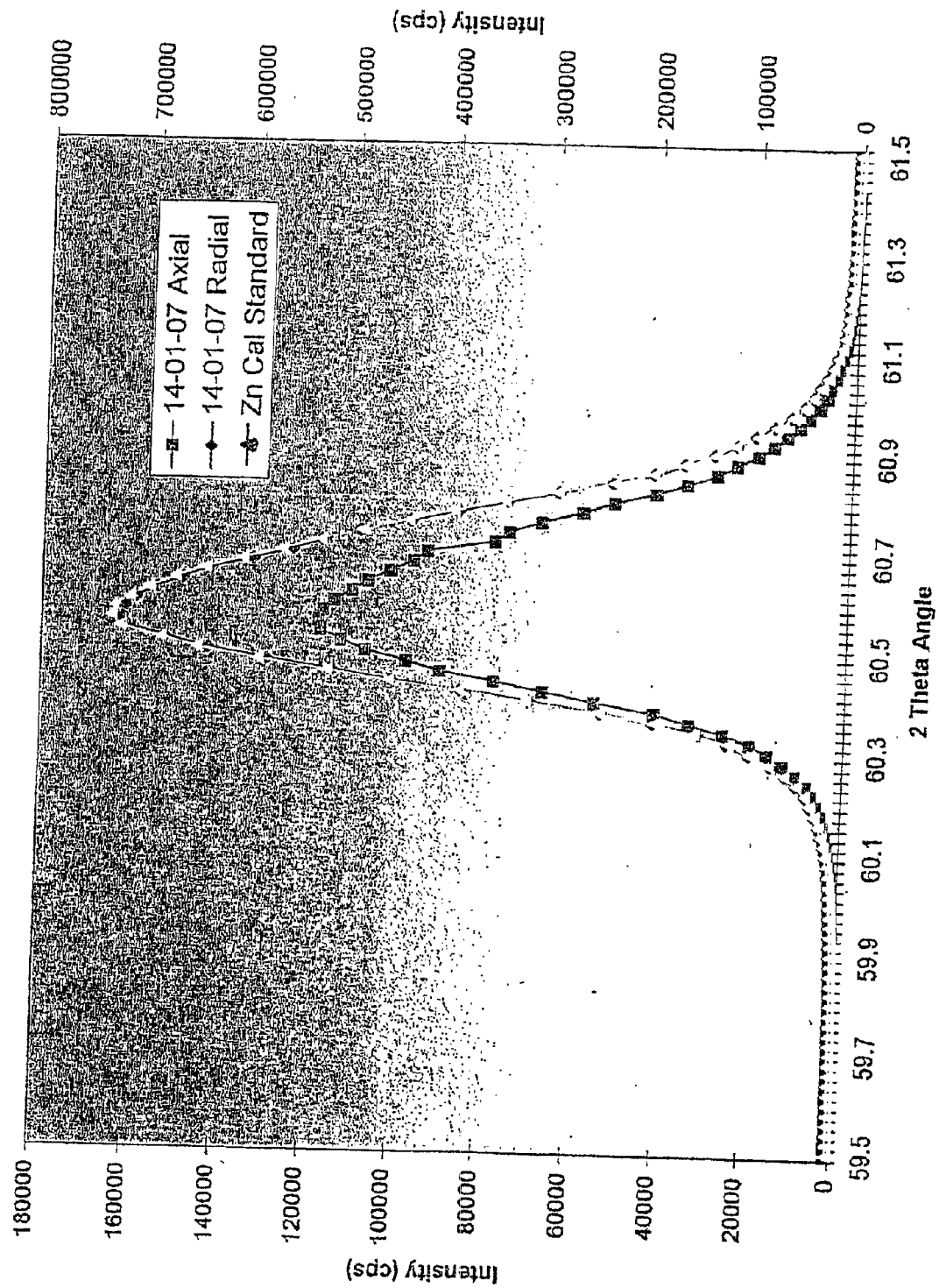
FIG. 39 shows a plot of x-ray fluorescence spectrometry for a manufactured tin/lead/zinc alloy in the region of the $K_\alpha$ band of zinc, on the axial and radial faces of a block cut from the ingot prepared in Example 5, as compared to a plot of x-ray fluorescence spectrometry for natural zinc.

An x-ray fluorescence analysis of the tin/lead/zinc alloy sample is provided in FIG. 39, with the $K_\alpha$ peak of a zinc control standard shown for reference.

Figure 40:
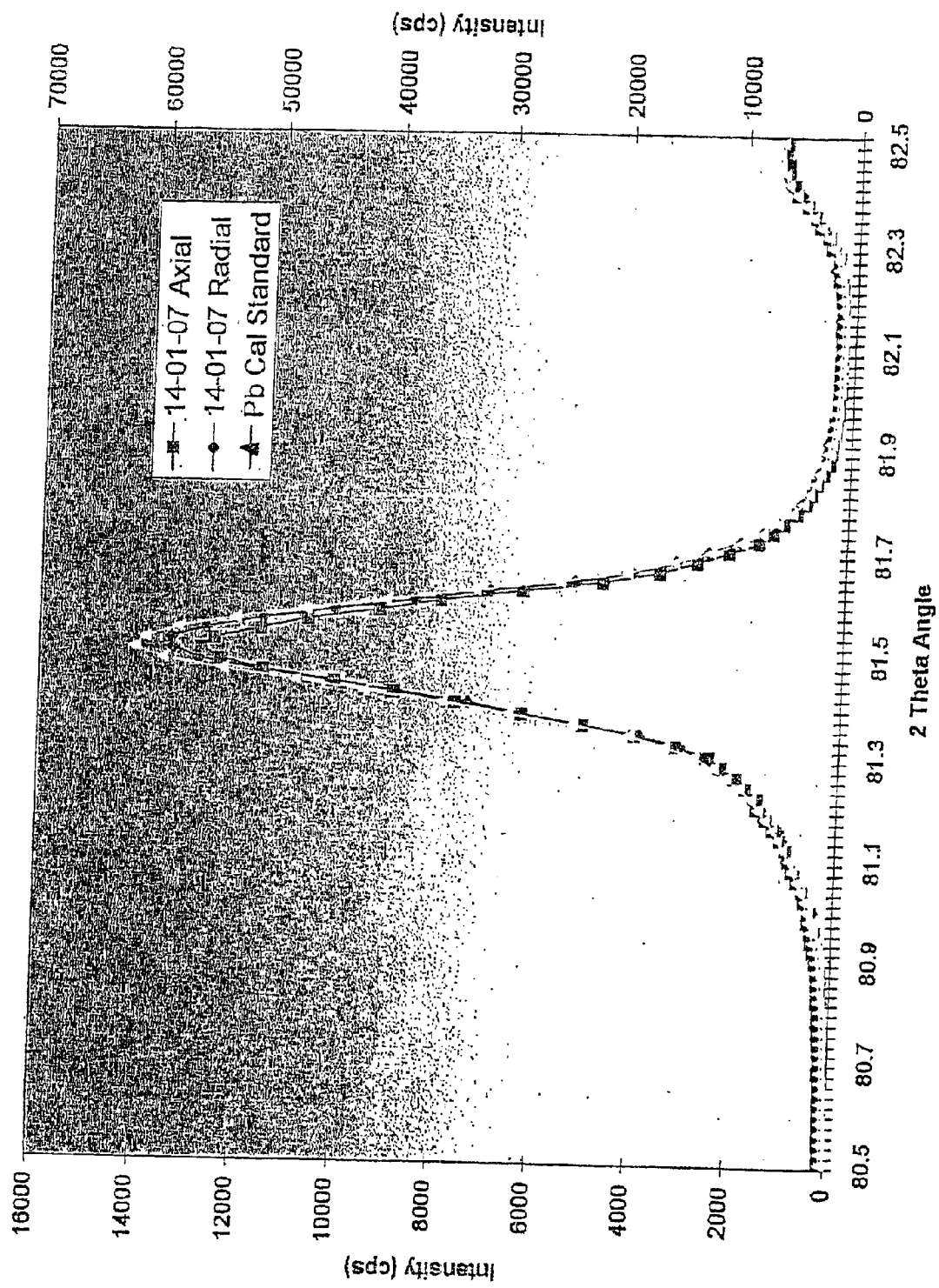
FIG. 40 shows a plot of x-ray fluorescence spectrometry for a manufactured tin/lead/zinc alloy in the region of the $K_\alpha$ band of lead, on the axial and radial faces of a block cut from the ingot prepared in Example 5, as compared to a plot of x-ray fluorescence spectrometry for natural lead.

An x-ray fluorescence analysis of the tin/lead/zinc alloy sample is provided in FIG. 40, with the $K_\alpha$ peak of a lead control standard shown for reference.

Summary data showing the apparent elemental composition of the product of Example 5 is shown in Tables 20–21, as was measured by an XRF analysis using a Uniquant software package. The apparent elemental composition of the product varies by position, which is indicated in each table.

The manufactured tin-based alloy exhibited some stratification along the sides of the ingot. The top (axial) face and the side (radial) face did not appear significantly different in coloration or appearance, and each had a matte finish. Like other manufactured alloy ingot, apparent peaks were exhibited on the axial face of the ingot.

The ingot did not have an internal void. No unexpected chemical activity or magnetic activity were recorded. The ingot did not crack upon retrieval from the reactor and retained a small amount of refractory.

EXAMPLE 6

Experimental Procedure for Tin/Sodium, Magnesium and Potassium 14-01-08

A cylindrical alumina-based crucible (99.68% $Al_2O_3$, 0.07% $SiO_2$, 0.08% $Fe_2O_3$, 0.04% CaO, 0.12% $Na_2O_3$; 4.5" O.D.×3.75" I.D.×10" depth) of a 100 pound induction furnace reactor supplied by Inductotherm and fitted with a 75-30R Powertrak power supply, was charged with 2000 g tin (99.9% purity), plus 50 g each of sodium (99.8% pure), potassium (98% pure) and magnesium (99.98% pure) through its charging port. The reactor was fitted with a graphite cap with a ceramic liner (i.e. the crucible, from Engineering Ceramics). During the entire procedure, a slight positive pressure of nitrogen (~0.5 psi) was maintained in the reactor using a continuous backspace purge. The reactor was heated to the metal charge liquidus point plus 300° F., at a rate no greater than 300° F./hour, as limited by the integrity of the crucible. The induction furnace operated in the frequency range of 0 kHz to 3000 kHz, with frequency determined by a temperature-controlled feedback loop implementing an Omega Model CN300 temperature controller. Upon reaching 900° F., the reactor was charged with an additional 2120 g Sn over an hour.

The temperature was again increased to 932° F. again using a rate no greater than 300° F./hour. When this temperature was reached, graphite saturation assemblies (⅜" OD, 36" long high purity (<5 ppm impurities) graphite rods) were inserted to the bottom of the Sn/Na/K/Mg charge through ports located in the top plate. The Sn/Na/K/Mg alloy was held at 932° F. for 4 hours. Every 30 minutes during the hold period, an attempt was made to lower the graphite saturation assemblies as dissolution occurred. As the Sn/Na/K/Mg alloy became saturated with carbon, the graphite saturation assemblies were consumed. After the 4 hour hold period was complete, the graphite saturation assemblies were removed.

The reactor temperature was increased to 968° F. over 7 minutes. The temperature was then varied between 942° F. and 968° F. for 15 cycles. Each cycle consisted of lowering the temperature continuously over 7 minutes and raising the temperature continuously over 7 minutes. After the 15 cycles were completed, a gas addition lance was lowered into the molten metal to a position approximately 2" from the bottom of the reactor and a 0.15 L/min flow of argon was begun. The temperature of the Sn/Na/K/Mg alloy was varied over another 5 cycles between 942° F. and 968° F.

After the fifth cycle, the reactor temperature was lowered to 932° F. over a 10 minute period with continued argon addition. The graphite saturation assemblies were reinstalled in the tin/sodium/potassium/magnesium alloy and remained there for 1 hour. The graphite saturation assemblies were removed.

The reactor temperature was lowered to 930° F. over 5 minutes. The reactor was held at this temperature for 5 minutes with continued argon addition. The temperature was then varied between 918° F. and 930° F. over 20 cycles. Each cycle consisted of lowering the temperature continuously over 9 minutes and raising the temperature continuously over 9 minutes. The argon addition ceased after completion of the 20 cycles.

The reactor temperature was lowered to 924° F. over 5 minutes. The temperature was varied between 918° F. and 924° F. over 4½ cycles. Each cycle consisted of lowering the temperature continuously over 5 minutes and raising the temperature continuously over 3 minutes. In addition, while raising the temperature, a 0.15 L/min flow of argon was added, and while lowering the temperature, a 0.15 L/min flow of nitrogen was added.

The reactor temperature was lowered to 916° F. over 5 minutes. The temperature was varied between 894° F. and 916° F. for 15.5 cycles. Each cycle consisted of lowering the temperature continuously over 15 minutes and raising the temperature continuously over 15 minutes. In addition, while raising the temperature, a 0.15 L/min flow of argon was added, and while lowering the temperature, a 0.15 L/min flow of nitrogen was added. All gas addition, except for the purge of nitrogen ceased after the 15.5 cycles were completed.

The temperature was varied between 894° F. and 903° F. for one cycle. The cycle consisted of raising the temperature continuously over 15 minutes and lowering the temperature continuously over 15 minutes. The gas addition lance was removed.

The reactor temperature was cooled by lowering the induction furnace power to 1 kW or less as the ingot cooled. The tin/sodium/magnesium/potassium alloy solidified into an ingot. After solidification, the alloy was cooled to approximately ambient temperature in water.

Analytical Protocols

XRF, grain size, magnetism, and chemical reactivity measurements were carried out by the procedures described in Example 1.

Analytical Results

Figure 41:
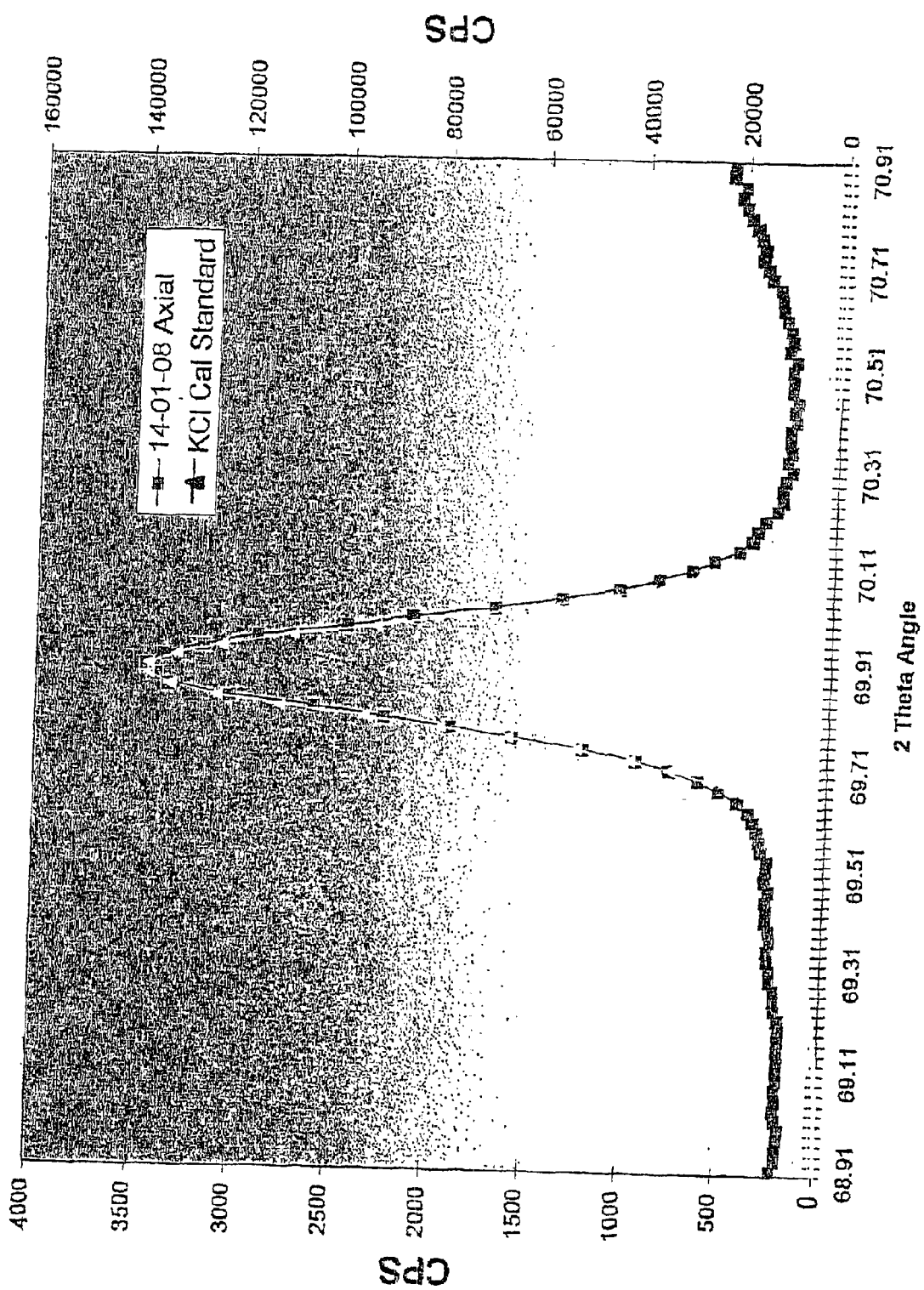
FIG. 41 shows a plot of x-ray fluorescence spectrometry for a manufactured tin/sodium/magnesium/potassium alloy in the region of the $K_\alpha$ band of potassium (from potassium chloride), on the axial and radial faces of a block cut from the ingot prepared in Example 6, as compared to a plot of x-ray fluorescence spectrometry for natural potassium (from potassium chloride).

An x-ray fluorescence analysis of the tin/sodium/potassium/magnesium alloy sample is provided in FIG. 41, with the $K_\alpha$ peak of a potassium (from potassium chloride) control standard shown for reference.

Figure 42:
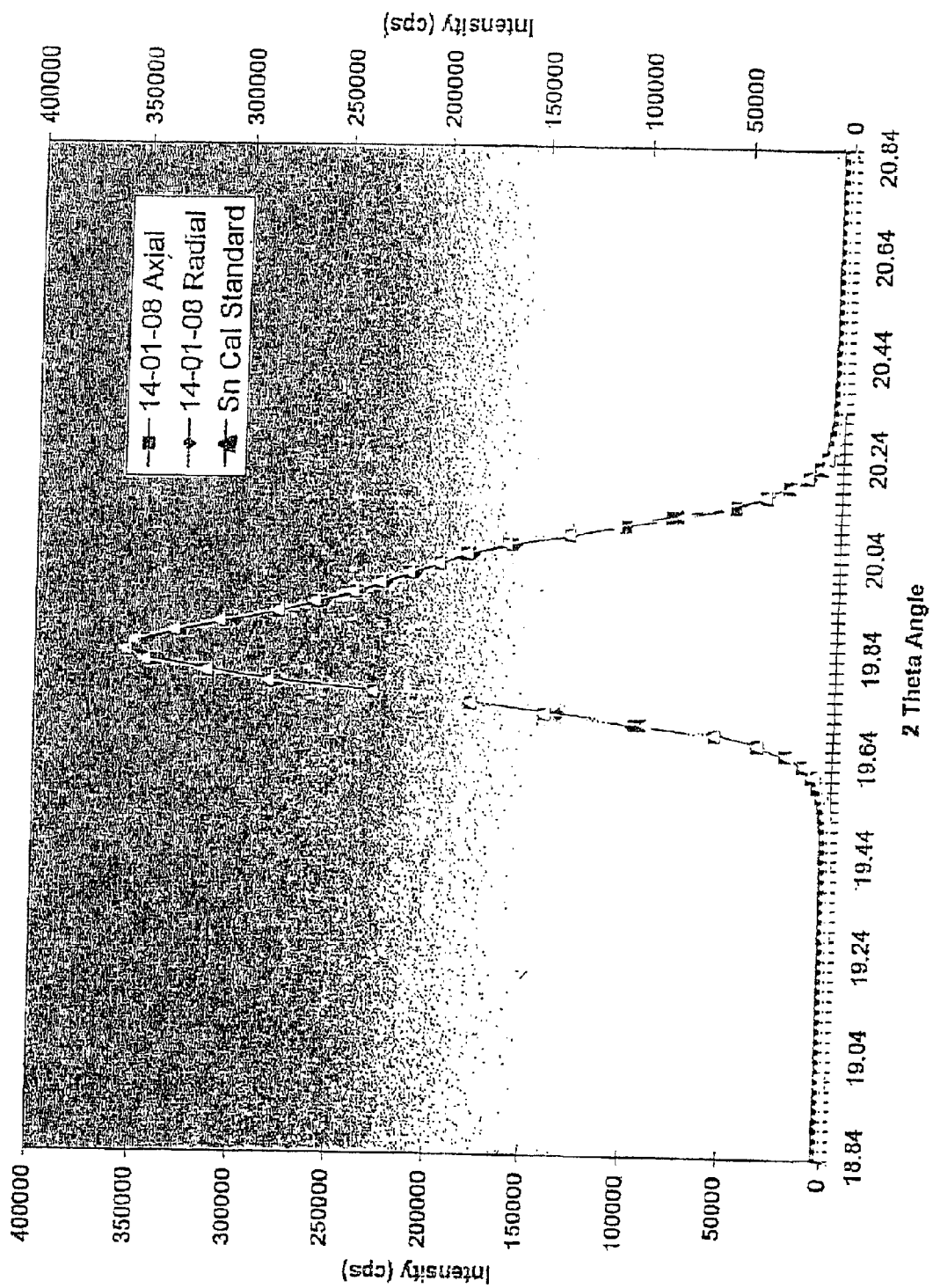
FIG. 42 shows a plot of x-ray fluorescence spectrometry for a manufactured tin/sodium/magnesium/potassium alloy in the region of the $K_\alpha$ band of tin, on the axial and radial faces of a block cut from the ingot prepared in Example 6, as compared to a plot of x-ray fluorescence spectrometry for natural tin.

An x-ray fluorescence analysis of the tin/sodium/potassium/magnesium alloy sample is provided in FIG. 42, with the $K_\alpha$ peak of a tin control standard shown for reference.

Figure 43:
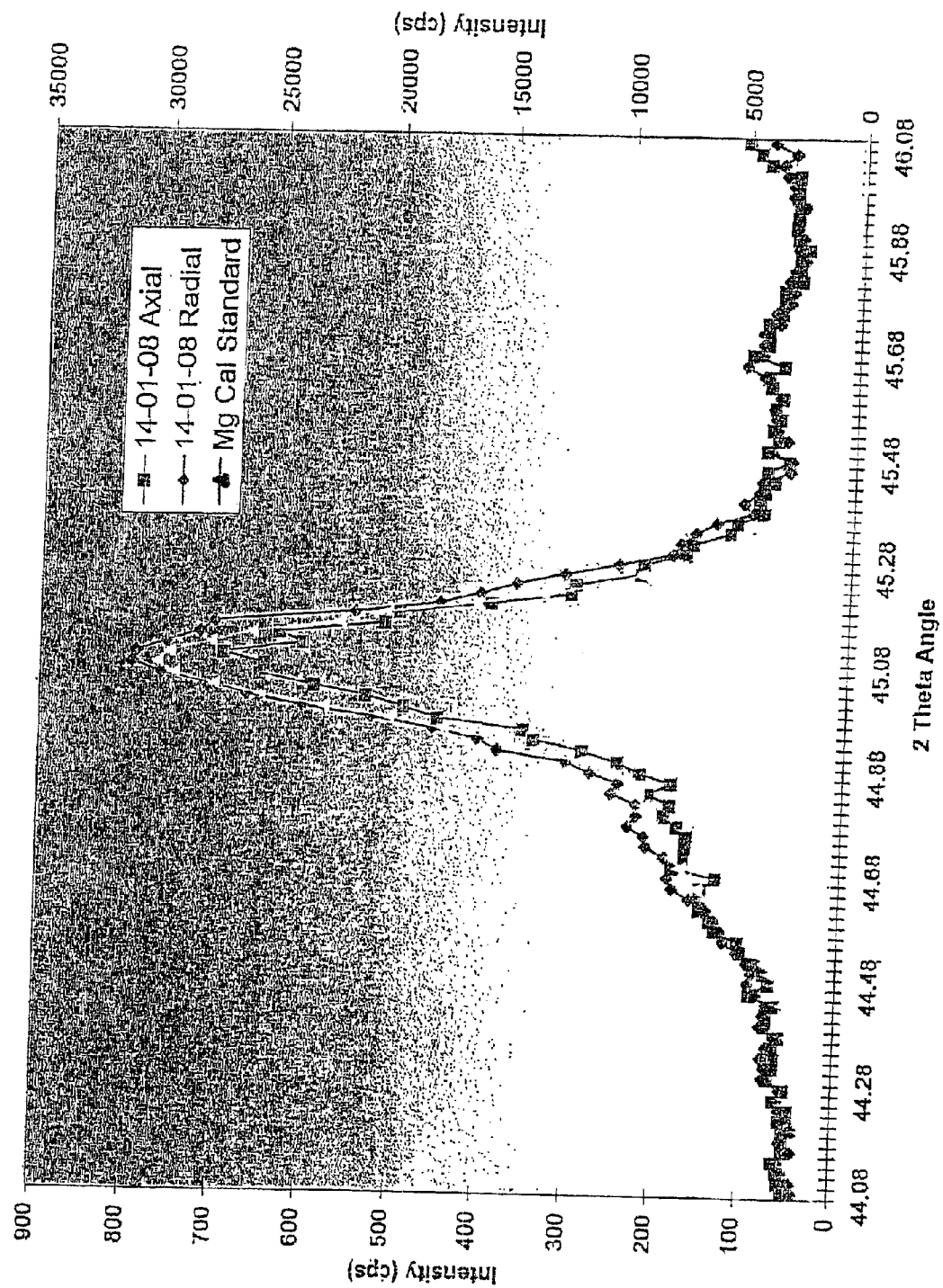
FIG. 43 shows a plot of x-ray fluorescence spectrometry for a manufactured tin/sodium/magnesium/potassium alloy in the region of the $K_\alpha$ band of magnesium (using magnesium oxide), on the axial and radial faces of a block cut from the ingot prepared in Example 6, as compared to a plot of x-ray fluorescence spectrometry for natural magnesium (using magnesium oxide).

An x-ray fluorescence analysis of the tin/sodium/potassium/magnesium alloy sample is provided in FIG. 43, with the $K_\alpha$ peak of a magnesium control standard shown for reference.

Figure 44:
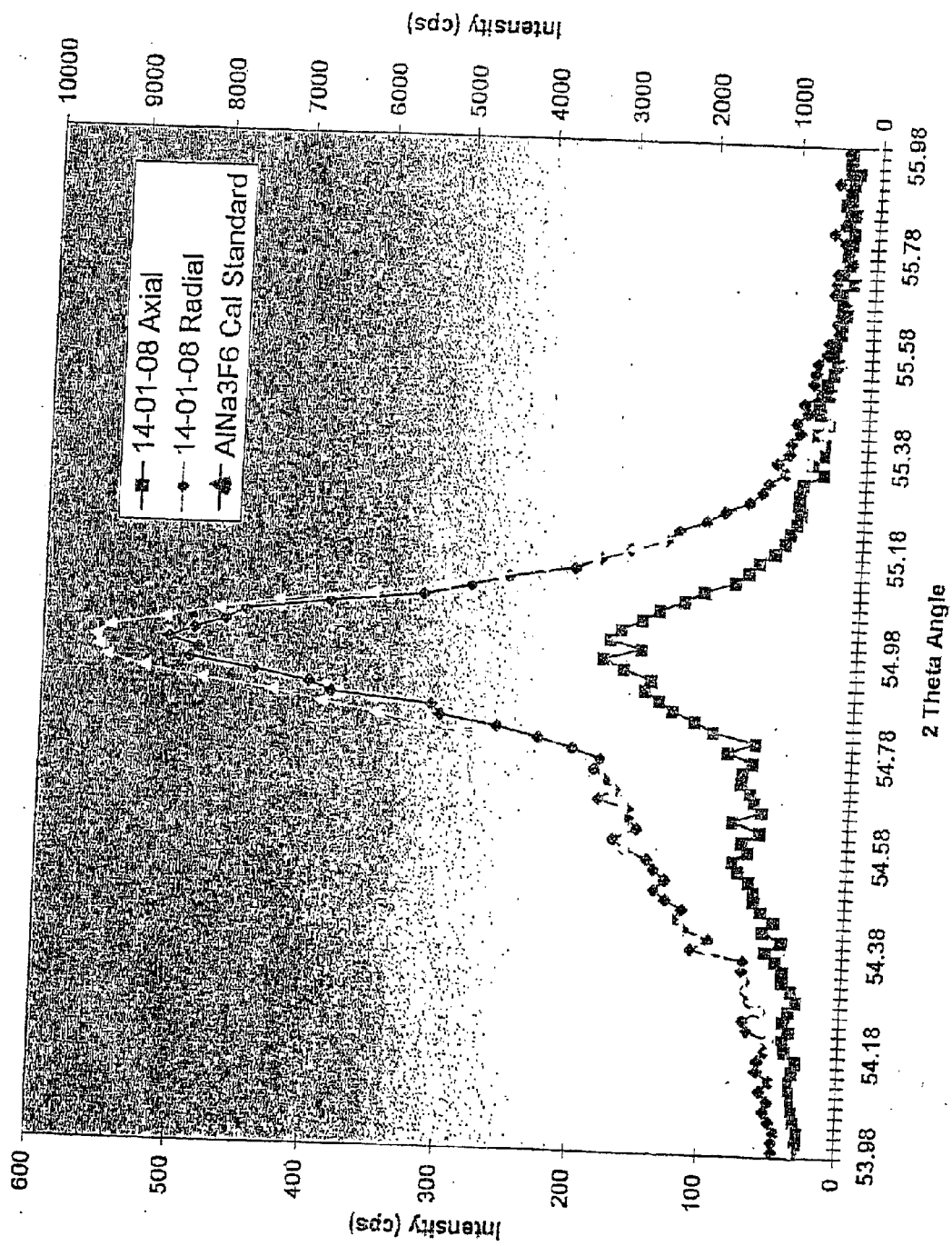
FIG. 44 shows a plot of x-ray fluorescence spectrometry for a manufactured tin/sodium/magnesium/potassium alloy in the region of the $K_\alpha$ band of sodium (using $AlNa_3F_6$), on the axial and radial faces of a block cut from the ingot prepared in Example 6, as compared to a plot of x-ray fluorescence spectrometry for natural sodium (using $AlNa_3F_6$).

An x-ray fluorescence analysis of the tin/sodium/potassium/magnesium alloy sample is provided in FIG. 44, with the $K_\alpha$ peak of a sodium (from $AlNa_3F_6$) control standard shown for reference.

Summary data showing the apparent elemental composition of the product of Example 6 is shown in Tables 22–23, as was measured by an XRF analysis using a Uniquant software package. The apparent elemental composition of the product varies by position, which is indicated in each table.

The ingot had a uniform dull matte finish on axial and radial surfaces (i.e., isotropic coloration). Minimal refractory was retained upon retrieval from the reactor. No internal voids were found in the ingot. No unexpected magnetic or chemical activity were observed.

EXAMPLE 7

Experimental Procedure for Silicon 15-01-01

A cylindrical alumina-based crucible (99.68% $Al_2O_3$, 0.07% $SiO_2$, 0.08% $Fe_2O_3$, 0.04% CaO, 0.12% $Na_2O_3$; 4.5" O.D.×3.75" I.D.×10" depth) of a 100 pound induction furnace reactor (Inductotherm) fitted with a 75-30R Powertrak power supply was charged with 700 g Silicon (100.00% purity), through its charging port. The reactor was fitted with a graphite cap and a ceramic liner (i.e., the crucible, from Engineering Ceramics). During the entire procedure, a slight positive pressure of nitrogen (~0.5 psi) was maintained in the reactor using a continuous backspace purge. The reactor was heated to the metal charge liquidus point plus 300° F., at a rate no greater than 300° F./hour as limited by the integrity of the crucible. The induction furnace operated in the frequency range of 0 kHz to 3000 kHz, with frequency determined by a temperature-controlled feedback loop implementing an Omega Model CN 300 temperature controller. Upon reaching 2800° F., the reactor was charged with an additional 400 g Silicon again using a rate no greater than 300° F./hour.

The temperature was again increased to 2900° F. again using a rate no greater than 300° F./hour. When this temperature was reached, graphite saturation assemblies (⅜" OD, 36" long high purity (5 ppm impurities) graphite rods) were inserted to the bottom of the Silicon charge through ports located in the top plate. The Silicon was held at 2900° F. for 4 hours. Every 30 minutes during the hold period, an attempt was made to lower the graphite saturation assemblies as dissolution occurred. As the Silicon became saturated with carbon, the graphite saturation assemblies were consumed. After the 4 hour hold period was complete, the graphite saturation assemblies were removed.

The reactor temperature was increased to 2976° F. over 7 minutes. The temperature was then varied between 2920° F. and 2976° F. for 15 cycles. Each cycle consisted of lowering the temperature continuously over 7 minutes and raising the temperature continuously over 7 minutes. After the 15 cycles were completed, a gas addition lance was lowered into the molten metal to a position approximately 2" from the bottom of the reactor and a 0.15 L/min flow of argon was begun. The temperature of the Silicon was varied over another 5 cycles between 2920° F. and 2976° F.

After the fifth cycle, the reactor temperature was lowered to 2900° F. over a 10 minute period with continued argon addition. The graphite saturation assemblies were reinstalled in the Silicon and remained there for 1 hour. The graphite saturation assemblies were removed.

The reactor temperature was lowered to 2895° F. over 5 minutes. The reactor was held at this temperature for 5 minutes with continued argon addition. The temperature was then varied between 2886° F. and 2895° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2873° F. over 5 minutes. The temperature was varied between 2868° F. and 2873° F. over 4½ cycles. Each cycle consisted of lowering the temperature continuously over 5 minutes and raising the temperature continuously over 3 minutes. In addition, while raising the temperature, a 0.15 L/min flow of argon was added, and while lowering the temperature, a 0.15 L/min flow of nitrogen was added.

The reactor temperature was lowered to 2863° F. over 5 minutes. The temperature was varied between 2811° F. and 2863° F. for 15.5 cycles. Each cycle consisted of lowering the temperature continuously over 15 minutes and raising the temperature continuously over 15 minutes. In addition, while raising the temperature, a 0.15 L/min flow of argon was added, and while lowering the temperature, a 0.15 L/min flow of nitrogen was added. All gas addition, except for the purge of nitrogen ceased after the 15.5 cycles were completed.

The temperature was varied between 2833° F. and 2811° F. for one cycle. The cycle consisted of raising the temperature continuously over 15 minutes and lowering the temperature continuously over 15 minutes. The gas addition lance was removed.

The reactor temperature was slowly cooled by lowering the induction furnace power to 1 kW or less s the ingot cooled. After solidification, the Silicon was cooled to approximately ambient temperature in water.

Analytical Protocols

XRF, grain size, magnetism, and chemical reactivity measurements were carried out by the procedures described in Example 1.

Analytical Results

Figures 45A, 45B:
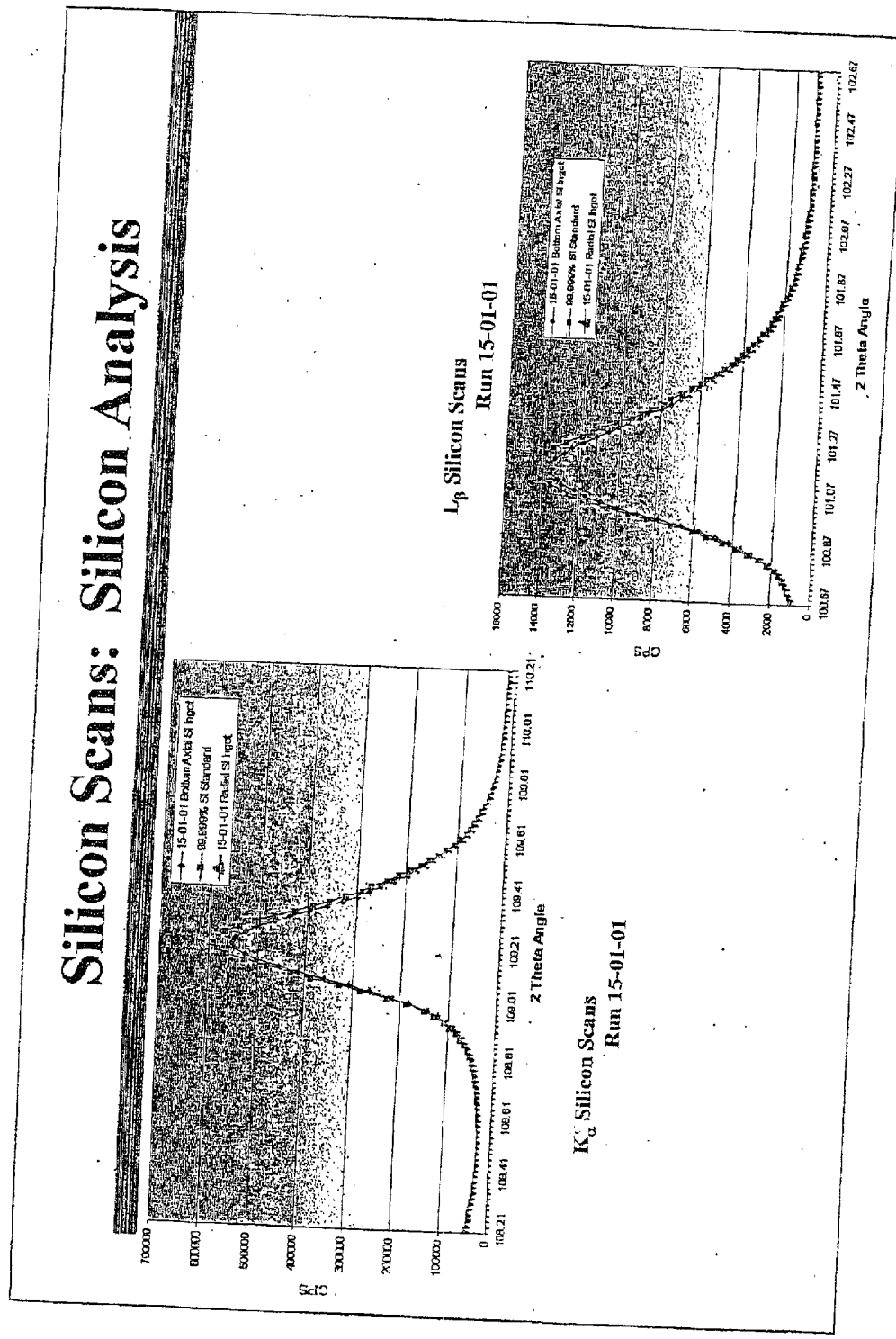
FIGS. 45A and 45B show plots of x-ray fluorescence spectrometry for manufactured silicon, on both the axial and radial faces of a block cut from the ingot prepared in Example 7, as compared to plots of x-ray fluorescence spectrometry for natural silicon.

An x-ray fluorescence analysis of the silicon sample is provided in FIGS. 45A and 45B, with the $K_\alpha$ and $L_\alpha$ peaks of a silicon control standard shown for reference.

Figures 46A, 46B:
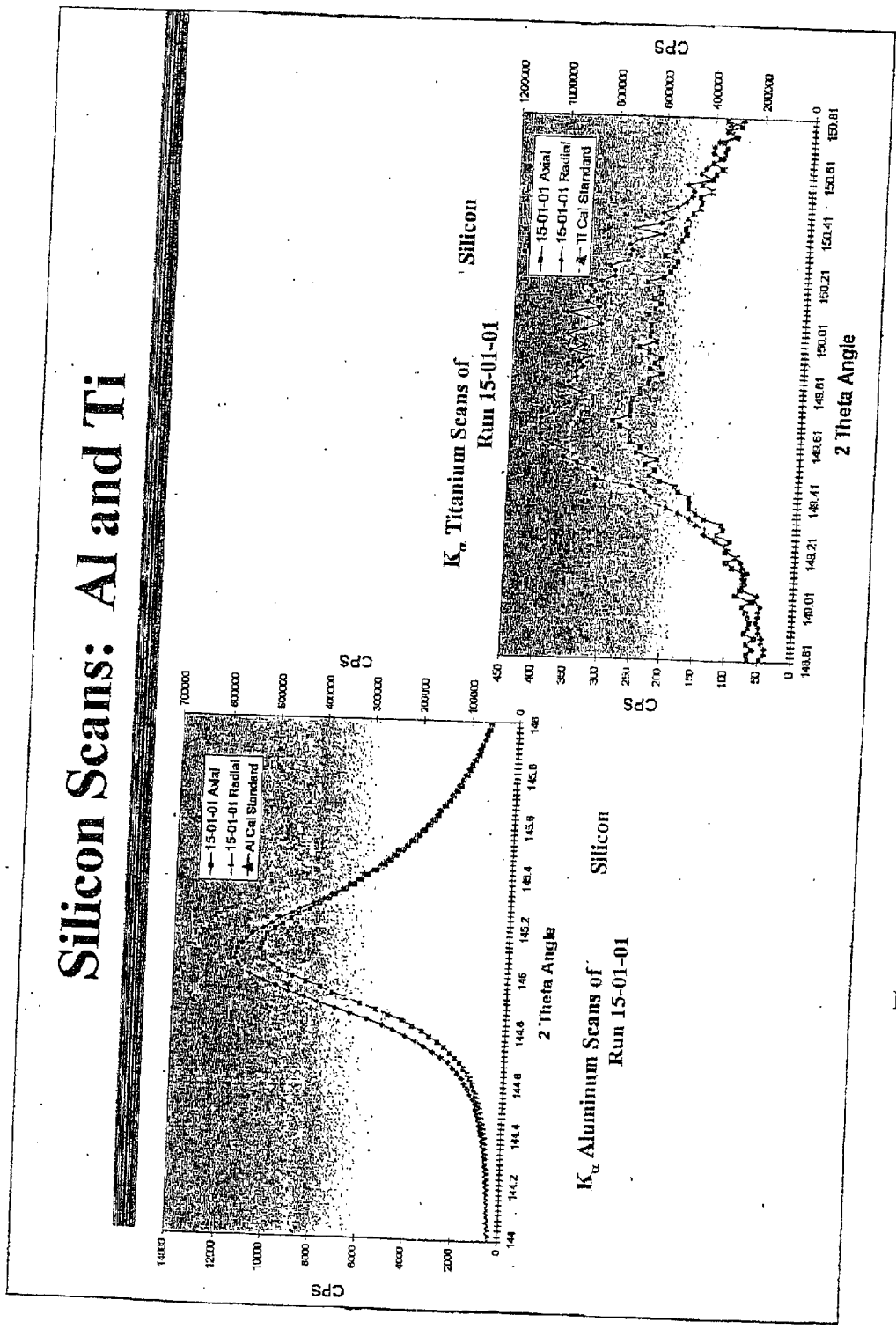
FIG. 46A shows a plot of x-ray fluorescence spectrometry for manufactured silicon in the region of the $K_\alpha$ band of aluminum, on the axial and radial faces of a block cut from the ingot prepared in Example 7, as compared to a plot of x-ray fluorescence spectrometry for natural aluminum.
FIG. 46B shows a plot of x-ray fluorescence spectrometry for manufactured silicon in the region of the $K_\alpha$ band of titanium, on the axial and radial faces of a block cut from the ingot prepared in Example 7, as compared to a plot of x-ray fluorescence spectrometry for natural titanium.

An x-ray fluorescence analysis of the silicon sample is provided in FIG. 46A, with the $K_\alpha$ peak of an aluminum control standard shown for reference.

An x-ray fluorescence analysis of the silicon sample is provided in FIG. 46B, with the $K_\alpha$ peak of a titanium control standard shown for reference.

Figure 47B:
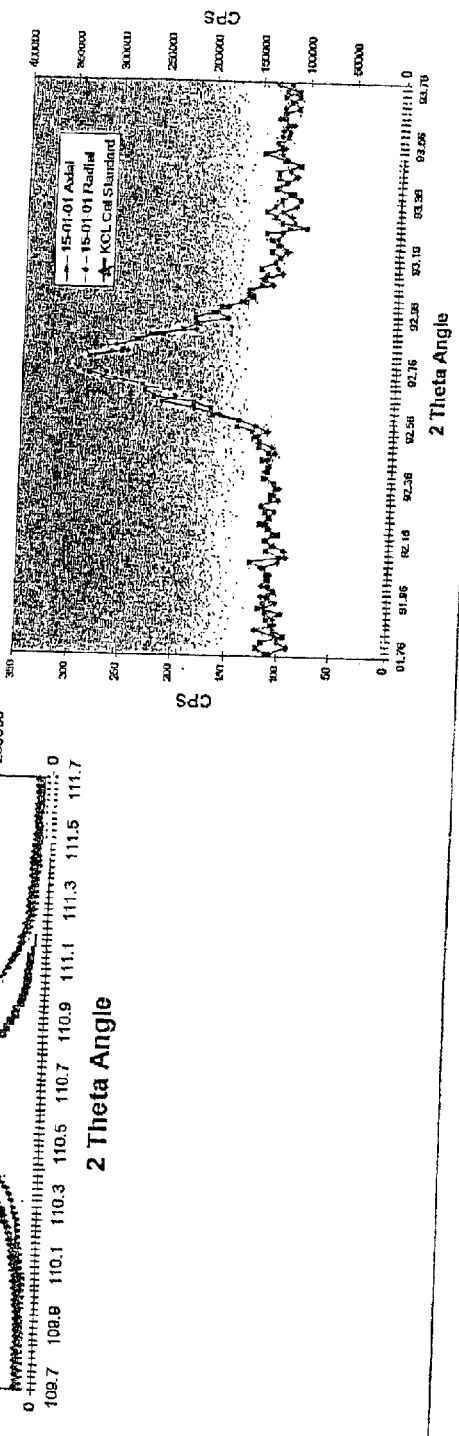
FIG. 47B shows a plot of x-ray fluorescence spectrometry for manufactured silicon in the region of the $K_\alpha$ band of chlorine (from potassium chloride), on the axial and radial faces of a block cut from the ingot prepared in Example 7, as compared to a plot of x-ray fluorescence spectrometry for natural chlorine (from potassium chloride).
Figure 47A:
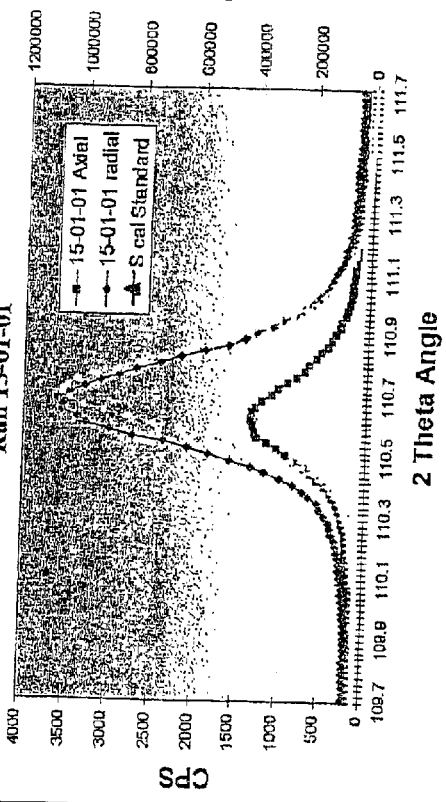
FIG. 47A shows a plot of x-ray fluorescence spectrometry for manufactured silicon in the region of the $K_\alpha$ band of sulfur, on the axial and radial faces of a block cut from the ingot prepared in Example 7, as compared to a plot of x-ray fluorescence spectrometry for natural sulfur.

An x-ray fluorescence analysis of the silicon sample is provided in FIG. 47A, with the $K_\alpha$ peak of a sulfur control standard shown for reference.

An x-ray fluorescence analysis of the silicon sample is provided in FIG. 47B, with the $K_\alpha$ peak of a chlorine (from potassium chloride) control standard shown for reference.

Figures 48A, 48B:
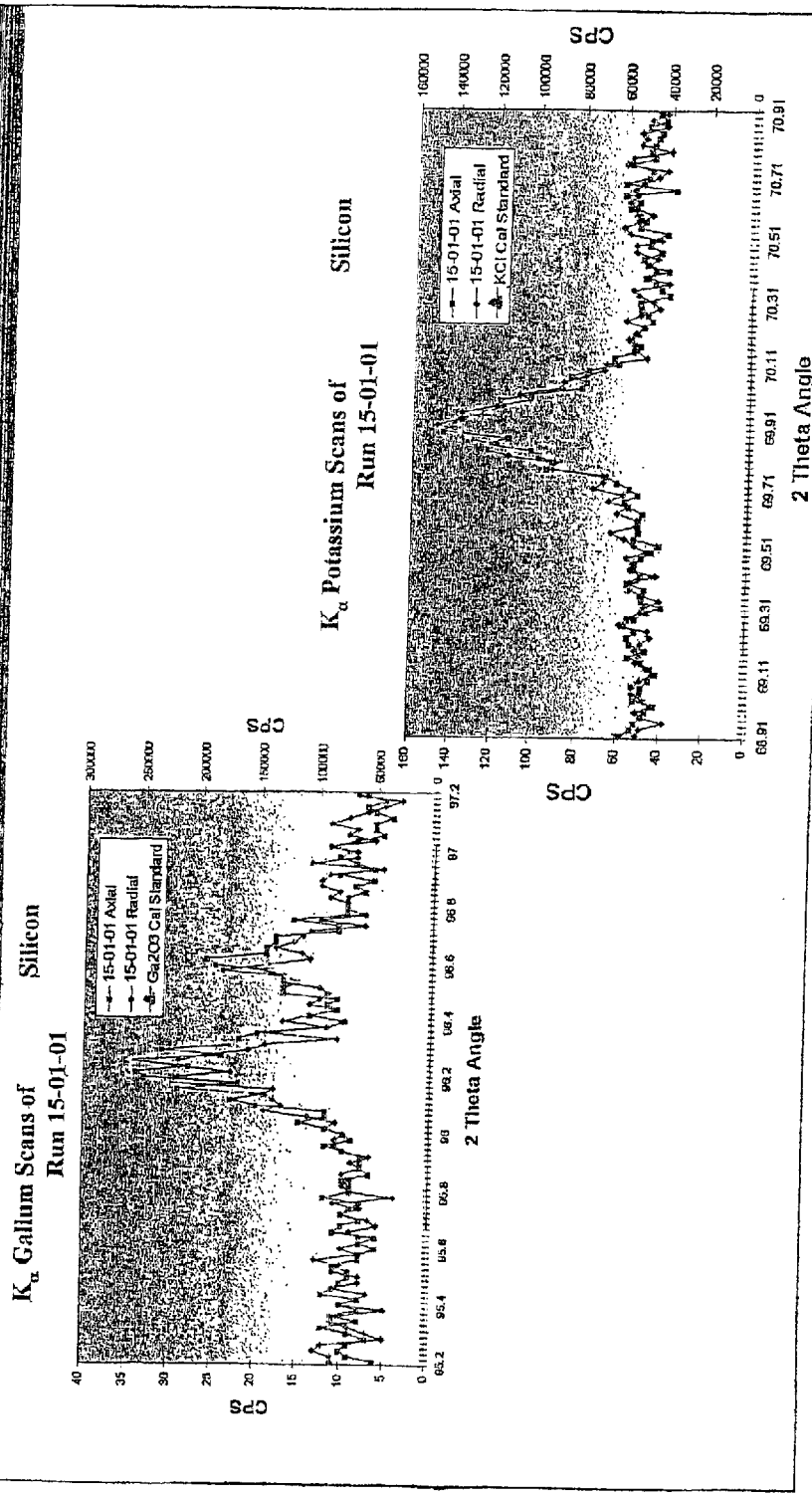
FIG. 48A shows a plot of x-ray fluorescence spectrometry for manufactured silicon in the region of the $K_\alpha$ band of gallium (from gallium oxide), on the axial and radial faces of a block cut from the ingot prepared in Example 7, as compared to a plot of x-ray fluorescence spectrometry for natural gallium (from gallium oxide).
FIG. 48B shows a plot of x-ray fluorescence spectrometry for manufactured silicon in the region of the $K_\alpha$ band of potassium (from potassium chloride), on the axial and radial faces of a block cut from the ingot prepared in Example 7, as compared to a plot of x-ray fluorescence spectrometry for natural potassium (from potassium chloride).

An x-ray fluorescence analysis of the silicon sample is provided in FIG. 48A, with the $K_\alpha$ peak of a gallium control standard shown for reference.

An x-ray fluorescence analysis of the silicon sample is provided in FIG. 48B, with the $K_\alpha$ peak of a potassium control standard shown for reference.

Summary data showing the apparent elemental composition of the product of Example 7 is shown in Tables 24–27, as was measured by an XRF analysis using a Uniquant software package. The apparent elemental composition of the product varies by position, which is indicated in each table.

No unexpected magnetic activity or chemical reactivity were recorded for the ingot. The manufactured silicon system did appear shiny on its axial (top) face and dull on is radial (side) face. The ingot retained minimal refractory upon removal from the reactor.

EXAMPLE 8

Experimental Procedure for Iron 15-01-02

A cylindrical alumina-based crucible (99.68% $Al_2O_3$, 0.07% $SiO_2$, 0.08% $Fe_2O_3$, 0.04% CaO, 0.12% $Na_2O_3$; 4.5" O.D.×3.75" I.D.×10" depth) of a 100 pound induction furnace reactor supplied by Inductotherm, fitted with a 75-30R Powertrak power supply was charged with 2000 g Iron (99.98% purity) and 200 g carbon through its charging port. The reactor was fitted with a graphite cap with a ceramic liner (i.e. the crucible, from Engineering Ceramics). During the entire procedure, a slight positive pressure of nitrogen (~0.5 psi) was maintained in the reactor using a continuous backspace purge. The reactor was heated to the metal charge liquidus point plus 300° F., at a rate no greater than 300° F./hour, as limited by the integrity of the crucible. The induction furnace operated in the frequency range of 0 kHz to 3000 kHz, with frequency determined by a temperature-controlled feedback loop implementing an Omega Model CN300 temperature controller. Upon reaching 2800° F., the reactor was charged with an additional 2595 g iron over an hour.

The temperature was again increased to 2850° F. again using a rate no greater than 300° F./hour. When this temperature was reached, graphite saturation assemblies (⅜" OD, 36" long high purity (<5 ppm impurities) graphite rods) were inserted to the bottom of the iron charge through ports located in the top plate. The iron was held at 2850° F. for 4 hours. Every 30 minutes during the hold period, an attempt was made to lower the graphite saturation assemblies as dissolution occurred. As the iron became saturated with carbon, the graphite saturation assemblies were consumed. After the 4 hour hold period was complete, the graphite saturation assemblies were removed.

The reactor temperature was increased to 3360° F. over 7 minutes. The temperature was then varied between 2993° F. and 3360° F. for 15 cycles. Each cycle consisted of lowering the temperature continuously over 7 minutes and raising the temperature continuously over 7 minutes. After the 15 cycles were completed, a gas addition lance was lowered into the molten metal to a position approximately 2" from the bottom of the reactor and a 0.15 L/min flow of argon was begun. The temperature of the iron was varied over another 5 cycles between 2993° F. and 3360° F.

After the fifth cycle, the reactor temperature was lowered to 2850° F. over a 10 minute period with continued argon addition. The graphite saturation assemblies were reinstalled in the iron and remained there for 1 hour. The graphite saturation assemblies were removed.

The reactor temperature was lowered to 2819° F. over 5 minutes. The reactor was held at this temperature for 5 minutes with continued argon addition. The temperature was then varied between 2622° F. and 2818° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2724° F. over 5 minutes. The temperature was varied between 2622° F. and 2724° F. over 4½ cycles. Each cycle consisted of lowering the temperature continuously over 5 minutes and raising the temperature continuously over 3 minutes. In addition, while raising the temperature, a 0.15 L/min flow of argon was added, and while lowering the temperature, a 0.15 L/min flow of nitrogen was added.

The reactor temperature was lowered to 2586° F. over 5 minutes. The temperature was varied between 2133° F. and 2586° F. for 15.5 cycles. Each cycle consisted of lowering the temperature continuously over 15 minutes and raising the temperature continuously over 15 minutes. In addition, while raising the temperature, a 0.15 L/min flow of argon was added, and while lowering the temperature, a 0.15 L/min flow of nitrogen was added. All gas addition, except for the purge of nitrogen ceased after the 15.5 cycles were completed.

The temperature was varied between 2340° F. and 2133° F. for one cycle. The cycle consisted of raising the temperature continuously over 15 minutes and lowering the temperature continuously over 15 minutes. The gas addition lance was removed.

The reactor temperature was cooled by lowering the induction furnace power to 1 kW or less as the ingot cooled. After solidification, the iron was cooled to approximately ambient temperature in water.

Analytical Protocols

XRF, grain size, magnetism, and chemical reactivity measurements were carried out by the procedures described in Example 1.

Analytical Results

Figure 49B:
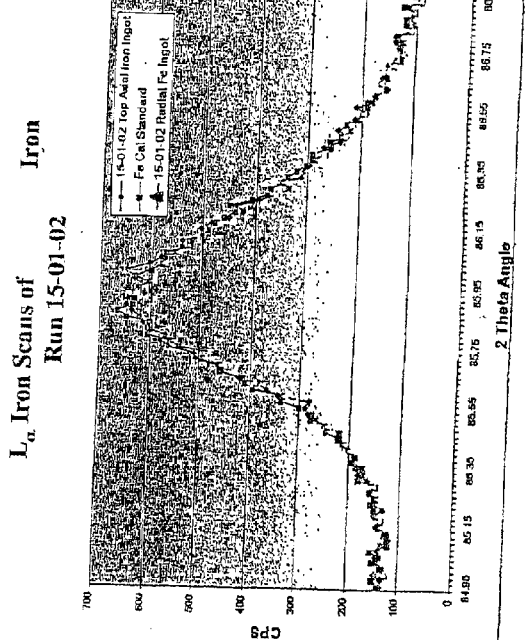
FIGS. 49A and 49B show plots of x-ray fluorescence spectrometry for manufactured iron, on both the axial and radial faces of a block cut from the ingot prepared in Example 8, as compared to plots of x-ray fluorescence spectrometry for natural iron.
Figure 49A:
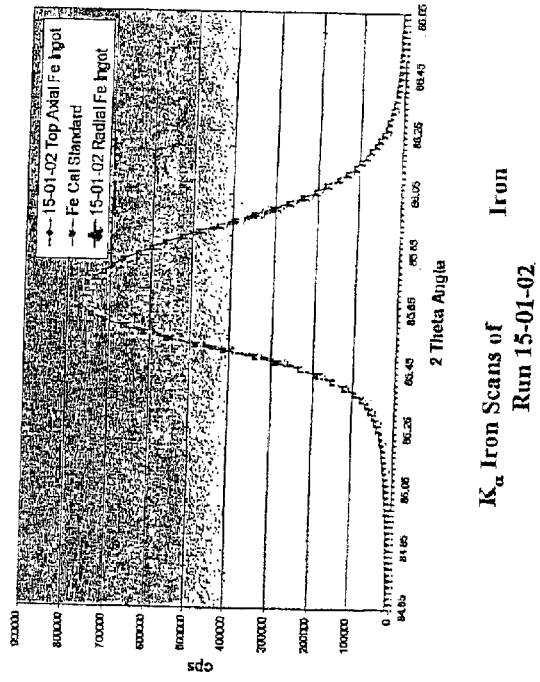

An x-ray fluorescence analysis of the iron sample is provided in FIGS. 49A and 49B, with the $K_\alpha$ and $L_\alpha$ peaks of an iron control standard shown for reference.

Figures 50A, 50B:
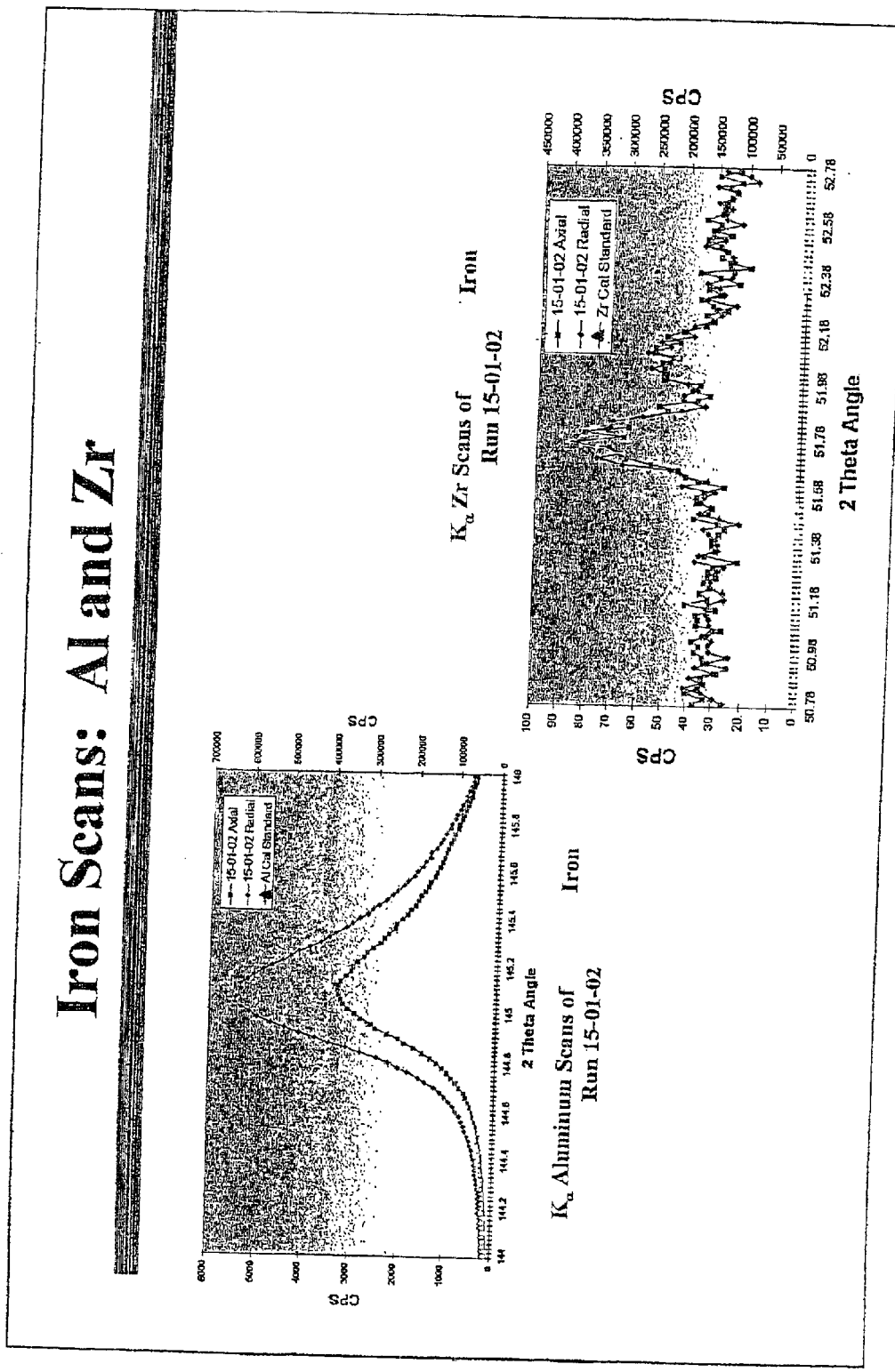
FIG. 50A shows a plot of x-ray fluorescence spectrometry for manufactured iron in the region of the $K_\alpha$ band of aluminum, on the axial and radial faces of a block cut from the ingot prepared in Example 8, as compared to a plot of x-ray fluorescence spectrometry for natural aluminum.
FIG. 50B shows a plot of x-ray fluorescence spectrometry for manufactured iron in the region of the $K_\alpha$ band of zirconium, on the axial and radial faces of a block cut from the ingot prepared in Example 8, as compared to a plot of x-ray fluorescence spectrometry for natural zirconium.

An x-ray fluorescence analysis of the iron sample is provided in FIG. 50A, with the $K_\alpha$ peak of an aluminum control standard shown for reference.

An x-ray fluorescence analysis of the iron sample is provided in FIG. 50B, with the $K_\alpha$ peak of an zirconium control standard shown for reference.

An x-ray fluorescence analysis of the iron sample is provided in FIG. 51 A, with the $K_\alpha$ peak of a sulfur control standard shown for reference.

Figures 51A, 51B:
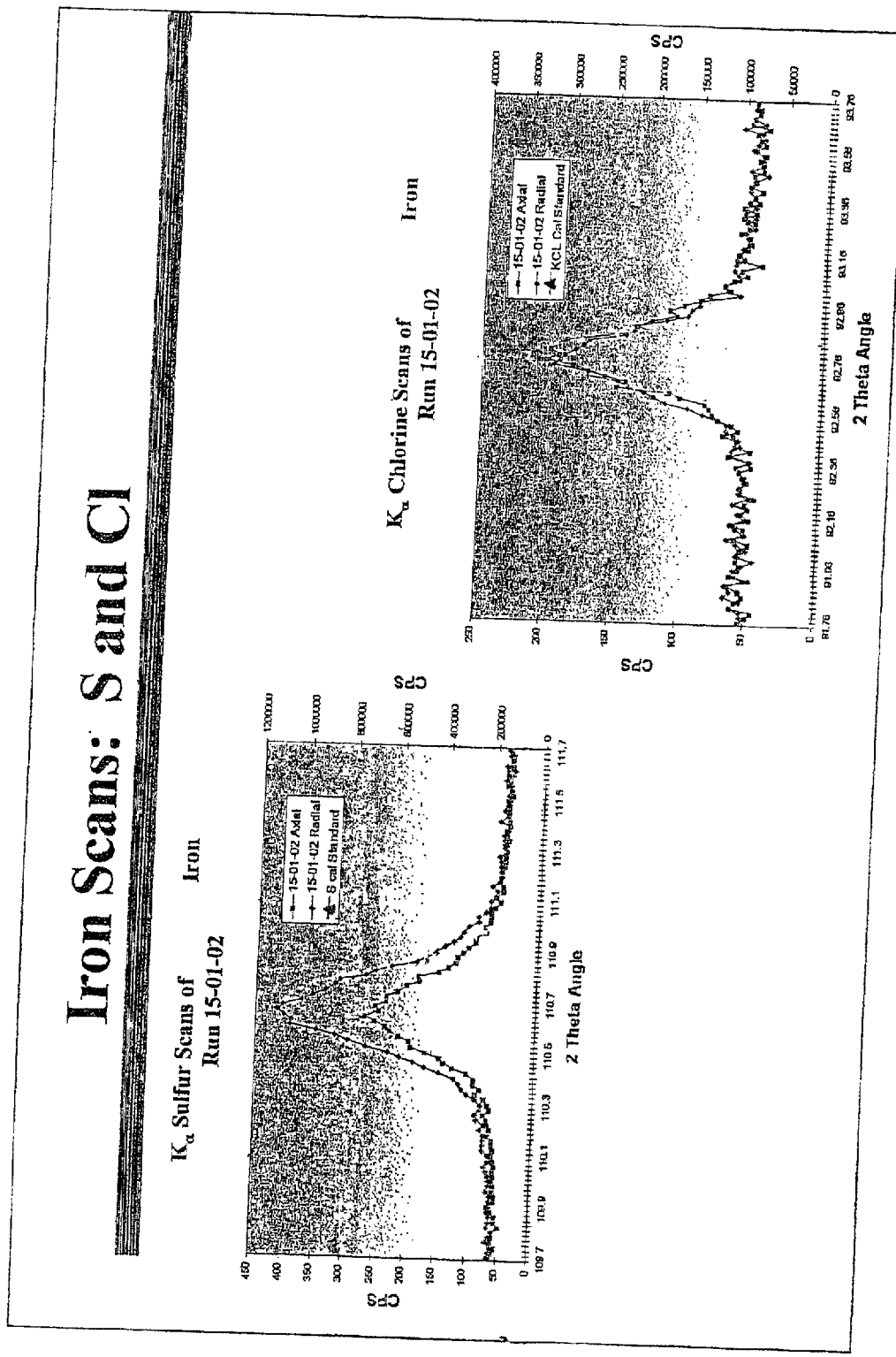
FIG. 51A shows a plot of x-ray fluorescence spectrometry for manufactured iron in the region of the $K_\alpha$ band of sulfur, on the axial and radial faces of a block cut from the ingot prepared in Example 8, as compared to a plot of x-ray fluorescence spectrometry for natural sulfur.
FIG. 51B shows a plot of x-ray fluorescence spectrometry for manufactured iron in the region of the $K_\alpha$ band of chlorine (from potassium chloride), on the axial and radial faces of a block cut from the ingot prepared in Example 8, as compared to a plot of x-ray fluorescence spectrometry for natural chlorine (from potassium chloride).

An x-ray fluorescence analysis of the iron sample is provided in FIG. 51B, with the $K_\alpha$ peak of a chlorine (from potassium chloride) control standard shown for reference.

Summary data showing the apparent elemental composition of the product of Example 8 is shown in Tables 28–29, as was measured by an XRF analysis using a Uniquant software package. The apparent elemental composition of the product varies by position, which is indicated in each table.

The manufactured iron exhibited no unexpected magnetic activity. The reactivity relative to that which would be expected from natural iron has not been quantified. The ingot appears glassy or shiny on its axial (top) face and dull on its radial (side) face. The manufactured iron retained a negligible amount of refractory upon removal from the reactor, but cracked upon retrieval. The ingot had no internal voids.

EXAMPLE 9

Experimental Procedure for Iron w/Vanadium, Chromium and Manganese 15-01-03

A cylindrical alumina-based crucible (99.68% $Al_2O_3$, 0.07% $SiO_2$, 0.08% $Fe_2O_3$, 0.04% CaO, 0.12% $Na_2O_3$; 4.5" O.D.×3.75" I.D.×10" depth) of a 100 pound induction furnace reactor supplied by Inductotherm, fitted with a 75-30R Powertrak power supply, was charged with 2000 g Iron (99.98% purity), plus 91.9 g each of Vanadium (99.5% pure), Chromium (99% pure), and Manganese (99.9% pure), plus 200 g of carbon through its charging port. The reactor was fitted with a graphite cap with a ceramic liner (i.e., the crucible, from Engineering Ceramics). During the entire procedure, a slight positive pressure of nitrogen (~0.5 psi) was maintained in the reactor using a continuous backspace purge. The reactor was heated to the metal charge liquidus point plus 300° F., at a rate no greater than 300° F./hour as limited by the integrity of the crucible. The induction furnace operated in the frequency range of 0 kHz to 3000 kHz, with frequency determined by a temperature-controlled feedback loop implementing an Omega Model CN300 temperature controller. Upon reaching 2800° F., the reactor was charged with an additional 2319.3 g iron over an hour.

The temperature was again increased to 2850° F. again using a rate no greater than 300° F./hour. When this temperature was reached, graphite saturation assemblies (⅜" OD, 36" long high purity graphite rods) were inserted to the bottom of the metal charge through ports located in the top plate. The alloy was held at 2850° F. for 4 hours. Every 30 minutes during the hold period, an attempt was made to lower the graphite saturation assemblies as dissolution occurred. As the alloy became saturated with carbon, the graphite saturation assemblies were consumed. After the 4 hour hold period was complete, the graphite saturation assemblies were removed.

The reactor temperature was increased to 3360° F. over 7 minutes. The temperature was then varied between 2993° F. and 3360° F. for 15 cycles. Each cycle consisted of lowering the temperature continuously over 7 minutes and raising the temperature continuously over 7 minutes. After the 15 cycles were completed, a gas addition lance was lowered into the molten metal to a position approximately 2" from the bottom of the reactor and a 0.15 L/min flow of argon was begun. The temperature of the iron was varied over another 5 cycles between 2993° F. and 3360° F.

After the fifth cycle, the reactor temperature was lowered to 2850° F. over a 10 minute period with continued argon addition. The graphite saturation assemblies were reinstalled in the iron and remained there for 1 hour. The graphite saturation assemblies were removed.

The reactor temperature was lowered to 2819° F. over 5 minutes. The reactor was held at this temperature for 5 minutes with continued argon addition. The temperature was then varied between 2622° F. and 2818° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2724° F. over 5 minutes. The temperature was varied between 2622° F. and 2724° F. over 4½ cycles. Each cycle consisted of lowering the temperature continuously over 5 minutes and raising the temperature continuously over 3 minutes. In addition, while raising the temperature, a 0.15 L/min flow of argon was added, and while lowering the temperature, a 0.15 L/min flow of nitrogen was added.

The reactor temperature was lowered to 2586° F. over 5 minutes. The temperature was varied between 2133° F. and 2586° F. for 15.5 cycles. Each cycle consisted of lowering the temperature continuously over 15 minutes and raising the temperature continuously over 15 minutes. In addition, while raising the temperature, a 0.15 L/min flow of argon was added, and while lowering the temperature, a 0.15 L/min flow of nitrogen was added. All gas addition, except for the purge of nitrogen ceased after the 15.5 cycles were completed.

The temperature was varied between 2340° F. and 2133° F. for one cycle. The cycle consisted of raising the temperature continuously over 15 minutes and lowering the temperature continuously over 15 minutes. The gas addition lance was removed.

The reactor temperature was cooled by lowering the induction furnace power to 1 kW or less as the ingot cooled. The iron/vanadium/chromium/manganese alloy was the cooled to approximately ambient temperature in water.

Analytical Protocols

XRF, grain size, magnetism, and chemical reactivity measurements were carried out by the procedures described in Example 1.

Analytical Results

Figure 52:
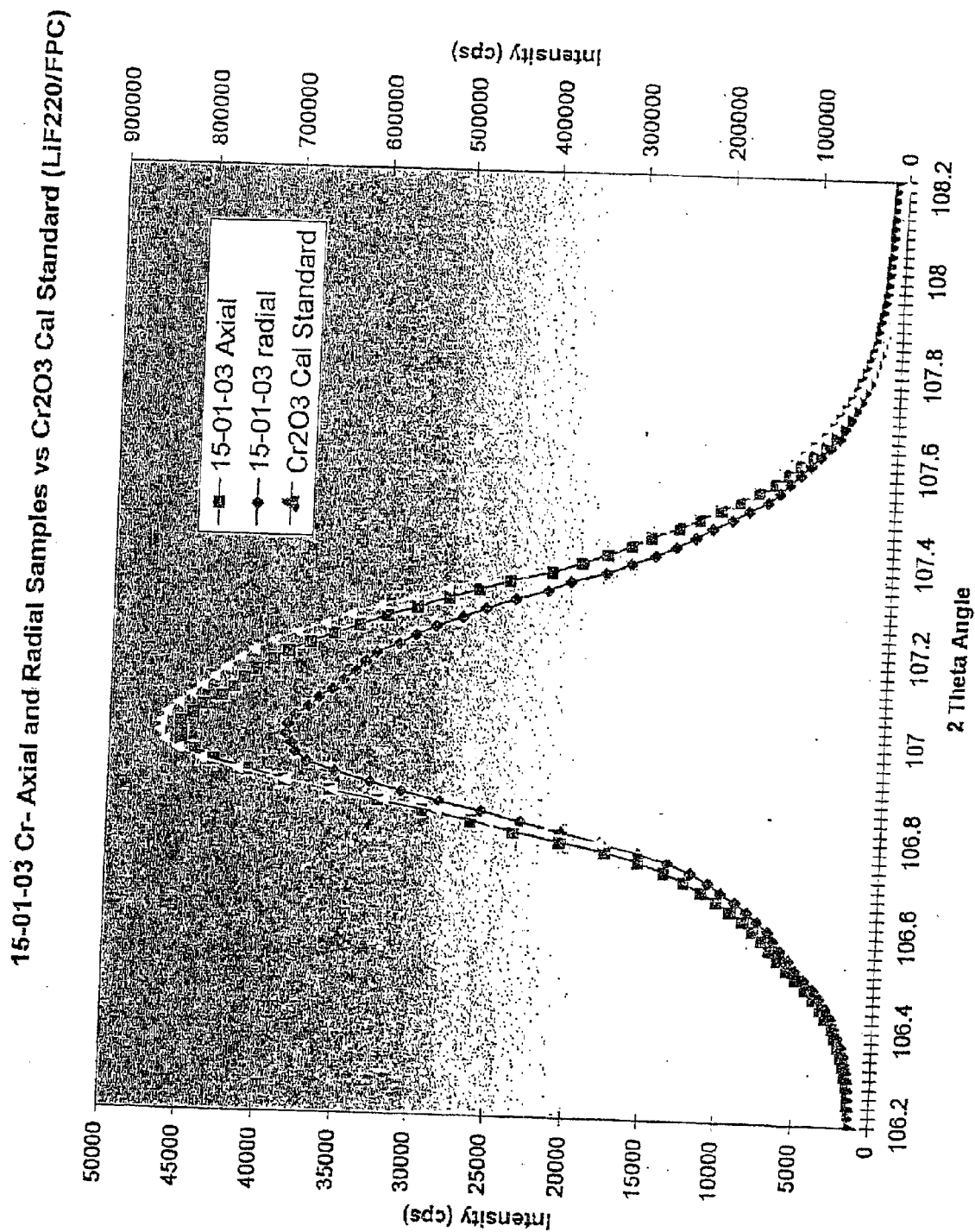
FIG. 52 shows a plot of x-ray fluorescence spectrometry for a manufactured iron/vanadium/chromium/manganese alloy in the region of the $K_\alpha$ band of chromium (using chromium(III) oxide), on the axial and radial faces of a block cut from the ingot prepared in Example 9, as compared to a plot of x-ray fluorescence spectrometry for natural chromium (using chromium (III) oxide).

An x-ray fluorescence analysis of the iron/vanadium/chromium/manganese alloy sample is provided in FIG. 52, with the $K_\alpha$ peak of a chromium (from chromium(III) oxide) control standard shown for reference.

Figure 53:
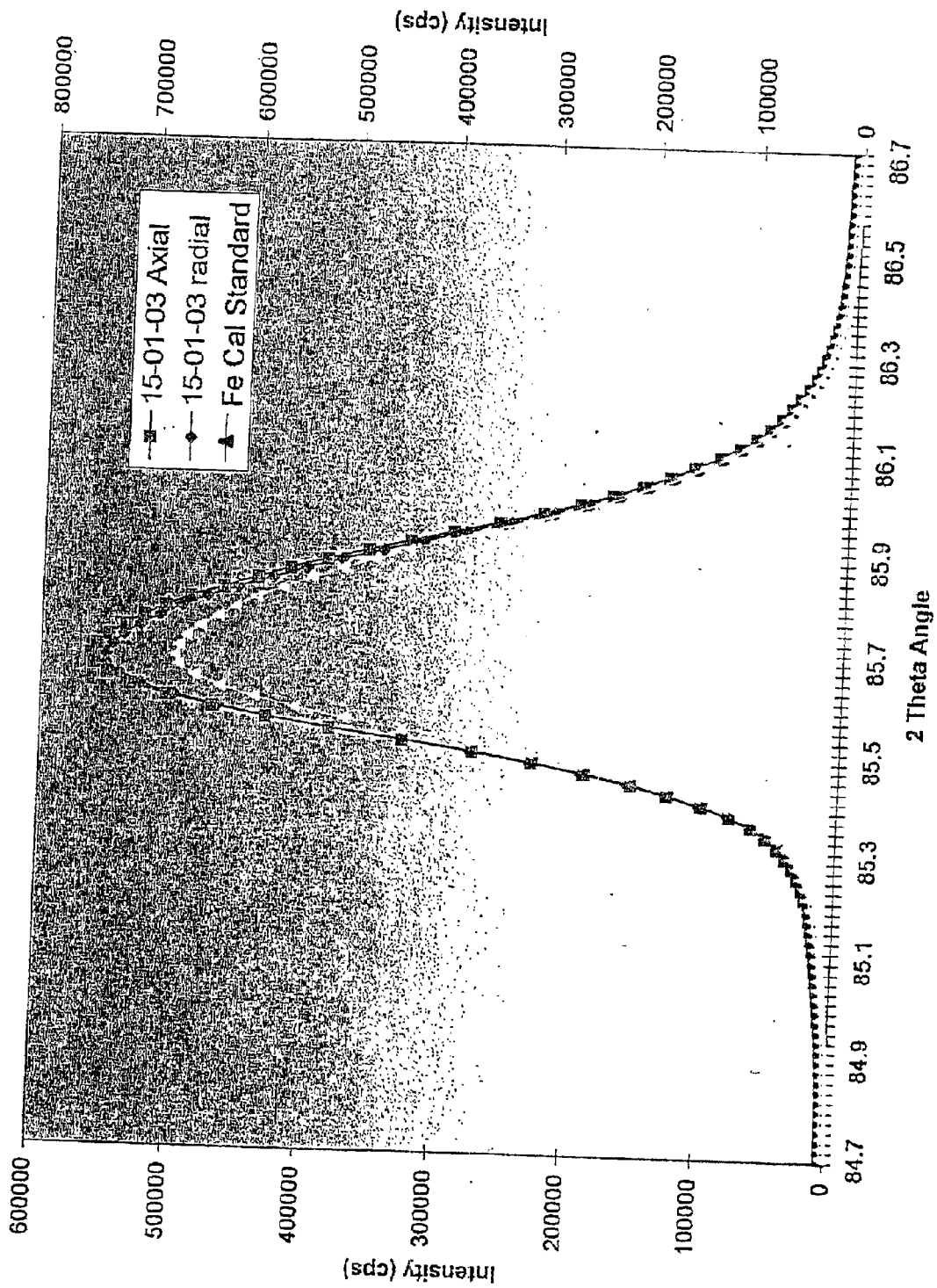
FIG. 53 shows a plot of x-ray fluorescence spectrometry for a manufactured iron/vanadium/chromium/manganese alloy in the region of the $K_\alpha$ band of iron, on the axial and radial faces of a block cut from the ingot prepared in Example 9, as compared to a plot of x-ray fluorescence spectrometry for natural iron.

An x-ray fluorescence analysis of the iron/vanadium/chromium/manganese alloy sample is provided in FIG. 53, with the $K_\alpha$ peak of an iron control standard shown for reference.

Figure 54:
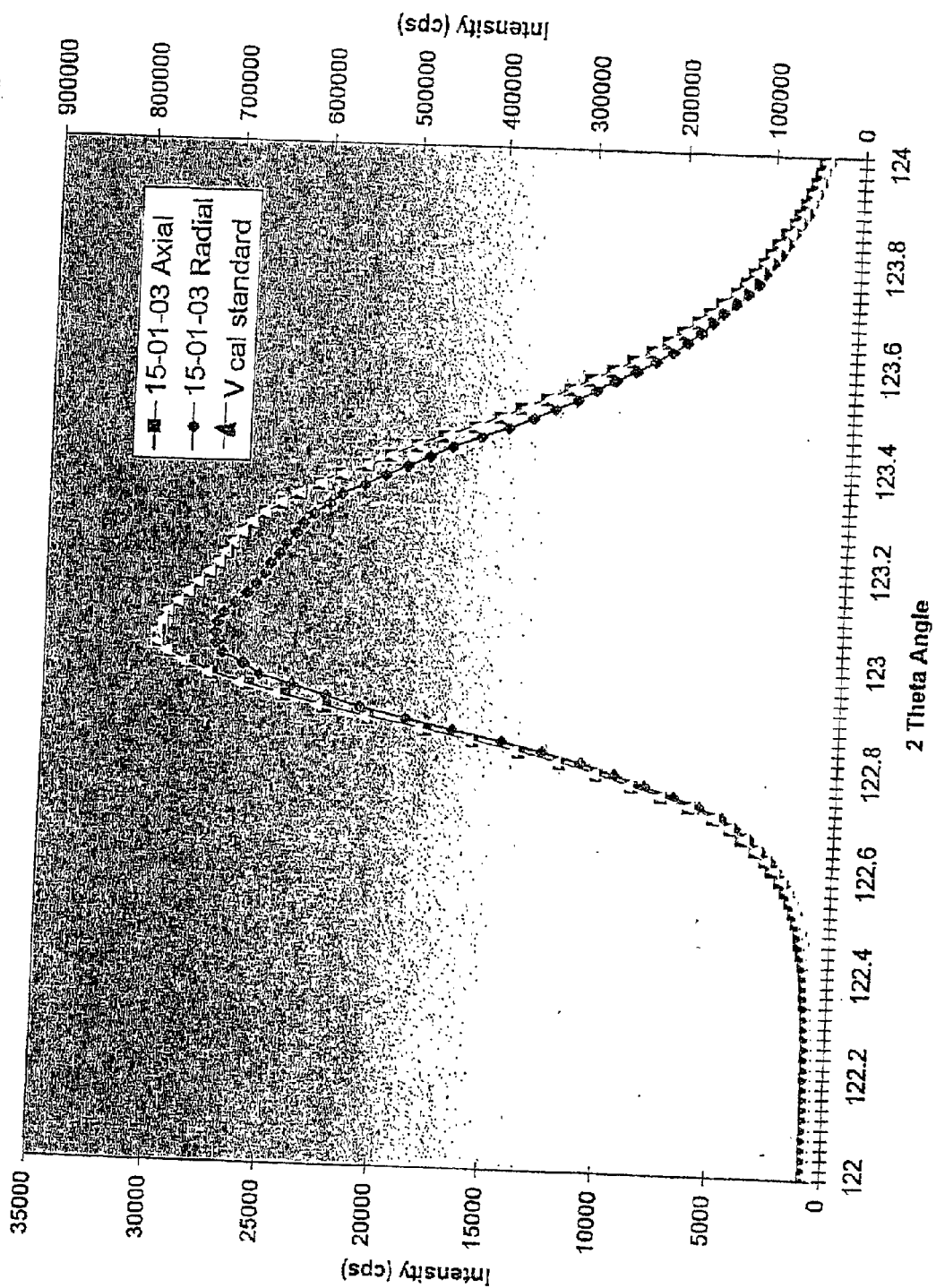
FIG. 54 shows a plot of x-ray fluorescence spectrometry for a manufactured iron/vanadium/chromium/manganese alloy in the region of the $K_\alpha$ band of vanadium, on the axial and radial faces of a block cut from the ingot prepared in Example 9, as compared to a plot of x-ray fluorescence spectrometry for natural vanadium.

An x-ray fluorescence analysis of the iron/vanadium/chromium/manganese alloy sample is provided in FIG. 54, with the $K_\alpha$ peak of a vanadium control standard shown for reference.

Figure 55:
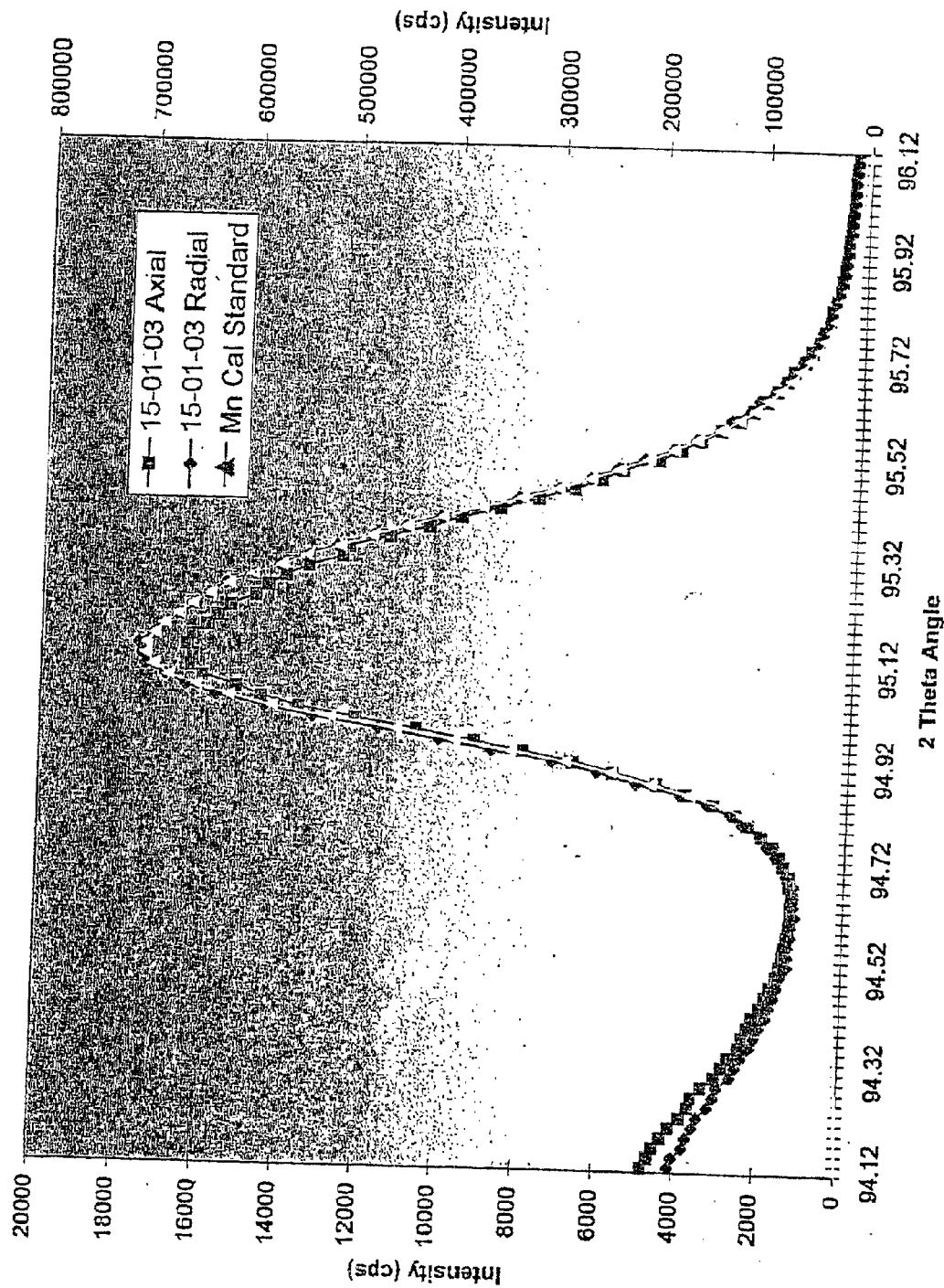
FIG. 55 shows a plot of x-ray fluorescence spectrometry for a manufactured iron/vanadium/chromium/manganese alloy in the region of the $K^\alpha$ band of manganese, on the axial and radial faces of a block cut from the ingot prepared in Example 9, as compared to a plot of x-ray fluorescence spectrometry for natural manganese.

An x-ray fluorescence analysis of the iron/vanadium/chromium/manganese alloy sample is provided in FIG. 55, with the $K_\alpha$ peak of a manganese control standard shown for reference.

Figure 56:
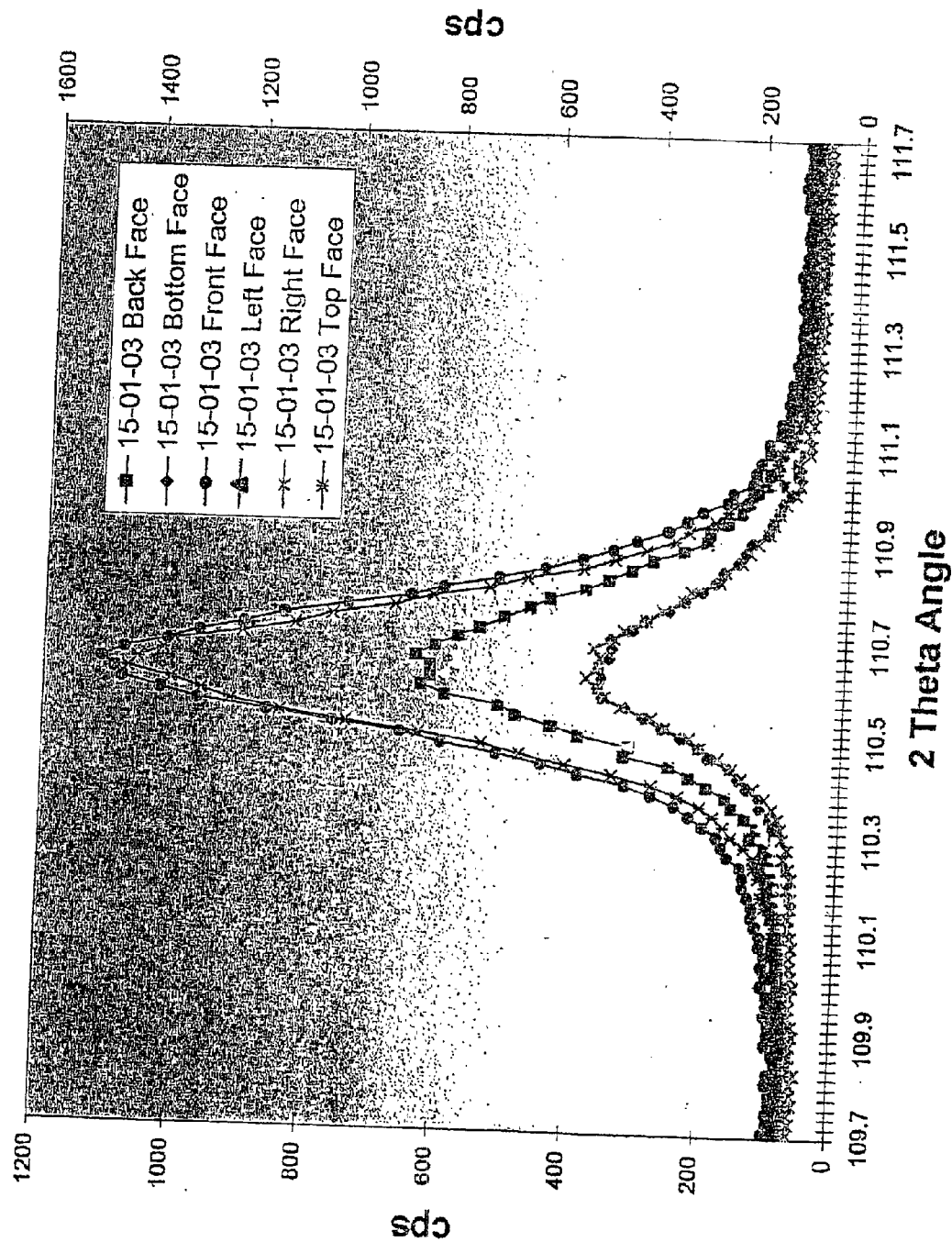
FIG. 56 shows a plot of x-ray fluorescence spectrometry for a manufactured iron/vanadium/chromium/manganese alloy in the region of the $K_\alpha$ band of sulfur, on all six sides of a block cut from the ingot prepared in Example 9.

An x-ray fluorescence analysis of the iron/vanadium/chromium/manganese alloy sample is provided in FIG. 56, in the region of the $K_\alpha$ peak of a sulfur control standard.

Summary data showing the apparent elemental composition of the product of Example 9 is shown in Tables 40–41, as was measured by an XRF analysis using a Uniquant software package. The apparent elemental composition of the product varies by position, which is indicated in each table.

Upon polishing the manufactured alloy in preparation for XRF analysis, the alloy was noted to be particularly hard and a stratification pattern that was not attributable to the polishing materials was exposed. The relative hardness of the alloy was tested and the Moh's hardness was found to be greater than what would be expected from a natural alloy of a similar composition. The radial surface of the ingot had a shiny or glassy appearance, while the axial surface appeared dull, thus reflecting bulk anisotropic behavior.

The manufactured alloy had no unexpected magnetic activity. The ingot retained a negligible amount of refractory upon retrieval from the reactor, but did crack.

EXAMPLE 10

Experimental Procedure for Nickel w/Tantalum, Hafnium and Tungsten 15-01-04

A cylindrical alumina-based crucible (99.68% $Al_2O_3$, 0.07% $SiO_2$, 0.08% $Fe_2O_3$, 0.04% CaO, 0.12% $Na_2O_3$; 4.5" O.D.×3.75" I.D.×10" depth) of a 100 pound induction furnace reactor supplied by Inductotherm, fitted with a 75-30R Powertrak power supply and was charged with 2500 g Nickel (99.9% purity), plus 100 g each of Hafnium (99.9% pure), W (99.9% pure), Ta (99.98% pure), and carbon through its charging port. The reactor was fitted with a graphite cap with a ceramic liner (i.e., the crucible, from Engineering Ceramics). During the entire procedure, a slight positive pressure of nitrogen (~0.5 psi) was maintained in the reactor using a continuous backspace purge. The reactor was heated to the metal charge liquidus point plus 300° F., at a rate no greater than 300° F./hour, as limited by the integrity of the crucible. The induction furnace operated in the frequency range of 0 kHz to 3000 kHz, with frequency determined by a temperature-controlled feedback loop implementing an Omega Model CN300 temperature controller. Upon reaching 2800° F., the reactor was charged with an additional 2200 g nickel over an hour.

The temperature was again increased to 2850° F. again using a rate no greater than 300° F./hour. When this temperature was reached, graphite saturation assemblies (⅜" OD, 36" long high purity (<5 ppm impurities) graphite rods) were inserted to the bottom of the metal charge through ports located in the top plate. The alloy was held at 2850° F. for 4 hours. Every 30 minutes during the hold period, an attempt was made to lower the graphite saturation assemblies as dissolution occurred. As the alloy became saturated with carbon, the graphite saturation assemblies were consumed. After the 4 hour hold period was complete, the graphite saturation assemblies were removed.

The reactor temperature was increased to 3256° F. over 7 minutes. The temperature was then varied between 2950° F. and 3256° F. for 15 cycles. Each cycle consisted of lowering the temperature continuously over 7 minutes and raising the temperature continuously over 7 minutes. After the 15 cycles were completed, a gas addition lance was lowered into the molten metal to a position approximately 2" from the bottom of the reactor and a 0.15 L/min flow of argon was begun. The temperature of the alloy was varied over another 5 cycles between 2950° F. and 3256° F.

After the fifth cycle, the reactor temperature was lowered to 2850° F. over a 10 minute period with continued argon addition. The graphite saturation assemblies were reinstalled in the alloy and remained there for 1 hour. The graphite saturation assemblies were removed.

The reactor temperature was lowered to 2829° F. over 5 minutes. The reactor was held at this temperature for 5 minutes with continued argon addition. The temperature was then varied between 2790° F. and 2829° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2770° F. over 5 minutes. The temperature was varied between 2710° F. and 2770° F. over 4½ cycles. Each cycle consisted of lowering the temperature continuously over 5 minutes and raising the temperature continuously over 3 minutes. In addition, while raising the temperature, a 0.15 L/min flow of argon was added, and while lowering the temperature, a 0.15 L/min flow of nitrogen was added.

The reactor temperature was lowered to 2691° F. over 5 minutes. The temperature was varied between 2492° F. and 2691° F. for 15.5 cycles. Each cycle consisted of lowering the temperature continuously over 15 minutes and raising the temperature continuously over 15 minutes. In addition, while raising the temperature, a 0.15 L/min flow of argon was added, and while lowering the temperature, a 0.15 L/min flow of nitrogen was added. All gas addition, except for the purge of nitrogen ceased after the 15.5 cycles were completed.

The temperature was varied between 2571° F. and 2492° F. for one cycle. The cycle consisted of raising the temperature continuously over 15 minutes and lowering the temperature continuously over 15 minutes. The gas addition lance was removed.

The reactor temperature was slowly cooled by lowering the induction furnace power to 1 kW or less as the ingot cooled. After solidification, the alloy was cooled to approximately ambient temperature in water.

Analytical Protocols

XRF, grain size, magnetism, and chemical reactivity measurements were carried out by the procedures described in Example 1.

Analytical Results

Figure 57:
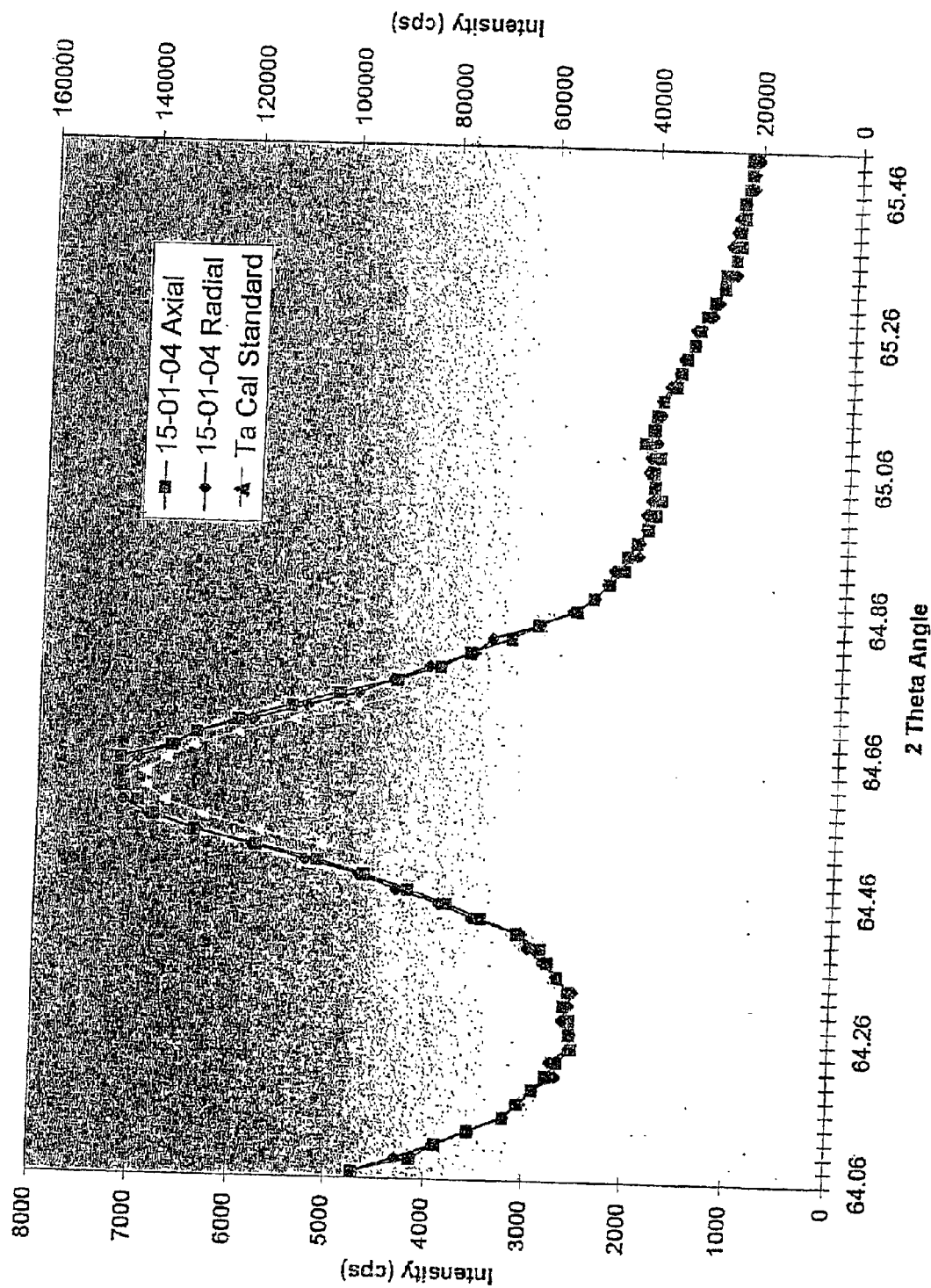
FIG. 57 shows a plot of x-ray fluorescence spectrometry for a manufactured nickel/tantalum/hafnium/tungsten alloy in the region of the $K_\alpha$ band of tantalum, on the axial and radial faces of a block cut from the ingot prepared in Example 10, as compared to a plot of x-ray fluorescence spectrometry for natural tantalum.

An x-ray fluorescence analysis of the nickel/hafnium/tantalum/tungsten alloy sample is provided in FIG. 57, with the $K_\alpha$ peak of a tantalum control standard shown for reference.

Figure 58:
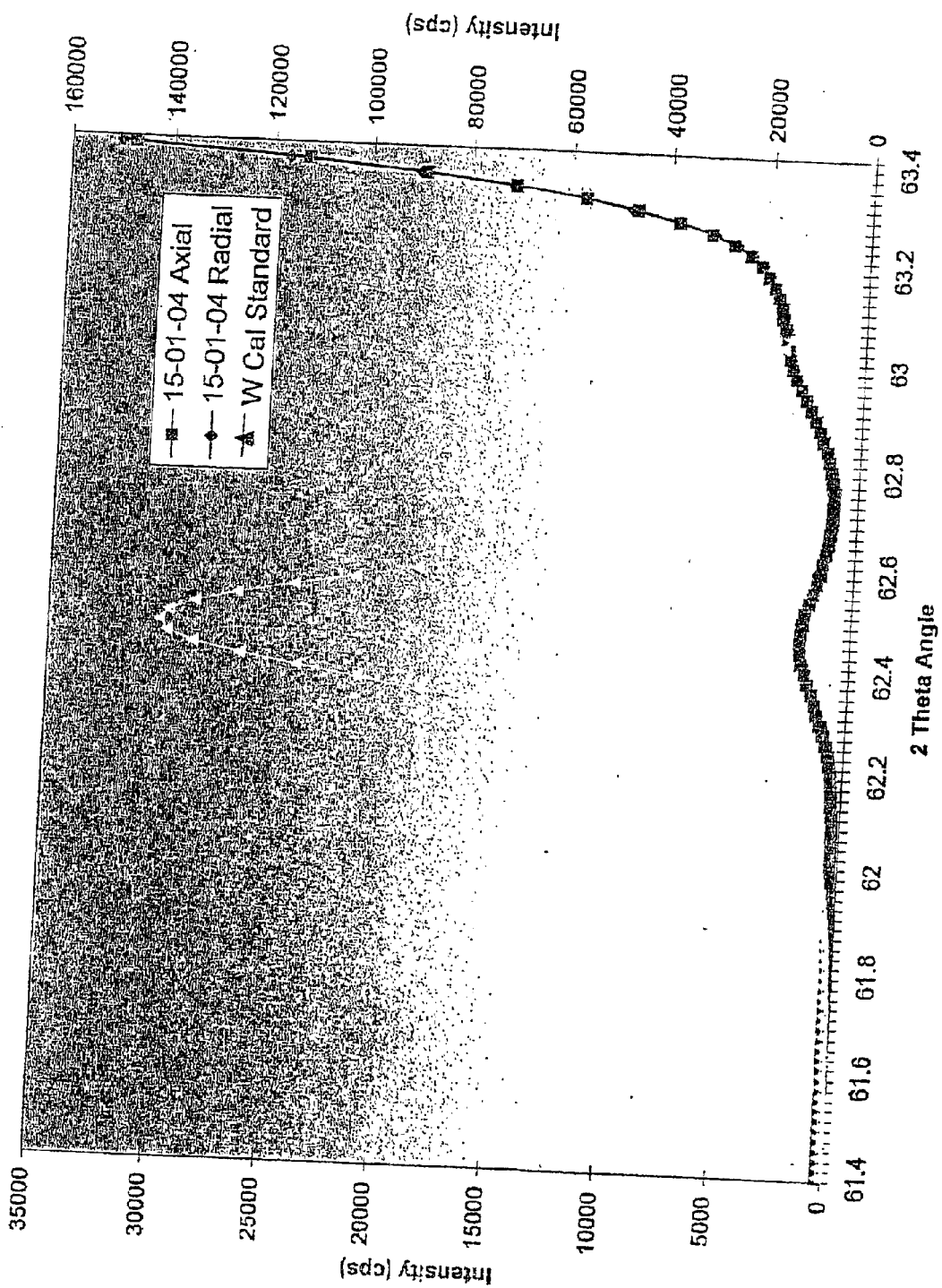
FIG. 58 shows a plot of x-ray fluorescence spectrometry for a manufactured nickel/tantalum/hafnium/tungsten alloy in the region of the $K_\alpha$ band of tungsten, on the axial and radial faces of a block cut from the ingot prepared in Example 10, as compared to a plot of x-ray fluorescence spectrometry for natural tungsten.

An x-ray fluorescence analysis of the nickel/hafnium/tantalum/tungsten alloy sample is provided in FIG. 58, with the $K_\alpha$ peak of a tungsten control standard shown for reference.

Figure 59:
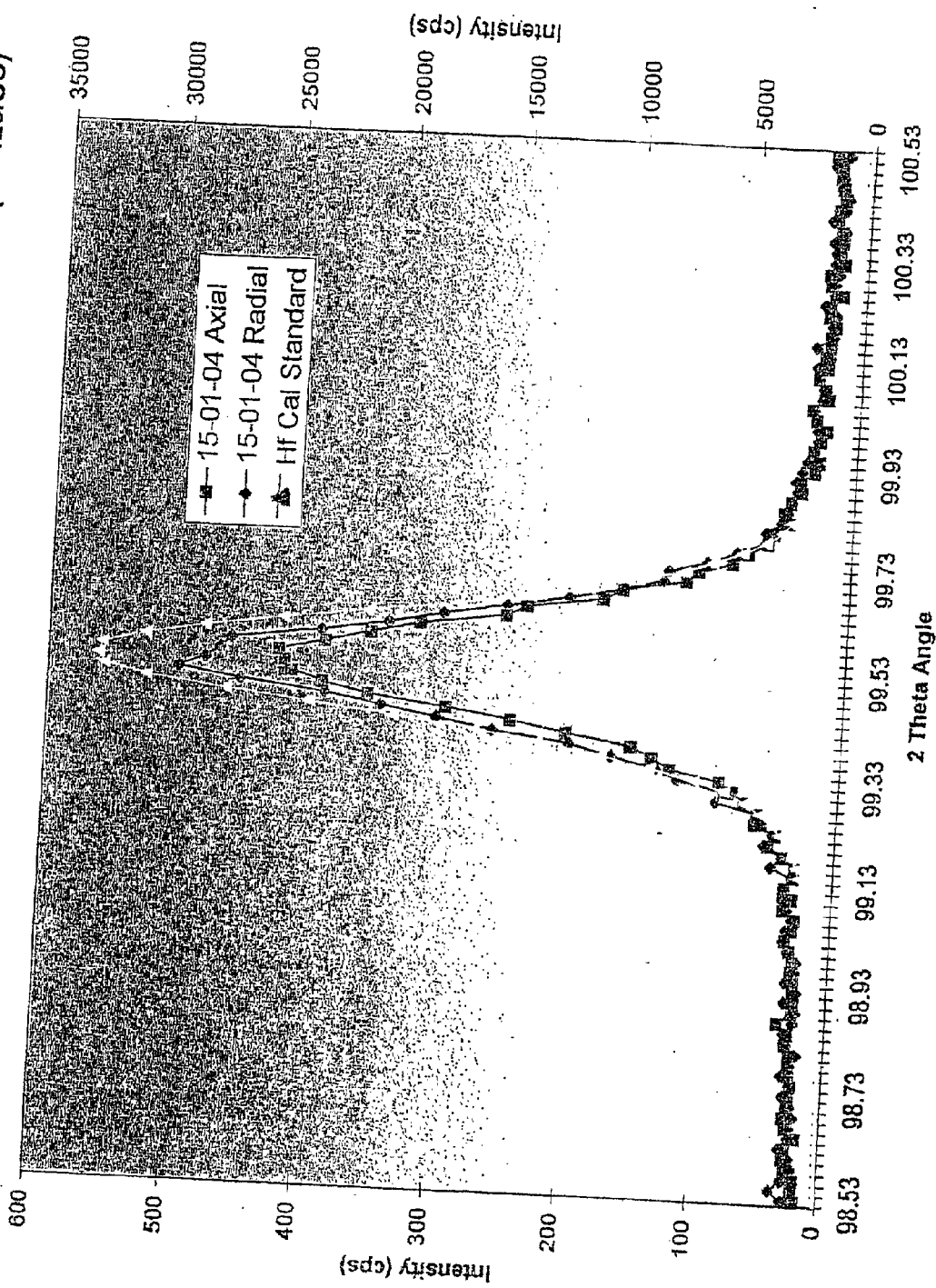
FIG. 59 shows a plot of x-ray fluorescence spectrometry for a manufactured nickel/tantalum/hafnium/tungsten alloy in the region of the $K_\alpha$ band of hafnium, on the axial and radial faces of a block cut from the ingot prepared in Example 10, as compared to a plot of x-ray fluorescence spectrometry for natural hafnium.

An x-ray fluorescence analysis of the nickel/hafnium/tantalum/tungsten alloy sample is provided in FIG. 59, with the $K_\alpha$ peak of a hafnium control standard shown for reference.

Figure 60:
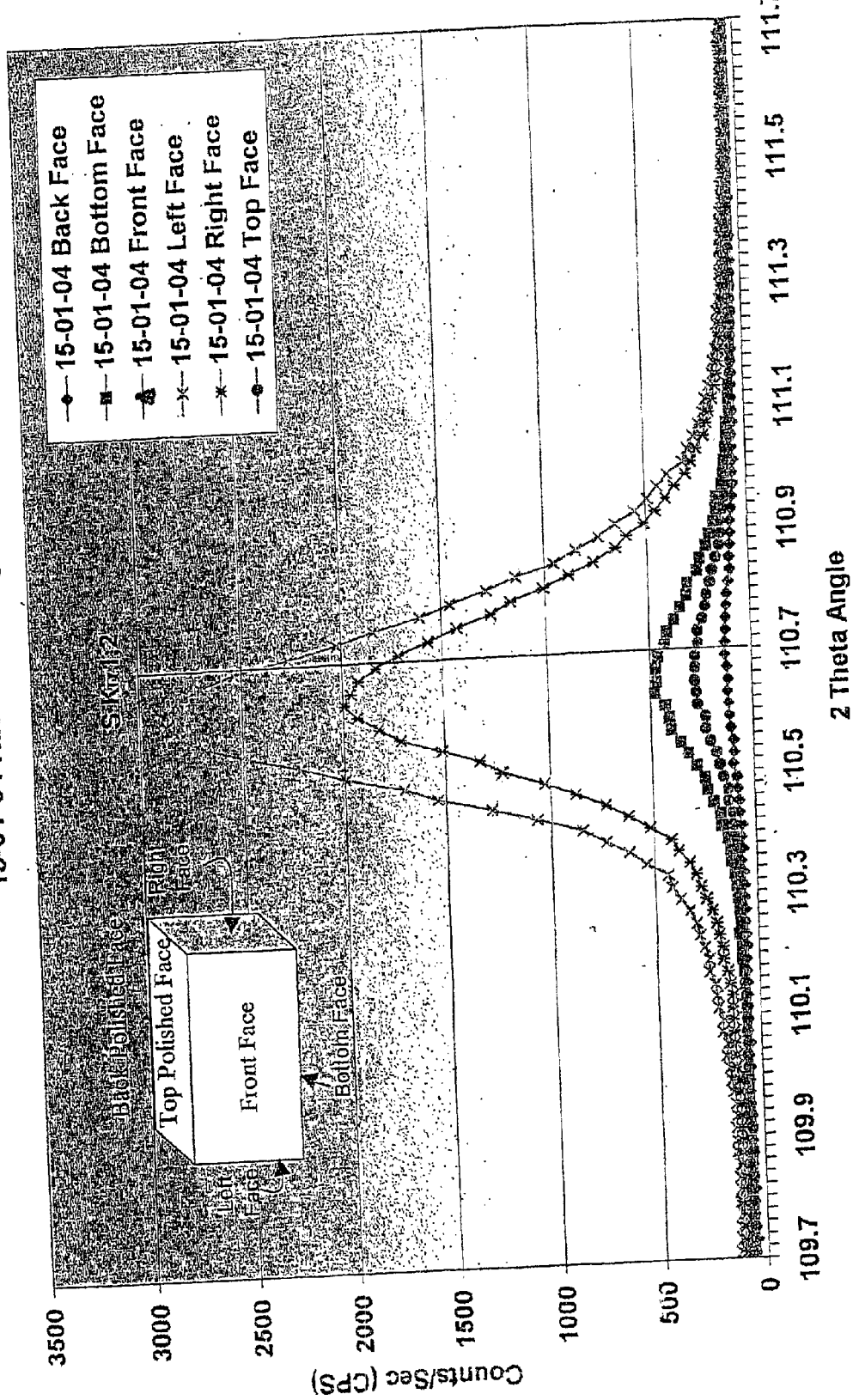
FIG. 60 shows a plot of x-ray fluorescence spectrometry for a manufactured nickel/tantalum/hafnium/tungsten alloy in the region of the $K_\alpha$ band of sulfur, on all six faces of a block cut from the ingot prepared in Example 10.

An x-ray fluorescence analysis of the nickel/hafnium/tantalum/tungsten alloy sample is provided in FIG. 60, in the region of the $K_\alpha$ peak of a sulfur control standard.

Figure 61:
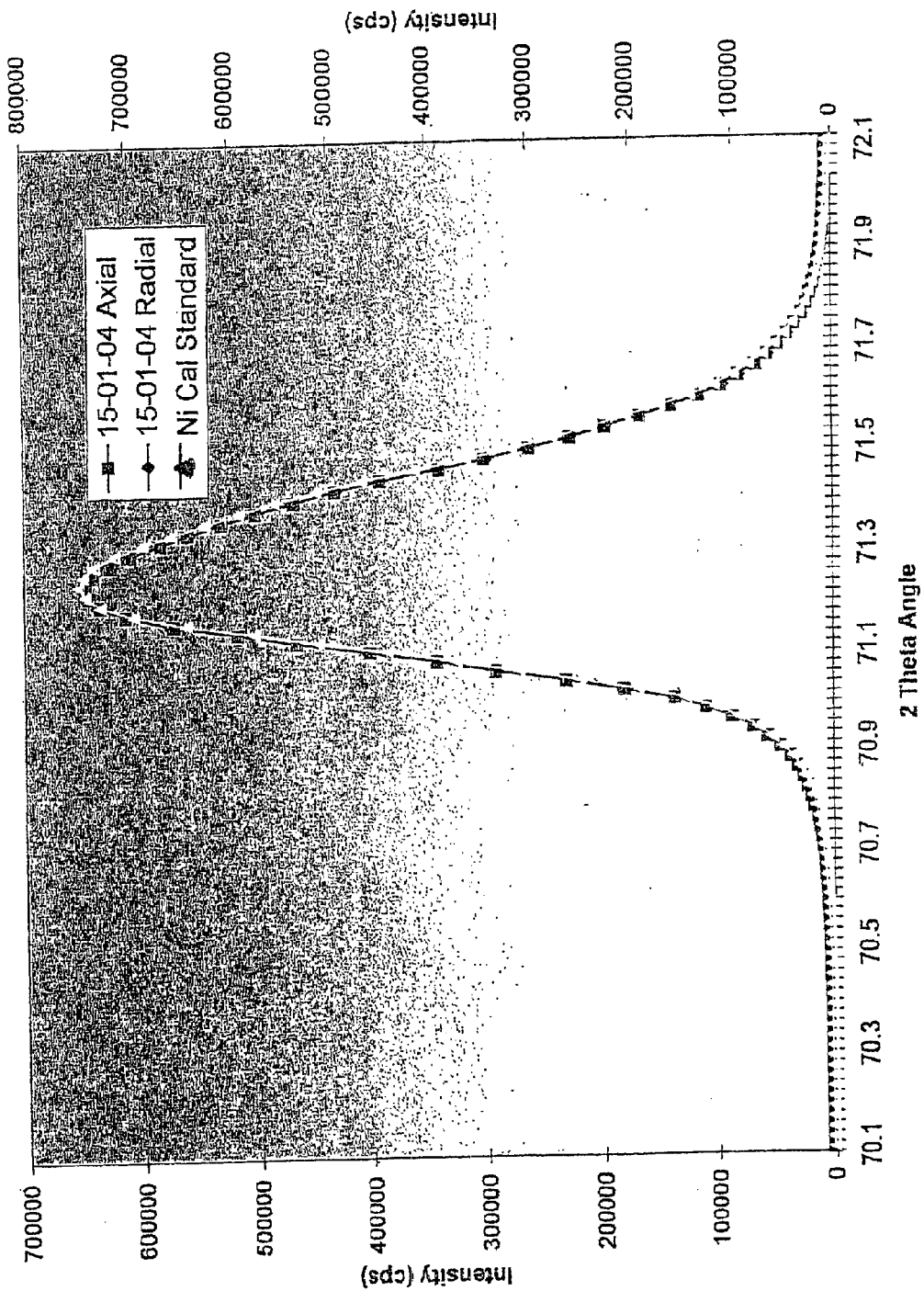
FIG. 61 shows a plot of x-ray fluorescence spectrometry for a manufactured nickel/tantalum/hafnium/tungsten alloy in the region of the $K_\alpha$ band of nickel, on the axial and radial faces of a block cut from the ingot prepared in Example 10, as compared to a plot of x-ray fluorescence spectrometry for natural nickel.

An x-ray fluorescence analysis of the nickel/hafnium/tantalum/tungsten alloy sample is provided in FIG. 61, with the $K_\alpha$ peak of a nickel control standard shown for reference.

Summary data showing the apparent elemental composition of the product of Example 10 is shown in Tables 30–31, as was measured by an XRF analysis using a Uniquant software package. The apparent elemental composition of the product varies by position, which is indicated in each table.

The manufactured nickel-based alloy exhibited clear anisotropic behavior with respect to color and reactivity similar to the anisotropy observed via XRF. The sides were covered with a large amount of refractory retained after the ingot was retrieved from the reactor. The top face had a classic metallic sheen. No unexpected magnetic activity was observed. The ingot did not upon removal from the reactor or exhibit any internal voids.

EXAMPLE 11

Experimental Procedure for Copper 14-00-01

A cylindrical alumina-based crucible (89.07% $Al_2O_3$, 10.37% $SiO_2$, 0.16% $TiO_2$, 0.15% $Fe_2O_3$, 0.03% CaO, 0.01% MgO, 0.02% $Na_2O_3$, 0.02% $K_2O$; 9" O.D.×7.75" I.D.×14" depth) of a 100 pound induction furnace reactor supplied by Inductotherm, fitted with a 75-30R Powertrak power supply, was charged with 100 pounds copper (99.98% purity) through its charging port. During the entire procedure, a slight positive pressure of nitrogen (~0.5 psi) was maintained in the reactor using a continuous backspace purge. The reactor was heated to the metal charge liquidus point plus 300° F., at a rate no greater than 300° F./hour, as limited by the integrity of the crucible. The induction furnace operated in the frequency range of 0 kHz to 3000 kHz, with frequency determined by a temperature-controlled feedback loop implementing an Omega Model CN300 temperature controller.

The temperature was again increased to 2462° F. again using a rate no greater than 300° F./hour. When this temperature was reached, graphite saturation assemblies (⅜" OD, 36" long high purity (<5 ppm impurities) graphite rods) were inserted to the bottom of the copper charge through ports located in the top plate. The copper was held at 2462° F. for 4 hours. Every 30 minutes during the hold period, an attempt was made to lower the graphite saturation assemblies as dissolution occurred. As the copper became saturated with carbon, the graphite saturation assemblies were consumed. After the 4 hour hold period was complete, the graphite saturation assemblies were removed.

The reactor temperature was increased to 2480° F. over 7 minutes. The temperature was then varied between 2480° F. and 2530° F. for 15 cycles. Each cycle consisted of raising the temperature continuously over 7 minutes and lowering the temperature continuously over 7 minutes. After the 15 cycles were completed, a gas addition lance was lowered into the molten metal to a position approximately 2" from the bottom of the reactor and a 1.5 L/min flow of argon was begun. The temperature of the copper was varied over another 5 cycles between 2480° F. and 2530° F.

After the fifth cycle, the reactor temperature was lowered to 2462° F. over a 10 minute period with continued argon addition. The graphite saturation assemblies were reinstalled in the copper and remained there for 1 hour. The graphite saturation assemblies were removed.

The reactor temperature was lowered to 2459° F. over 5 minutes. The reactor was held at this temperature for 5 minutes with continued argon addition. The temperature was then varied between 2459° F. and 2453° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2450° F. over 5 minutes. The temperature was varied between 2450° F. and 2441° F. over 4½ cycles. Each cycle consisted of lowering the temperature continuously over 5 minutes and raising the temperature continuously over 3 minutes. In addition, while raising the temperature, a 1.5 L/min flow of argon was added, and while lowering the temperature, a 1.5 L/min flow of nitrogen was added.

The reactor temperature was lowered to 2438° F. over 5 minutes. The temperature was varied between 2438° F. and 2406° F. for 15.5 cycles. Each cycle consisted of lowering the temperature continuously over 15 minutes and raising the temperature continuously over 15 minutes. In addition, while raising the temperature, a 1.5 L/min flow of argon was added, and while lowering the temperature, a 1.5 L/min flow of nitrogen was added. All gas addition, except for the purge of nitrogen ceased after the 15.5 cycles were completed.

The temperature was varied between 2406° F. and 2419° F. for one cycle. The cycle consisted of raising the temperature continuously over 15 minutes and lowering the temperature continuously over 15 minutes. The gas addition lance was removed.

The reactor temperature was rapidly cooled by quenching in water, so that the copper solidified into an ingot.

Analytical Protocols

XRF, grain size, magnetism, and chemical reactivity measurements were carried out by the procedures described in Example 1.

Analytical Results

Summary data showing the apparent elemental composition of the product of Example 11 is shown in Tables 32–33, as was measured by an XRF analysis using a Uniquant software package. The apparent elemental composition of the product varies by position, which is indicated in each table.

Immediately after the method described above was completed, multiple discrete magnetic spots attracted by a ⅛" diameter neodymium iron boron magnet were observed in a sinusoidal pattern. The ingot exhibited point attraction to iron filings at reduced temperatures at or near 77 K. Over days to months, the strength of the magnetic attraction decreased on a fraction of the locations exhibiting magnetic attraction or attraction to iron filings.

Various forms of ligated chlorine (e.g. HCl and MCl, where M is a metal as defined above) readily reacted with the manufactured copper form yielding product distributions distinguishable from natural copper, thereby demonstrating a change in chemical reactivity. This reactivity increased over time.

Extremely large grain sizes (i.e., greater than 1") were observed, which is uncharacteristic and previously unreported in natural copper systems (typically, copper grains sizes are 10–100 μm). Unique changes in coloration were observed with the crossing of grain boundaries; however, the overall coloration mimicked natural copper.

EXAMPLE 12

Experimental Procedure for Copper 14-00-03

A cylindrical alumina-based crucible (89.07% $Al_2O_3$, 10.37% $SiO_2$, 0.16% $TiO_2$, 0.15% $Fe_2O_3$, 0.03% CaO, 0.01% MgO, 0.02% $Na_2O_3$, 0.02% $K_2O$; 9" O.D.×7.75" I.D.×14" depth) of a 100 pound induction furnace reactor supplied by Inductotherm, fitted with a 75-30R Powertrak power supply and was charged with 100 pounds copper (99.98% purity) through its charging port. During the entire procedure, a slight positive pressure of nitrogen (~0.5 psi) was maintained in the reactor using a continuous backspace purge. The reactor was heated to the metal charge liquidus point plus 300° F., at a rate no greater than 300° F./hour, as limited by the integrity of the crucible. The induction furnace operated in the frequence range of 0 kHz to 3000 kHz, with frequency determined by a temperature-controlled feedback loop implementing an Omega Model CN300 temperature controller.

The temperature was again increased to 2462° F. again using a rate no greater than 300° F./hour. When this temperature was reached, graphite saturation assemblies (⅜" OD, 36" long high purity (<5 ppm impurities) graphite rods) were inserted to the bottom of the copper charge through ports located in the top plate. The copper was held at 2462° F. for 4 hours. Every 30 minutes during the hold period, an attempt was made to lower the graphite saturation assemblies as dissolution occurred. As the copper became saturated with carbon, the graphite saturation assemblies were consumed. After the 4 hour hold period was complete, the graphite saturation assemblies were removed.

The reactor temperature was increased to 2480° F. over 7 minutes. The temperature was then varied between 2480° F. and 2530° F. for 15 cycles. Each cycle consisted of raising the temperature continuously over 7 minutes and lowering the temperature continuously over 7 minutes. After the 15 cycles were completed, a gas addition lance was lowered into the molten metal to a position approximately 2" from the bottom of the reactor and a 1.5 L/min flow of argon was begun. The temperature of the copper was varied over another 5 cycles between 2480° F. and 2530° F.

After the fifth cycle, the reactor temperature was lowered to 2462° F. over a 10 minute period with continued argon addition. The graphite saturation assemblies were reinstalled in the copper and remained there for 1 hour. The graphite saturation assemblies were removed.

The reactor temperature was lowered to 2459° F. over 5 minutes. The reactor was held at this temperature for 5 minutes with continued argon addition. The temperature was then varied between 2459° F. and 2453° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2450° F. over 5 minutes. The temperature was varied between 2450° F. and 2441° F. over 4½ cycles. Each cycle consisted of lowering the temperature continuously over 5 minutes and raising the temperature continuously over 3 minutes. In addition, while raising the temperature, a 1.5 L/min flow of argon was added, and while lowering the temperature, a 1.5 L/min flow of nitrogen was added.

The reactor temperature was lowered to 2438° F. over 5 minutes. The temperature was varied between 2438° F. and 2406° F. for 15.5 cycles. Each cycle consisted of lowering the temperature continuously over 15 minutes and raising the temperature continuously over 15 minutes. In addition, while raising the temperature, a 1.5 L/min flow of argon was added, and while lowering the temperature, a 1.5 L/min flow of nitrogen was added. All gas addition, except for the purge of nitrogen ceased after the 15.5 cycles were completed.

The temperature was varied between 2406° F. and 2419° F. for one cycle. The cycle consisted of raising the temperature continuously over 15 minutes and lowering the temperature continuously over 15 minutes. The gas addition lance was removed.

The reactor temperature was rapidly cooled by quenching in water, so that the copper solidified into an ingot.

Analytical Protocols

XRF, grain size, magnetism, and chemical reactivity measurements were carried out by the procedures described in Example 1.

Analytical Results

Summary data showing the apparent elemental composition of the product of Example 12 is shown in Tables 34–35, as was measured by an XRF analysis using a Uniquant software package. The apparent elemental composition of the product varies by position, which is indicated in each table.

This manufactured copper system demonstrated an ability to change color (i.e., visible light spectrum emission) dependent upon electromagnetic stimulation. The color of the top, glassy surface of an ingot changed under different lighting conditions. While the (radial) side of the ingot was a matte pink color, the top of the ingot (axial face) has a glassy color, which can vary from intense burgundy to golden bronze to burnished orange. These differences in appearance reflect the anisotropy detected via the XRFs.

The radial surface of the ingot was covered with magnetically active spots. The magnetism of the ingot decreased over time. Altered chemical reactivity, particularly with respect to ligated chlorine, was observed on axial surfaces. The chemical reactivity increased over time. Radial surfaces appeared unaffected and were free from refractory (material from the crucible).

EXAMPLE 13

Experimental Procedure for Copper 14-00-04

A cylindrical alumina-based crucible (89.07% $Al_2O_3$, 10.37% $SiO_2$, 0.16% $TiO_2$, 0.15% $Fe_2O_3$, 0.03% CaO, 0.01% MgO, 0.02% $Na_2O_3$, 0.02% $K_2O$; 9" O.D.×7.75" I.D.×14" depth) of a 100 pound induction furnace reactor supplied by Inductotherm, fitted with a 75-30R Powertrak power supply was charged with 100 pounds copper (99.98% purity) through its charging port. During the entire procedure, a slight positive pressure of nitrogen (~0.5 psi) was maintained in the reactor using a continuous backspace purge. The reactor was heated to the metal charge liquidus point plus 300° F., at a rate no greater than 300° F./hour, as limited by the integrity of the crucible. The induction furnace operated in the frequence range of 0 kHz to 3000 kHz, with frequency determined by a temperature-controlled feedback loop implementing an Omega Model CN300 temperature controller The temperature was again increased to 2462° F. again using a rate no greater than 300° F./hour. When this temperature was reached, graphite saturation assemblies (⅜" OD, 36" long high purity (<5 ppm impurities) graphite rods) were inserted to the bottom of the copper charge through ports located in the top plate. The copper was held at 2462° F. for 4 hours. Every 30 minutes during the hold period, an attempt was made to lower the graphite saturation assemblies as dissolution occurred. As the copper became saturated with carbon, the graphite saturation assemblies were consumed. After the 4 hour hold period was complete, the graphite saturation assemblies were removed.

The reactor temperature was increased to 2480° F. over 7 minutes. The temperature was then varied between 2480° F. and 2530° F. for 15 cycles. Each cycle consisted of raising the temperature continuously over 7 minutes and lowering the temperature continuously over 7 minutes. After the 15 cycles were completed, a gas addition lance was lowered into the molten metal to a position approximately 2" from the bottom of the reactor and a 1.5 L/min flow of argon was begun The temperature of the copper was varied over another 5 cycles between 2480° F. and 2530° F.

After the fifth cycle, the reactor temperature was lowered to 2462° F. over a 10 minute period with continued argon addition. The graphite saturation assemblies were reinstalled in the copper and remained there for 1 hour. The graphite saturation assemblies were removed.

The reactor temperature was lowered to 2459° F. over 5 minutes. The reactor was held at this temperature for 5 minutes with continued argon addition. The temperature was then varied between 2459° F. and 2453° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2450° F. over 5 minutes. The temperature was varied between 2450° F. and 2441° F. over 4½ cycles. Each cycle consisted of lowering the temperature continuously over 5 minutes and raising the temperature continuously over 3 minutes. In addition, while raising the temperature, a 1.5 L/min flow of argon was added, and while lowering the temperature, a 1.5 L/min flow of nitrogen was added.

The reactor temperature was lowered to 2438° F. over 5 minutes. The temperature was varied between 2438° F. and 2406° F. for 15.5 cycles. Each cycle consisted of lowering the temperature continuously over 15 minutes and raising the temperature continuously over 15 minutes. In addition, while raising the temperature, a 1.5 L/min flow of argon was added, and while lowering the temperature, a 1.5 L/min flow of nitrogen was added. All gas addition, except for the purge of nitrogen ceased after the 15.5 cycles were completed.

The temperature was varied between 2406° F. and 2419° F. for one cycle. The cycle consisted of raising the temperature continuously over 15 minutes and lowering the temperature continuously over 15 minutes. The gas addition lance was removed.

The reactor temperature was slowly cooled and was subsequently quenched in water, so that the copper solidified into an ingot.

Analytical Protocols

XRF, grain size, magnetism, and chemical reactivity measurements were carried out by the procedures described in Example 1.

Analytical Results

Summary data showing the apparent elemental composition of the product of Example 13 is shown in Tables 36–37, as was measured by an XRF analysis using a Uniquant software package. The apparent elemental composition of the product varies by position, which is indicated in each table.

The manufactured copper ingot exhibited many of the characteristic patterns observed in previous examples. Differences in the coloration and appearance of the axial and radial directions were observed: matte, burgundy brown coloration on the side, and glassy on the top with demarcations.

This ingot had internal voids. The ingot demonstrated enhanced chemical reactivity on the axial surfaces. Refractory was found to be tightly bound to select portions of the radial surfaces. Minimal magnetic activity was detected.

EXAMPLE 14

Experimental Procedure for copper 15-00-01

A cylindrical alumina-based crucible (89.07% $Al_2O_3$, 10.37% $SiO_2$, 0.16% $TiO_2$, 0.15% $Fe_2O_3$, 0.03% CaO, 0.01% MgO, 0.02% $Na_2O_3$, 0.02% $K_2O$; 9" O.D.×7.75" I.D.×14" depth) of a 100 pound induction furnace reactor supplied by Inductotherm, fitted with a 75-30R Powertrak power supply and was charged with 100 pounds copper (99.98% purity) through its charging port. During the entire procedure, a slight positive pressure of nitrogen (~5 psi) was maintained in the reactor using a continuous backspace purge. The reactor was heated to the metal charge liquidus point plus 300° F., at a rate no greater than 300° F./hour, as limited by the integrity of the crucible. The induction furnace operated in the frequence range of 0 kHz to 3000 kHz, with frequency determined by a temperature-controlled feedback loop implementing an Omega Model CN300 temperature controller.

The temperature was again increased to 2462° F. again using a rate no greater than 300° F./hour. When this temperature was reached, graphite saturation assemblies (⅜" OD, 36" long high purity (<5 ppm impurities) graphite rods) were inserted to the bottom of the copper charge through ports located in the top plate. The copper was held at 2462° F. for 4 hours. Every 30 minutes during the hold period, an attempt was made to lower the graphite saturation assemblies as dissolution occurred. As the copper became saturated with carbon, the graphite saturation assemblies were consumed. After the 4 hour hold period was complete, the graphite saturation assemblies were removed.

The reactor temperature was increased to 2480° F. over 7 minutes. The temperature was then varied between 2480° F. and 2530° F. for 15 cycles. Each cycle consisted of raising the temperature continuously over 7 minutes and lowering the temperature continuously over 7 minutes. After the 15 cycles were completed, a gas addition lance was lowered into the molten metal to a position approximately 2"0 from the bottom of the reactor and a 1.5 L/min flow of argon was begun. The temperature of the copper was varied over another 5 cycles between 2480° F. and 2530° F.

After the fifth cycle, the reactor temperature was lowered to 2462° F. over a 10 minute period with continued argon addition. The graphite saturation assemblies were reinstalled in the copper and remained there for 1 hour. The graphite saturation assemblies were removed.

The reactor temperature was lowered to 2459° F. over 5 minutes. The reactor was held at this temperature for 5 minutes with continued argon addition. The temperature was then varied between 2459° F. and 2453° F. over 20 cycles. Each cycle consisted of lowering the temperature continuously over 9 minutes and raising the temperature continuously over 9 minutes. The argon addition ceased after completion of the 20 cycles.

The reactor temperature was lowered to 2450° F. over 5 minutes. The temperature was varied between 2450° F. and 2441° F. over 4½ cycles. Each cycle consisted of lowering the temperature continuously over 5 minutes and raising the temperature continuously over 3 minutes. In addition, while raising the temperature, a 1.5 L/min flow of argon was added, and while lowering the temperature, a 1.5 L/min flow of nitrogen was added.

The reactor temperature was lowered to 2438° F. over 5 minutes. The temperature was varied between 2438° F. and 2406° F. for 15.5 cycles. Each cycle consisted of lowering the temperature continuously over 15 minutes and raising the temperature continuously over 15 minutes. In addition, while raising the temperature, a 1.5 L/min flow of argon was added, and while lowering the temperature, a 1.5 L/min flow of nitrogen was added. All gas addition, except for the purge of nitrogen ceased after the 15.5 cycles were completed.

The temperature was varied between 2406° F. and 2419° F. for one cycle. The cycle consisted of raising the temperature continuously over 15 minutes and lowering the temperature continuously over 15 minutes. The gas addition lance was removed.

The reactor temperature was slowly cooled and was subsequently quenched in water, so that the copper solidified into an ingot.

Analytical Protocols

XRF, grain size, magnetism, and chemical reactivity measurements were carried out by the procedures described in Example 1.

Analytical Results

Summary data showing the apparent elemental composition of the product of Example 14 is shown in Tables 38–39, as was measured by an XRF analysis using a Uniquant software package. The apparent elemental composition of the product varies by position, which is indicated in each table.

The manufactured copper demonstrated an ability to change color (i.e., visible light spectrum emission), dependant upon electromagnetic stimulation. The top (axial face) of the ingot can vary from intense burgundy to a deep golden orange. Additionally, the appearance and color of this ingot reflect the anisotropy detected via the XRF scans. The radial (side) face appears like burnished copper, while the axial (top) face has a glassy appearance.

On the bottom and side faces, each of the grain boundaries is clearly delineated. Each of the grains appears to have a different color, giving the exterior of the ingot an iridescent appears. The ingot did not have an internal void, as ingots of previous examples did. Additionally, the ingot did not exhibit the extensive magnetic activity observed in Examples 11 and 12. The ingot retained an extensive amount of refractory upon retrieval from the reactor.

While this invention has been particularly shown and described with references to preferred embodiments thereof, it will be understood by those skilled in the art that various changes in form and details may be made therein without departing from the scope of the invention encompassed by the appended claims.

TABLE 1

ANALYSIS REPORT by Uniquant

| | |
|---|---|
| Spectrometers configuration: | ARL 8410 Rh 60 kV LiF220 LiF420 Ge111 TlAP |
| Sample ident = Tailored - 3 | |
| Further info = | |
| Kappa list = Nov. 15, 1994 | Channel list = Sep. 23, 1999 |
| Calculated as: Elements | Spectral impurity data: CAL.209Teflon |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 10 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.037 | 29 + Cu | 99.58 | 0.03 | 51 Sb | < | |
| 11 Na | < | | 30 + Zn | <2e | 0.006 | 52 Te | < | |
| 12 Mg | < | | 31 + Ga | 0.012 | 0.003 | 53 I | < | |
| 13 + Al | 0.027 | 0.012 | 32 Ge | <2e | 0.003 | 55 Cs | < | |
| 14 Si | < | | 33 As | < | | 56 Ba | < | |
| 15 + P | 0.003 | 0.001 | 34 Se | < | | Sum La . . . Lu | 0.15 | 0.07 |
| 16 + S | 0.038 | 0.003 | 35 Br | < | | 72 + Hf | <2e | 0.022 |
| 16 + So | 0.022 | 0.003 | 37 Rb | < | | 73 + Ta | <2e | 0.071 |
| 17 + Cl | 0.037 | 0.003 | 38 Sr | < | | 74 W | < | |
| 18 + Ar | 0.017 | 0.002 | 39 Y | < | | 75 Re | < | |
| 19 + K | <2e | 0.0008 | 40 Zr | < | | 76 Os | < | |
| 20 + Ca | 0.0050 | 0.0008 | 41 Nb | < | | 77 + Ir | 0.029 | 0.008 |
| 21 Sc | < | | 42 Mo | < | | 78 + Pt | 0.017 | 0.007 |
| 22 + Ti | 0.015 | 0.001 | 44 Ru | < | | 79 Au | <2e | 0.007 |
| 23 V | < | | 45 Rh | < | | 80 Hg | < | |
| 24 Cr | < | | 46 Pd | < | | 81 Tl | < | |
| 25 + Mn | 0.0069 | 0.0007 | 47 Ag | < | | 82 Pb | < | |
| 26 + Fe | 0.015 | 0.001 | 48 + Cd | 0.004 | 0.002 | 83 Bi | < | |
| 27 Co | < | | 49 In | < | | 90 Th | <2e | 0.003 |
| 28 Ni | < | | 50 Sn | < | | 92 U | < | |

| Light Elements | | | Noble Elements | | | Lanthanides | | |
|---|---|---|---|---|---|---|---|---|
| 4 Be | | | 44 Ru | < | | 57 + La | 0.073 | 0.006 |
| 5 B | | | 45 Rh | < | | 58 Ce | < | |
| 6 C | | | 46 Pd | < | | 59 Pr | < | |
| 7 N | | | 47 Ag | < | | 60 Nd | < | |
| 8 O | | | 75 Re | < | | 62 + Sm | 0.022 | 0.003 |
| 9 E | < | | 76 Os | < | | 63 + Eu | 0.015 | 0.002 |
| | | | 77 + Ir | 0.029 | 0.008 | 64 + Gd | 0.009 | 0.002 |
| | | | 78 + Pt | 0.017 | 0.007 | 65 + Tb | 0.015 | 0.002 |
| | | | 79 Au | <2e | 0.007 | 66 DY | < | |
| | | | | | | 67 + Ho | <2e | 0.013 |
| | | | | | | 68 Er | <2e | 0.004 |
| | | | | | | 69 Tm | < | |

TABLE 1-continued

ANALYSIS REPORT by Uniquant

|  |  |  |  |
|---|---|---|---|
|  | 70 Yb | <2e | 0.005 |
|  | 71 + Lu | <2e | 0.013 |
| KnownConc = 0 | REST = 0 | D/S = 0 |  |

Sum Conc's before normalisation to 100%: 90.6%

TABLE 2

ANALYSIS REPORT by Uniquant

Spectrometers configuration: ARL 8410 Rh 60 kV LiF220 LiF420 Ge111 TlAP
Sample ident = Tailored - 2
Further info =
Kappa list = Nov. 15, 1994        Channel list = Sep. 23, 1999
Calculated as: Elements           Spectral impurity data: CAL.209Teflon
X-ray path = Vacuum               Film type = No supporting film
Case number = 0                   Known Area, % Rest, Diluent/Sample and Mass/Area
Eff. Diam. = 25.00 mm             Eff. Area = 490.6 mm2
KnownConc = 0%
Rest = 0%
Dil/Sample = 0
Viewed Mass = 18000.00 mg
Sample Height = 5 mm < means that the concentration is < 10 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.036 | 29 + Cu | 98.62 | 0.06 | 51 Sb | < |  |
| 11 + Na | 0.11 | 0.02 | 30 + Zn | <2e | 0.006 | 52 Te | < |  |
| 12 Mg | < |  | 31 + Ga | 0.007 | 0.003 | 53 I | < |  |
| 13 + Al | 0.44 | 0.03 | 32 Ge | <2e | 0.003 | 55 Cs | < |  |
| 14 + Si | 0.107 | 0.008 | 33 As | < |  | 56 Ba | < |  |
| 15 + P | 0.004 | 0.001 | 34 Se | < |  | Sum La . . . Lu | 0.087 | 0.072 |
| 16 + S | 0.19 | 0.01 | 35 Br | < |  | 72 + Hf | < |  |
| 16 + So | 0.12 | 0.01 | 37 Rb | < |  | 73 + Ta | <2e | 0.071 |
| 17 + Cl | 0.17 | 0.01 | 38 Sr | < |  | 74 W | < |  |
| 18 + Ar | 0.027 | 0.002 | 39 Y | < |  | 75 Re | < |  |
| 19 + K | 0.0065 | 0.0010 | 40 Zr | < |  | 76 Os | < |  |
| 20 + Ca | 0.013 | 0.001 | 41 Nb | < |  | 77 Ir | < |  |
| 21 Sc | < |  | 42 Mo | < |  | 78 + Pt | 0.022 | 0.008 |
| 22 + Ti | 0.015 | 0.001 | 44 Ru | < |  | 79 Au | <2e | 0.007 |
| 23 V | < |  | 45 Rh | < |  | 80 Hg | < |  |
| 24 Cr | < |  | 46 Pd | < |  | 81 Tl | < |  |
| 25 Mn | <2e | 0.0006 | 47 Ag | < |  | 82 Pb | < |  |
| 26 + Fe | 0.044 | 0.004 | 48 Cd | <2e | 0.002 | 83 Bi | < |  |
| 27 Co | < |  | 49 In | < |  | 90 Th | < |  |
| 28 Ni | < |  | 50 Sn | < |  | 92 U | < |  |

| Light Elements | | | Noble Elements | | | Lanthanides | | |
|---|---|---|---|---|---|---|---|---|
| 4 Be |  |  | 44 Ru | < |  | 57 + La | 0.059 | 0.005 |
| 5 B |  |  | 45 Rh | < |  | 58 Ce | <2e | 0.003 |
| 6 C |  |  | 46 Pd | < |  | 59 Pr | <2e | 0.003 |
| 7 N |  |  | 47 Ag | < |  | 60 Nd | <2e | 0.002 |
| 8 O |  |  | 75 Re | < |  | 62 Sm | <2e | 0.003 |
| 9 F | < |  | 76 Os | < |  | 63 Eu | < |  |
|  |  |  | 77 Ir | < |  | 64 Gd | < |  |
|  |  |  | 78 + Pt | 0.022 | 0.008 | 65 + Tb | 0.005 | 0.002 |
|  |  |  | 79 Au | <2e | 0.007 | 66 Dy | <2e | 0.008 |
|  |  |  |  |  |  | 67 + Ho | <2e | 0.015 |
|  |  |  |  |  |  | 68 Er | <2e | 0.004 |
|  |  |  |  |  |  | 69 Tm | < |  |
|  |  |  |  |  |  | 70 Yb | < |  |
|  |  |  |  |  |  | 71 + Lu | < |  |
| KnownConc = 0 | | | REST = 0 | | | D/S = 0 | | |

Sum Conc's before normalisation to 100%: 96.0%

TABLE 3

ANALYSIS REPORT by UniQuant

| | |
|---|---|
| Spectrometers configuration: | ARL 8410 Rh 60 kV LiF220 LiF420 Ge111 TlAP |
| Sample ident = Tailored - 1 | |
| Further info = | |
| Kappa list = Nov. 15, 1994 | Channel list = Jul. 20, 1994 |
| Calculated as: Elements | Spectral impurity data: CAL.209Teflon |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 10 ppm
<2e means that Conc < 2 × StdErr

| Z | wt % | StdErr | Z | wt % | StdErr | Z | wt % | StdErr |
|---|---|---|---|---|---|---|---|---|
| Sum Be . . . F | 0 | 0.036 | 29 Cu | 99.84 | 0.03 | 51 Sb | < | |
| 11 Na | < | | 30 Zn | < | | 52 Te | < | |
| 12 Mg | < | | 31 Ga | 0.007 | 0.003 | 53 I | < | |
| 13 Al | < | | 32 Ge | <2e | 0.002 | 55 Cs | < | |
| 14 Si | < | | 33 As | < | | 56 Ba | < | |
| 15 P | < | | 34 Se | < | | Sum La . . . Lu | 0.053 | 0.071 |
| 16 S | 0.0089 | 0.0008 | 35 Br | < | | 72 Hf | <2e | 0.022 |
| 16 So | < | | 37 Rb | < | | 73 Ta | < | |
| 17 Cl | 0.017 | 0.001 | 38 Sr | < | | 74 W | < | |
| 18 Ar | < | | 39 Y | < | | 75 Re | < | |
| 19 K | <2e | 0.0007 | 40 Zr | < | | 76 Os | < | |
| 20 Ca | 0.0024 | 0.0009 | 41 Nb | < | | 77 Ir | 0.040 | 0.008 |
| 21 Sc | <2e | 0.001 | 42 Mo | 0.005 | 0.002 | 78 Pt | < | |
| 22 Ti | 0.003 | 0.001 | 44 Ru | < | | 79 Au | <2e | 0.006 |
| 23 V | < | | 45 Rh | < | | 80 Hg | <2e | 0.006 |
| 24 Cr | < | | 46 Pd | < | | 81 Tl | < | |
| 25 Mn | < | | 47 Ag | < | | 82 Pb | < | |
| 26 Fe | < | | 48 Cd | < | | 83 Bi | < | |
| 27 Co | < | | 49 In | < | | 90 Th | 0.009 | 0.003 |
| 28 Ni | < | | 50 Sn | < | | 92 U | < | |

| Light Elements | | | Noble Elements | | | Lanthanides | | |
|---|---|---|---|---|---|---|---|---|
| 4 Be | | | 44 Ru | < | | 57 La | 0.030 | 0.006 |
| 5 B | | | 45 Rh | < | | 58 Ce | < | |
| 6 C | | | 46 Pd | < | | 59 Pr | < | |
| 7 N | | | 47 Ag | < | | 60 Nd | < | |
| 8 O | | | 75 Re | < | | 62 Sm | < | |
| 9 F | < | | 76 Os | < | | 63 Eu | <2e | 0.002 |
| | | | 77 Ir | 0.040 | 0.008 | 64 Gd | <2e | 0.002 |
| | | | 78 Pt | < | | 65 Tb | <2e | 0.002 |
| | | | 79 Au | <2e | 0.006 | 66 Dy | < | |
| | | | | | | 67 Ho | <2e | 0.015 |
| | | | | | | 68 Er | 0.014 | 0.004 |
| | | | | | | 69 Tm | <2e | 0.004 |
| | | | | | | 70 Yb | < | |
| | | | | | | 71 Lu | <2e | 0.014 |
| KnownConc = 0 | | | REST = 0 | | | D/S = 0 | | |

Sum Conc's before normalisation to 100%: 99.5%

TABLE 4

XRF Analyses of Manufactured Ingols

| Atom No. | 14-00-01 Cu | | 14-00-03 Cu | | 14-00-04 Cu | | 15-00-001 Cu | | 14-01-01 Cu | | 14-01-04 NI | | 15-01-01 SI | |
|---|---|---|---|---|---|---|---|---|---|---|---|---|---|---|
| Element | Axial | Radial | Axial | Radial | Axial | Radial | Axial | Radial | Axial | Radial | Axial | Radial | Axial | Radial |
| Major Elements: | | | | | | | | | | | | | | |
| 11 Na | 0.063 | 0.11 | 0.039 | 0.23 | 0.07 | 0.062 | 0.048 | 0.93 | 0.046 | 0.065 | 0.031 | 0.12 | 0.004 | 0.013 |
| 13 Mg | | | | | | | | | | | | | | |
| 13 Al | 0.33 | 0.25 | 0.103 | 0.37 | 0.27 | 0.63 | 0.25 | 0.30 | 0.93 | 0.67 | 2.11 | 2.57 | 1.18 | 1.46 |
| 14 Si | 0.66 | 0.58 | 0.036 | 0.29 | 0.29 | 0.6 | 0.37 | 0.068 | 0.89 | 0.51 | 0.03 | 0.14 | 96.56 | 98.12 |

TABLE 4-continued

XRF Analyses of Manufactured Ingols

| | | | | | | | | | | | | | | |
|---|---|---|---|---|---|---|---|---|---|---|---|---|---|---|
| 19 K | | 0.0021 | | 0.013 | 0.0023 | | | 0.0053 | | | | 0.0048 | | 0.014 |
| 23 V | | | | | | | | | | | | | | |
| 24 Cr | | | | | | 0.002 | | | | | | | 0.0031 | 0.0025 |
| 25 Mn | | | | | | | | | | | | | | |
| 26 Fe | | | | | | | | | | | | | 0.065 | 0.012 |
| 27 Co | | | | | | | | | | | | | | |
| 28 Ni | | | | | | | | | | | 97.1 | 96.43 | 0.0051 | 0.0053 |
| 29 Cu | 98.88 | 98.84 | 99.69 | 96.93 | 99.29 | 96.59 | 89.21 | 99.38 | 98.07 | 98.09 | | | 0.012 | 0.0101 |
| 30 Zn | | | | | | | | | | | | | 0.0021 | 0.002 |
| 47 Ag | | | | 0.004 | | | | | | 0.004 | | | | |
| 50 Sn | | | | | | | | | | | | | | |
| 72 Hr | | | | | | | | | | | | | | 0.003 |
| 73 Ta | | | | | | | | | | | | | | |
| 74 W | | | | | | | | | | | | | 0.007 | 0.011 |
| 79 Au | | | | | | | | | | | | | | |
| 82 Po | | | | | | | | | | | | | | |
| Minor Elements | | | | | | | | | | | | | | |
| 4–9 Be-F | | 0.11 | | | | | | | 0.071 | | | | 0.059 | |
| 15 P | | | 0.004 | 0.004 | | | | | | | 0.002 | | 0.013 | 0.018 |
| 16 S | 0.0042 | 0.0065 | 0.0056 | 0.021 | | 0.012 | 0.0043 | 0.0035 | | | | | 0.013 | |
| 16+ So | | | | | 0.074 | | | | 0.0057 | 0.0026 | 0.0042 | 0.028 | | 0.14 |
| 17 Cl | 0.026 | 0.029 | 0.037 | 0.069 | 0.021 | 0.02 | 0.021 | 8.034 | 0.0107 | 0.0065 | | 9.005 | 0.004 | 0.019 |
| 18 Ar | 0.013 | 0.015 | 0.013 | 0.016 | 0.012 | 0.016 | 0.014 | 0.017 | 0.009 | 0.006 | | 0.01 | 0.013 | 0.012 |
| 20 Cs | | 0.0041 | 0.0048 | 0.017 | | 0.0109 | | 0.0025 | 0.0078 | | | 0.011 | 0.0092 | 0.077 |
| 21 Sc | | | | 0.0036 | | | 0.0021 | | | 0.004 | 0.0024 | | | |
| 22 Ti | | | 0.003 | | | 0.0037 | | | | | | | 0.019 | 0.029 |
| 31 Ga | 0.008 | | | 0.008 | | | 0.008 | 0.007 | 0.006 | 0.006 | | | 0.0038 | 0.0043 |
| 32 Ge | | | | | | | | | | | | 6.001 | | |
| 40 Zr | | | | | | 0.005 | | | | | 0.027 | 0.032 | | |
| 41 No | | | | | | | | | | | | | | |
| 42 Mo | | 0.005 | | | | | | | | | | | | |
| 44 Ru | | | | | | | | | | | | | | |
| 45 Rh | | | | | | | | | | | 0.005 | | | |
| 48 Cd | | | | | | | | | | | | | | |
| 51 Sb | | | | | | | | | | | | | | |
| 56 Ba | | | | | | | | | | | | 0.006 | 0.005 | |
| 57–71 Lathanides | 0.021 | 0.011 | 0.033 | 0.006 | 0.023 | 0.021 | 0.01 | 0.017 | 0.003 | 0.014 | 0.69 | 0.65 | 0.004 | 0.005 |
| 75 Rs | | | | | | | | | | | | | | |
| 77 Ir | | 0.018 | 0.031 | 0.029 | 0.026 | 0.035 | 0.036 | 0.031 | 0.025 | | | | | |
| 90 Th | | | | | | | | | | | | | | |
| Sum of Concentr. Before Normaliz | 100 | 99.5 | 82.4 | 90 | 99.5 | 88.1 | 82.7 | 94.5 | 101.7 | 102.1 | 101.4 | 100.5 | 83.4 | 79.7 |

| Atom No. | 15-01-02 Fe | | 14-01-05 Co | | 14-01-06 Au/Ag | | 15-01-04 W/T a/Hf | | 15-01-03 V/Cr/Mn/Fe | | 14-01-07 Pb/Zn/Sn | | 14-01-08 Sn/Na/K/Mg | |
|---|---|---|---|---|---|---|---|---|---|---|---|---|---|---|
| Element | Axial | Radial | Axial | Radial | Axial | Radial | Axial | Radial | Axial | Radial | Axial | Radial | Axial | Radial |
| Major Elements: | | | | | | | | | | | | | | |
| 11 Na | | 0.04 | 0.026 | 0.043 | 0.056 | 0.045 | 0.066 | 0.043 | 0.032 | 0.083 | | 0.016 | 1.07 | 2.82 |
| 13 Mg | | | | | | | | | | 0.013 | 0.17 | 2.08 | 0.85 | 1.04 |
| 13 Al | 1.89 | 2.96 | 4.9 | 3.71 | 0.013 | 0.017 | 3.57 | 3.38 | 2.28 | 4.5 | 0.026 | 0.018 | 1.53 | 1.69 |
| 14 Si | 0.032 | 0.14 | 0.073 | 0.18 | | | 0.23 | 0.74 | | 0.015 | | | 0.16 | 0.29 |
| 19 K | | | | | | 0.0025 | | | | 0.019 | | | | |
| 23 V | | | | | | | | | 2.38 | 2.26 | | | | |
| 24 Cr | | | | | | | | | 2.71 | 2.39 | | | | |
| 25 Mn | | | 0.0091 | 0.0081 | | | | | 2.05 | 2.2 | | | | |
| 26 Fe | 98.01 | 98.78 | 0.13 | 0.13 | | | | | 90.4 | 87.9 | | | 0.017 | 0.023 |
| 27 Co | | | 94.6 | 95.7 | | | | | | | | | 0.003 | |
| 28 Ni | | | 0.16 | 0.18 | | | 90.5 | 90 | 0.012 | | | 0.007 | 0.021 | 0.045 |
| 29 Cu | 0.012 | 0.814 | | | 96.97 | 97.04 | | | 0.025 | 0.16 | 0.014 | 0.24 | 0.079 | 0.44 |
| 30 Zn | | | | | | | | | 0.095 | 0.032 | 33.2 | 25.4 | | 0.009 |
| 47 Ag | | | | | 1.49 | 1.44 | | | | | | | | |
| 50 Sn | | | | | | | | | | | 47.9 | 54.7 | 96.6 | 93.6 |
| 72 Hr | | | 0.014 | | | | 1.78 | 2 | | 0.018 | | | | |
| 73 Ta | | | | | | | 1.76 | 1.78 | | | | | | |
| 74 W | 0.008 | | | | | | 1.49 | 1.5 | | 0.008 | 0.033 | | 0.031 | 0.046 |
| 79 Au | | | | | 1.37 | 1.33 | | | | | | | | |
| 82 Po | | | | | | | | | | | 18.3 | 18.9 | 0.087 | 0.063 |
| Minor | | | | | | | | | | | | | | |

TABLE 4-continued

XRF Analyses of Manufactured Ingols

Elements

4–9 Be-F

| | | | | | | | | | | | | | | |
|---|---|---|---|---|---|---|---|---|---|---|---|---|---|---|
| 15 P | 0.0033 | 0.0036 | 0.004 | 0.0037 | | | 0.0025 | | 0.0031 | 0.0097 | | | | 0.022 |
| 16 S | | | | | 0.0532 | 0.0066 | 0.0069 | 0.0053 | | | | | | |
| 16+ So | 0.0077 | 0.012 | | | | | | | 0.0092 | 0.048 | | 0.038 | 0.044 | 0.032 |
| 17 Cl | 0.004 | 0.0044 | 0.0047 | 0.0034 | 0.02 | 0.025 | 0.0044 | 0.0059 | 0.011 | 0.052 | 0.031 | 0.053 | 0.005 | 0.013 |
| 18 Ar | 0.012 | 0.913 | 0.011 | 0.01 | 0.014 | 0.011 | 0.018 | 0.019 | 0.009 | 0.01 | | | | |
| 20 Cs | 0.0053 | 0.0073 | 0.0075 | 0.0087 | 0.0023 | 0.006 | 0.0025 | | 0.006 | 0.051 | | | | |
| 21 Sc | 0.025 | 0.0026 | 0.0022 | 0.0033 | | | 0.0036 | 0.002 | | | | | 0.007 | |
| 22 Ti | | | | | | | | | | 0.003 | | | | |
| 31 Ga | | | | | 0.002 | | | | | | | | | |
| 32 Ge | | | | | | | | | | | | | | |
| 40 Zr | 0.0099 | 0.012 | 0.019 | 0.017 | 0.0074 | 0.008 | | | 0.045 | 0.097 | 0.016 | 0.024 | 0.047 | 0.043 |
| 41 No | | | | | | | | | | | | | | |
| 42 Mo | | | | | | | | | | | | | | |
| 44 Ru | | | | | | | | | | | 0.011 | | | |
| 45 Rh | | | | | | | | | | | | | | |
| 48 Cd | | | 0.003 | | | | | | | 0.025 | 0.014 | 0.041 | 0.029 | |
| 51 Sb | | | | | | | | | | | 0.015 | 0.023 | | |
| 56 Ba | | | 0.006 | | | | | | | | | | | |
| 57–71 Lathanides | | | 0.02 | 0.02 | 0.012 | 0.003 | 0.58 | 0.57 | | | 0.031 | 0.035 | 0.021 | 0.025 |
| 75 Rs | | | | | 0.021 | | | | | | | | | |
| 77 Ir | | | | | 0.025 | 0.038 | | | | | | | | |
| 90 Th | 0.008 | | | | | | | | 0.085 | 0.006 | | | | |
| Sum of Concentr. Before Normaliz | 96.5 | 97.3 | 102 | 101.3 | 101.1 | 100.1 | 101 | 101.9 | 100.1 | 99.9 | 111.4 | 115.8 | 97.8 | 98.1 |

TABLE 5

Quantum Catalytics, LLC ANALYSIS REPORT by Uniquant

OLD.347 of Jun. 19, 2001  Today Jun. 19, 2001
Spectrometers configuration: ARL 8410 Rh 60 kV LiF220 LiF420 Ge111 TlAP
Sample ident = 14-01-01  AXIAL
Further info = 14-01-01  AXIAL 6/19
Kappa list = Nov. 15, 1994  Channel list = 18-Jun. 18, 2001
Calculated as: Elements  Spectral impurity data: CAL.909 Teflon (7/94)
X-ray path = Vacuum  Film type = No supporting film
Case number = 0  Known Area, % Rest, Diluent/Sample and Mass/Area
Eff. Diam. = 25.00 mm  Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + E1 means involved in Sum = 100%

| Z | wt % | StdErr | Z | wt % | StdErr | Z | wt % | StdErr |
|---|---|---|---|---|---|---|---|---|
| Sum Be . . . F | 0 | 0.034 | 29 + Cu | 98.07 | 0.07 | 51 Sb | < | |
| 11 + Na | 0.046 | 0.009 | 30 + Zn | < | | 52 Te | < | |
| 12 Mg | < | | 31 + Ga | 0.006 | 0.003 | 53 I | < | |
| 13 + Al | 0.93 | 0.04 | 32 Ge | < | | 55 Cs | < | |
| 14 + Si | 0.89 | 0.04 | 33 As | < | | 56 Ba | <2e | 0.003 |
| 15 + P | < | | 34 Se | < | | Sum La . . . Lu | 0.003 | 0.058 |
| 16 S | | | 35 Br | < | | 72 + Hf | < | |
| 16 + So | 0.0087 | 0.0008 | 37 Rb | < | | 73 + Ta | < | |
| 17 + Cl | 0.0107 | 0.0010 | 38 Sr | < | | 74 W | < | |
| 18 + Ar | 0.009 | 0.002 | 39 Y | < | | 75 Re | < | |
| 19 K | < | | 40 Zr | < | | 76 Os | < | |
| 20 + Ca | 0.0078 | 0.0008 | 41 Nb | < | | 77 + Ir | 0.025 | 0.008 |
| 21 Sc | < | | 42 Mo | < | | 78 Pt | <2e | 0.007 |
| 22 Ti | < | | 44 Ru | < | | 79 Au | < | |
| 23 V | < | | 45 Rh | <2e | 0.002 | 80 Hg | <2e | 0.006 |
| 24 Cr | < | | 46 Pd | < | | 81 Tl | < | |
| 25 Mn | < | | 47 Ag | <2e | 0.002 | 82 Pb | <2e | 0.003 |
| 26 Fe | < | | 48 Cd | < | | 83 Bi | < | |
| 27 Co | < | | 49 In | < | | 90 Th | <2e | 0.003 |

TABLE 5-continued

Quantum Catalytics, LLC ANALYSIS REPORT by Uniquant

| | | | | | | |
|---|---|---|---|---|---|---|
| 28 Ni | < | 50 Sn | < | 92 U | < | |

| Light Elements | | Noble Elements | | | Lanthanides | | |
|---|---|---|---|---|---|---|---|
| 4 Be | | 44 Ru | < | | 57 La | < | |
| 5 B | | 45 Rh | <2e | 0.002 | 58 Ce | < | |
| 6 C | | 46 Pd | < | | 59 Pr | < | |
| 7 N | | 47 Ag | <2e | 0.002 | 60 Nd | < | |
| 8 O | | 75 Re | < | | 62 Sm | < | |
| 9 F | < | 76 Os | < | | 63 Eu | <2e | 0.001 |
| | | 77 + Ir | 0.025 | 0.008 | 64 Gd | < | |
| | | 78 Pt | <2e | 0.007 | 65 Tb | < | |
| | | 79 Au | < | | 66 Dy | < | |
| | | | | | 67 Ho | < | |
| | | | | | 68 Br | < | |
| | | | | | 69 Tm | < | |
| | | | | | 70 Yb | < | |
| | | | | | 71 + Lu | < | |
| KnownConc = 0 | | REST = 0 | | | D/S = 0 | | |

Sum Conc's before normalisation to 100%: 101.7%

TABLE 6

Quantum Catalytics, LLC ANALYSIS REPORT by Uniquant

OLD.346 of Jun. 19, 2001                                    Today Jun. 19, 2001
Spectrometers configuration: ARL 8410 Rh 60 kv LiF220 LiF420 Ge111 TlAP
Sample ident = 14-01-01        RADIAL
Further info = 14-01-01        RADIAL 6/19
Kappa list = Nov. 15, 1994     Channel list = Jun. 18, 2001
Calculated as: Elements        Spectral impurity data: CAL.909 Teflon (7/94)
X-ray path = Vacuum            Film type = No supporting film
Case number = 0                Known Area, % Rest, Diluent/Sample and Mass/Area
Eff. Diam. = 25.00 mm          Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0.071 | 0.036 | 29 + Cu | 98.69 | 0.06 | 51 Sb | < | |
| 11 + Na | 0.068 | 0.009 | 30 + Zn | < | | 52 Te | < | |
| 12 Mg | < | | 31 + Ga | 0.006 | 0.003 | 53 I | < | |
| 13 + Al | 0.67 | 0.03 | 32 Ge | < | | 55 Cs | < | |
| 14 + Si | 0.51 | 0.03 | 33 As | < | | 56 Ba | < | |
| 15 + P | < | | 34 Se | < | | Sum La . . . Lu | 0.014 | 0.062 |
| 16 S | | | 35 Br | < | | 72 + Hf | < | |
| 16 + So | 0.0026 | 0.0004 | 37 Rb | < | | 73 + Ta | < | |
| 17 + Cl | 0.0065 | 0.0009 | 38 Sr | < | | 74 W | < | |
| 18 + Ar | 0.006 | 0.001 | 39 Y | < | | 75 Re | < | |
| 19 K | < | | 40 Zr | < | | 76 Os | < | |
| 20 Ca | < | | 41 Nb | < | | 77 + Ir | <2e | 0.008 |
| 21 + Sc | 0.0040 | 0.0007 | 42 + Mo | 0.005 | 0.002 | 78 Pt | < | |
| 22 Ti | < | | 44 Ru | <2e | 0.002 | 79 Au | <2e | 0.007 |
| 23 V | < | | 45 Rh | < | | 80 Hg | < | |
| 24 + Cr | < | | 46 Pd | < | | 81 Tl | < | |
| 25 Mn | < | | 47 + Ag | 0.004 | 0.002 | 82 Pb | < | |
| 26 Fe | < | | 48 Cd | < | | 83 Bi | < | |
| 27 + Co | < | | 49 In | < | | 90 Th | <2e | 0.003 |
| 28 Ni | < | | 50 Sn | < | | 92 U | < | |

| Light Elements | | Noble Elements | | | Lanthanides | | |
|---|---|---|---|---|---|---|---|
| 4 Be | | 44 Ru | <2e | 0.002 | 57 La | < | |
| 5 B | | 45 Rh | < | | 58 Ce | < | |
| 6 C | | 46 Pd | < | | 59 Pr | < | |
| 7 N | | 47 + Ag | 0.004 | 0.002 | 60 Nd | < | |
| 8 O | | 75 Re | < | | 62 Sm | < | |
| 9 F | <2e | 0.036 | 76 Os | < | | 63 Eu | < | |

TABLE 6-continued

Quantum Catalytics, LLC ANALYSIS REPORT by Uniquant

| | | | | | | |
|---|---|---|---|---|---|---|
| 77 + Ir | <2e | 0.008 | 64 Gd | < | | |
| 78 Pt | < | | 65 Tb | < | | |
| 79 Au | <2e | 0.007 | 66 Dy | < | | |
| | | | 67 Ho | < | | |
| | | | 68 + Er | 0.012 | 0.003 | |
| | | | 69 Tm | < | | |
| | | | 70 Yb | < | | |
| | | | 71 + Lu | < | | |

KnownConc = 0    REST = 0    D/S = 0

Sum Conc's before normalisation to 100%: 102.1%

TABLE 7

Quantum Catalytics, LLC ANALYSIS REPORT by Uniquant

OLD.236 of Apr. 23, 2001                                    Today Apr. 23, 2001
Spectrometers configuration: ARL 8410 Rh 60 kV LiF220 LiF420 Ge111 TlAP
Sample ident = 14-01-01          Cu SECTION TOP
Further info = 14-01-01          MIDDLE SECTION TOP FACE AXIAL
Kappa list = Nov. 15, 1994       Channel list = Apr. 19, 2001
Calculated as: Elements          Spectral impurity data: CAL.909 Teflon (7/94)
X-ray path = Vacuum              Film type = No supporting film
Case number = 0                  Known Area, % Rest, Diluent/Sample and Mass/Area
Eff. Diam. = 25.00 mm            Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.037 | 29 + Cu | 99.71 | 0.03 | 51 Sb | < | |
| 11 + Na | 0.098 | 0.011 | 30 + Zn | < | | 52 Te | < | |
| 12 Mg | <2e | 0.004 | 31 Ga | <2e | 0.003 | 53 I | < | |
| 13 + Al | 0.066 | 0.005 | 32 Ge | < | | 55 + Cs | 0.007 | 0.003 |
| 14 Si | < | | 33 As | < | | 56 Ba | < | |
| 15 + P | < | | 34 Se | < | | Sum La . . . Lu | 0.024 | 0.074 |
| 16 + S | 0.014 | 0.001 | 35 Br | < | | 72 + Hf | < | |
| 16 So | | | 37 Rb | < | | 73 + Ta | < | |
| 17 + Cl | 0.028 | 0.002 | 38 Sr | < | | 74 W | < | |
| 18 + Ar | 0.019 | 0.002 | 39 Y | < | | 75 Re | < | |
| 19 + K | 0.0021 | 0.0007 | 40 Zr | < | | 76 Os | < | |
| 20 + Ca | < | | 41 Nb | < | | 77 + Ir | 0.024 | 0.008 |
| 21 Sc | < | | 42 Mo | < | | 78 Pt | < | |
| 22 + Ti | 0.0021 | 0.0009 | 44 Ru | < | | 79 Au | < | |
| 23 V | < | | 45 Rh | < | | 80 Hg | < | |
| 24 Cr | < | | 46 Pd | < | | 81 Tl | < | |
| 25 Mn | < | | 47 Ag | < | | 82 Pb | < | |
| 26 Fe | < | | 48 + Cd | 0.004 | 0.002 | 83 Bi | < | |
| 27 Co | < | | 49 In | < | | 90 + Th | 0.007 | 0.003 |
| 28 Ni | < | | 50 Sn | < | | 92 U | < | |

| Light Elements | | Noble Elements | | | Lanthanides | | |
|---|---|---|---|---|---|---|---|
| 4 Be | | 44 Ru | < | | 57 + La | 0.015 | 0.004 |
| 5 B | | 45 Rh | < | | 58 Ce | < | |
| 6 C | | 46 Pd | < | | 59 Pr | < | |
| 7 N | | 47 Ag | < | | 60 Nd | < | |
| 8 O | | 75 Re | < | | 62 Sm | < | |
| 9 F | < | 76 Os | < | | 63 Eu | < | |
| | | 77 + Ir | 0.024 | 0.008 | 64 Gd | <2e | 0.002 |
| | | 78 Pt | < | | 65 Tb | < | |
| | | 79 Au | < | | 66 Dy | < | |
| | | | | | 67 Ho | < | |
| | | | | | 68 Er | <2e | 0.004 |

TABLE 7-continued

Quantum Catalytics, LLC ANALYSIS REPORT by Uniquant

|   |   |   |
|---|---|---|
| 69 Tm | <2e | 0.005 |
| 70 Yb | < | |
| 71 + Lu | < | |
| KnownConc = 0 | REST = 0 | D/S = 0 |

Sum Conc's before normalisation to 100%: 102.7%

TABLE 8

Quantum Catalytics, LLC ANALYSIS REPORT by Uniquant

OLD.244 of Apr. 19, 2001      Today Apr. 24, 2001
Spectrometers configuration: ARL 8410 Rh 60 kV LiF220 LiF420 Ge111 TlAP
Sample ident = 14-01-01    MID BOTTOM FACE
Further info = 14-01-01    MIDDLE SECTION BOTTOM FCE AXIAL
Kappa list = Nov. 15, 1994    Channel list = Apr. 19, 2001
Calculated as: Elements    Spectral impurity data: CAL.909 Teflon (7/94)
X-ray path = Vacuum    Film type = No supporting film
Case number = 0    Known Area, % Rest, Diluent/Sample and Mass/Area
Eff. Diam. = 25.00 mm    Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.037 | 29 + Cu | 98.42 | 0.06 | 51 Sb | < | |
| 11 + Na | 0.21 | 0.01 | 30 + Zn | < | | 52 Te | < | |
| 12 + Mg | 0.013 | 0.004 | 31 + Ga | 0.006 | 0.003 | 53 I | < | |
| 13 + Al | 0.80 | 0.04 | 32 Ge | < | | 55 Cs | < | |
| 14 + Si | 0.34 | 0.02 | 33 As | < | | 56 Ba | <2e | 0.003 |
| 15 + P | < | | 34 Se | < | | Sum La . . . Lu | 0.018 | 0.071 |
| 16 + S | 0.031 | 0.003 | 35 Br | < | | 72 + Hf | <2e | 0.022 |
| 16 So | | | 37 Rb | < | | 73 + Ta | < | |
| 17 + Cl | 0.070 | 0.006 | 38 + Sr | 0.0024 | 0.0010 | 74 W | < | |
| 18 + Ar | 0.019 | 0.002 | 39 Y | < | | 75 Re | < | |
| 19 + K | 0.020 | 0.002 | 40 Zr | < | | 76 Os | <2e | 0.006 |
| 20 + Ca | 0.012 | 0.001 | 41 Nb | < | | 77 + Ir | 0.033 | 0.008 |
| 21 Sc | < | | 42 + Mo | <2e | 0.002 | 78 Pt | < | |
| 22 + Ti | 0.003 | 0.001 | 44 Ru | < | | 79 Au | <2e | 0.006 |
| 23 V | < | | 45 Rh | <2e | 0.002 | 80 Hg | <2e | 0.006 |
| 24 Cr | < | | 46 Pd | < | | 81 Tl | < | |
| 25 Mn | < | | 47 Ag | < | | 82 + Pb | 0.009 | 0.003 |
| 26 Fe | <2e | 0.001 | 48 + Cd | 0.004 | 0.002 | 83 Bi | < | |
| 27 + Co | < | | 49 In | < | | 90 Th | < | |
| 28 Ni | < | | 50 Sn | < | | 92 U | < | |

| Light Elements | | | Noble Elements | | | Lanthanides | | |
|---|---|---|---|---|---|---|---|---|
| 4 Be | | | 44 Ru | < | | 57 La | <2e | 0.005 |
| 5 B | | | 45 Rh | <2e | 0.002 | 58 Ce | < | |
| 6 C | | | 46 Pd | < | | 59 Pr | < | |
| 7 N | | | 47 Ag | < | | 60 Nd | < | |
| 8 O | | | 75 Re | < | | 62 Sm | < | |
| 9 F | < | | 76 Os | <2e | 0.006 | 63 Eu | <2e | 0.002 |
| | | | 77 + Ir | 0.033 | 0.008 | 64 Gd | < | |
| | | | 78 Pt | < | | 65 Tb | < | |
| | | | 79 Au | <2e | 0.006 | 66 Dy | < | |
| | | | | | | 67 Ho | < | |
| | | | | | | 68 + Er | 0.013 | 0.004 |
| | | | | | | 69 Tm | < | |

TABLE 8-continued

Quantum Catalytics, LLC ANALYSIS REPORT by Uniquant

|  |  |  |
|---|---|---|
|  | 70 Yb | < |
|  | 71 + Lu | < |
| KnownConc = 0 | REST = 0 | D/S = 0 |

Sum Conc's before normalisation to 100%: 103.1%

TABLE 9

Quantum Catalytics, LLC ANALYSIS REPORT by Uniquant

OLD.252 of Apr. 19, 2001  Today Apr. 25, 2001
Spectrometers configuration: ARL 8410 Rh 60 kV LiF220 LiF420 Ge111 TlAP
Sample ident = 14-01-01  MID SECT TOP FAC
Further info = 14-01-01  MIDDLE SECTION TOP FACE 4/25/01
Kappa list = Nov. 15, 1994  Channel list = Apr. 19, 2001
Calculated as: Elements  Spectral impurity data: CAL.909 Teflon (7/94)
X-ray path = Vacuum  Film type = No supporting film
Case number = 0  Known Area, % Rest, Diluent/Sample and Mass/Area
Eff. Diam. = 25.00 mm  Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.038 | 29 + Cu | 99.66 | 0.03 | 51 Sb | < |  |
| 11 + Na | 0.034 | 0.011 | 30 + Zn | < |  | 52 Te | < |  |
| 12 Mg | < |  | 31 Ga | <2e | 0.003 | 53 I | < |  |
| 13 + Al | 0.15 | 0.01 | 32 Ge | < |  | 55 Cs | < |  |
| 14 + Si | 0.033 | 0.005 | 33 As | <2e | 0.004 | 56 Ba | <2e | 0.003 |
| 15 + P | < |  | 34 Se | < |  | Sum La . . . Lu | 0.026 | 0.075 |
| 16 + S | 0.017 | 0.002 | 35 Br | < |  | 72 + Hf | < |  |
| 16 So |  |  | 37 Rb | < |  | 73 + Ta | < |  |
| 17 + Cl | 0.027 | 0.002 | 38 + Sr | 0.003 | 0.001 | 74 W | < |  |
| 18 + Ar | 0.017 | 0.002 | 39 Y | < |  | 75 Re | < |  |
| 19 + K | 0.0021 | 0.0007 | 40 Zr | < |  | 76 Os | <2e | 0.007 |
| 20 + Ca | 0.0056 | 0.0007 | 41 Nb | < |  | 77 + Ir | 0.026 | 0.008 |
| 21 Sc | < |  | 42 Mo | < |  | 78 Pt | < |  |
| 22 + Ti | 0.0023 | 0.0010 | 44 Ru | < |  | 79 Au | < |  |
| 23 V | < |  | 45 Rh | < |  | 80 Hg | < |  |
| 24 Cr | < |  | 46 Pd | < |  | 81 Tl | < |  |
| 25 Mn | < |  | 47 Ag | < |  | 82 Pb | < |  |
| 26 Fe | < |  | 48 Cd | < |  | 83 Bi | <2e | 0.005 |
| 27 Co | < |  | 49 In | < |  | 90 Th | <2e | 0.003 |
| 28 Ni | < |  | 50 Sn | < |  | 92 U | < |  |

| Light Elements | | Noble Elements | | | Lanthanides | | |
|---|---|---|---|---|---|---|---|
| 4 Be |  | 44 Ru | < |  | 57 + La | 0.021 | 0.004 |
| 5 B |  | 45 Rh | < |  | 58 Ce | < |  |
| 6 C |  | 46 Pd | < |  | 59 Pr | < |  |
| 7 N |  | 47 Ag | < |  | 60 Nd | < |  |
| 8 O |  | 75 Re | < |  | 62 Sm | < |  |
| 9 F | < | 76 Os | <2e | 0.007 | 63 Eu | < |  |
|  |  | 77 + Ir | 0.026 | 0.008 | 64 Gd | < |  |
|  |  | 78 Pt | < |  | 65 Tb | < |  |
|  |  | 79 Au | < |  | 66 Dy | < |  |
|  |  |  |  |  | 67 Ho | < |  |
|  |  |  |  |  | 68 Er | < |  |
|  |  |  |  |  | 69 Tm | <2e | 0.005 |
|  |  |  |  |  | 70 Yb | < |  |
|  |  |  |  |  | 71 + Lu | < |  |
| KnownConc = 0 | | REST = 0 | | | D/S = 0 | | |

Sum Conc's before normalisation to 100%: 102.6%

TABLE 10

Quantum Catalytics, LLC ANALYSIS REPORT by Uniquant

| | |
|---|---|
| OLD.255 of Apr. 19, 2001 | Today Apr. 25, 2001 |
| Spectrometers configuration: | ARL 8410 Rh 60 kV LiF220 LiF420 Ge111 TlAP |
| Sample ident = 14-01-01 | MID SECT TOP FAC |
| Further info = 14-01-01 | MIDDLE SECTION TOP FACE 4/25/01 |
| Kappa list = Nov. 15, 1994 | Channel list = Apr. 19, 2001 |
| Calculated as: Elements | Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.035 | 29 + Cu | 99.70 | 0.03 | 51 Sb | < | |
| 11 + Na | <2e | 0.011 | 30 + Zn | < | | 52 Te | < | |
| 12 Mg | < | | 31 Ga | <2e | 0.003 | 53 I | < | |
| 13 + Al | 0.14 | 0.01 | 32 Ge | < | | 55 Cs | < | |
| 14 + Si | 0.028 | 0.006 | 33 As | < | | 56 Ba | < | |
| 15 + P | < | | 34 Se | < | | Sum La . . . Lu | 0.019 | 0.075 |
| 16 + S | 0.018 | 0.002 | 35 Br | < | | 72 + Hf | < | |
| 16 So | | | 37 Rb | < | | 73 + Ta | < | |
| 17 + Cl | 0.028 | 0.002 | 38 Sr | < | | 74 W | < | |
| 18 + Ar | 0.020 | 0.002 | 39 Y | < | | 75 Re | < | |
| 19 + K | 0.0033 | 0.0007 | 40 Zr | < | | 76 Os | < | |
| 20 + Ca | 0.0058 | 0.0007 | 41 Nb | < | | 77 + Ir | 0.021 | 0.008 |
| 21 Sc | < | | 42 Mo | < | | 78 Pt | <2e | 0.008 |
| 22 + Ti | 0.0028 | 0.0009 | 44 Ru | < | | 79 Au | < | |
| 23 V | < | | 45 Rh | < | | 80 Hg | <2e | 0.006 |
| 24 Cr | < | | 46 Pd | < | | 81 Tl | < | |
| 25 Mn | < | | 47 Ag | <2e | 0.002 | 82 Pb | < | |
| 26 Fe | < | | 48 Cd | < | | 83 Bi | < | |
| 27 Co | < | | 49 In | < | | 90 Th | 0.006 | 0.003 |
| 28 Ni | < | | 50 Sn | < | | 92 U | < | |

| Light Elements | | | Noble Elements | | | Lanthanides | | |
|---|---|---|---|---|---|---|---|---|
| 4 Be | | | 44 Ru | < | | 57 + La | 0.016 | 0.003 |
| 5 B | | | 45 Rh | < | | 58 Ce | < | |
| 6 C | | | 46 Pd | < | | 59 Pr | < | |
| 7 N | | | 47 Ag | <2e | 0.002 | 60 Nd | < | |
| 8 O | | | 75 Re | < | | 62 Sm | < | |
| 9 F | < | | 76 Os | < | | 63 Eu | < | |
| | | | 77 + Ir | 0.021 | 0.008 | 64 Gd | < | |
| | | | 78 Pt | <2e | 0.008 | 65 Tb | < | |
| | | | 79 Au | < | | 66 Dy | < | |
| | | | | | | 67 Ho | < | |
| | | | | | | 68 Er | < | |
| | | | | | | 69 Tm | <2e | 0.005 |
| | | | | | | 70 Yb | < | |
| | | | | | | 71 + Lu | < | |
| KnownConc = 0 | | | REST = 0 | | | D/S = 0 | | |

Sum Conc's before normalisation to 100%: 102.5%

TABLE 11

Quantum Catalytics, LLC ANALYSIS REPORT by Uniquant

| | |
|---|---|
| OLD.259 of Apr. 19, 2001 | Today Apr. 26, 2001 |
| Spectrometers configuration: | ARL 8410 Rh 60 kV LiF220 LiF420 Ge111 TlAP |
| Sample ident = 14-01-01 | BOT BOTTOM |
| Further info = 14-01-01 | MIDDLE SECTION BOT FACE 4/25/01 |
| Kappa list = Nov. 15, 1994 | Channel list = Apr. 19, 2001 |
| Calculated as: Elements | Spectral impurity data : CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |

TABLE 11-continued

Quantum Catalytics, LLC ANALYSIS REPORT by Uniquant

Dil/Sample = 0
Viewed Mass = 18000.00 mg
Sample Height = 5 mm

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.037 | 29 + Cu | 98.53 | 0.06 | 51 Sb | < | |
| 11 + Na | 0.14 | 0.01 | 30 + Zn | < | | 52 Te | < | |
| 12 Mg | <2e | 0.004 | 31 Ga | <2e | 0.003 | 53 I | < | |
| 13 + Al | 0.78 | 0.04 | 32 Ge | < | | 55 Cs | < | |
| 14 + Si | 0.35 | 0.02 | 33 As | < | | 56 Ba | < | |
| 15 + P | < | | 34 Se | < | | Sum La . . . Lu | 0.024 | 0.071 |
| 16 S | | | 35 Br | < | | 72 + Hf | < | |
| 16 + So | 0.032 | 0.003 | 37 Rb | < | | 73 + Ta | < | |
| 17 + Cl | 0.061 | 0.005 | 38 Sr | < | | 74 W | < | |
| 18 + Ar | 0.018 | 0.002 | 39 Y | < | | 75 Re | < | |
| 19 + K | 0.021 | 0.002 | 40 Zr | < | | 76 Os | < | |
| 20 + Ca | 0.013 | 0.001 | 41 Nb | < | | 77 + Ir | 0.026 | 0.008 |
| 21 Sc | < | | 42 Mo | < | | 78 Pt | < | |
| 22 Ti | <2e | 0.001 | 44 Ru | < | | 79 Au | < | |
| 23 V | < | | 45 Rh | < | | 80 Hg | <2e | 0.006 |
| 24 Cr | < | | 46 Pd | < | | 81 Tl | < | |
| 25 + Mn | < | | 47 Ag | < | | 82 + Pb | 0.007 | 0.003 |
| 26 + Fe | 0.003 | 0.001 | 48 Cd | < | | 83 Bi | < | |
| 27 Co | < | | 49 In | < | | 90 Th | <2e | 0.003 |
| 28 Ni | < | | 50 Sn | < | | 92 U | < | |

| Light Elements | | Noble Elements | | | Lanthanides | | |
|---|---|---|---|---|---|---|---|
| 4 Be | | 44 Ru | < | | 57 La | <2e | 0.004 |
| 5 B | | 45 Rh | < | | 58 Ce | < | |
| 6 C | | 46 Pd | < | | 59 Pr | < | |
| 7 N | | 47 Ag | < | | 60 Nd | < | |
| 8 O | | 75 Re | < | | 62 Sm | < | |
| 9 F | < | 76 Os | < | | 63 + Eu | 0.005 | 0.002 |
| | | 77 + Ir | 0.026 | 0.008 | 64 Gd | <2e | 0.002 |
| | | 78 Pt | < | | 65 Tb | < | |
| | | 79 Au | < | | 66 Dy | < | |
| | | | | | 67 Ho | < | |
| | | | | | 68 + Er | 0.012 | 0.004 |
| | | | | | 69 Tm | < | |
| | | | | | 70 Yb | < | |
| | | | | | 71 + Lu | < | |
| KnownConc = 0 | | REST = 0 | | | D/S = 0 | | |

Sum Conc's before normalisation to 100%: 102.9%

TABLE 12

Quantum Catalytics, LLC ANALYSIS REPORT by Uniquant

OLD.260 of Apr. 19, 2001      Today Apr. 26, 2001
Spectrometers configuration: ARL 8410 Rh 60 kV LiF220 LiF420 Ge111 TlAP
Sample ident = 14-01-01      BOT BOTTOM
Further info = 14-01-01      MID SECT BOT FACE 4/25/01 BTB
Kappa list = Nov. 15, 1994      Channel list = Apr. 19, 2001
Calculated as: Elements      Spectral impurity data : CAL.909 Teflon (7/94)
X-ray path = Vacuum      Film type = No supporting film
Case number = 0      Known Area, % Rest, Diluent/Sample and Mass/Area
Eff. Diam. = 25.00 mm      Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.036 | 29 + Cu | 98.55 | 0.06 | 51 Sb | < | |
| 11 + Na | 0.12 | 0.01 | 30 + Zn | < | | 52 Te | < | |
| 12 Mg | <2e | 0.004 | 31 + Ga | 0.010 | 0.003 | 53 I | < | |
| 13 + Al | 0.77 | 0.04 | 32 Ge | <2e | 0.002 | 55 + Cs | 0.006 | 0.003 |

TABLE 12-continued

Quantum Catalytics, LLC ANALYSIS REPORT by Uniquant

| Z | wt % | StdErr | Z | wt % | StdErr | Z | wt % | StdErr |
|---|---|---|---|---|---|---|---|---|
| 14 + Si | 0.34 | 0.02 | 33 As | <2e | 0.004 | 56 Ba | 0.006 | 0.003 |
| 15 + P | < | | 34 Se | < | | Sum La . . . Lu | 0.013 | 0.071 |
| 16 + S | 0.034 | 0.003 | 35 Br | < | | 72 + Hf | <2e | 0.022 |
| 16 So | | | 37 Rb | < | | 73 + Ta | < | |
| 17 + Cl | 0.064 | 0.005 | 38 Sr | < | | 74 W | < | |
| 18 + Ar | 0.018 | 0.002 | 39 Y | < | | 75 Re | < | |
| 19 + K | 0.021 | 0.002 | 40 Zr | < | | 76 Os | <2e | 0.007 |
| 20 + Ca | 0.014 | 0.001 | 41 Nb | < | | 77 + Ir | 0.018 | 0.007 |
| 21 Sc | < | | 42 Mo | <2e | 0.002 | 78 Pt | < | |
| 22 Ti | < | | 44 Ru | < | | 79 + Au | 0.014 | 0.007 |
| 23 V | < | | 45 Rh | < | | 80 Hg | <2e | 0.006 |
| 24 Cr | < | | 46 Pd | < | | 81 Tl | < | |
| 25 Mn | < | | 47 Ag | <2e | 0.002 | 82 Pb | <2e | 0.003 |
| 26 Fe | <2e | 0.001 | 48 Cd | < | | 83 + Bi | 0.013 | 0.005 |
| 27 Co | < | | 49 In | < | | 90 Th | <2e | 0.003 |
| 28 Ni | < | | 50 Sn | < | | 92 U | < | |

| Light Elements | | Noble Elements | | | Lanthanides | | |
|---|---|---|---|---|---|---|---|
| 4 Be | | 44 Ru | < | | 57 + La | <2e | 0.005 |
| 5 B | | 45 Rh | < | | 58 Ce | <2e | 0.002 |
| 6 C | | 46 Pd | < | | 59 Pr | < | |
| 7 N | | 47 Ag | <2e | 0.002 | 60 Nd | < | |
| 8 O | | 75 Re | < | | 62 Sm | < | |
| 9 F | < | 76 Os | <2e | 0.007 | 63 Eu | < | |
| | | 77 + Ir | 0.018 | 0.007 | 64 Gd | < | |
| | | 78 Pt | < | | 65 Tb | <2e | 0.002 |
| | | 79 + Au | 0.014 | 0.007 | 66 Dy | < | |
| | | | | | 67 Ho | < | |
| | | | | | 68 Er | < | |
| | | | | | 69 Tm | < | |
| | | | | | 70 Yb | < | |
| | | | | | 71 + Lu | < | |
| KnownConc = 0 | | REST = 0 | | | D/S = 0 | | |

Sum Conc's before normalisation to 100%: 103.1%

TABLE 13

Quantum Catalytics, LLC ANALYSIS REPORT by Uniquant

| | |
|---|---|
| OLD.261 of Apr. 19, 2001 | Today Apr. 26, 2001 |
| Spectrometers configuration: | ARL 8410 Rh 60 kV LiF220 LiF420 Ge111 TlAP |
| Sample ident = 14-01-01 | BOT BOTTOM |
| Further info = 14-01-01 | MID SECT BOT FACE 4/25/01 3 HR |
| Kappa list = Nov. 15, 1994 | Channel list = Apr. 19, 2001 |
| Calculated as: Elements | Spectral impurity data : CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.038 | 29 + Cu | 98.50 | 0.06 | 51 Sb | < | |
| 11 + Na | 0.15 | 0.01 | 30 + Zn | < | | 52 Te | < | |
| 12 + Mg | 0.014 | 0.004 | 31 + Ga | 0.009 | 0.003 | 53 I | < | |
| 13 + Al | 0.79 | 0.04 | 32 Ge | < | | 55 Cs | < | |
| 14 + Si | 0.35 | 0.02 | 33 As | < | | 56 Ba | < | |
| 15 + P | < | | 34 Se | < | | Sum La . . . Lu | 0.016 | 0.071 |
| 16 + S | 0.036 | 0.003 | 35 Br | < | | 72 + Hf | < | |
| 16 So | | | 37 Rb | < | | 73 + Ta | < | |
| 17 + Cl | 0.062 | 0.005 | 38 Sr | < | | 74 W | < | |
| 18 + Ar | 0.018 | 0.002 | 39 Y | < | | 75 Re | < | |
| 19 + K | 0.020 | 0.002 | 40 Zr | < | | 76 Os | < | |
| 20 + Ca | 0.0108 | 0.0010 | 41 Nb | < | | 77 + Ir | 0.016 | 0.007 |
| 21 + Sc | 0.0020 | 0.0009 | 42 Mo | < | | 78 Pt | <2e | 0.007 |
| 22 + Ti | <2e | 0.001 | 44 Ru | < | | 79 Au | < | |
| 23 V | < | | 45 Rh | < | | 80 Hg | <2e | 0.006 |

TABLE 13-continued

Quantum Catalytics, LLC ANALYSIS REPORT by Uniquant

| | | | | | | | | |
|---|---|---|---|---|---|---|---|---|
| 24 Cr | < | | 46 Pd | < | | 81 Tl | < | |
| 25 Mn | < | | 47 Ag | <2e | 0.002 | 82 Pb | 0.006 | 0.003 |
| 26 Fe | <2e | 0.001 | 48 + Cd | 0.004 | 0.002 | 83 Bi | < | |
| 27 + Co | < | | 49 In | < | | 90 Th | <2e | 0.003 |
| 28 Ni | < | | 50 Sn | < | | 92 U | < | |

| Light Elements | | Noble Elements | | | Lanthanides | | |
|---|---|---|---|---|---|---|---|
| 4 Be | | 44 Ru | < | | 57 La | <2e | 0.004 |
| 5 B | | 45 Rh | < | | 58 Ce | < | |
| 6 C | | 46 Pd | < | | 59 Pr | < | |
| 7 N | | 47 Ag | <2e | 0.002 | 60 Nd | < | |
| 8 O | | 75 Re | < | | 62 Sm | < | |
| 9 F | < | 76 Os | < | | 63 Eu | < | |
| | | 77 + Ir | 0.016 | 0.007 | 64 Gd | < | |
| | | 78 Pt | <2e | 0.007 | 65 Tb | < | |
| | | 79 Au | < | | 66 Dy | < | |
| | | | | | 67 Ho | < | |
| | | | | | 68 + Er | 0.013 | 0.004 |
| | | | | | 69 Tm | < | |
| | | | | | 70 Yb | < | |
| | | | | | 71 + Lu | < | |
| KnownConc = 0 | | REST = 0 | | | D/S = 0 | | |

Sum Conc's before normalisation to 100%: 102.9%

TABLE 14

Quantum Catalytics, LLC ANALYSIS REPORT by Uniquant

OLD.320 of May 24, 2001　　　　　　　　　　　　　Today May 25, 2001
Spectrometers configuration:　ARL 8410 Rh 60 kV LiF220 LiF420 Ge111 TlAP
Sample ident = 14-01-04　　　　Ni AXIAL BLK
Further info = 14-01-04　　　　　Ni AXIAL BLK 5/25
Kappa list = Nov. 15, 1994　　　Channel list = May 24, 2001
Calculated as: Elements　　　　Spectral impurity data : CAL.909 Teflon (7/94)
X-ray path = Vacuum　　　　　　Film type = No supporting film
Case number = 0　　　　　　　　Known Area, % Rest, Diluent/Sample and Mass/Area
Eff. Diam. = 25.00 mm　　　　　Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.035 | 29 Cu | < | | 51 Sb | < | |
| 11 + Na | 0.031 | 0.009 | 30 Zn | < | | 52 Te | < | |
| 12 Mg | < | | 31 Ga | < | | 53 I | < | |
| 13 + Al | 2.11 | 0.07 | 32 Ge | < | | 55 Cs | < | |
| 14 + Si | 0.030 | 0.005 | 33 As | < | | 56 Ba | <2e | 0.003 |
| 15 + P | 0.0020 | 0.0003 | 34 Se | < | | Sum La . . . Lu | 0.69 | 1.22 |
| 16 S | | | 35 Br | < | | 72 Hf | <2e | 0.007 |
| 16 + So | 0.0042 | 0.0004 | 37 Rb | < | | 73 + Ta | < | |
| 17 + Cl | < | | 38 Sr | < | | 74 + W | < | |
| 18 Ar | < | | 39 Y | < | | 75 Re | < | |
| 19 K | < | | 40 + Zr | 0.027 | 0.002 | 76 Os | < | |
| 20 Ca | < | | 41 Nb | < | | 77 Ir | < | |
| 21 + Sc | 0.0024 | 0.0008 | 42 Mo | <2e | 0.002 | 78 Pt | < | |
| 22 Ti | < | | 44 Ru | <2e | 0.002 | 79 Au | < | |
| 23 V | < | | 45 + Rh | 0.005 | 0.002 | 80 Hg | < | |
| 24 Cr | < | | 46 Pd | < | | 81 Tl | < | |
| 25 Mn | < | | 47 Ag | < | | 82 Pb | < | |
| 26 Fe | < | | 48 Cd | < | | 83 Bi | < | |
| 27 Co | < | | 49 In | < | | 90 Th | < | |
| 28 + Ni | 97.10 | 0.08 | 50 Sn | < | | 92 U | < | |

| Light Elements | | Noble Elements | | | Lanthanides | | |
|---|---|---|---|---|---|---|---|
| 4 Be | | 44 Ru | <2e | 0.002 | 57 La | < | |
| 5 B | | 45 + Rh | 0.005 | 0.002 | 58 Ce | < | |
| 6 C | | 46 Pd | < | | 59 Pr | < | |

TABLE 14-continued

Quantum Catalytics, LLC ANALYSIS REPORT by Uniquant

| Z | | | Z | | | Z | | |
|---|---|---|---|---|---|---|---|---|
| 7 N | | | 47 Ag | < | | 60 Nd | < | |
| 8 O | | | 75 Re | < | | 62 Sm | < | |
| 9 F | < | | 76 Os | < | | 63 Eu | < | |
| | | | 77 Ir | < | | 64 Gd | < | |
| | | | 78 Pt | < | | 65 Tb | < | |
| | | | 79 Au | < | | 66 + Dy | < | |
| | | | | | | 67 + Ho | < | |
| | | | | | | 68 Er | < | |
| | | | | | | 69 Tm | < | |
| | | | | | | 70 + Yb | 0.69 | 0.27 |
| | | | | | | 71 Lu | < | |
| KnownConc = 0 | | | REST = 0 | | | D/S = 0 | | |

Sum Conc's before normalisation to 100%: 101.4%

TABLE 15

Quantum Catalytics, LLC ANALYSIS REPORT by Uniquant

OLD.321 of May 24, 2001  Today May 25, 2001
Spectrometers configuration: ARL 8410 Rh 60 kV LiF220 LiF420 Ge111 TlAP
Sample ident = 14-01-04  Ni RADIAL BLK
Further info = 14-01-04  Ni RADIAL BLK 5/25
Kappa list = Nov. 15, 1994  Channel list = May 24, 2001
Calculated as: Elements  Spectral impurity data : CAL.909 Teflon (7/94)
X-ray path = Vacuum  Film type = No supporting film
Case number = 0  Known Area, % Rest, Diluent/Sample and Mass/Area
Eff. Diam. = 25.00 mm  Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.037 | 29 Cu | < | | 51 Sb | < | |
| 11 + Na | 0.12 | 0.01 | 30 Zn | < | | 52 Te | < | |
| 12 Mg | < | | 31 Ga | < | | 53 I | < | |
| 13 + Al | 2.57 | 0.07 | 32 + Ge | 0.005 | 0.002 | 55 Cs | <2e | 0.002 |
| 14 + Si | 0.14 | 0.01 | 33 As | < | | 56 Ba | 0.006 | 0.003 |
| 15 + P | < | | 34 Se | < | | Sum La . . . Lu | 0.65 | 1.21 |
| 16 S | | | 35 Br | < | | 72 Hf | <2e | 0.007 |
| 16 + So | 0.026 | 0.002 | 37 Rb | < | | 73 + Ta | < | |
| 17 + Cl | 0.0050 | 0.0007 | 38 Sr | < | | 74 + W | < | |
| 18 + Ar | 0.010 | 0.001 | 39 Y | < | | 75 Re | <2e | 0.006 |
| 19 + K | 0.0048 | 0.0007 | 40 + Zr | 0.032 | 0.003 | 76 Os | < | |
| 20 + Ca | 0.011 | 0.001 | 41 Nb | < | | 77 Ir | <2e | 0.006 |
| 21 Sc | < | | 42 Mo | <2e | 0.002 | 78 Pt | < | |
| 22 Ti | < | | 44 Ru | < | | 79 Au | < | |
| 23 V | < | | 45 Rh | < | | 80 Hg | <2e | 0.004 |
| 24 Cr | < | | 46 Pd | < | | 81 Tl | < | |
| 25 Mn | < | | 47 Ag | <2e | 0.002 | 82 Pb | < | |
| 26 Fe | < | | 48 Cd | <2e | 0.002 | 83 Bi | < | |
| 27 Co | < | | 49 In | < | | 90 Th | <2e | 0.002 |
| 28 + Ni | 96.43 | 0.09 | 50 Sn | < | | 92 U | <2e | 0.002 |

| Light Elements | | Noble Elements | | | Lanthanides | | |
|---|---|---|---|---|---|---|---|
| 4 Be | | 44 Ru | < | | 57 La | < | |
| 5 B | | 45 Rh | < | | 58 Ce | < | |
| 6 C | | 46 Pd | < | | 59 Pr | < | |
| 7 N | | 47 Ag | <2e | 0.002 | 60 Nd | < | |
| 8 O | | 75 Re | <2e | 0.006 | 62 Sm | < | |
| 9 F | < | 76 Os | < | | 63 Eu | < | |
| | | 77 Ir | <2e | 0.006 | 64 Gd | < | |
| | | 78 Pt | < | | 65 Tb | <2e | 0.003 |
| | | 79 Au | < | | 66 + Dy | < | |
| | | | | | 67 + Ho | < | |

TABLE 15-continued

Quantum Catalytics, LLC ANALYSIS REPORT by Uniquant

|  |  |  |  |
|---|---|---|---|
|  | 68 Er | < |  |
|  | 69 Tm | < |  |
|  | 70 + Yb | 0.64 | 0.27 |
|  | 71 Lu | < |  |
| KnownConc = 0 | REST = 0 | D/S = 0 |  |

Sum Conc's before normalisation to 100%: 100.5%

TABLE 16

Quantum Catalytics, LLC ANALYSIS REPORT by Uniquant

OLD.327 of Jun. 1, 2001          Today Jun. 4, 2001
Spectrometers configuration: ARL 8410 Rh 60 kV LiF220 LiF420 Ge111 TlAP
Sample ident = 14-01-05    Co AXIAL TOP
Further info = 14-01-05    CO AXIAL TOP
Kappa list = Nov. 15, 1994    Channel list = May 24, 2001
Calculated as: Elements    Spectral impurity data: CAL.909 Teflon (7/94)
X-ray path = Vacuum    Film type = No supporting film
Case number = 0    Known Area, % Rest, Diluent/Sample and Mass/Area
Eff. Diam. = 25.00 mm    Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.88 | 29 Cu | < |  | 51 Sb | < |  |
| 11 + Na | 0.026 | 0.008 | 30 Zn | < |  | 52 Te | < |  |
| 12 Mg | < |  | 31 Ga | <2e | 0.002 | 53 I | < |  |
| 13 + Al | 4.9 | 0.1 | 32 Ge | < |  | 55 Cs | < |  |
| 14 + Si | 0.073 | 0.006 | 33 As | < |  | 56 + Ba | 0.006 | 0.003 |
| 15 + P | 0.0040 | 0.0004 | 34 Se | < |  | Sum La . . . Lu | 0.02 | 10.08 |
| 16 S |  |  | 35 Br | < |  | 72 + Hf | 0.014 | 0.006 |
| 16 + So | < |  | 37 Rb | < |  | 73 Ta | < |  |
| 17 + Cl | 0.0047 | 0.0006 | 38 Sr | < |  | 74 W | < |  |
| 18 + Ar | 0.011 | 0.001 | 39 Y | < |  | 75 Re | < |  |
| 19 K | < |  | 40 + Zr | 0.019 | 0.002 | 76 Os | < |  |
| 20 + Ca | 0.0075 | 0.0007 | 41 Nb | < |  | 77 Ir | <2e | 0.005 |
| 21 + Sc | 0.0022 | 0.0006 | 42 Mo | < |  | 78 Pt | < |  |
| 22 Ti | < |  | 44 Ru | < |  | 79 Au | < |  |
| 23 V | < |  | 45 Rh | < |  | 80 Hg | <2e | 0.004 |
| 24 Cr | < |  | 46 Pd | < |  | 81 Tl | < |  |
| 25 + Mn | 0.0091 | 0.0008 | 47 Ag | < |  | 82 Pb | <2e | 0.002 |
| 26 + Fe | 0.13 | 0.01 | 48 Cd | 0.003 | 0.002 | 83 Bi | < |  |
| 27 + Co | 94.6 | 0.1 | 49 In | < |  | 90 Th | <2e | 0.002 |
| 28 + Ni | 0.16 | 0.01 | 50 Sn | < |  | 92 U | < |  |

| Light Elements |  | Noble Elements |  |  | Lanthanides |  |  |
|---|---|---|---|---|---|---|---|
| 4 Be |  | 44 Ru | < |  | 57 La | < |  |
| 5 B |  | 45 Rh | < |  | 58 Ce | < |  |
| 6 C |  | 46 Pd | < |  | 59 Pr | < |  |
| 7 N |  | 47 Ag | < |  | 60 Nd | < |  |
| 8 O |  | 75 Re | < |  | 62 Sm | < |  |
| 9 + F | < | 76 Os | < |  | 63 Eu | <2e | 0.002 |
|  |  | 77 Ir | <2e | 0.005 | 64 + Gd | 0.016 | 0.003 |
|  |  | 78 Pt | < |  | 65 Tb | < |  |
|  |  | 79 Au | < |  | 66 Dy | < |  |
|  |  |  |  |  | 67 + Ho | < |  |
|  |  |  |  |  | 68 + Er | < |  |
|  |  |  |  |  | 69 Tm | < |  |
|  |  |  |  |  | 70 + Yb | < |  |
|  |  |  |  |  | 71 + Lu | < |  |
| KnownConc = 0 |  | REST = 0 |  |  | D/S = 0 |  |  |

Sum Conc's before normalisation to 100%: 102.0%

TABLE 17

Quantum Catalytics, LLC ANALYSIS REPORT by Uniquant

OLD.328 of Jun. 1, 2001          Today Jun. 4, 2001
Spectrometers configuration: ARL 8410 Rh 60 kV LiF220 LiF420 Ge111 TlAP
Sample ident = 14-01-05    Co RADIAL
Further info = 14-01-05    CO RADIAL
Kappa list = Nov. 15, 1994    Channel list = May 24, 2001
Calculated as: Elements    Spectral impurity data: CAL.909 Teflon (7/94)
X-ray path = Vacuum    Film type = No supporting film
Case number = 0    Known Area, % Rest, Diluent/Sample and Mass/Area
Eff. Diam. = 25.00 mm    Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.88 | 29 Cu | < | | 51 Sb | < | |
| 11 + Na | 0.043 | 0.009 | 30 Zn | < | | 52 Te | < | |
| 12 Mg | < | | 31 Ga | < | | 53 I | < | |
| 13 + Al | 3.71 | 0.09 | 32 Ge | < | | 55 Cs | < | |
| 14 + Si | 0.18 | 0.01 | 33 As | < | | 56 Ba | < | |
| 15 + P | 0.0037 | 0.0004 | 34 Se | < | | Sum La . . . Lu | 0.02 | 10.20 |
| 16 S | | | 35 Br | < | | 72 Hf | <2e | 0.006 |
| 16 + So | < | | 37 Rb | < | | 73 Ta | < | |
| 17 + Cl | 0.0034 | 0.0007 | 38 Sr | < | | 74 W | < | |
| 18 + Ar | 0.010 | 0.001 | 39 Y | < | | 75 Re | <2e | 0.005 |
| 19 K | < | | 40 + Zr | 0.017 | 0.001 | 76 Os | < | |
| 20 + Ca | 0.0087 | 0.0008 | 41 Nb | < | | 77 Ir | <2e | 0.005 |
| 21 + Sc | 0.0033 | 0.0006 | 42 Mo | < | | 78 Pt | < | |
| 22 Ti | < | | 44 Ru | <2e | 0.002 | 79 Au | < | |
| 23 V | < | | 45 Rh | <2e | 0.002 | 80 Hg | <2e | 0.004 |
| 24 + Cr | < | | 46 Pd | < | | 81 Tl | < | |
| 25 + Mn | 0.0081 | 0.0007 | 47 Ag | < | | 82 Pb | < | |
| 26 + Fe | 0.13 | 0.01 | 48 Cd | < | | 83 Bi | < | |
| 27 + Co | 95.7 | 0.1 | 49 In | < | | 90 Th | <2e | 0.002 |
| 28 + Ni | 0.18 | 0.01 | 50 Sn | < | | 92 U | < | |

| Light Elements | | Noble Elements | | | Lanthanides | | |
|---|---|---|---|---|---|---|---|
| 4 Be | | 44 Ru | <2e | 0.002 | 57 La | < | |
| 5 B | | 45 Rh | <2e | 0.002 | 58 Ce | < | |
| 6 C | | 46 Pd | < | | 59 Pr | < | |
| 7 N | | 47 Ag | < | | 60 Nd | < | |
| 8 O | | 75 Re | <2e | 0.005 | 62 Sm | < | |
| 9 + F | < | 76 Os | < | | 63 + Eu | 0.008 | 0.002 |
| | | 77 Ir | <2e | 0.005 | 64 + Gd | 0.011 | 0.003 |
| | | 78 Pt | < | | 65 Tb | < | |
| | | 79 Au | < | | 66 Dy | < | |
| | | | | | 67 + Ho | < | |
| | | | | | 68 + Er | < | |
| | | | | | 69 Tm | < | |
| | | | | | 70 + Yb | < | |
| | | | | | 71 + Lu | < | |
| KnownConc = 0 | | REST = 0 | | | D/S = 0 | | |

Sum Conc's before normalisation to 100%: 101.3%

TABLE 18

Quantum Catalytics, LLC ANALYSIS REPORT by Uniquant

OLD.330 of Jun. 4, 2001          Today Jun. 4, 2001
Spectrometers configuration: ARL 8410 Rh 60 kV LiF220 LiF420 Ge111 TlAP
Sample ident = 14-01-06    Cu/Ag/Au Ax TOP
Further info = 14-01-06    Cu/Ag/Au AXIAL TOP 6/4/01
Kappa list = Nov. 15, 1994    Channel list = Jun. 4, 2001
Calculated as: Elements    Spectral impurity data: CAL.909 Teflon (7/94)
X-ray path = Vacuum    Film type = No supporting film

TABLE 18-continued

Quantum Catalytics, LLC ANALYSIS REPORT by Uniquant

Case number = 0  
Eff. Diam. = 25.00 mm  
KnownConc = 0%  
Rest = 0%  
Dil/Sample = 0  
Viewed Mass = 18000.00 mg  
Sample Height = 5 mm Known Area, % Rest, Diluent/Sample and Mass/Area  
Eff. Area = 490.6 mm2

< means that the concentration is < 20 ppm  
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.41 | 29 + Cu | 96.97 | 0.09 | 51 Sb | < | |
| 11 + Na | 0.056 | 0.010 | 30 + Zn | < | | 52 Te | < | |
| 12 Mg | < | | 31 + Ga | 0.007 | 0.003 | 53 I | < | |
| 13 + Al | 0.013 | 0.003 | 32 Ge | < | | 55 Cs | < | |
| 14 Si | < | | 33 As | < | | 56 Ba | < | |
| 15 + P | < | | 34 + Se | < | | Sum La . . . Lu | 0.012 | 0.071 |
| 16 + S | 0.0032 | 0.0004 | 35 + Br | < | | 72 + Hf | < | |
| 16 So | | | 37 + Rb | < | | 73 + Ta | < | |
| 17 + Cl | 0.020 | 0.002 | 38 Sr | < | | 74 W | < | |
| 18 + Ar | 0.011 | 0.002 | 39 Y | < | | 75 + Re | 0.021 | 0.008 |
| 19 K | < | | 40 + Zr | 0.0074 | 0.0010 | 76 Os | < | |
| 20 + Ca | 0.0029 | 0.0008 | 41 Nb | < | | 77 + Ir | 0.026 | 0.008 |
| 21 + Sc | < | | 42 Mo | <2e | 0.002 | 78 Pt | < | |
| 22 Ti | < | | 44 Ru | < | | 79 + Au | 1.37 | 0.05 |
| 23 V | < | | 45 Rh | < | | 80 Hg | <2e | 0.006 |
| 24 Cr | < | | 46 Pd | < | | 81 Tl | < | |
| 25 Mn | < | | 47 + Ag | 1.49 | 0.06 | 82 Pb | < | |
| 26 Fe | < | | 48 Cd | < | | 83 Bi | < | |
| 27 Co | < | | 49 In | < | | 90 Th | <2e | 0.003 |
| 28 Ni | < | | 50 + Sn | < | | 92 U | < | |

| Light Elements | | Noble Elements | | | Lanthanides | | |
|---|---|---|---|---|---|---|---|
| 4 Be | | 44 Ru | < | | 57 + La | <2e | 0.004 |
| 5 B | | 45 Rh | < | | 58 Ce | < | |
| 6 C | | 46 Pd | < | | 59 Pr | < | |
| 7 N | | 47 + Ag | 1.49 | 0.06 | 60 Nd | < | |
| 8 O | | 75 + Re | 0.021 | 0.008 | 62 Sm | < | |
| 9 F | < | 76 Os | < | | 63 Eu | <2e | 0.002 |
| | | 77 + Ir | 0.026 | 0.008 | 64 Gd | < | |
| | | 78 Pt | < | | 65 Tb | <2e | 0.002 |
| | | 79 + Au | 1.37 | 0.05 | 66 Dy | < | |
| | | | | | 67 Ho | < | |
| | | | | | 68 Er | < | |
| | | | | | 69 Tm | < | |
| | | | | | 70 Yb | < | |
| | | | | | 71 + Lu | < | |
| KnownConc = 0 | | REST = 0 | | | D/S = 0 | | |

Sum Conc's before normalisation to 100%: 100.1%

TABLE 19

| Quantum Catalytics, LLC ANALYSIS REPORT by Uniquant | |
|---|---|
| OLD.331 of Jun. 4, 2001 | Today Jun. 4, 2001 |
| Spectrometers configuration: | ARL 8410 Rh 60 kV LiF220 LiF420 Ge111 TlAP |
| Sample ident = 14-01-06 | Cu/Ag/Au RADIAL |
| Further info = 14-01-06 | Cu/Ag/Au RADIAL 06/4/01 |
| Kappa list = Nov. 15, 1994 | Channel list = Jun. 4, 2001 |
| Calculated as: Elements | Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.040 | 29 + Cu | 97.04 | 0.08 | 51 Sb | < | |
| 11 + Na | 0.045 | 0.010 | 30 + Zn | <2e | | 52 Te | < | |
| 12 Mg | <2e | 0.004 | 31 Ga | <2e | 0.003 | 53 I | < | |
| 13 + Al | 0.047 | 0.004 | 32 Ge | <2e | 0.002 | 55 Cs | <2e | 0.003 |
| 14 Si | <2e | 0.005 | 33 As | < | | 56 Ba | <2e | 0.003 |
| 15 + P | < | | 34 + Se | < | | Sum La . . . Lu | 0.003 | 0.071 |
| 16 + S | 0.0066 | 0.0006 | 35 + Br | < | | 72 + Hf | < | |
| 16 So | | | 37 + Rb | < | | 73 + Ta | < | |
| 17 + Cl | 0.025 | 0.002 | 38 Sr | < | | 74 W | < | |
| 18 + Ar | 0.011 | 0.002 | 39 Y | < | | 75 Re | <2e | 0.008 |
| 19 + K | 0.0021 | 0.0008 | 40 + Zr | 0.008 | 0.001 | 76 Os | < | |
| 20 + Ca | 0.0060 | 0.0009 | 41 Nb | < | | 77 + Ir | 0.033 | 0.008 |
| 21 Sc | < | | 42 Mo | < | | 78 Pt | < | |
| 22 Ti | < | | 44 Ru | < | | 79 + Au | 1.33 | 0.05 |
| 23 V | < | | 45 Rh | < | | 80 Hg | <2e | 0.006 |
| 24 + Cr | < | | 46 Pd | < | | 81 Tl | < | |
| 25 Mn | < | | 47 + Ag | 1.44 | 0.05 | 82 Pb | < | |
| 26 Fe | < | | 48 Cd | < | | 83 Bi | < | |
| 27 Co | < | | 49 In | < | | 90 Th | < | |
| 28 Ni | < | | 50 + Sn | < | | 92 U | < | |

| Light Elements | | Noble Elements | | | Lanthanides | | |
|---|---|---|---|---|---|---|---|
| 4 Be | | 44 Ru | < | | 57 La | < | |
| 5 B | | 45 Rh | < | | 58 Ce | < | |
| 6 C | | 46 Pd | < | | 59 Pr | < | |
| 7 N | | 47 + Ag | 1.44 | 0.05 | 60 Nd | < | |
| 8 O | | 75 Re | <2e | 0.008 | 62 Sm | < | |
| 9 F | < | 76 Os | < | | 63 Eu | < | |
| | | 77 + Ir | 0.033 | 0.008 | 64 Gd | < | |
| | | 78 Pt | < | | 65 Tb | <2e | 0.002 |
| | | 79 + Au | 1.33 | 0.05 | 66 Dy | < | |
| | | | | | 67 Ho | < | |
| | | | | | 68 Er | < | |
| | | | | | 69 Tm | < | |
| | | | | | 70 Yb | < | |
| | | | | | 71 + Lu | < | |
| KnownConc = 0 | | REST = 0 | | | D/S = 0 | | |

Sum Conc's before normalisation to 100%: 100.1%

TABLE 20

| Quantum Catalytics, LLC ANALYSIS REPORT by Uniquant | |
|---|---|
| OLD.336 of Jun. 11, 2001 | Today Jun. 11, 2001 |
| Spectrometers configuration: | ARL 8410 Rh 60 kV LiF220 LiF420 Ge111 TlAP |
| Sample ident = 14-01-07 | AXIAL |
| Further info = 14-01-07 | AXIAL LEAD TIN ZINC 6/11 CASS 8 |
| Kappa list = Nov. 15, 1994 | Channel list = Jun. 4, 2001 |
| Calculated as: Elements | Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |

TABLE 20-continued

Quantum Catalytics, LLC ANALYSIS REPORT by Uniquant

Sample Height = 5 mm

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.051 | 29 + Cu | 0.24 | 0.02 | 51 + Sb | 0.023 | 0.006 |
| 11 + Na | < | | 30 + Zn | 25.4 | 0.2 | 52 Te | < | |
| 12 + Mg | 0.016 | 0.008 | 31 + Ga | < | | 53 + I | <2e | 0.82 |
| 13 + Al | 2.08 | 0.07 | 32 Ge | < | | 55 Cs | < | |
| 14 + Si | 0.018 | 0.004 | 33 As | < | | 56 Ba | < | |
| 15 + P | < | | 34 Se | < | | Sum La . . . Lu | 0.035 | 0.072 |
| 16 S | | | 35 Br | <2e | 0.001 | 72 Hf | < | |
| 16 + So | 0.038 | 0.003 | 37 + Rb | < | | 73 + Ta | < | |
| 17 + Cl | 0.053 | 0.004 | 38 Sr | < | | 74 + W | <2e | 0.012 |
| 18 Ar | < | | 39 + Y | <2e | 0.002 | 75 Re | < | |
| 19 K | < | | 40 + Zr | 0.024 | 0.005 | 76 + Os | < | |
| 20 + Ca | <2e | 0.031 | 41 Nb | < | | 77 + Ir | < | |
| 21 Sc | < | | 42 Mo | < | | 78 + Pt | < | |
| 22 Ti | < | | 44 + Ru | <2e | 0.005 | 79 Au | < | |
| 23 V | < | | 45 Rh | < | | 80 Hg | < | |
| 24 Cr | < | | 46 Pd | < | | 81 + Tl | < | |
| 25 Mn | < | | 47 Ag | < | | 82 + Pb | 16.9 | 0.2 |
| 26 Fe | < | | 48 + Cd | 0.014 | 0.005 | 83 + Bi | < | |
| 27 Co | <2e | 0.001 | 49 + In | <2e | 0.011 | 90 + Th | < | |
| 28 + Ni | 0.007 | 0.003 | 50 + Sn | 54.7 | 0.2 | 92 U | < | |

| Light Elements | | Noble Elements | | | Lanthanides | | |
|---|---|---|---|---|---|---|---|
| 4 Be | | 44 + Ru | <2e | 0.005 | 57 La | < | |
| 5 B | | 45 Rh | < | | 58 + Ce | 0.030 | 0.010 |
| 6 C | | 46 Pd | < | | 59 Pr | <2e | 0.006 |
| 7 N | | 47 Ag | < | | 60 + Nd | <2e | 0.004 |
| 8 O | | 75 Re | < | | 62 Sm | < | |
| 9 F | < | 76 + Os | < | | 63 Eu | < | |
| | | 77 + Ir | < | | 64 Gd | < | |
| | | 78 + Pt | < | | 65 Tb | < | |
| | | 79 Au | < | | 66 Dy | < | |
| | | | | | 67 Ho | < | |
| | | | | | 68 Er | < | |
| | | | | | 69 Tm | < | |
| | | | | | 70 Yb | < | |
| | | | | | 71 Lu | < | |
| KnownConc = 0 | | REST = 0 | | | D/S = 0 | | |

Sum Conc's before normalisation to 100%: 111.4%

TABLE 21

Quantum Catalytics, LLC ANALYSIS REPORT by Uniquant

OLD.337 of Jun. 4, 2001                                       Today Jun. 11, 2001
Spectrometers configuration: ARL 8410 Rh 60 kV LiF220 LiF420 Ge111 TlAP
Sample ident = 14-01-07          RADIAL
Further info = 14-01-07          RADIAL LEAD/TIN/ZINC 6/11 CS 8
Kappa list = Nov. 15, 1994       Channel list = Jun. 4, 2001
Calculated as: Elements          Spectral impurity data: CAL.909 Teflon (7/94)
X-ray path = Vacuum              Film type = No supporting film
Case number = 0                  Known Area, % Rest, Diluent/Sample and Mass/Area
Eff. Diam. = 25.00               mm Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.046 | 29 + Cu | 0.014 | 0.002 | 51 + Sb | 0.015 | 0.005 |
| 11 + Na | < | | 30 + Zn | 33.2 | 0.2 | 52 Te | < | |
| 12 + Mg | < | | 31 + Ga | < | | 53 + I | <2e | 0.72 |
| 13 + Al | 0.17 | 0.01 | 32 Ge | < | | 55 Cs | < | |

TABLE 21-continued

Quantum Catalytics, LLC ANALYSIS REPORT by Uniquant

| Z | wt % | StdErr | Z | wt % | StdErr | Z | wt % | StdErr |
|---|---|---|---|---|---|---|---|---|
| 14 + Si | 0.026 | 0.004 | 33 As | < | | 56 Ba | < | |
| 15 P | < | | 34 Se | < | | Sum La ... Lu | 0.031 | 0.069 |
| 16 S | | | 35 Br | < | | 72 Hf | < | |
| 16 + So | < | | 37 + Rb | < | | 73 Ta | < | |
| 17 + Cl | 0.031 | 0.003 | 38 Sr | < | | 74 + W | 0.033 | 0.014 |
| 18 Ar | < | | 39 + Y | < | | 75 Re | < | |
| 19 K | < | | 40 + Zr | 0.016 | 0.005 | 76 + Os | < | |
| 20 + Ca | <2e | 0.027 | 41 Nb | < | | 77 + Ir | < | |
| 21 Sc | < | | 42 Mo | < | | 78 + Pt | < | |
| 22 Ti | < | | 44 + Ru | 0.011 | 0.005 | 79 Au | < | |
| 23 V | < | | 45 Rh | < | | 80 Hg | < | |
| 24 Cr | < | | 46 Pd | < | | 81 + Tl | <2e | 0.014 |
| 25 Mn | < | | 47 Ag | < | | 82 + Pb | 18.3 | 0.2 |
| 26 Fe | < | | 48 + Cd | 0.025 | 0.004 | 83 Bi | < | |
| 27 Co | < | | 49 + In | <2e | 0.010 | 90 Th | < | |
| 28 Ni | < | | 50 + Sn | 47.9 | 0.2 | 92 U | < | |

| Light Elements | | Noble Elements | | | Lanthanides | | |
|---|---|---|---|---|---|---|---|
| 4 Be | | 44 + Ru | 0.011 | 0.005 | 57 La | <2e | 0.008 |
| 5 B | | 45 Rh | < | | 58 + Ce | <2e | 0.010 |
| 6 C | | 46 Pd | < | | 59 Pr | < | |
| 7 N | | 47 Ag | < | | 60 Nd | < | |
| 8 O | | 75 Re | < | | 62 Sm | < | |
| 9 F | < | 76 + Os | < | | 63 Eu | < | |
| | | 77 + Ir | < | | 64 Gd | <2e | 0.004 |
| | | 78 + Pt | < | | 65 Tb | < | |
| | | 79 Au | < | | 66 Dy | < | |
| | | | | | 67 + Ho | 0.012 | 0.006 |
| | | | | | 68 Er | <2e | 0.004 |
| | | | | | 69 Tm | <2e | 0.004 |
| | | | | | 70 Yb | <2e | 0.004 |
| | | | | | 71 Lu | < | |
| KnownConc = 0 | | REST = 0 | | | D/S = 0 | | |

Sum Conc's before normalisation to 100%: 115.8%

TABLE 22

Quantum Catalytics, LLC ANALYSIS REPORT by Uniquant

OLD.342 of Jun. 14, 2001                                  Today Jun. 14, 2001
Spectrometers configuration: ARL 8410 Rh 60 kV LiF220 LiF420 Ge111 TlAP
Sample ident = 14-01-08           AXIAL
Further info = 14-01-08           AXIAL Sn, K, Na, Mg 6/14
Kappa list = Nov. 15, 1994        Channel list = Jun. 4, 2001
Calculated as: Elements           Spectral impurity data: CAL.909 Teflon (7/94)
X-ray path = Vacuum               Film type = No supporting film
Case number = 0                   Known Area, % Rest, Diluent/Sample and Mass/Area
Eff. Diam. = 25.00 mm             Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be ... F | 0 | 0.060 | 29 + Cu | 0.079 | 0.006 | 51 Sb | < | |
| 11 + Na | 1.07 | 0.05 | 30 Zn | < | | 52 Te | < | |
| 12 + Mg | 0.85 | 0.04 | 31 Ga | < | | 53 + I | <2e | 1.43 |
| 13 + Al | 1.53 | 0.06 | 32 Ge | < | | 55 Cs | < | |
| 14 + Si | 0.16 | 0.01 | 33 As | < | | 56 Ba | < | |
| 15 + P | < | | 34 Se | < | | Sum La ... Lu | 0.021 | 0.072 |
| 16 S | | | 35 Br | < | | 72 Hf | <2e | 0.003 |
| 16 + So | 0.044 | 0.004 | 37 Rb | < | | 73 Ta | < | |
| 17 + Cl | 0.015 | 0.001 | 38 + Sr | < | | 74 + W | 0.031 | 0.004 |
| 18 Ar | < | | 39 Y | < | | 75 Re | < | |
| 19 K | < | | 40 + Zr | 0.047 | 0.004 | 76 Os | < | |
| 20 + Ca | < | | 41 + Nb | < | | 77 + Ir | <2e | 0.003 |
| 21 + Sc | 0.007 | 0.002 | 42 Mo | < | | 78 Pt | < | |
| 22 Ti | < | | 44 + Ru | < | | 79 Au | < | |

TABLE 22-continued

Quantum Catalytics, LLC ANALYSIS REPORT by Uniquant

| Z | wt % | StdErr | Z | wt % | StdErr | Z | wt % | StdErr |
|---|---|---|---|---|---|---|---|---|
| 23 V | <2e | 0.002 | 45 Rh | < | | 80 Hg | < | |
| 24 Cr | < | | 46 Pd | < | | 81 Tl | < | |
| 25 Mn | < | | 47 Ag | < | | 82 + Pb | 0.067 | 0.006 |
| 26 + Fe | 0.017 | 0.002 | 48 + Cd | 0.041 | 0.005 | 83 Bi | <2e | 0.002 |
| 27 + Co | 0.003 | 0.001 | 49 + In | <2e | 0.019 | 90 + Th | < | |
| 28 + Ni | 0.021 | 0.002 | 50 + Sn | 95.6 | 0.1 | 92 U | < | |

| Light Elements | | Noble Elements | | | Lanthanides | | |
|---|---|---|---|---|---|---|---|
| 4 Be | | 44 + Ru | < | | 57 La | < | |
| 5 B | | 45 Rh | < | | 58 Ce | <2e | 0.007 |
| 6 C | | 46 Pd | < | | 59 Pr | < | |
| 7 N | | 47 Ag | < | | 60 Nd | <2e | 0.005 |
| 8 O | | 75 Re | < | | 62 Sm | < | |
| 9 F | < | 76 Os | < | | 63 Eu | < | |
| | | 77 + Ir | <2e | 0.003 | 64 Gd | < | |
| | | 78 Pt | < | | 65 Tb | < | |
| | | 79 Au | < | | 66 Dy | < | |
| | | | | | 67 Ho | <2e | 0.005 |
| | | | | | 68 Er | < | |
| | | | | | 69 Tm | <2e | 0.004 |
| | | | | | 70 Yb | < | |
| | | | | | 71 Lu | < | |
| KnownConc = 0 | | REST = 0 | | | D/S = 0 | | |

Sum Conc's before normalisation to 100%: 94.8%

TABLE 23

Quantum Catalytics, LLC ANALYSIS REPORT by Uniquant

| | |
|---|---|
| OLD.343 of Jun. 4, 2001 | Today Jun. 14, 2001 |
| Spectrometers configuration: | ARL 8410 Rh 60 kV LiF220 LiF420 Ge111 TlAP |
| Sample ident = 14-01-08 | RADIAL |
| Further info = 14-01-08 | RADIAL Sn, K, Na, Mg 6/14 |
| Kappa list = Nov. 15, 1994 | Channel list = Jun. 4, 2001 |
| Calculated as: Elements | Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.056 | 29 + Cu | 0.14 | 0.01 | 51 Sb | < | |
| 11 + Na | 2.82 | 0.08 | 30 + Zn | 0.003 | 0.002 | 52 Te | < | |
| 12 + Mg | 1.04 | 0.04 | 31 Ga | < | | 53 + I | <2e | 1.40 |
| 13 + Al | 1.69 | 0.06 | 32 Ge | < | | 55 Cs | < | |
| 14 + Si | 0.29 | 0.02 | 33 As | < | | 56 Ba | < | |
| 15 + P | 0.0022 | 0.0004 | 34 Se | < | | Sum La . . . Lu | 0.025 | 0.065 |
| 16 S | | | 35 Br | < | | 72 Hf | <2e | 0.003 |
| 16 + So | 0.032 | 0.003 | 37 Rb | < | | 73 Ta | < | |
| 17 + Cl | 0.013 | 0.001 | 38 Sr | < | | 74 + W | 0.048 | 0.004 |
| 18 Ar | < | | 39 Y | < | | 75 Re | < | |
| 19 K | < | | 40 + Zr | 0.043 | 0.004 | 76 Os | <2e | 0.003 |
| 20 + Ca | < | | 41 + Nb | < | | 77 + Ir | <2e | 0.003 |
| 21 Sc | <2e | 0.002 | 42 Mo | < | | 78 Pt | < | |
| 22 Ti | < | | 44 + Ru | < | | 79 Au | < | |
| 23 V | <2e | 0.001 | 45 Rh | < | | 80 Hg | < | |
| 24 Cr | <2e | 0.002 | 46 Pd | < | | 81 + Tl | 0.006 | 0.003 |
| 25 Mn | <2e | 0.001 | 47 Ag | < | | 82 + Pb | 0.069 | 0.006 |
| 26 + Fe | 0.023 | 0.002 | 48 + Cd | 0.029 | 0.006 | 83 Bi | <2e | 0.002 |
| 27 Co | <2e | 0.001 | 49 + In | <2e | 0.019 | 90 + Th | < | |
| 28 + Ni | 0.045 | 0.004 | 50 + Sn | 93.6 | 0.1 | 92 U | < | |

| Light Elements | | Noble Elements | | | Lanthanides | | |
|---|---|---|---|---|---|---|---|
| 4 Be | | 44 + Ru | < | | 57 La | < | |

TABLE 23-continued

Quantum Catalytics, LLC ANALYSIS REPORT by Uniquant

| | | | | | | | |
|---|---|---|---|---|---|---|---|
| 5 B | | 45 Rh | < | | 58 Ce | <2e | 0.006 |
| 6 C | | 46 Pd | < | | 59 Pr | < | |
| 7 N | | 47 Ag | < | | 60 Nd | <2e | 0.004 |
| 8 O | | 75 Re | < | | 62 Sm | <2e | 0.005 |
| 9 F | < | 76 Os | <2e | 0.003 | 63 Eu | <2e | 0.004 |
| | | 77 + Ir | <2e | 0.003 | 64 Gd | < | |
| | | 78 Pt | < | | 65 Tb | < | |
| | | 79 Au | < | | 66 Dy | < | |
| | | | | | 67 Ho | < | |
| | | | | | 68 Er | < | |
| | | | | | 69 Tm | < | |
| | | | | | 70 Yb | < | |
| | | | | | 71 Lu | < | |
| KnownConc = 0 | | REST = 0 | | | D/S = 0 | | |

Sum Conc's before normalisation to 100%: 98.1%

TABLE 24

Quantum Catalytics, LLC ANALYSIS REPORT by Uniquant

OLD.314 of May 24, 2001      Today May 24, 2001
Spectrometers configuration: ARL 8410 Rh 60 kV LiF220 LiF420 Ge111 TlAP
Sample ident = 15-01-01    Si AXIAL BLK
Further info = 15-01-01    Si AXIAL BLK 5/24
Kappa list = Nov. 15, 1994    Channel list = May 24, 2001
Calculated as: Elements    Spectral impurity data: CAL.909 Teflon (7/94)
X-ray path = Vacuum    Film type = No supporting film
Case number = 0    Known Area, % Rest, Diluent/Sample and Mass/Area
Eff. Diam. = 25.00 mm    Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0.059 | 0.021 | 29 + Cu | 0.012 | 0.001 | 51 Sb | < | |
| 11 + Na | 0.004 | 0.002 | 30 + Zn | 0.0021 | 0.0005 | 52 Te | < | |
| 12 Mg | < | | 31 + Ga | 0.0038 | 0.0005 | 53 I | < | |
| 13 + Al | 1.18 | 0.05 | 32 Ge | < | | 55 + Cs | <2e | 0.003 |
| 14 + Si | 98.58 | 0.06 | 33 As | < | | 56 + Ba | 0.008 | 0.003 |
| 15 + P | 0.013 | 0.001 | 34 Se | < | | Sum La . . . Lu | 0.004 | 0.018 |
| 16 + S | 0.013 | 0.001 | 35 Br | < | | 72 Hf | < | |
| 16 So | | | 37 Rb | < | | 73 Ta | < | |
| 17 + Cl | 0.004 | 0.002 | 38 Sr | < | | 74 + W | 0.007 | 0.001 |
| 18 + Ar | 0.013 | 0.003 | 39 Y | < | | 75 Re | < | |
| 19 + K | < | | 40 + Zr | < | | 76 Os | < | |
| 20 + Ca | 0.0092 | 0.0009 | 41 Nb | < | | 77 Ir | < | |
| 21 Sc | < | | 42 Mo | < | | 78 Pt | < | |
| 22 + Ti | 0.019 | 0.002 | 44 Ru | < | | 79 Au | < | |
| 23 V | < | | 45 Rh | < | | 80 Hg | < | |
| 24 + Cr | 0.0031 | 0.0005 | 46 Pd | < | | 81 Tl | < | |
| 25 + Mn | < | | 47 Ag | < | | 82 Pb | < | |
| 26 + Fe | 0.055 | 0.005 | 48 Cd | < | | 83 Bi | < | |
| 27 Co | < | | 49 In | < | | 90 Th | < | |
| 28 + Ni | 0.0051 | 0.0006 | 50 Sn | < | | 92 U | < | |

| Light Elements | | | Noble Elements | | | Lanthanides | | |
|---|---|---|---|---|---|---|---|---|
| 4 Be | | | 44 Ru | < | | 57 La | < | |
| 5 B | | | 45 Rh | < | | 58 Ce | < | |
| 6 C | | | 46 Pd | < | | 59 Pr | < | |
| 7 N | | | 47 Ag | < | | 60 Nd | < | |
| 8 O | | | 75 Re | < | | 62 Sm | < | |
| 9 + F | 0.059 | 0.021 | 76 Os | < | | 63 Eu | < | |
| | | | 77 Ir | < | | 64 Gd | < | |
| | | | 78 Pt | < | | 65 Tb | < | |
| | | | 79 Au | < | | 66 Dy | < | |
| | | | | | | 67 Ho | < | |
| | | | | | | 68 Er | < | |

TABLE 24-continued

Quantum Catalytics, LLC ANALYSIS REPORT by Uniquant

|  |  |  |  |  |
|---|---|---|---|---|
|  |  | 69 Tm | < |  |
|  |  | 70 Yb | < |  |
|  |  | 71 Lu | < |  |
| KnownConc = 0 | REST = 0 |  |  | D/S = 0 |

Sum Conc's before normalisation to 100%: 83.4%

TABLE 25

Quantum Catalytics, LLC ANALYSIS REPORT

OLD.317 of May 24, 2001  
Spectrometers configuration: ARL 8410 Rh 60 kV LiF220 LiF420 Ge111 TlAP  
Sample ident = 15-01-01  
Si RADIAL BLK  
Further info = 15-01-01  
Si RADIAL BLK 5/24  
Kappa list = Nov. 15, 1994  
Channel list = May 24, 2001  
Calculated as: Elements  
Spectral impurity data: CAL.909 Teflon (7/94)  
X-ray path = Vacuum  
Film type = No supporting film  
Case number = 0  
Known Area, % Rest, Diluent/Sample and Mass/Area  
Eff. Diam. = 25.00 mm  
Eff. Area = 490.6 mm2  
KnownConc = 0%  
Rest = 0%  
Dil/Sample = 0  
Viewed Mass = 18000.00 mg  
Sample Height = 5 mm  
Today May 24, 2001

< means that the concentration is < 20 ppm  
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.021 | 29 + Cu | 0.0101 | 0.0009 | 51 Sb | < |  |
| 11 + Na | 0.016 | 0.002 | 30 + Zn | 0.0020 | 0.0005 | 52 Te | < |  |
| 12 Mg | < |  | 31 + Ga | 0.0043 | 0.0005 | 53 I | < |  |
| 13 + Al | 1.46 | 0.05 | 32 Ge | < |  | 55 + Cs | <2e | 0.003 |
| 14 + Si | 98.12 | 0.07 | 33 As | < |  | 56 + Ba | <2e | 0.003 |
| 15 + P | 0.018 | 0.002 | 34 Se | < |  | Sum La . . . Lu | 0.005 | 0.020 |
| 16 S |  |  | 35 Br | < |  | 72 + Hf | 0.003 | 0.001 |
| 16 + So | 0.14 | 0.01 | 37 Rb | < |  | 73 Ta | < |  |
| 17 + Cl | 0.019 | 0.002 | 38 Sr | < |  | 74 + W | 0.011 | 0.001 |
| 18 + Ar | 0.012 | 0.003 | 39 Y | < |  | 75 Re | < |  |
| 19 + K | 0.014 | 0.001 | 40 + Zr | < |  | 76 Os | < |  |
| 20 + Ca | 0.077 | 0.006 | 41 Nb | < |  | 77 + Ir | < |  |
| 21 Sc | < |  | 42 Mo | < |  | 78 Pt | < |  |
| 22 + Ti | 0.029 | 0.003 | 44 Ru | < |  | 79 Au | < |  |
| 23 + V | < |  | 45 Rh | < |  | 80 Hg | < |  |
| 24 + Cr | 0.0026 | 0.0005 | 46 Pd | < |  | 81 Tl | < |  |
| 25 Mn | < |  | 47 Ag | < |  | 82 Pb | < |  |
| 26 + Fe | 0.042 | 0.004 | 48 Cd | < |  | 83 Bi | < |  |
| 27 Co | < |  | 49 In | < |  | 90 Th | < |  |
| 28 + Ni | 0.0053 | 0.0006 | 50 Sn | < |  | 92 U | < |  |

| Light Elements | | Noble Elements | | Lanthanides | | |
|---|---|---|---|---|---|---|
| 4 Be |  | 44 Ru | < | 57 La | < |  |
| 5 B |  | 45 Rh | < | 58 Ce | < |  |
| 6 C |  | 46 Pd | < | 59 Pr | < |  |
| 7 N |  | 47 Ag | < | 60 Nd | < |  |
| 8 O |  | 75 Re | < | 62 Sm | < |  |
| 9 F | < | 76 Os | < | 63 Eu | < |  |
|  |  | 77 + Ir | < | 64 Gd | <2e | 0.001 |
|  |  | 78 Pt | < | 65 Tb | < |  |
|  |  | 79 Au | < | 66 Dy | < |  |
|  |  |  |  | 67 Ho | < |  |
|  |  |  |  | 68 Er | < |  |
|  |  |  |  | 69 Tm | < |  |
|  |  |  |  | 70 Yb | < |  |
|  |  |  |  | 71 Lu | < |  |
| KnownConc = 0 |  | REST = 0 |  | D/S = 0 |  |  |

Sum Conc's before normalisation to 100%: 79.7%

TABLE 26

| Quantum Catalytics, LLC ANALYSIS REPORT by Uniquant | |
|---|---|
| OLD.237 of Apr. 23, 2001 | Today Apr. 23, 2001 |
| Spectrometers configuration: | ARL 8410 Rh 60 kV LiF220 LiF420 Ge111 TlAP |
| Sample ident = 15-01-01 | Si SECTION TOP |
| Further info = 15-01-01 | Si MID SECTION TOP FACE AXIAL |
| Kappa list = Nov. 15, 1994 | Channel list = Apr. 19, 2001 |
| Calculated as: Elements | Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be ... F | 0 | 0.018 | 29 + Cu | 0.0070 | 0.0006 | 51 Sb | < | |
| 11 + Na | 0.050 | 0.004 | 30 + Zn | 0.0033 | 0.0005 | 52 Te | < | |
| 12 Mg | < | | 31 + Ga | 0.0020 | 0.0004 | 53 I | < | |
| 13 + Al | 1.02 | 0.04 | 32 Ge | < | | 55 Cs | <2e | 0.003 |
| 14 + Si | 98.48 | 0.06 | 33 As | < | | 56 + Ba | <2e | 0.003 |
| 15 + P | 0.019 | 0.002 | 34 Se | < | | Sum La ... Lu | 0.002 | 0.018 |
| 16 + S | 0.14 | 0.01 | 35 Br | < | | 72 Hf | < | |
| 16 So | | | 37 Rb | < | | 73 Ta | < | |
| 17 + Cl | 0.075 | 0.006 | 38 Sr | < | | 74 + W | 0.009 | 0.001 |
| 18 + Ar | 0.012 | 0.003 | 39 Y | < | | 75 Re | < | |
| 19 + K | 0.028 | 0.002 | 40 + Zr | < | | 76 Os | < | |
| 20 + Ca | 0.025 | 0.002 | 41 Nb | < | | 77 Ir | < | |
| 21 Sc | < | | 42 Mo | < | | 78 Pt | < | |
| 22 + Ti | 0.064 | 0.005 | 44 Ru | < | | 79 Au | < | |
| 23 + V | < | | 45 Rh | < | | 80 Hg | < | |
| 24 + Cr | < | | 46 Pd | < | | 81 Tl | < | |
| 25 Mn | < | | 47 Ag | < | | 82 Pb | < | |
| 26 + Fe | 0.045 | 0.004 | 48 + Cd | < | | 83 Bi | < | |
| 27 + Co | < | | 49 In | < | | 90 + Th | <2e | 0.001 |
| 28 + Ni | 0.0051 | 0.0006 | 50 Sn | < | | 92 U | < | |

| Light Elements | | Noble Elements | | Lanthanides | |
|---|---|---|---|---|---|
| 4 Be | | 44 Ru | < | 57 La | < |
| 5 B | | 45 Rh | < | 58 Ce | < |
| 6 C | | 46 Pd | < | 59 Pr | < |
| 7 N | | 47 Ag | < | 60 Nd | < |
| 8 O | | 75 Re | < | 62 Sm | < |
| 9 F | < | 76 Os | < | 63 Eu | < |
| | | 77 Ir | < | 64 Gd | < |
| | | 78 Pt | < | 65 Tb | < |
| | | 79 Au | < | 66 Dy | < |
| | | | | 67 Ho | < |
| | | | | 68 Er | < |
| | | | | 69 Tm | < |
| | | | | 70 Yb | < |
| | | | | 71 Lu | < |
| KnownConc = 0 | | REST = 0 | | D/S = 0 | |

Sum Conc's before normalisation to 100%: 90.0%

TABLE 27

| Quantum Catalytics, LLC ANALYSIS REPORT by Uniquant | |
|---|---|
| OLD.245 of Apr. 19, 2001 | Today Apr. 24, 2001 |
| Spectrometers configuration: | ARL 8410 Rh 60 kV LiF220 LiF420 Ge111 TlAP |
| Sample ident = 15-01-01 | MID BOTTOM FACE |
| Further info = 15-01-01 | Si MID SECTION BOT FACE AXIAL |
| Kappa list = Nov. 15, 1994 | Channel list = Apr. 19, 2001 |
| Calculated as: Elements | Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.017 | 29 + Cu | 0.0075 | 0.0007 | 51 Sb | < | |
| 11 + Na | 0.033 | 0.003 | 30 + Zn | < | | 52 Te | < | |
| 12 Mg | < | | 31 + Ga | 0.0021 | 0.0003 | 53 I | < | |
| 13 + Al | 0.71 | 0.04 | 32 Ge | < | | 55 + Cs | <2e | 0.002 |
| 14 + Si | 98.81 | 0.05 | 33 As | < | | 56 + Ba | <2e | 0.003 |
| 15 + P | 0.016 | 0.001 | 34 Se | < | | Sum La . . . Lu | 0.006 | 0.018 |
| 16 + S | 0.23 | 0.02 | 35 Br | < | | 72 Hf | < | |
| 16 So | | | 37 Rb | < | | 73 Ta | < | |
| 17 + Cl | 0.057 | 0.005 | 38 Sr | < | | 74 + W | 0.007 | 0.001 |
| 18 + Ar | 0.007 | 0.002 | 39 Y | < | | 75 Re | < | |
| 19 + K | 0.012 | 0.001 | 40 Zr | < | | 76 Os | < | |
| 20 + Ca | 0.041 | 0.003 | 41 Nb | < | | 77 Ir | < | |
| 21 Sc | < | | 42 Mo | < | | 78 Pt | < | |
| 22 + Ti | 0.020 | 0.002 | 44 Ru | < | | 79 Au | < | |
| 23 + V | < | | 45 Rh | < | | 80 Hg | < | |
| 24 + Cr | < | | 46 Pd | < | | 81 Tl | < | |
| 25 Mn | < | | 47 Ag | < | | 82 Pb | < | |
| 26 + Fe | 0.026 | 0.002 | 48 Cd | < | | 83 Bi | < | |
| 27 + Co | < | | 49 In | < | | 90 Th | < | |
| 28 + Ni | 0.0034 | 0.0006 | 50 Sn | < | | 92 U | < | |

| Light Elements | | Noble Elements | | Lanthanides | | |
|---|---|---|---|---|---|---|
| 4 Be | | 44 Ru | < | 57 La | < | |
| 5 B | | 45 Rh | < | 58 Ce | < | |
| 6 C | | 46 Pd | < | 59 Pr | < | |
| 7 N | | 47 Ag | < | 60 Nd | < | |
| 8 O | | 75 Re | < | 62 Sm | < | |
| 9 F | < | 76 Os | < | 63 Eu | < | |
| | | 77 Ir | < | 64 Gd | < | |
| | | 78 Pt | < | 65 Tb | < | |
| | | 79 Au | < | 66 Dy | < | |
| | | | | 67 Ho | <2e | 0.002 |
| | | | | 68 + Er | <2e | 0.001 |
| | | | | 69 Tm | < | |
| | | | | 70 Yb | < | |
| | | | | 71 Lu | < | |
| KnownConc = 0 | | REST = 0 | | D/S = 0 | | |

Sum Conc's before normalisation to 100%: 91.9%

TABLE 28

| Quantum Catalytics, LLC ANALYSIS REPORT by Uniquant | |
|---|---|
| OLD.326 of Jun. 1, 2001 | Today Jun. 4, 2001 |
| Spectrometers configuration: | ARL 8410 Rh 60 kV LiF220 LiF420 Ge111 TlAP |
| Sample ident = 15-01-02 | AXIAL TOP |
| Further info = 15-01-02 | AXIAL TOP |
| Kappa list = Nov. 15, 1994 | Channel list = May 24, 2001 |
| Calculated as: Elements | Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.026 | 29 + Cu | 0.012 | 0.002 | 51 Sb | < | |
| 11 Na | <2e | 0.009 | 30 Zn | < | | 52 Te | < | |
| 12 Mg | < | | 31 Ga | < | | 53 I | < | |
| 13 + Al | 1.89 | 0.06 | 32 Ge | < | | 55 Cs | < | |
| 14 + Si | 0.032 | 0.005 | 33 As | < | | 56 Ba | <2e | 0.003 |
| 15 + P | 0.0033 | 0.0003 | 34 Se | < | | Sum La . . . Lu | 0 | 0.20 |
| 16 S | | | 35 Br | < | | 72 Hf | <2e | 0.005 |
| 16 + So | 0.0077 | 0.0007 | 37 Rb | < | | 73 Ta | < | |
| 17 + Cl | 0.0040 | 0.0006 | 38 Sr | < | | 74 + W | 0.009 | 0.004 |
| 18 + Ar | 0.012 | 0.001 | 39 Y | < | | 75 Re | <2e | 0.004 |
| 19 K | < | | 40 + Zr | 0.0099 | 0.0009 | 76 Os | < | |
| 20 + Ca | 0.0053 | 0.0006 | 41 Nb | < | | 77 Ir | < | |
| 21 + Sc | 0.0025 | 0.0005 | 42 Mo | < | | 78 Pt | < | |
| 22 Ti | < | | 44 Ru | < | | 79 Au | < | |
| 23 V | < | | 45 Rh | < | | 80 Hg | < | |
| 24 Cr | < | | 46 Pd | < | | 81 Tl | < | |
| 25 Mn | < | | 47 Ag | <2e | 0.002 | 82 Pb | < | |
| 26 + Fe | 98.01 | 0.07 | 48 Cd | <2e | 0.001 | 83 Bi | < | |
| 27 Co | < | | 49 In | < | | 90 + Th | 0.006 | 0.002 |
| 28 Ni | < | | 50 Sn | < | | 92 U | < | |

| Light Elements | | Noble Elements | | | Lanthanides | | |
|---|---|---|---|---|---|---|---|
| 4 Be | | 44 Ru | < | | 57 La | < | |
| 5 B | | 45 Rh | < | | 58 Ce | < | |
| 6 C | | 46 Pd | < | | 59 + Pr | <2e | 0.006 |
| 7 N | | 47 Ag | <2e | 0.002 | 60 Nd | < | |
| 8 O | | 75 Re | <2e | 0.004 | 62 + Sm | < | |
| 9 F | < | 76 Os | < | | 63 Eu | < | |
| | | 77 Ir | < | | 64 Gd | < | |
| | | 78 Pt | < | | 65 + Tb | < | |
| | | 79 Au | < | | 66 Dy | < | |
| | | | | | 67 Ho | < | |
| | | | | | 68 + Er | < | |
| | | | | | 69 + Tm | < | |
| | | | | | 70 Yb | < | |
| | | | | | 71 Lu | < | |
| KnownConc = 0 | | REST = 0 | | | D/S = 0 | | |

Sum Conc's before normalisation to 100%: 96.5%

TABLE 29

Quantum Catalytics, LLC ANALYSIS REPORT by Uniquant

| | |
|---|---|
| OLD.329 of Jun. 1, 2001 | Today Jun. 4, 2001 |
| Spectrometers configuration: | ARL 8410 Rh 60 kV LiF220 LiF420 Ge111 TlAP |
| Sample ident = 15-01-02 | Fe RADIAL |
| Further info = 15-01-02 | Fe RADIAL |
| Kappa list = Nov. 15, 1994 | Channel list = May 24, 2001 |
| Calculated as: Elements | Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.024 | 29 + Cu | 0.014 | 0.002 | 51 Sb | < | |
| 11 + Na | 0.040 | 0.009 | 30 Zn | < | | 52 Te | < | |
| 12 Mg | < | | 31 Ga | < | | 53 I | < | |
| 13 + Al | 2.96 | 0.08 | 32 Ge | < | | 55 Cs | < | |
| 14 + Si | 0.14 | 0.01 | 33 As | < | | 56 Ba | < | |
| 15 + P | 0.0036 | 0.0003 | 34 Se | < | | Sum La . . . Lu | 0 | 0.20 |
| 16 S | | | 35 Br | < | | 72 Hf | < | |
| 16 + So | 0.012 | 0.001 | 37 Rb | < | | 73 Ta | < | |
| 17 + Cl | 0.0044 | 0.0006 | 38 Sr | < | | 74 W | < | |
| 18 + Ar | 0.013 | 0.001 | 39 Y | < | | 75 Re | <2e | 0.004 |
| 19 K | < | | 40 + Zr | 0.012 | 0.001 | 76 Os | < | |
| 20 + Ca | 0.0073 | 0.0007 | 41 Nb | < | | 77 Ir | < | |
| 21 + Sc | 0.0026 | 0.0005 | 42 Mo | < | | 78 Pt | < | |
| 22 Ti | < | | 44 Ru | < | | 79 Au | < | |
| 23 V | < | | 45 Rh | < | | 80 Hg | <2e | 0.003 |
| 24 Cr | < | | 46 Pd | < | | 81 Tl | < | |
| 25 Mn | < | | 47 Ag | < | | 82 Pb | < | |
| 26 + Fe | 96.78 | 0.09 | 48 Cd | < | | 83 Bi | < | |
| 27 Co | < | | 49 In | < | | 90 Th | <2e | 0.002 |
| 28 Ni | < | | 50 Sn | < | | 92 U | < | |

| Light Elements | | Noble Elements | | | Lanthanides | | |
|---|---|---|---|---|---|---|---|
| 4 Be | | 44 Ru | < | | 57 La | < | |
| 5 B | | 45 Rh | < | | 58 Ce | <2e | 0.003 |
| 6 C | | 46 Pd | < | | 59 Pr | < | |
| 7 N | | 47 Ag | < | | 60 Nd | < | |
| 8 O | | 75 Re | <2e | 0.004 | 62 + Sm | < | |
| 9 F | < | 76 Os | < | | 63 Eu | <2e | 0.003 |
| | | 77 Ir | < | | 64 Gd | < | |
| | | 78 Pt | < | | 65 + Tb | < | |
| | | 79 Au | < | | 66 Dy | < | |
| | | | | | 67 Ho | < | |
| | | | | | 68 + Er | < | |
| | | | | | 69 + Tm | < | |
| | | | | | 70 Yb | < | |
| | | | | | 71 Lu | < | |
| KnownConc = 0 | | REST = 0 | | | D/S = 0 | | |

Sum Conc's before normalisation to 100%: 97.8%

TABLE 30

Quantum Catalytics, LLC ANALYSIS REPORT by Uniquant

| | |
|---|---|
| OLD.338 of Jun. 11, 2001 | Today Jun. 11, 2001 |
| Spectrometers configuration: | ARL 8410 Rh 60 kV LiF220 LiF420 Ge111 TlAP |
| Sample ident = 15-01-04 | AXIAL |
| Further info = 15-01-04 | Ni/W/Ta/Hf AXIAL 6/11 |
| Kappa list = Nov. 15, 1994 | Channel list = Jun. 4, 2001 |
| Calculated as: Elements | Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.036 | 29 Cu | < | | 51 Sb | < | |
| 11 + Na | 0.066 | 0.009 | 30 Zn | < | | 52 Te | < | |
| 12 Mg | < | | 31 Ga | < | | 53 I | < | |
| 13 + Al | 3.57 | 0.09 | 32 Ge | < | | 55 Cs | < | |
| 14 + Si | 0.23 | 0.02 | 33 As | < | | 56 Ba | < | |
| 15 + P | 0.0025 | 0.0004 | 34 + Se | < | | Sum La . . . Lu | 0.58 | 1.17 |
| 16 + S | 0.0069 | 0.0006 | 35 Br | < | | 72 + Hf | 1.78 | 0.06 |
| 16 So | | | 37 Rb | < | | 73 + Ta | 1.76 | 0.06 |
| 17 + Cl | 0.0044 | 0.0008 | 38 Sr | < | | 74 + W | 1.49 | 0.06 |
| 18 + Ar | 0.018 | 0.002 | 39 Y | < | | 75 Re | < | |
| 19 K | < | | 40 + Zr | < | | 76 Os | < | |
| 20 + Ca | 0.0025 | 0.0008 | 41 Nb | < | | 77 + Ir | < | |
| 21 + Sc | 0.0036 | 0.0009 | 42 Mo | < | | 78 Pt | < | |
| 22 Ti | < | | 44 Ru | < | | 79 Au | < | |
| 23 V | < | | 45 Rh | < | | 80 + Hg | < | |
| 24 Cr | < | | 46 Pd | < | | 81 Tl | < | |
| 25 Mn | < | | 47 Ag | < | | 82 Pb | < | |
| 26 Fe | < | | 48 Cd | < | | 83 + Bi | < | |
| 27 Co | < | | 49 In | < | | 90 Th | <2e | 0.003 |
| 28 + Ni | 90.5 | 0.1 | 50 Sn | < | | 92 U | < | |

| Light Elements | | Noble Elements | | Lanthanides | | |
|---|---|---|---|---|---|---|
| 4 Be | | 44 Ru | < | 57 La | < | |
| 5 B | | 45 Rh | < | 58 Ce | < | |
| 6 C | | 46 Pd | < | 59 Pr | < | |
| 7 N | | 47 Ag | < | 60 Nd | < | |
| 8 O | | 75 Re | < | 62 Sm | < | |
| 9 F | < | 76 Os | < | 63 Eu | <2e | 0.002 |
| | | 77 + Ir | < | 64 Gd | < | |
| | | 78 Pt | < | 65 Tb | < | |
| | | 79 Au | < | 66 Dy | < | |
| | | | | 67 + Ho | < | |
| | | | | 68 + Er | < | |
| | | | | 69 + Tm | < | |
| | | | | 70 + Yb | 0.58 | 0.26 |
| | | | | 71 Lu | < | |
| KnownConc = 0 | | REST = 0 | | D/S = 0 | | |

Sum Conc's before normalisation to 100%: 101.0%

TABLE 31

Quantum Catalytics, LLC ANALYSIS REPORT by Uniquant

| | |
|---|---|
| OLD.339 of Jun. 4, 2001 | Today Jun. 11, 2001 |
| Spectrometers configuration: | ARL 8410 Rh 60 kV LiF220 LiF420 Ge111 TlAP |
| Sample ident = 15-01-04 | RADIAL |
| Further info = 15-01-04 | Ni/W/Ta/Hf RADIAL 6/11 |
| Kappa list = Nov. 15, 1994 | Channel list = Jun. 4, 2001 |
| Calculated as: Elements | Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.036 | 29 + Cu | < | | 51 Sb | < | |
| 11 + Na | 0.043 | 0.009 | 30 Zn | < | | 52 Te | < | |
| 12 Mg | < | | 31 + Ga | <2e | 0.002 | 53 I | < | |
| 13 + Al | 3.38 | 0.09 | 32 + Ge | < | | 55 Cs | <2e | 0.003 |
| 14 + Si | 0.74 | 0.04 | 33 As | < | | 56 Ba | < | |
| 15 + P | < | | 34 + Se | < | | Sum La . . . Lu | 0.57 | 1.16 |
| 16 + S | 0.0053 | 0.0005 | 35 Br | < | | 72 + Hf | 2.00 | 0.07 |
| 16 So | | | 37 Rb | < | | 73 + Ta | 1.78 | 0.06 |
| 17 + Cl | 0.0059 | 0.0008 | 38 Sr | < | | 74 + W | 1.50 | 0.06 |
| 18 + Ar | 0.019 | 0.002 | 39 Y | < | | 75 + Re | < | |
| 19 K | < | | 40 + Zr | < | | 76 Os | < | |
| 20 Ca | < | | 41 Nb | < | | 77 + Ir | < | |
| 21 + Sc | 0.0020 | 0.0009 | 42 Mo | < | | 78 Pt | < | |
| 22 Ti | < | | 44 Ru | < | | 79 + Au | < | |
| 23 V | < | | 45 Rh | < | | 80 + Hg | < | |
| 24 Cr | < | | 46 Pd | < | | 81 Tl | < | |
| 25 Mn | < | | 47 Ag | < | | 82 Pb | < | |
| 26 Fe | < | | 48 Cd | <2e | 0.002 | 83 + Bi | < | |
| 27 Co | < | | 49 In | < | | 90 Th | <2e | 0.003 |
| 28 + Ni | 90.0 | 0.2 | 50 Sn | < | | 92 U | < | |

| Light Elements | | Noble Elements | | Lanthanides | | |
|---|---|---|---|---|---|---|
| 4 Be | | 44 Ru | < | 57 La | < | |
| 5 B | | 45 Rh | < | 58 Ce | < | |
| 6 C | | 46 Pd | < | 59 Pr | < | |
| 7 N | | 47 Ag | < | 60 Nd | < | |
| 8 O | | 75 + Re | < | 62 Sm | < | |
| 9 F | < | 76 Os | < | 63 Eu | < | |
| | | 77 + Ir | < | 64 Gd | <2e | 0.002 |
| | | 78 Pt | < | 65 Tb | < | |
| | | 79 + Au | < | 66 Dy | < | |
| | | | | 67 + Ho | < | |
| | | | | 68 + Er | < | |
| | | | | 69 + Tm | < | |
| | | | | 70 + Yb | 0.57 | 0.26 |
| | | | | 71 Lu | < | |
| KnownConc = 0 | | REST = 0 | | D/S = 0 | | |

Sum Conc's before normalisation to 100%: 101.9%

TABLE 32

Quantum Catalytics, LLC ANALYSIS REPORT by Uniquant

OLD.615 of Mar. 7, 2002  Today Mar. 7, 2002
Spectrometers configuration: ARL 8410 Rh 60 kV LiF220 LiF420 Ge111 TlAP
Sample ident = 14-00-01  AX
Further info = 14-00-01  AXIAL POLISHED VAC 3/7/02
Kappa list = Nov. 15, 1994  Channel list = Jan. 8, 2002
Calculated as:  Elements Spectral impurity data: CAL.909 Teflon (7/94)
X-ray path = Vacuum  Film type = No supporting film
Case number = 0  Known Area, % Rest, Diluent/Sample and Mass/Area
Eff. Diam. = 25.00 mm  Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be ... F | 0 | 0.043 | 29 + Cu | 98.88 | 0.05 | 51 Sb | < | |
| 11 + Na | 0.063 | 0.012 | 30 + Zn | < | | 52 Te | < | |
| 12 Mg | < | | 31 + Ga | 0.008 | 0.003 | 53 I | < | |
| 13 + Al | 0.33 | 0.02 | 32 Ge | < | | 55 Cs | < | |
| 14 + Si | 0.66 | 0.03 | 33 As | < | | 56 Ba | < | |
| 15 + P | < | | 34 Se | < | | Sum La ... Lu | 0.021 | 0.073 |
| 16 + S | 0.0042 | 0.0004 | 35 Br | < | | 72 + Hf | < | |
| 16 So | | | 37 Rb | < | | 73 + Ta | < | |
| 17 + Cl | 0.026 | 0.002 | 38 Sr | < | | 74 W | < | |
| 18 + Ar | 0.013 | 0.001 | 39 Y | < | | 75 Re | < | |
| 19 K | < | | 40 Zr | < | | 76 Os | < | |
| 20 Ca | < | | 41 Nb | < | | 77 Ir | <2e | 0.008 |
| 21 + Sc | < | | 42 Mo | <2e | 0.002 | 78 Pt | < | |
| 22 Ti | < | | 44 Ru | < | | 79 Au | < | |
| 23 V | < | | 45 Rh | <2e | 0.002 | 80 Hg | <2e | 0.006 |
| 24 Cr | < | | 46 Pd | < | | 81 Tl | < | |
| 25 Mn | < | | 47 Ag | <2e | 0.002 | 82 Pb | < | |
| 26 Fe | < | | 48 Cd | <2e | 0.002 | 83 Bi | < | |
| 27 Co | < | | 49 In | < | | 90 Th | < | |
| 28 Ni | < | | 50 Sn | < | | 92 U | < | |

| Light Elements | | | Noble Elements | | | Lanthanides | | |
|---|---|---|---|---|---|---|---|---|
| 4 Be | | | 44 Ru | < | | 57 + La | 0.012 | 0.005 |
| 5 B | | | 45 Rh | <2e | 0.002 | 58 Ce | < | |
| 6 C | | | 46 Pd | < | | 59 Pr | < | |
| 7 N | | | 47 Ag | <2e | 0.002 | 60 Nd | < | |
| 8 O | | | 75 Re | < | | 62 Sm | < | |
| 9 F | < | | 76 Os | < | | 63 Eu | < | |
| | | | 77 Ir | <2e | 0.008 | 64 Gd | < | |
| | | | 78 Pt | < | | 65 Tb | <2e | 0.002 |
| | | | 79 Au | < | | 66 Dy | < | |
| | | | | | | 67 Ho | < | |
| | | | | | | 68 Er | <2e | 0.004 |
| | | | | | | 69 Tm | <2e | 0.004 |
| | | | | | | 70 Yb | < | |
| | | | | | | 71 + Lu | < | |
| KnownConc = 0 | | | REST = 0 | | | D/S = 0 | | |

Sum Conc's before normalisation to 100%: 100.0%

TABLE 33

| Quantum Catalytics, LLC ANALYSIS REPORT by Uniquant | |
|---|---|
| OLD.620 of Jan. 8, 2002 | Today Mar. 7, 2002 |
| Spectrometers configuration: | ARL 8410 Rh 60 kV LiF220 LiF420 Ge111 TlAP |
| Sample ident = 14-00-01 | RAD |
| Further info = 14-00-01 | RADIAL POLISHED VAC 3/7/02 |
| Kappa list = Nov. 15, 1994 | Channel list = Jan. 8, 2002 |
| Calculated as: | Elements Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0.11 | 0.04 | 29 + Cu | 98.84 | 0.05 | 51 Sb | < | |
| 11 + Na | 0.11 | 0.01 | 30 + Zn | < | | 52 Te | < | |
| 12 Mg | < | | 31 Ga | <2e | 0.003 | 53 I | < | |
| 13 + Al | 0.28 | 0.02 | 32 Ge | < | | 55 Cs | <2e | 0.003 |
| 14 + Si | 0.58 | 0.03 | 33 As | < | | 56 Ba | 0.006 | 0.003 |
| 15 + P | < | | 34 Se | < | | Sum La . . . Lu | 0.011 | 0.072 |
| 16 + S | 0.0065 | 0.0006 | 35 Br | < | | 72 + Hf | < | |
| 16 So | | | 37 Rb | < | | 73 + Ta | < | |
| 17 + Cl | 0.029 | 0.002 | 38 Sr | < | | 74 W | < | |
| 18 + Ar | 0.015 | 0.001 | 39 Y | < | | 75 Re | <2e | 0.007 |
| 19 + K | 0.0021 | 0.0007 | 40 Zr | < | | 76 Os | <2e | 0.007 |
| 20 + Ca | 0.0041 | 0.0008 | 41 Nb | < | | 77 + Ir | 0.018 | 0.008 |
| 21 Sc | < | | 42 + Mo | <2e | 0.002 | 78 Pt | <2e | 0.008 |
| 22 Ti | <2e | 0.001 | 44 Ru | <2e | 0.002 | 79 Au | < | |
| 23 V | < | | 45 Rh | < | | 80 Hg | < | |
| 24 Cr | < | | 46 Pd | < | | 81 Tl | < | |
| 25 Mn | < | | 47 Ag | <2e | 0.002 | 82 Pb | < | |
| 26 Fe | < | | 48 Cd | <2e | 0.002 | 83 Bi | < | |
| 27 + Co | < | | 49 In | < | | 90 Th | <2e | 0.003 |
| 28 Ni | < | | 50 Sn | < | | 92 U | < | |

| Light Elements | | | Noble Elements | | | Lanthanides | | |
|---|---|---|---|---|---|---|---|---|
| 4 Be | | | 44 Ru | <2e | 0.002 | 57 La | <2e | 0.005 |
| 5 B | | | 45 Rh | < | | 58 Ce | < | |
| 6 C | | | 46 Pd | < | | 59 Pr | < | |
| 7 N | | | 47 Ag | <2e | 0.002 | 60 Nd | < | |
| 8 O | | | 75 Re | <2e | 0.007 | 62 Sm | < | |
| 9 + F | 0.11 | 0.04 | 76 Os | <2e | 0.007 | 63 Eu | <2e | 0.002 |
| | | | 77 + Ir | 0.018 | 0.008 | 64 Gd | < | |
| | | | 78 Pt | <2e | 0.008 | 65 Tb | <2e | 0.002 |
| | | | 79 Au | < | | 66 Dy | < | |
| | | | | | | 67 Ho | < | |
| | | | | | | 68 Er | < | |
| | | | | | | 69 Tm | <2e | 0.004 |
| | | | | | | 70 Yb | < | |
| | | | | | | 71 + Lu | < | |
| KnownConc = 0 | | | REST = 0 | | | D/S = 0 | | |

Sum Conc's before normalisation to 100%: 99.8%

TABLE 34

| Quantum Catalytics, LLC ANALYSIS REPORT by Uniquant | |
|---|---|
| OLD.613 of Mar. 7, 2002 | Today Mar. 7, 2002 |
| Spectrometers configuration: | ARL 8410 Rh 60 kV LiF220 LiF420 Ge111 TlAP |
| Sample ident = 14-00-03 | AX |
| Further info = 14-00-03 | AXIAL POLISHED VAC 3/7/02 |
| Kappa list = Nov. 15, 1994 | Channel list = Jan. 8, 2002 |
| Calculated as: | Elements Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be ... F | 0 | 0.043 | 29 + Cu | 99.69 | 0.03 | 51 Sb | < | |
| 11 + Na | 0.039 | 0.012 | 30 + Zn | < | | 52 Te | < | |
| 12 Mg | < | | 31 Ga | <2e | 0.003 | 53 I | < | |
| 13 + Al | 0.103 | 0.008 | 32 Ge | <2e | 0.002 | 55 Cs | < | |
| 14 + Si | 0.036 | 0.006 | 33 As | < | | 56 Ba | < | |
| 15 + P | < | | 34 Se | < | | Sum La ... Lu | 0.033 | 0.071 |
| 16 + S | 0.0056 | 0.0005 | 35 Br | < | | 72 + Hf | < | |
| 16 So | | | 37 Rb | < | | 73 + Ta | < | |
| 17 + Cl | 0.037 | 0.003 | 38 Sr | < | | 74 W | < | |
| 18 + Ar | 0.013 | 0.001 | 39 Y | < | | 75 Re | < | |
| 19 + K | < | | 40 Zr | < | | 76 Os | < | |
| 20 + Ca | 0.0048 | 0.0008 | 41 Nb | < | | 77 + Ir | 0.031 | 0.008 |
| 21 Sc | < | | 42 + Mo | 0.005 | 0.002 | 78 Pt | < | |
| 22 + Ti | 0.003 | 0.001 | 44 Ru | < | | 79 Au | <2e | 0.007 |
| 23 V | < | | 45 Rh | < | | 80 Hg | < | |
| 24 Cr | < | | 46 Pd | < | | 81 Tl | < | |
| 25 Mn | < | | 47 Ag | < | | 82 Pb | < | |
| 26 Fe | < | | 48 Cd | <2e | 0.002 | 83 Bi | < | |
| 27 + Co | < | | 49 In | < | | 90 Th | < | |
| 28 Ni | < | | 50 Sn | < | | 92 U | < | |

| Light Elements | | | Noble Elements | | | Lanthanides | | |
|---|---|---|---|---|---|---|---|---|
| 4 Be | | | 44 Ru | < | | 57 + La | 0.015 | 0.005 |
| 5 B | | | 45 Rh | < | | 58 Ce | < | |
| 6 C | | | 46 Pd | < | | 59 Pr | < | |
| 7 N | | | 47 Ag | < | | 60 Nd | < | |
| 8 O | | | 75 Re | < | | 62 Sm | < | |
| 9 F | < | | 76 Os | < | | 63 Eu | <2e | 0.002 |
| | | | 77 + Ir | 0.031 | 0.008 | 64 Gd | < | |
| | | | 78 Pt | < | | 65 Tb | < | |
| | | | 79 Au | <2e | 0.007 | 66 Dy | < | |
| | | | | | | 67 Ho | < | |
| | | | | | | 68 + Er | 0.015 | 0.004 |
| | | | | | | 69 Tm | < | |
| | | | | | | 70 Yb | < | |
| | | | | | | 71 + Lu | < | |
| KnownConc = 0 | | | REST = 0 | | | D/S = 0 | | |

Sum Conc's before normalisation to 100%: 99.4%

TABLE 35

Quantum Catalytics, LLC ANALYSIS REPORT by Uniquant

| | |
|---|---|
| OLD.618 of Jan. 8, 2002 | Today Mar. 7, 2002 |
| Spectrometers configuration: | ARL 8410 Rh 60 kV LiF220 LiF420 Ge111 TlAP |
| Sample ident = 14-00-03 | RAD |
| Further info = 14-00-03 | RADIAL POLISHED VAC 3/7/02 |
| Kappa list = Nov. 15, 1994 | Channel list = Jan. 8, 2002 |
| Calculated as: | Elements Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.042 | 29 + Cu | 98.93 | 0.05 | 51 Sb | < | |
| 11 + Na | 0.23 | 0.02 | 30 + Zn | < | | 52 Te | < | |
| 12 Mg | < | | 31 + Ga | 0.008 | 0.003 | 53 I | < | |
| 13 + Al | 0.37 | 0.02 | 32 Ge | <2e | 0.003 | 55 Cs | < | |
| 14 + Si | 0.29 | 0.02 | 33 As | < | | 56 Ba | < | |
| 15 + P | 0.004 | 0.001 | 34 Se | < | | Sum La . . . Lu | 0.008 | 0.072 |
| 16 + S | 0.021 | 0.002 | 35 Br | < | | 72 + Hf | < | |
| 16 So | | | 37 Rb | < | | 73 + Ta | < | |
| 17 + Cl | 0.068 | 0.006 | 38 Sr | <2e | 0.001 | 74 W | < | |
| 18 + Ar | 0.018 | 0.002 | 39 Y | < | | 75 Re | < | |
| 19 + K | 0.013 | 0.001 | 40 Zr | < | | 76 Os | < | |
| 20 + Ca | 0.017 | 0.002 | 41 Nb | < | | 77 + Ir | 0.023 | 0.008 |
| 21 + Sc | 0.0036 | 0.0009 | 42 Mo | < | | 78 Pt | < | |
| 22 Ti | < | | 44 Ru | < | | 79 Au | < | |
| 23 V | < | | $$ Rh | <2e | 0.002 | 80 Hg | <2e | 0.007 |
| 24 Cr | < | | 46 Pd | < | | 81 Tl | <2e | 0.005 |
| 25 Mn | < | | 47 + Ag | 0.004 | 0.002 | 82 Pb | <2e | 0.003 |
| 26 Fe | < | | 48 Cd | <2e | 0.002 | 83 Bi | < | |
| 27 Co | < | | 49 In | < | | 90 Th | < | |
| 28 Ni | < | | 50 Sn | < | | 92 U | < | |

| Light Elements | | Noble Elements | | | Lanthanides | | |
|---|---|---|---|---|---|---|---|
| 4 Be | | 44 Ru | < | | 57 La | < | |
| 5 B | | 45 Rh | <2e | 0.002 | 58 Ce | < | |
| 6 C | | 46 Pd | < | | 59 Pr | < | |
| 7 N | | 47 + Ag | 0.004 | 0.002 | 60 Nd | < | |
| 8 O | | 75 Re | < | | 62 Sm | < | |
| 9 F | < | 76 Os | < | | 63 Eu | < | |
| | | 77 + Ir | 0.023 | 0.008 | 64 Gd | < | |
| | | 78 Pt | < | | 65 Tb | <2e | 0.002 |
| | | 79 Au | < | | 66 Dy | < | |
| | | | | | 67 Ho | < | |
| | | | | | 68 Er | <2e | 0.004 |
| | | | | | 69 Tm | < | |
| | | | | | 70 Yb | < | |
| | | | | | 71 + Lu | < | |
| KnownConc = 0 | | REST = 0 | | | D/S = 0 | | |

Sum Conc's before normalisation to 100%: 99.0%

TABLE 36

| Quantum Catalytics, LLC ANALYSIS REPORT by Uniquant | |
|---|---|
| OLD.612 of Mar. 7, 2002 | Today Mar. 7, 2002 |
| Spectrometers configuration: | ARL 8410 Rh 60 kV LiF220 LiF420 Ge111 TlAP |
| Sample ident = 14-00-04 | AX |
| Further info = 14-00-04 | AXIAL POLISHED VAC 3/7/02 |
| Kappa list = Nov. 15, 1994 | Channel list = Jan. 8, 2002 |
| Calculated as: | Elements Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.042 | 29 + Cu | 99.29 | 0.05 | 51 Sb | < | |
| 11 + Na | 0.070 | 0.011 | 30 + Zn | < | | 52 Te | < | |
| 12 Mg | < | | 31 Ga | <2e | 0.003 | 53 I | < | |
| 13 + Al | 0.27 | 0.02 | 32 Ge | < | | 55 Cs | <2e | 0.003 |
| 14 + Si | 0.29 | 0.02 | 33 As | < | | 56 Ba | <2e | 0.003 |
| 15 + P | < | | 34 Se | < | | Sum La . . . Lu | 0.023 | 0.072 |
| 16 S | | | 35 Br | < | | 72 + Hf | <2e | 0.022 |
| 16 + So | 0.0074 | 0.0007 | 37 Rb | < | | 73 + Ta | < | |
| 17 + Cl | 0.021 | 0.002 | 38 Sr | < | | 74 W | < | |
| 18 + Ar | 0.012 | 0.001 | 39 Y | < | | 75 Re | < | |
| 19 + K | 0.0023 | 0.0007 | 40 Zr | < | | 76 Os | < | |
| 20 Ca | < | | 41 Nb | < | | 77 + Ir | 0.026 | 0.008 |
| 21 Sc | < | | 42 Mo | < | | 78 Pt | <2e | 0.007 |
| 22 + Ti | <2e | 0.001 | 44 Ru | < | | 79 Au | < | |
| 23 V | < | | 45 Rh | < | | 80 Hg | <2e | 0.006 |
| 24 Cr | < | | 46 Pd | < | | 81 Tl | < | |
| 25 Mn | < | | 47 Ag | < | | 82 Pb | < | |
| 26 Fe | < | | 48 Cd | < | | 83 Bi | < | |
| 27 Co | < | | 49 In | < | | 90 Th | < | |
| 28 Ni | < | | 50 Sn | < | | 92 U | < | |

| Light Elements | | Noble Elements | | | Lanthanides | | |
|---|---|---|---|---|---|---|---|
| 4 Be | | 44 Ru | < | | 57 + La | 0.013 | 0.005 |
| 5 B | | 45 Rh | < | | 58 Ce | < | |
| 6 C | | 46 Pd | < | | 59 Pr | < | |
| 7 N | | 47 Ag | < | | 60 Nd | < | |
| 8 O | | 75 Re | < | | 62 Sm | < | |
| 9 F | < | 76 Os | < | | 63 Eu | < | |
| | | 77 + Ir | 0.026 | 0.008 | 64 Gd | < | |
| | | 78 Pt | <2e | 0.007 | 65 Tb | <2e | 0.002 |
| | | 79 Au | < | | 66 Dy | < | |
| | | | | | 67 Ho | < | |
| | | | | | 68 Er | <2e | 0.004 |
| | | | | | 69 Tm | <2e | 0.004 |
| | | | | | 70 Yb | < | |
| | | | | | 71 + Lu | < | |
| KnownConc = 0 | | REST = 0 | | | D/S = 0 | | |

Sum Conc's before normalisation to 100%: 99.5%

TABLE 37

Quantum Catalytics, LLC ANALYSIS REPORT by Uniquant

OLD.619 of Jan. 8, 2002  Today Mar. 7, 2002
Spectrometers configuration: ARL 8410 Rh 60 kV LiF220 LiF420 Ge111 TlAP
Sample ident = 14-00-04  RAD
Further info = 14-00-04  RADIAL POLISHED VAC 3/7/02
Kappa list = Nov. 15, 1994  Channel list = Jan. 8, 2002
Calculated as:  Elements Spectral impurity data: CAL.909 Teflon (7/94)
X-ray path = Vacuum  Film type = No supporting film
Case number = 0  Known Area, % Rest, Diluent/Sample and Mass/Area
Eff. Diam. = 25.00 mm  Eff. Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.044 | 29 + Cu | 98.59 | 0.06 | 51 Sb | < | |
| 11 + Na | 0.062 | 0.012 | 30 + Zn | < | | 52 Te | < | |
| 12 Mg | < | | 31 Ga | <2e | 0.003 | 53 I | < | |
| 13 + Al | 0.63 | 0.03 | 32 Ge | < | | 55 Cs | < | |
| 14 + Si | 0.60 | 0.03 | 33 As | < | | 56 Ba | < | |
| 15 + P | < | | 34 Se | < | | Sum La . . . Lu | 0.021 | 0.073 |
| 16 + S | 0.012 | 0.001 | 35 Br | < | | 72 + Hf | <2e | 0.022 |
| 16 So | | | 37 Rb | < | | 73 + Ta | < | |
| 17 + Cl | 0.020 | 0.002 | 38 Sr | < | | 74 W | < | |
| 18 + Ar | 0.016 | 0.002 | 39 Y | < | | 75 Re | <2e | 0.009 |
| 19 + K | < | | 40 + Zr | 0.005 | 0.001 | 76 Os | < | |
| 20 + Ca | 0.0109 | 0.0010 | 41 Nb | < | | 77 + Ir | 0.035 | 0.009 |
| 21 Sc | < | | 42 Mo | < | | 78 Pt | < | |
| 22 + Ti | 0.0037 | 0.0010 | 44 Ru | <2e | 0.002 | 79 Au | < | |
| 23 V | < | | 45 Rh | < | | 80 Hg | <2e | 0.006 |
| 24 + Cr | 0.0020 | 0.0006 | 46 Pd | < | | 81 Tl | < | |
| 25 Mn | < | | 47 Ag | < | | 82 Pb | < | |
| 26 Fe | < | | 48 Cd | <2e | 0.002 | 83 Bi | < | |
| 27 Co | < | | 49 In | < | | 90 Th | <2e | 0.003 |
| 28 Ni | < | | 50 Sn | < | | 92 U | < | |

| Light Elements | | | Noble Elements | | | Lanthanides | | |
|---|---|---|---|---|---|---|---|---|
| 4 Be | | | 44 Ru | <2e | 0.002 | 57 + La | 0.010 | 0.004 |
| 5 B | | | 45 Rh | < | | 58 Ce | < | |
| 6 C | | | 46 Pd | < | | 59 Pr | 0.005 | 0.002 |
| 7 N | | | 47 Ag | < | | 60 Nd | < | |
| 8 O | | | 75 Re | <2e | 0.009 | 62 Sm | < | |
| 9 F | < | | 76 Os | < | | 63 Eu | < | |
| | | | 77 + Ir | 0.035 | 0.009 | 64 Gd | <2e | 0.002 |
| | | | 78 Pt | < | | 65 Tb | <2e | 0.002 |
| | | | 79 Au | < | | 66 Dy | < | |
| | | | | | | 67 Ho | < | |
| | | | | | | 68 Er | < | |
| | | | | | | 69 Tm | < | |
| | | | | | | 70 Yb | < | |
| | | | | | | 71 + Lu | < | |
| KnownConc = 0 | | | REST = 0 | | | D/S = 0 | | |

Sum Conc's before normalisation to 100%: 88.1%

TABLE 38

Quantum Catalytics, LLC ANALYSIS REPORT by Uniquant

OLD.614 of Mar. 7, 2002  
Spectrometers configuration: ARL 8410 Rh 60 kV LiF220 LiF420 Ge111 TlAP  
Sample ident = 15-00-01  AX  
Further info = 15-00-01  AXIAL POLISHED VAC 3/7/02  
Kappa list = Nov. 15, 1994  Channel list = Jan. 8, 2002  
Calculated as:  Elements Spectral impurity data: CAL.909 Teflon (7/94)  
X-ray path = Vacuum  Film type = No supporting film  
Case number = 0  Known Area, % Rest, Diluent/Sample and Mass/Area  
Eff. Diam. = 25.00 mm  Eff. Area = 490.6 mm2  
KnownConc = 0%  
Rest = 0%  
Dil/Sample = 0  
Viewed Mass = 18000.00 mg  
Sample Height = 5 mm  
Today Mar. 7, 2002

< means that the concentration is < 20 ppm  
<2e means wt % < 2 StdErr. The + in Z + El means involved in Sum = 100%

| Z | wt % | StdErr | Z | wt % | StdErr | Z | wt % | StdErr |
|---|------|--------|---|------|--------|---|------|--------|
| Sum Be . . . F | 0 | 0.043 | 29 + Cu | 99.21 | 0.04 | 51 Sb | < | |
| 11 + Na | 0.048 | 0.012 | 30 + Zn | < | | 52 Te | < | |
| 12 Mg | < | | 31 + Ga | 0.008 | 0.003 | 53 I | < | |
| 13 + Al | 0.29 | 0.02 | 32 Ge | <2e | 0.002 | 55 Cs | <2e | 0.003 |
| 14 + Si | 0.37 | 0.02 | 33 As | < | | 56 Ba | < | |
| 15 + P | < | | 34 Se | < | | Sum La . . . Lu | 0.011 | 0.072 |
| 16 + S | 0.043 | 0.0004 | 35 Br | < | | 72 + Hf | <2e | 0.022 |
| 16 So | | | 37 Rb | < | | 73 + Ta | < | |
| 17 + Cl | 0.021 | 0.002 | 38 Sr | < | | 74 W | < | |
| 18 + Ar | 0.014 | 0.001 | 39 Y | < | | 75 Re | <2e | 0.008 |
| 19 + K | < | | 40 Zr | < | | 76 Os | <2e | 0.007 |
| 20 Ca | < | | 41 Nb | < | | 77 + Ir | 0.036 | 0.008 |
| 21 + Sc | 0.0021 | 0.0009 | 42 Mo | < | | 78 Pt | < | |
| 22 Ti | < | | 44 Ru | < | | 79 Au | <2e | 0.007 |
| 23 V | < | | 45 Rh | < | | 80 Hg | < | |
| 24 Cr | < | | 46 Pd | < | | 81 Tl | < | |
| 25 Mn | < | | 47 Ag | < | | 82 Pb | < | |
| 26 Fe | < | | 48 Cd | < | | 83 Bi | < | |
| 27 Co | < | | 49 In | < | | 90 Th | < | |
| 28 Ni | < | | 50 Sn | < | | 92 U | < | |

| Light Elements | | | Noble Elements | | | Lanthanides | | |
|---|---|---|---|---|---|---|---|---|
| 4 Be | | | 44 Ru | < | | 57 La | <2e | 0.005 |
| 5 B | | | 45 Rh | < | | 58 Ce | < | |
| 6 C | | | 46 Pd | < | | 59 Pr | < | |
| 7 N | | | 47 Ag | < | | 60 Nd | < | |
| 8 O | | | 75 Re | <2e | 0.008 | 62 Sm | < | |
| 9 F | < | | 76 Os | <2e | 0.007 | 63 Eu | < | |
| | | | 77 + Ir | 0.036 | 0.008 | 64 Gd | < | |
| | | | 78 Pt | < | | 65 Tb | < | |
| | | | 79 Au | <2e | 0.007 | 66 Dy | < | |
| | | | | | | 67 Ho | < | |
| | | | | | | 68 Er | <2e | 0.004 |
| | | | | | | 69 Tm | < | |
| | | | | | | 70 Yb | < | |
| | | | | | | 71 + Lu | < | |
| KnownConc = 0 | | | REST = 0 | | | D/S = 0 | | |

Sum Conc's before normalisation to 100%: 99.7%

TABLE 39

Quantum Catalytics, LLC ANALYSIS REPORT by Uniquant

OLD.617 of Jan. 8, 2002  
Spectrometers configuration: ARL 8410 Rh 60 kV LiF220 LiF420 Ge111 TlAP  
Sample ident = 15-00-01  RAD  
Further info = 15-00-01  RADIAL POLISHED VAC 3/7/02  
Kappa list = Nov. 15, 1994  Channel list = Jan. 8, 2002  
Calculated as: Elements Spectral impurity data: CAL.909 Teflon (7/94)  
X-ray path = Vacuum  Film type = No supporting film  
Case number = 0  Known Area, % Rest, Diluent/Sample and Mass/Area  
Eff. Diam. = 25.00 mm  Eff. Area = 490.6 mm2  
KnownConc = 0%  
Rest = 0%  
Dil/Sample = 0  
Viewed Mass = 18000.00 mg  
Sample Height = 5 mm  
Today Mar. 7, 2002

< means that the concentration is < 20 ppm  
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.041 | 29 + Cu | 99.39 | 0.05 | 51 Sb | < | |
| 11 + Na | 0.093 | 0.012 | 30 + Zn | < | | 52 Te | < | |
| 12 Mg | < | | 31 + Ga | 0.007 | 0.003 | 53 I | < | |
| 13 + Al | 0.33 | 0.02 | 32 Ge | <2e | 0.002 | 55 Cs | < | |
| 14 + Si | 0.068 | 0.006 | 33 As | < | | 56 Ba | < | |
| 15 + P | < | | 34 Se | < | | Sum La . . . Lu | 0.017 | 0.073 |
| 16 + S | 0.0083 | 0.0007 | 35 Br | < | | 72 + Hf | < | |
| 16 So | | | 37 Rb | < | | 73 + Ta | < | |
| 17 + Cl | 0.034 | 0.003 | 38 Sr | < | | 74 W | < | |
| 18 + Ar | 0.017 | 0.002 | 39 Y | < | | 75 Re | < | |
| 19 + K | 0.0053 | 0.0008 | 40 Zr | < | | 76 Os | < | |
| 20 + Ca | 0.0036 | 0.0008 | 41 Nb | < | | 77 + Ir | 0.031 | 0.008 |
| 21 Sc | < | | 42 Mo | <2e | 0.002 | 78 Pt | < | |
| 22 Ti | < | | 44 Ru | <2e | 0.002 | 79 Au | <2e | 0.007 |
| 23 V | < | | 45 Rh | < | | 80 Hg | <2e | 0.006 |
| 24 Cr | < | | 46 Pd | < | | 81 + Tl | 0.014 | 0.005 |
| 25 Mn | < | | 47 Ag | < | | 82 Pb | < | |
| 26 Fe | < | | 48 Cd | < | | 83 Bi | <2e | 0.005 |
| 27 Co | < | | 49 In | < | | 90 Th | < | |
| 28 Ni | < | | 50 Sn | < | | 92 U | < | |

| Light Elements | | | Noble Elements | | | Lanthanides | | |
|---|---|---|---|---|---|---|---|---|
| 4 Be | | | 44 Ru | <2e | 0.002 | 57 La | <2e | 0.005 |
| 5 B | | | 45 Rh | < | | 58 Ce | < | |
| 6 C | | | 46 Pd | < | | 59 Pr | < | |
| 7 N | | | 47 Ag | < | | 60 Nd | < | |
| 8 O | | | 75 Re | < | | 62 Sm | < | |
| 9 F | < | | 76 Os | < | | 63 Eu | <2e | 0.002 |
| | | | 77 + Ir | 0.031 | 0.008 | 64 Gd | <2e | 0.002 |
| | | | 78 Pt | < | | 65 Tb | < | |
| | | | 79 Au | <2e | 0.007 | 66 Dy | < | |
| | | | | | | 67 Ho | < | |
| | | | | | | 68 Er | <2e | 0.004 |
| | | | | | | 69 Tm | <2e | 0.004 |
| | | | | | | 70 Yb | < | |
| | | | | | | 71 + Lu | < | |
| KnownConc = 0 | | | REST = 0 | | | D/S = 0 | | |

Sum Conc's before normalisation to 100%: 94.6%

TABLE 40

Quantum Catalytics, LLC ANALYSIS REPORT by Uniquant

| | |
|---|---|
| OLD.340 of Jun. 11, 2001 | Today Jun. 11, 2001 |
| Spectrometers configuration: | ARL 8410 Rh 60 kV LiF220 LiF420 Ge111 TlAP |
| Sample ident = 15-01-03 | AXIAL |
| Further info = 15-01-03 | AXIAL Fe, Cr, Mn, V 6/11 |
| Kappa list = Nov, 15, 1994 | Channel list = Jun. 4, 2001 |
| Calculated as: | Elements Spectral impurity data: CAL.909 Teflon (7/94) |
| X-ray path = Vacuum | Film type = No supporting film |
| Case number = 0 | Known Area, % Rest, Diluent/Sample and Mass/Area |
| Eff. Diam. = 25.00 mm | Eff. Area = 490.6 mm2 |
| KnownConc = 0% | |
| Rest = 0% | |
| Dil/Sample = 0 | |
| Viewed Mass = 18000.00 mg | |
| Sample Height = 5 mm | |

< means that the concentration is < 20 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| Sum Be . . . F | 0 | 0.039 | 29 + Cu | 0.028 | 0.002 | 51 Sb | < | |
| 11 + Na | 0.032 | 0.009 | 30 + Zn | 0.005 | 0.002 | 52 Te | < | |
| 12 Mg | < | | 31 Ga | <2e | 0.001 | 53 I | <2e | 0.002 |
| 13 + Al | 2.28 | 0.07 | 32 Ge | < | | 55 Cs | <2e | 0.002 |
| 14 Si | < | | 33 As | < | | 56 + Ba | <2e | 0.003 |
| 15 + P | 0.0038 | 0.0003 | 34 Se | < | | Sum La . . . Lu | 0 | 0.21 |
| 16 S | | | 35 Br | < | | 72 Hf | <2e | 0.004 |
| 16 + So | 0.0092 | 0.0008 | 37 Rb | < | | 73 Ta | < | |
| 17 + Cl | 0.017 | 0.002 | 38 Sr | < | | 74 W | <2e | 0.004 |
| 18 + Ar | 0.009 | 0.001 | 39 Y | < | | 75 Re | < | |
| 19 + K | < | | 40 + Zr | 0.045 | 0.004 | 76 Os | < | |
| 20 + Ca | 0.0060 | 0.0006 | 41 Nb | < | | 77 Ir | < | |
| 21 Sc | < | | 42 Mo | < | | 78 Pt | < | |
| 22 Ti | < | | 44 Ru | < | | 79 Au | < | |
| 23 + V | 2.38 | 0.07 | 45 Rh | < | | 80 Hg | < | |
| 24 + Cr | 2.71 | 0.08 | 46 Pd | < | | 81 Tl | < | |
| 25 + Mn | 2.05 | 0.07 | 47 Ag | < | | 82 Pb | < | |
| 26 + Fe | 90.4 | 0.1 | 48 Cd | < | | 83 Bi | < | |
| 27 Co | < | | 49 In | < | | 90 + Th | 0.005 | 0.002 |
| 28 + Ni | 0.012 | 0.003 | 50 Sn | < | | 92 U | < | |

| Light Elements | | Noble Elements | | Lanthanides | |
|---|---|---|---|---|---|
| 4 Be | | 44 Ru | < | 57 La | < |
| 5 B | | 45 Rh | < | 58 Ce | < |
| 6 C | | 46 Pd | < | 59 + Pr | < |
| 7 N | | 47 Ag | < | 60 Nd | < |
| 8 O | | 75 Re | < | 62 + Sm | < |
| 9 F | < | 76 Os | < | 63 + Eu | < |
| | | 77 Ir | < | 64 Gd | < |
| | | 78 Pt | < | 65 + Tb | < |
| | | 79 Au | < | 66 Dy | < |
| | | | | 67 Ho | < |
| | | | | 68 + Er | < |
| | | | | 69 + Tm | < |
| | | | | 70 Yb | < |
| | | | | 71 Lu | < |
| KnownConc = 0 | | REST = 0 | | D/S = 0 | |

Sum Conc's before normalisation to 100%: 100.1%

TABLE 41

| Quantum Catalytics, LLC | ANALYSIS REPORT | by Uniquant |
|---|---|---|

OLD.341 of Jun. 4, 2001  Today Jun. 11, 2001
Spectrometers configuration: ARL 8410 Rh 60kV LiF220 LiF420 Ge111 TlAP
Sample ident = 15-01-03  RADIAL
Further info = 15-01-03 RADIAL Fe, Cr, Mn, V 6/11
Kappa list = Nov. 15, 1994  Channel list = Jun. 4, 2001
Calculated as: Elements  Spectral impurity data: CAL.909 Teflon (7/94)
X-ray path = Vacuum  Film type = No supporting film
Case number = 0 Known Area, % Rest, Diluent/Sample and Mass/Area
Eff.Diam. = 25.00 mm  Eff.Area = 490.6 mm2
KnownConc = 0%
Rest = 0%
Dil/Sample = 0
Viewed Mass = 18000.00 mg
Sample Height = 5 mm < means that the concentration is < 20 ppm
<2e means wt % < 2 StdErr. The + in Z + E1 means involved in Sum = 100%

| Z | wt % | StdErr | Z | wt % | StdErr | Z | wt % | StdErr |
|---|---|---|---|---|---|---|---|---|
| SumBe...F | 0 | 0.036 | 29 + Cu | 0.16 | 0.01 | 51 Sb | < | |
| 11 + Na | 0.083 | 0.009 | 30 + Zn | 0.032 | 0.003 | 52 Te | < | |
| 12 + Mg | 0.013 | 0.003 | 31 Ga | <2e | 0.001 | 53 I | < | |
| 13 + Al | 4.5 | 0.1 | 32 Ge | < | | 55 Cs | < | |
| 14 + Si | 0.15 | 0.01 | 33 As | < | | 56 Ba | < | |
| 15 + P | 0.0097 | 0.0009 | 34 Se | < | | SumLa...Lu | 0 | 0.20 |
| 16 S | | | 35 Br | < | | 72 Hf | 0.018 | 0.004 |
| 16 + So | 0.048 | 0.004 | 37 Rb | < | | 73 Ta | < | |
| 17 + Cl | 0.032 | 0.003 | 38 Sr | < | | 74 + W | 0.008 | 0.004 |
| 18 + Ar | 0.010 | 0.001 | 39 Y | < | | 75 Re | < | |
| 19 + K | 0.019 | 0.002 | 40 + Zr | 0.097 | 0.008 | 76 Os | < | |
| 20 + Ca | 0.051 | 0.004 | 41 Nb | < | | 77 Ir | <2e | 0.003 |
| 21 Sc | < | | 42 Mo | <2e | 0.002 | 78 Pt | < | |
| 22 + Ti | 0.0030 | 0.0006 | 44 Ru | < | | 79 Au | < | |
| 23 + V | 2.26 | 0.07 | 45 Rh | < | | 80 Hg | < | |
| 24 + Cr | 2.39 | 0.07 | 46 Pd | < | | 81 Tl | < | |
| 25 + Mn | 2.20 | 0.07 | 47 Ag | <2e | 0.001 | 82 Pb | < | |
| 26 + Fe | 87.9 | 0.2 | 48 Cd | <2e | 0.001 | 83 Bi | < | |
| 27 Co | < | | 49 In | < | | 90 + Th | 0.006 | 0.002 |
| 28 Ni | <2e | 0.003 | 50 Sn | < | | 92 U | < | |

| Light Elements | | Noble Elements | | | Lanthanides | | |
|---|---|---|---|---|---|---|---|
| 4 Be | | 44 Ru | < | | 57 La | < | |
| 5 B | | 45 Rh | < | | 58 Ce | < | |
| 6 C | | 46 Pd | < | | 59 + Pr | < | |
| 7 N | | 47 Ag | <2e | 0.001 | 60 Nd | < | |
| 8 O | | 75 Re | < | | 62 − Sm | < | |
| 9 F | < | 76 Os | < | | 63 + Eu | < | |
| | | 77 Ir | <2e | 0.003 | 64 Gd | < | |
| | | 78 Pt | < | | 65 + Tb | < | |
| | | 79 Au | < | | 66 Dy | < | |
| | | | | | 67 Ho | < | |
| | | | | | 68 + Er | < | |
| | | | | | 69 + Tm | < | |
| | | | | | 70 Yb | < | |
| | | | | | 71 Lu | < | |

KnownConc = 0  REST = 0  D/S = 0
Sum Conc's before normalisation to 100%: 99.9%

What is claimed is:

1. A manufactured copper characterized by the x-ray fluorescence spectrometry plot of FIG. 6A, 6B, 7, or 26.

2. A manufactured nickel characterized by the x-ray fluorescence spectrometry plot of FIG. 27A, 27B, 28A, 28B, 29, or 30.

3. A manufactured nickel characterized by the x-ray fluorescence spectrometry plot of FIG. 27A or 27B.

4. A manufactured cobalt characterized by the x-ray fluorescence spectrometry plot of FIG. 31A, 31B, 32A, 32B, 33A, 33B, or 34.

5. A manufactured cobalt characterized by the x-ray fluorescence spectrometry plot of FIG. 31A or 31B.

6. A manufactured silicon characterized by the x-ray fluorescence spectrometry plot of FIG. 45A, 45B, 46A, 46B, 47A, 47B, 48A, or 48B.

7. A manufactured silicon characterized by the x-ray fluorescence spectrometry plot of FIG. 45A or 45B.

8. An manufactured iron characterized by the x-ray fluorescence spectrometry plot of FIG. 49A, 49B, 50A, 50B, 51A, or 51B.

9. An manufactured iron characterized by the x-ray fluorescence spectrometry plot of FIG. 49A or 49B.

10. An manufactured alloy comprised of copper, gold, and silver characterized by the x-ray fluorescence spectrometry plot of FIG. 35, 36, or 37.

11. An manufactured alloy comprised of tin, lead, and zinc characterized by the x-ray fluorescence spectrometry plot of FIG. 38, 39, or 40.

12. An manufactured alloy comprised of tin, sodium, magnesium, and potassium characterized by the x-ray fluorescence spectrometry plot of FIG. 41, 42, 43, or 44.

13. An alloy comprised of iron, vanadium, chromium, and manganese characterized by the x-ray fluorescence spectrometry plot of FIG. 52, 53, 54, or 55.

14. An manufactured alloy comprised of nickel, tantalum, hafnium, and tungsten characterized by the x-ray fluorescence spectrometry plot of FIG. 56, 57, 58, 59, 60, or 61.

15. A method of processing a metal or an alloy of metals, comprising the steps of:
- (A.) adding the metal or alloy to a reactor in or more steps and melting said metal or alloy;
- (B.) adding a carbon source to the molten metal or alloy and dissolving carbon in said molten metal or alloy, followed by removing the undissolved carbon source;
- (C.) increasing the temperature of the molten metal or alloy;
- (D.) varying the temperature of the molten metal or alloy between two temperatures over one or more cycles;
- (E.) adding a flow of an inert gas through the molten metal or alloy;
- (F.) varying the temperature of the molten metal or alloy between two temperatures over one or more cycles;
- (G.) adding a carbon source to the molten metal or alloy and dissolving carbon in said molten metal or alloy, followed by removing the undissolved carbon source;
- (H.) varying the temperature of the molten metal or alloy between two temperatures over one or more cycles, wherein the molten metal or alloy has a greater degree of saturation with carbon than in Step (F.);
- (I.) stopping the flow of the inert gas;
- (J.) varying the temperature of the molten metal or alloy between two temperatures over one or more cycles, wherein the molten metal or alloy has a greater degree of saturation with carbon than in Step (H.) and wherein an inert gas is added as the temperature is lowered and an inert gas, chosen independently, is added as the temperature is raised;
- (K.) varying the temperature of the molten metal or alloy between two temperatures over one or more cycles, wherein the molten metal or alloy has a greater degree of saturation with carbon than in Step (J.) and wherein an inert gas is added as the temperature is lowered and an inert gas, chosen independently, is added as the temperature is raised;
- (L.) stopping the flow of the inert gases;
- (M.) varying the temperature of the molten metal or alloy between two temperatures over one or more cycles, wherein the molten metal or alloy has an equal or greater degree of saturation with carbon than in Step (K.); and
- (N.) cooling the molten metal or alloy to room temperature, thereby obtaining a solidified manufactured metal or alloy.

16. The method of claim 15, wherein the metal is a transition metal.

17. The method of claim 16, wherein the transition metal is chromium, manganese, iron, cobalt, nickel, copper, zinc, or alloys thereof.

18. The method of claim 15, wherein the metal is an alkali metal or an alkaline earth metal.

19. The method of claim 15, wherein the metal is silicon.

20. The method of claim 15, wherein the metal is aluminum.

21. The method of claim 15, wherein the alloy of metals comprises copper, gold, and silver.

22. The method of claim 15, wherein the alloy of metals comprises tin, zinc, and lead.

23. The method of claim 15, wherein the alloy of metals comprises tin, sodium, magnesium, and potassium.

24. The method of claim 15, wherein the alloy of metals comprises iron, vanadium, chromium, and manganese.

25. The method of claim 15, wherein the alloy of metals comprises nickel, tantalum, hafnium, and tungsten.

26. The method of claim 15, wherein the carbon source of Steps (B.) and (G.), independently, is a graphite rod, graphite powder, graphite flakes, diamond, fullerenes, natural gas, methane, ethane, propane, butane, pentane, cast iron, iron comprising carbon, or steel comprising carbon.

27. The method of claim 15, wherein each cycle of Steps (D.), (F.), (H.), (J.), (K.), and (L.) comprises, in any order, a period of increasing metal or alloy temperature and a period of decreasing metal or alloy temperature and wherein a cycle has a duration of 3 to 67 minutes.

28. The method of claim 27, wherein each cycle of Steps (D.), (F.), (H.), (J.), (K.), and (L.) comprises, in any order, a period of increasing metal or alloy temperature and a period of decreasing metal or alloy temperature and wherein a cycle has a duration of 8 to 30 minutes.

29. The method of claim 15, wherein the period of increasing metal or alloy temperature in Steps (D.), (F.), (H.), (J.), (K.), and/or (L.), independently, is different than the period of decreasing metal or alloy temperature.

30. The method of claim 15, wherein the period of increasing metal or alloy temperature in Steps (D.), (F.), (H.), (J.), (K.), and/or (L.), independently, is equal to the period of decreasing metal or alloy temperature.

31. The method of claim 15, wherein the inert gas of Steps (E.), (J.), and (K.), independently, is argon, nitrogen, helium, neon, xenon, hydrogen, krypton, and mixtures thereof.

32. The method of claim 15, wherein the molten metal or alloy of Step (N.) is cooled to room temperature by heat exchange with inert gas over 1 to 72 hours.

33. The method of claim 15, wherein the molten metal or alloy of Step (N.) is cooled to room temperature by quenching in a bath comprising tap water, distilled water, deionized water, other forms of water, inert gases, liquid nitrogen or other suitable liquified gases, a thermally-stable oil or organic coolant, and combinations thereof.

34. The method of claim 15, wherein the reactor is an induction furnace.

35. A method of processing a metal or an alloy of metals, comprising the steps of:
- (A.) adding the metal or alloy to a reactor in one or more steps and melting said metal or alloy;
- (B.) adding a carbon source to the molten metal or alloy and dissolving carbon in said molten metal or alloy, followed by removing the undissolved carbon source;
- (C.) varying the temperature of the molten metal or alloy between two temperatures over two or more cycles;
- (D.) adding a carbon source to the molten metal or alloy and further dissolving carbon in said molten metal or alloy, followed by removing the undissolved carbon source;
- (E.) varying the temperature of the molten metal or alloy between two temperatures over two or more cycles, wherein the molten metal or alloy has a greater degree of saturation with carbon than in Step (D.); and (F.) cooling the molten metal or alloy to room temperature, thereby obtaining a solidified manufactured metal or alloy;

further characterized by adding a flow of inert gas before, during, or after Steps (B.) through (E.).

36. The method of claim 35, wherein the metal is a transition metal.

37. The method of claim 36, wherein the transition metal is chromium, manganese, iron, cobalt, nickel, copper, zinc, or alloys thereof.

38. The method of claim 35, wherein the metal is an alkali metal or an alkaline earth metal.

39. The method of claim 35, wherein the metal is silicon.

40. The method of claim 35, wherein the metal is aluminum.

41. A method of processing copper, comprising the steps of:

(A.) adding copper to a reactor in one or more steps and melting copper;

(B.) adding a carbon source to the molten copper and dissolving carbon in the molten copper, followed by removing the undissolved carbon source;

(C.) increasing the temperature of the copper;

(D.) varying the temperature of the molten copper between two temperatures over 15 cycles;

(E.) adding a flow of an inert gas through the molten copper;

(F.) varying the temperature of the molten copper between two temperatures over 5 cycles;

(G.) adding a carbon source to the molten copper and dissolving carbon in the molten copper, followed by removing the undissolved carbon source;

(H.) varying the temperature of the molten copper between two temperatures over 20 cycles;

(I.) stopping the flow of the inert gas;

(J.) varying the temperature of the molten copper between two temperatures over 4.5 cycles, wherein an inert gas is added as the temperature is lowered and an inert gas, chosen independently, is added as the temperature is raised;

(K.) varying the temperature of the molten copper between two temperatures over 15.5 cycles, wherein an inert gas is added as the temperature is lowered and an inert gas, chosen independently, is added as the temperature is raised;

(L.) stopping the flow of the inert gases;

(M.) varying the temperature of the molten copper between two temperatures over 1 cycle; and (N.) cooling the molten copper to room temperature, thereby obtaining a solidified manufactured copper.

42. A method of processing copper of claim 1, comprising:

(1.) contacting molten copper with a carbon source;

(2.) an iterative cycling process, wherein relative saturation of copper with carbon remains the same or increases independently with each cycle; and (3.) cooling the molten copper to room temperature, thereby obtaining a solidified manufactured copper.

* * * * *